US010491796B2

(12) United States Patent
Brav et al.

(10) Patent No.: US 10,491,796 B2
(45) Date of Patent: Nov. 26, 2019

(54) DEVICES, METHODS AND SYSTEMS FOR VISUAL IMAGING ARRAYS

(71) Applicant: The Invention Science Fund II, LLC, Bellevue, WA (US)

(72) Inventors: Ehren Brav, Bainbridge Island, WA (US); Russell Hannigan, Sammamish, WA (US); Roderick A. Hyde, Redmond, WA (US); Muriel Y. Ishikawa, Livermore, CA (US); 3ric Johanson, Seattle, WA (US); Jordin T. Kare, San Jose, CA (US); Tony S. Pan, Bellevue, WA (US); Phillip Rutschman, Seattle, WA (US); Clarence T. Tegreene, Mercer Island, WA (US); Charles Whitmer, North Bend, WA (US); Lowell L. Wood, Jr., Bellevue, WA (US); Victoria Y. H. Wood, Livermore, CA (US)

(73) Assignee: The Invention Science Fund II, LLC, Bellevue, WA (US)

( * ) Notice: Subject to any disclaimer, the term of this patent is extended or adjusted under 35 U.S.C. 154(b) by 0 days.

(21) Appl. No.: 14/838,128

(22) Filed: Aug. 27, 2015

(65) Prior Publication Data
US 2016/0227259 A1 Aug. 4, 2016

Related U.S. Application Data

(63) Continuation of application No. 14/838,114, filed on Aug. 27, 2015, and a continuation-in-part of
(Continued)

(51) Int. Cl.
H04N 5/232 (2006.01)
H04N 7/18 (2006.01)
(Continued)

(52) U.S. Cl.
CPC ......... *H04N 5/23206* (2013.01); *G06F 3/011* (2013.01); *G06K 9/00624* (2013.01);
(Continued)

(58) Field of Classification Search
CPC ......... H04N 5/23206; H04N 21/23418; H04N 5/23293; H04N 5/23229; H04N 21/21805;
(Continued)

(56) References Cited

U.S. PATENT DOCUMENTS 5,262,856 A 11/1993 Lippman et al.
5,493,581 A 2/1996 Young et al.
(Continued)

FOREIGN PATENT DOCUMENTS

JP 2003111050 A 4/2003
JP 2004040351 A 2/2004
(Continued)

OTHER PUBLICATIONS

Samaneigo et al.; "A Portable, Scalable Retinal Imaging System"; TI Engibous Competition Report; Rice University; Spring 2012; pp. 1-96; mobileVision.
(Continued)

*Primary Examiner* — Albert H Cutler

(57) ABSTRACT

Computationally implemented methods and systems include acquiring a request for particular image data that is part of a scene, transmitting the request for the particular image data to an image sensor array that includes more than one image sensor and that is configured to capture the scene that is larger than the requested particular image data, receiving only the particular image data from the image sensor array, and transmitting the received particular image data to at least one requestor. In addition to the foregoing, other aspects are described in the claims, drawings, and text.

38 Claims, 90 Drawing Sheets

Related U.S. Application Data application No. 14/714,239, filed on May 15, 2015, now Pat. No. 10,027,873, and a continuation-in-part of application No. 14/791,160, filed on Jul. 2, 2015, now Pat. No. 9,866,765, which is a continuation of application No. 14/791,127, filed on Jul. 2, 2015, now Pat. No. 9,924,109.

(60) Provisional application No. 62/081,559, filed on Nov. 18, 2014, provisional application No. 62/081,560, filed on Nov. 18, 2014, provisional application No. 62/082,001, filed on Nov. 19, 2014, provisional application No. 62/082,002, filed on Nov. 19, 2014, provisional application No. 62/156,162, filed on May 1, 2015, provisional application No. 62/180,040, filed on Jun. 15, 2015.

(51) Int. Cl.
| | |
|---|---|
| *G06F 3/01* | (2006.01) |
| *H04N 21/218* | (2011.01) |
| *H04N 21/81* | (2011.01) |
| *H04N 21/2662* | (2011.01) |
| *H04N 21/239* | (2011.01) |
| *H04N 21/234* | (2011.01) |
| *H04N 21/2183* | (2011.01) |
| *G06K 9/00* | (2006.01) |

(52) U.S. Cl.
CPC ..... *H04N 5/23229* (2013.01); *H04N 5/23293* (2013.01); *H04N 5/23296* (2013.01); *H04N 7/181* (2013.01); *H04N 21/2183* (2013.01); *H04N 21/21805* (2013.01); *H04N 21/2393* (2013.01); *H04N 21/23418* (2013.01); *H04N 21/2662* (2013.01); *H04N 21/812* (2013.01); *G06T 2207/30196* (2013.01); *G06T 2207/30221* (2013.01)

(58) Field of Classification Search
CPC ............. H04N 21/2183; H04N 21/812; H04N 21/2393; H04N 21/2662; H04N 5/23296; G06K 9/00624; G06T 2207/30221; G06T 2207/30196
See application file for complete search history.

(56) References Cited

U.S. PATENT DOCUMENTS

| | | | |
|---|---|---|---|
| 6,704,465 | B2 | 3/2004 | Aoi et al. |
| 6,954,288 | B2 | 10/2005 | Uekusa et al. |
| 7,623,152 | B1 | 11/2009 | Kaplinsky |
| 7,675,549 | B1* | 3/2010 | Brower .............. H04N 1/00244 |
| | | | 348/157 |
| 7,680,192 | B2 | 3/2010 | Kaplinsky |
| 7,720,282 | B2 | 5/2010 | Blake et al. |
| 7,733,371 | B1 | 6/2010 | Monroe |
| 7,746,378 | B2 | 6/2010 | Shu et al. |
| 8,340,453 | B1 | 12/2012 | Chen et al. |
| 9,165,406 | B1 | 10/2015 | Gray et al. |
| 9,866,765 | B2 | 1/2018 | Brav et al. |
| 9,866,881 | B2 | 1/2018 | Brav et al. |
| 9,924,109 | B2 | 3/2018 | Brav et al. |
| 2001/0039565 | A1 | 11/2001 | Gupta |
| 2002/0076098 | A1 | 6/2002 | Love |
| 2002/0090140 | A1 | 7/2002 | Thirsk |
| 2002/0092029 | A1 | 7/2002 | Smith |
| 2003/0025803 | A1 | 2/2003 | Nakamura et al. |
| 2003/0179937 | A1 | 9/2003 | Brake et al. |
| 2004/0010803 | A1* | 1/2004 | Berstis ............... H04N 5/23206 |
| | | | 725/105 |
| 2004/0130624 | A1 | 7/2004 | Ryley et al. |
| 2004/0131281 | A1 | 7/2004 | Reiners |
| 2004/0136456 | A1* | 7/2004 | Ogden ............... G09G 5/006 |
| | | | 375/240.01 |
| 2005/0073585 | A1 | 4/2005 | Ettinger et al. |
| 2005/0122397 | A1 | 6/2005 | Henson et al. |
| 2005/0157173 | A1 | 7/2005 | Kurebayashi et al. |
| 2005/0163346 | A1 | 7/2005 | van den Bergen et al. |
| 2005/0206726 | A1 | 9/2005 | Yoshida et al. |
| 2005/0226539 | A1 | 10/2005 | Schweng |
| 2006/0007461 | A1 | 1/2006 | Ferlitsch |
| 2006/0125921 | A1 | 6/2006 | Foote |
| 2006/0125937 | A1 | 6/2006 | LeGall et al. |
| 2007/0014485 | A1 | 1/2007 | McAlpine et al. |
| 2007/0024706 | A1 | 2/2007 | Brannon, Jr. et al. |
| 2007/0030353 | A1 | 2/2007 | Novak |
| 2007/0126863 | A1 | 6/2007 | Prechtl et al. |
| 2007/0171301 | A1 | 7/2007 | Tatsumi |
| 2007/0182819 | A1 | 8/2007 | Monroe |
| 2007/0188624 | A1 | 8/2007 | Zhang |
| 2007/0279494 | A1 | 12/2007 | Aman et al. |
| 2007/0296814 | A1* | 12/2007 | Cooper ................ H04N 19/503 |
| | | | 348/143 |
| 2008/0031496 | A1 | 2/2008 | Takagi |
| 2008/0036864 | A1* | 2/2008 | McCubbrey ............. H04N 7/18 |
| | | | 348/159 |
| 2008/0036875 | A1 | 2/2008 | Jones et al. |
| 2008/0143842 | A1 | 6/2008 | Gillard et al. |
| 2008/0309970 | A1 | 12/2008 | Kobayashi |
| 2009/0040293 | A1 | 2/2009 | Foo et al. |
| 2009/0123070 | A1 | 5/2009 | Xiaoying |
| 2009/0129653 | A1 | 5/2009 | DeHority et al. |
| 2009/0244404 | A1 | 10/2009 | Park |
| 2009/0251530 | A1* | 10/2009 | Cilia ...................... B60R 11/04 |
| | | | 348/39 |
| 2010/0053443 | A1 | 3/2010 | Tsukagoshi |
| 2010/0110892 | A1 | 5/2010 | Lai et al. |
| 2010/0123872 | A1 | 5/2010 | Aikawa et al. |
| 2010/0246988 | A1 | 9/2010 | Dekel et al. |
| 2010/0304731 | A1* | 12/2010 | Bratton ................. H04N 5/232 |
| | | | 455/420 |
| 2011/0164108 | A1 | 7/2011 | Bates et al. |
| 2012/0019671 | A1 | 1/2012 | Goldberg et al. |
| 2012/0072762 | A1 | 3/2012 | Atchison et al. |
| 2012/0169842 | A1 | 7/2012 | Chuang et al. |
| 2012/0274899 | A1 | 11/2012 | Wang et al. |
| 2013/0070047 | A1* | 3/2013 | DiGiovanni ........... H04N 5/222 |
| | | | 348/36 |
| 2013/0141523 | A1 | 6/2013 | Banta et al. |
| 2013/0321635 | A1 | 12/2013 | Finn et al. |
| 2013/0335584 | A1 | 12/2013 | Kato et al. |
| 2014/0059603 | A1 | 2/2014 | Lee et al. |
| 2015/0029464 | A1 | 1/2015 | Jayasundera et al. |
| 2015/0211870 | A1 | 7/2015 | Nickolaou |
| 2015/0223686 | A1 | 8/2015 | Wang |
| 2015/0371360 | A1 | 12/2015 | Mohamed et al. |
| 2016/0012367 | A1 | 1/2016 | Korb et al. |
| 2016/0180194 | A1 | 6/2016 | Karyodisa |
| 2016/0213249 | A1 | 7/2016 | Cornsweet et al. |
| 2016/0296112 | A1 | 10/2016 | Fletcher et al. |
| 2018/0063372 | A1 | 3/2018 | Rutschman et al. |
| 2018/0157930 | A1 | 6/2018 | Rutschman et al. |

FOREIGN PATENT DOCUMENTS

| | | |
|---|---|---|
| JP | 2004088483 A | 3/2004 |
| JP | 2005333552 A | 12/2005 |
| JP | 2014192804 A | 10/2014 |
| KR | 1020110072846 | 6/2011 |
| WO | WO 2013/069565 A1 | 5/2013 |

OTHER PUBLICATIONS

PCT International Search Report; International App. No. PCT/US2015/061389; dated Feb. 23, 2016; pp. 1-3.

PCT International Search Report; International App. No. PCT/US2015/061384; dated Feb. 23, 2016; pp. 1-4.

PCT International Search Report; International App. No. PCT/US 15/1439; dated Mar. 7, 2016; pp. 1-2.

(56) References Cited

OTHER PUBLICATIONS

PCT International Search Report; International App. No. PCT/US2017/050498; dated Dec. 15, 2017; pp. 1-3.
PCT International Search Report; International App. No. PCT/US2018/055581; dated Mar. 11, 2019; pp. 1-3.

\* cited by examiner

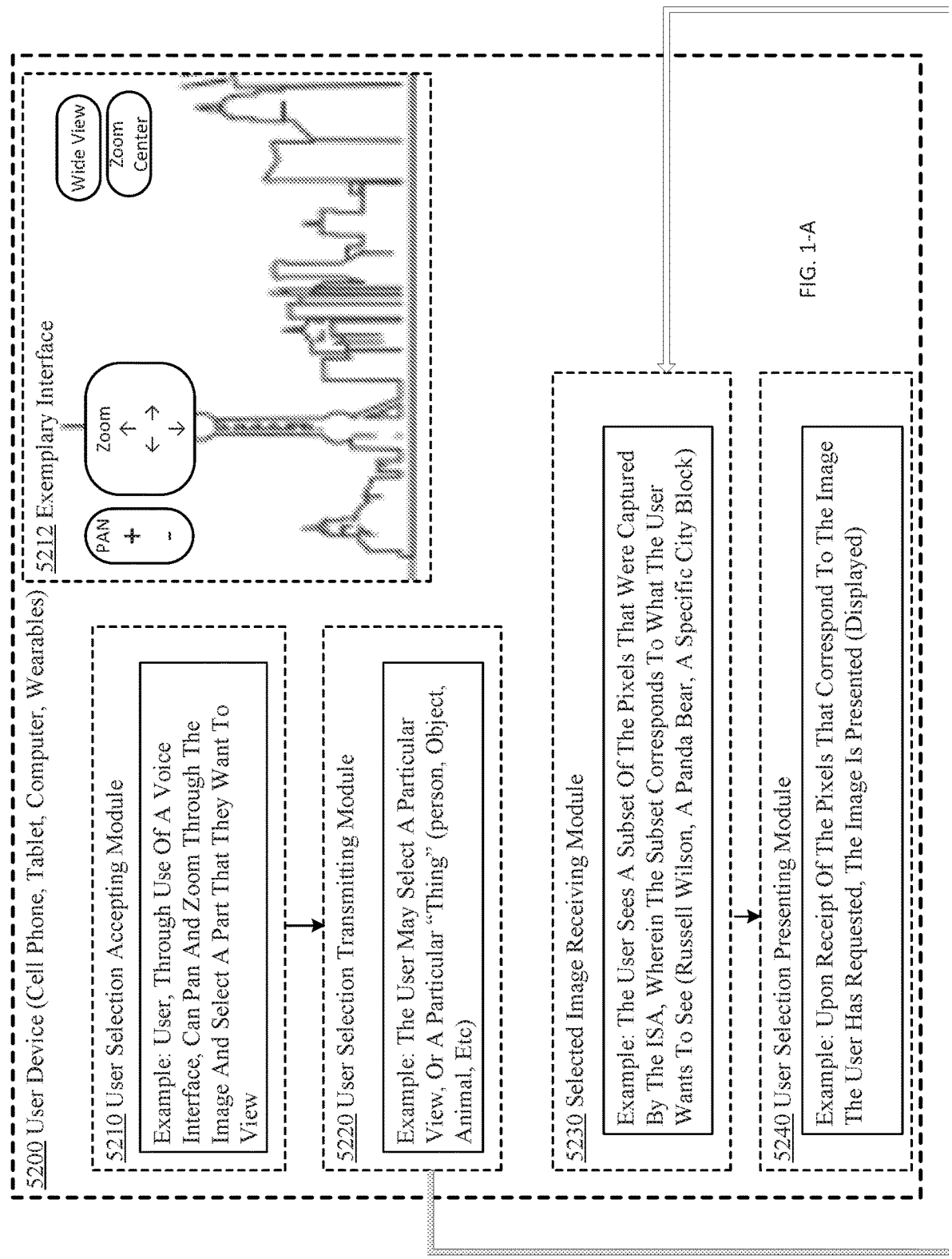

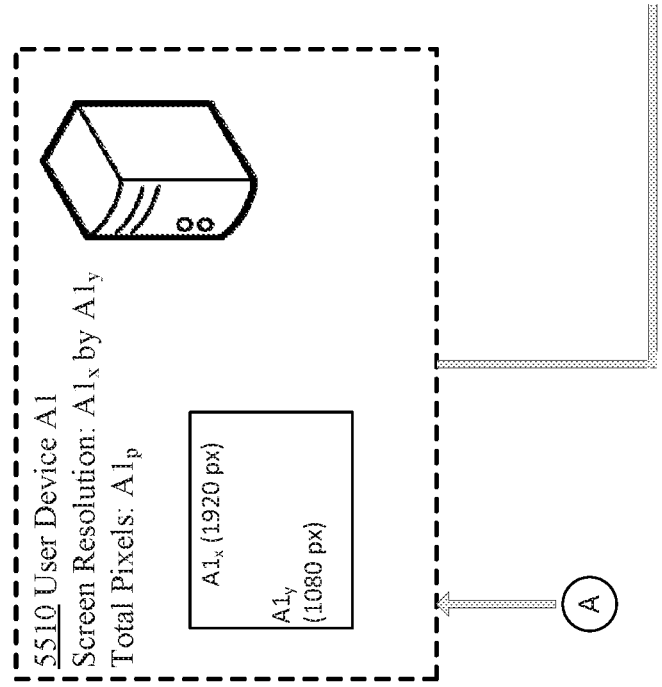
FIG. 1-B

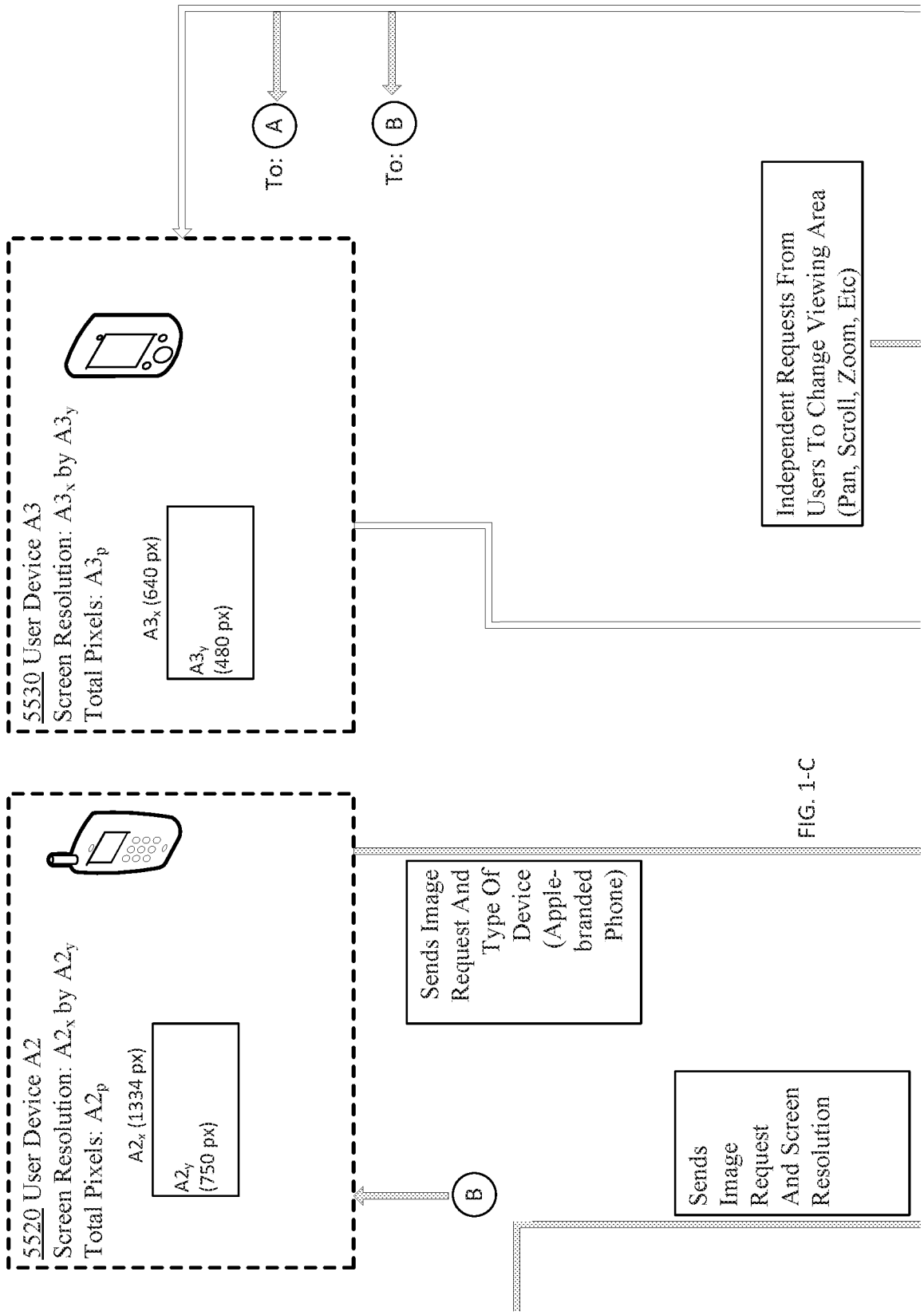

| FIG. 1-A | FIG. 1-B | FIG. 1-C | FIG. 1-D | FIG. 1-E | FIG. 1-F | FIG. 1-G | FIG. 1-H | FIG. 1-I | FIG. 1-J |
|---|---|---|---|---|---|---|---|---|---|
| FIG. 1-K | FIG. 1-L | FIG. 1-M | FIG. 1-N | FIG. 1-O | FIG. 1-P | FIG. 1-Q | FIG. 1-R | FIG. 1-S | FIG. 1-T |
| FIG. 1-U | FIG. 1-V | FIG. 1-W | FIG. 1-X | FIG. 1-Y | FIG. 1-Z | FIG. 1-AA | FIG. 1-AB | FIG. 1-AC | FIG. 1-AD |
| FIG. 1-AE | FIG. 1-AF | FIG. 1-AG | FIG. 1-AH | FIG. 1-AI | FIG. 1-AJ | FIG. 1-AK | FIG. 1-AL | FIG. 1-AM | FIG. 1-AN |

There Are No Modules On This Page, But It Is Required To Show The Complete View Of The Entire System. This Page Fits Into Position (1,4) Of The Grid To Fig. 1-N →

FIG. 1-D

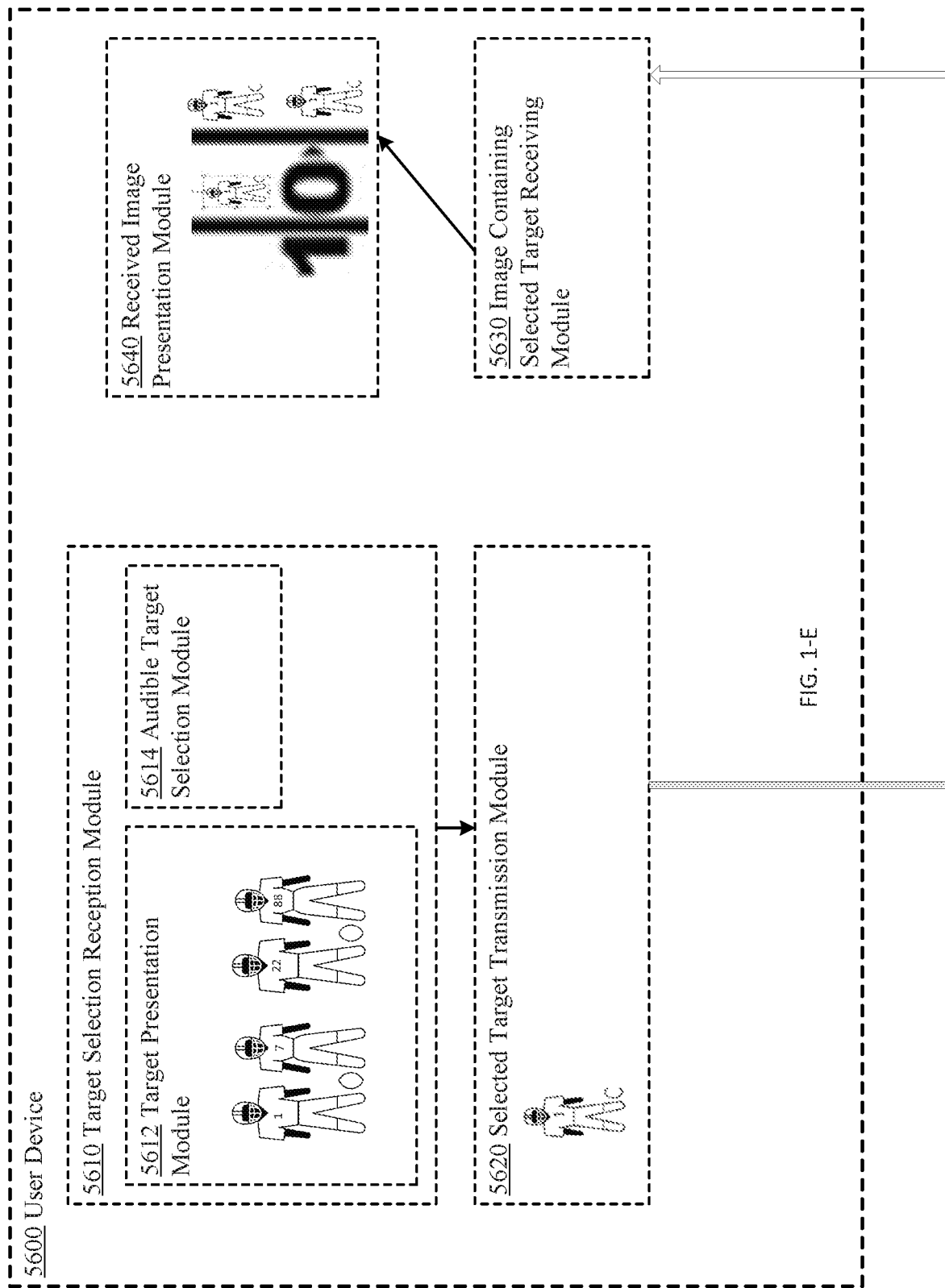
FIG. 1-E

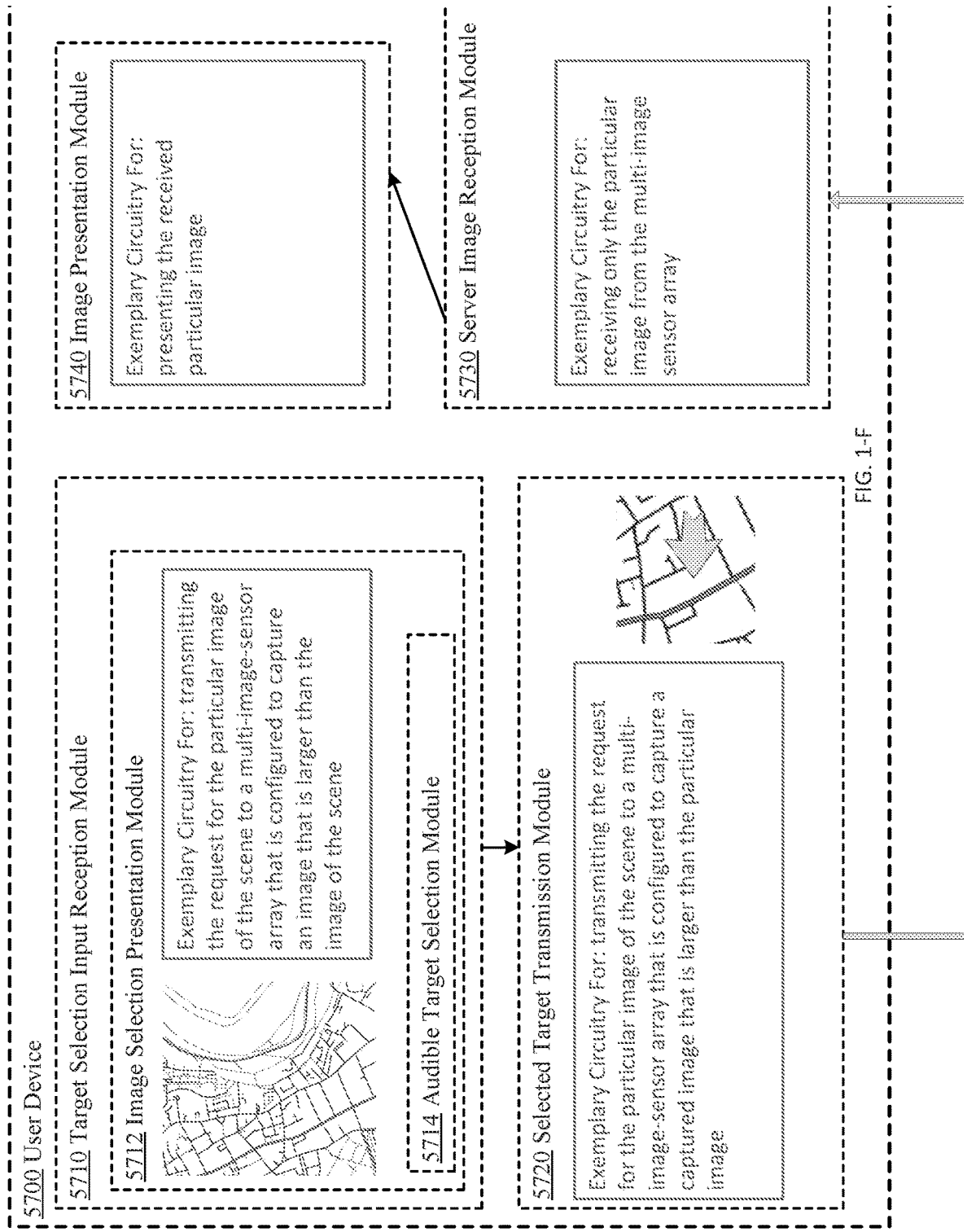

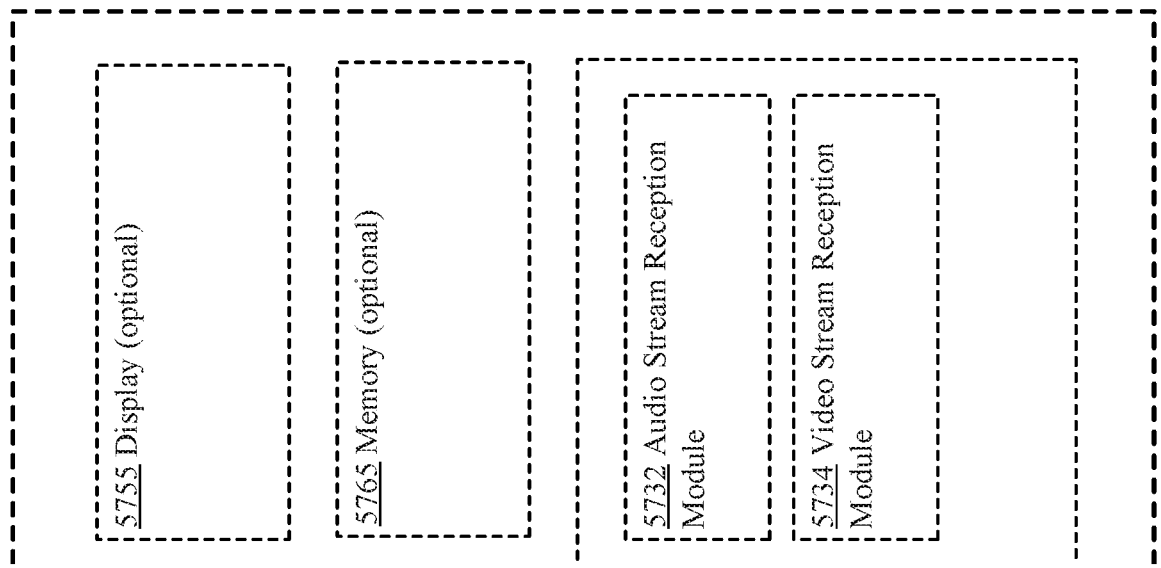
FIG. 1-G

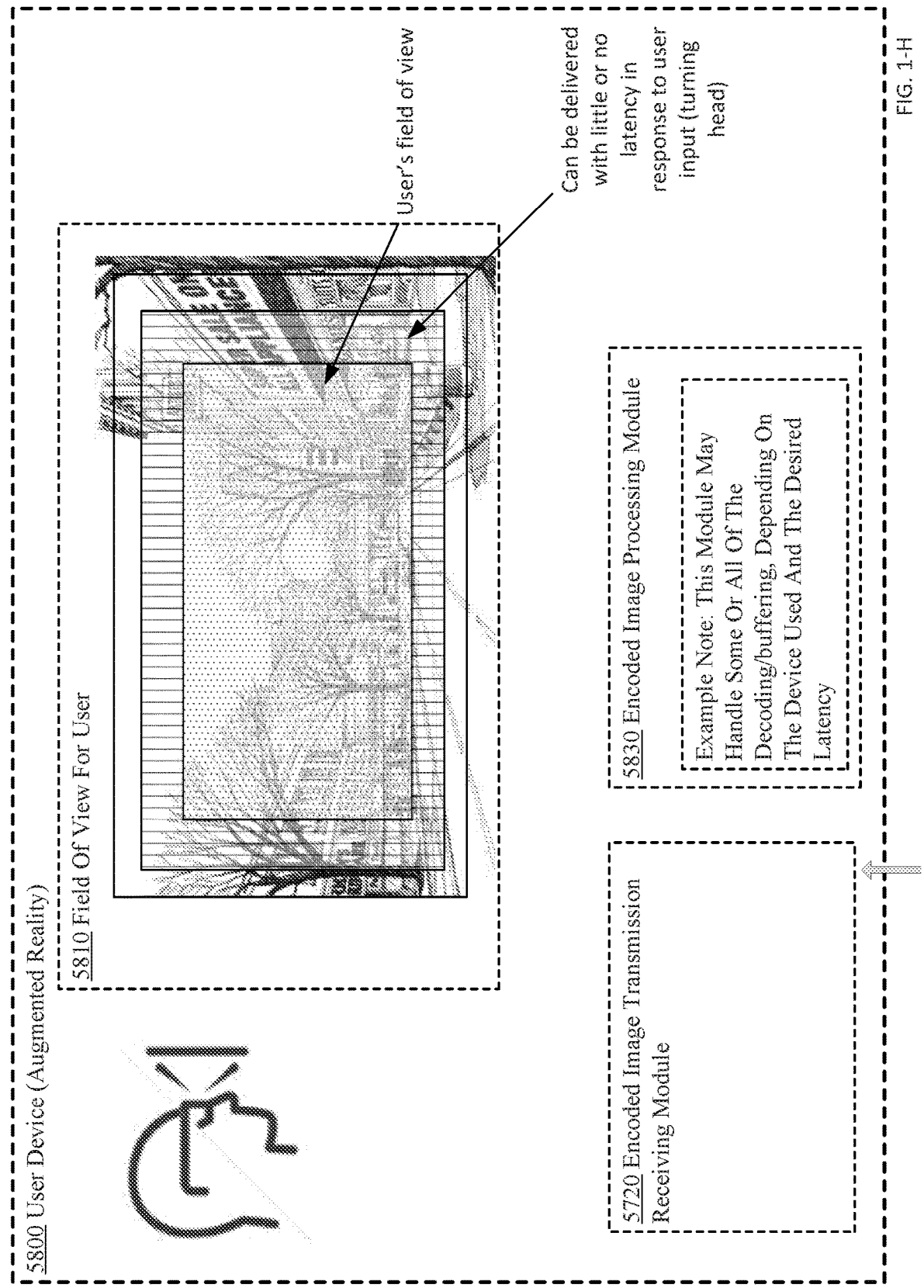
FIG. 1-H

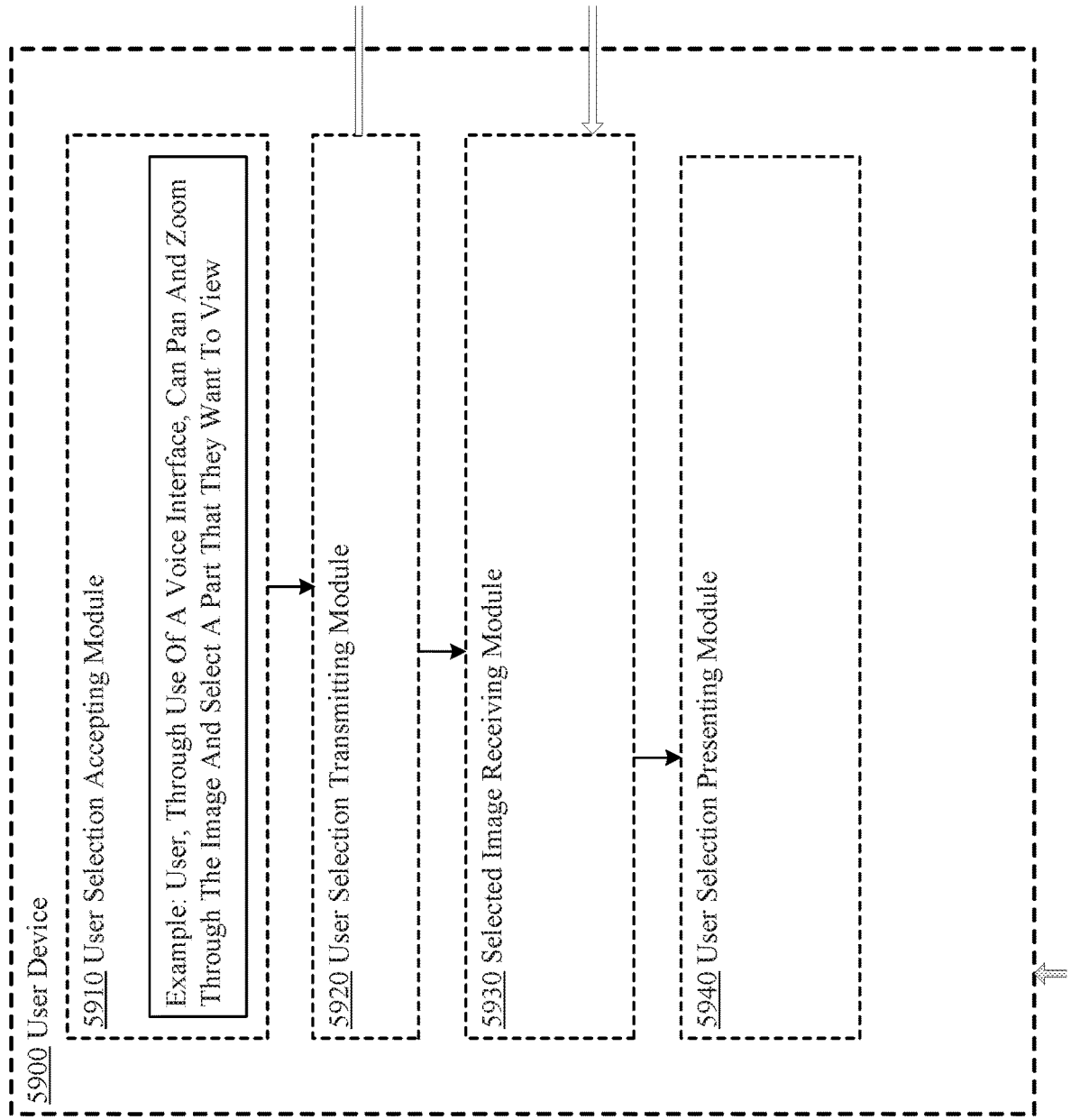
FIG. 1-I

There Are No Entire Modules On This Page, But It Is Required To Show The Complete View Of The Entire System, And Also To Show The Connections Between User Device 5900 Of Fig. 1-I (To The Left) And Server 4000 Of Fig. 1-T (Below). This Page Fits Into Position (1,10) Of The Grid

FIG. 1-J

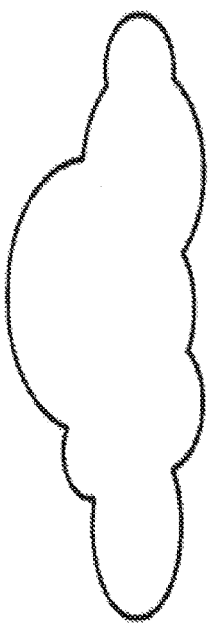
FIG. 1-K

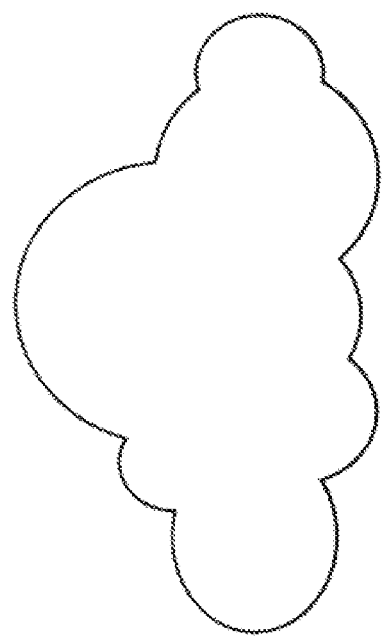
FIG. 1-L

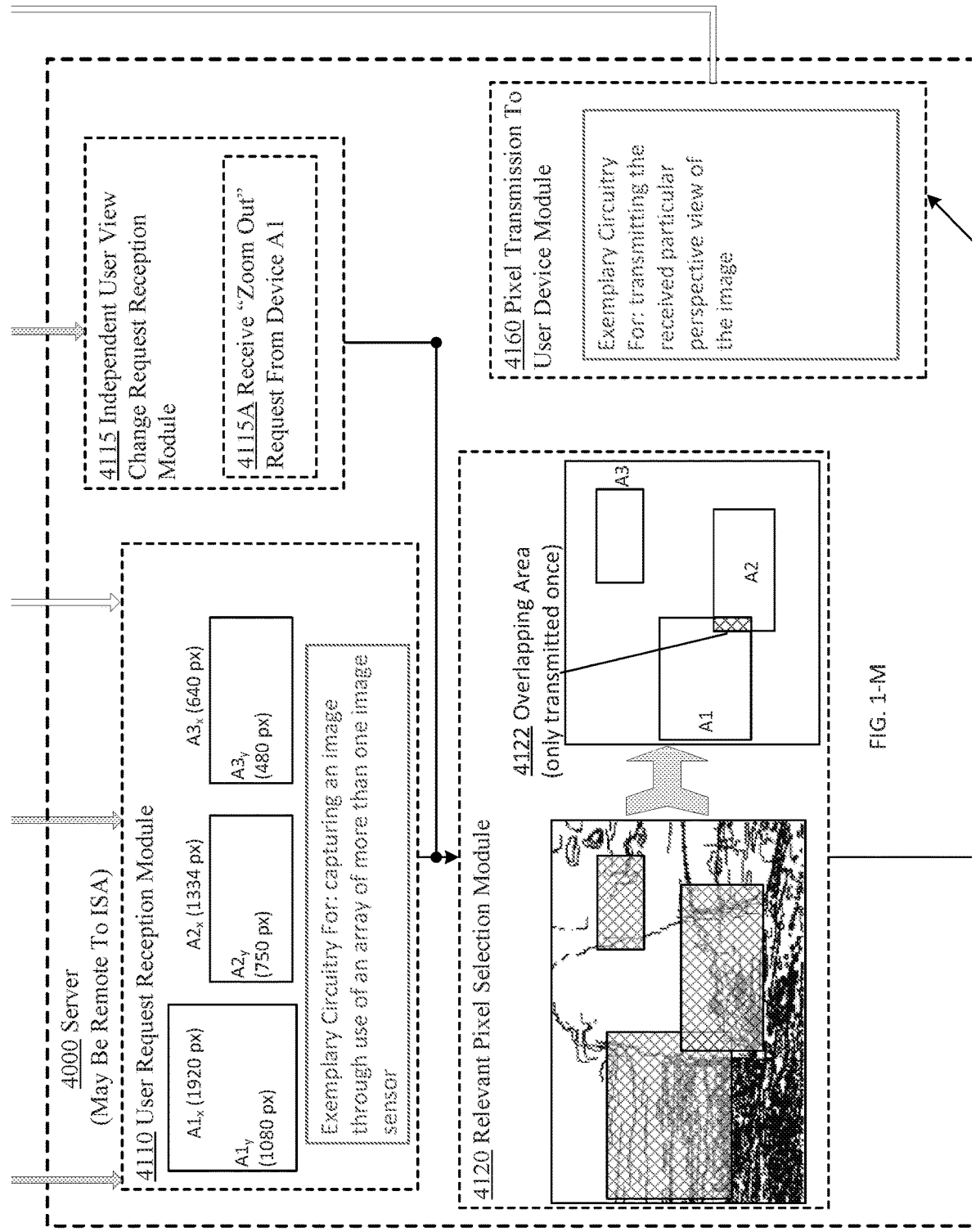
FIG. 1-M

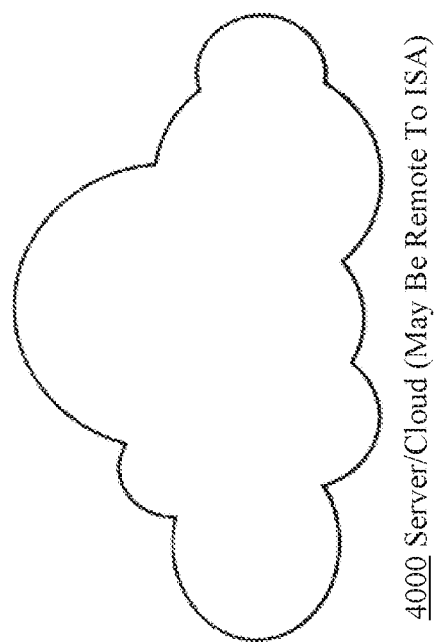
4000 Server/Cloud (May Be Remote To ISA)
FIG. 1-N

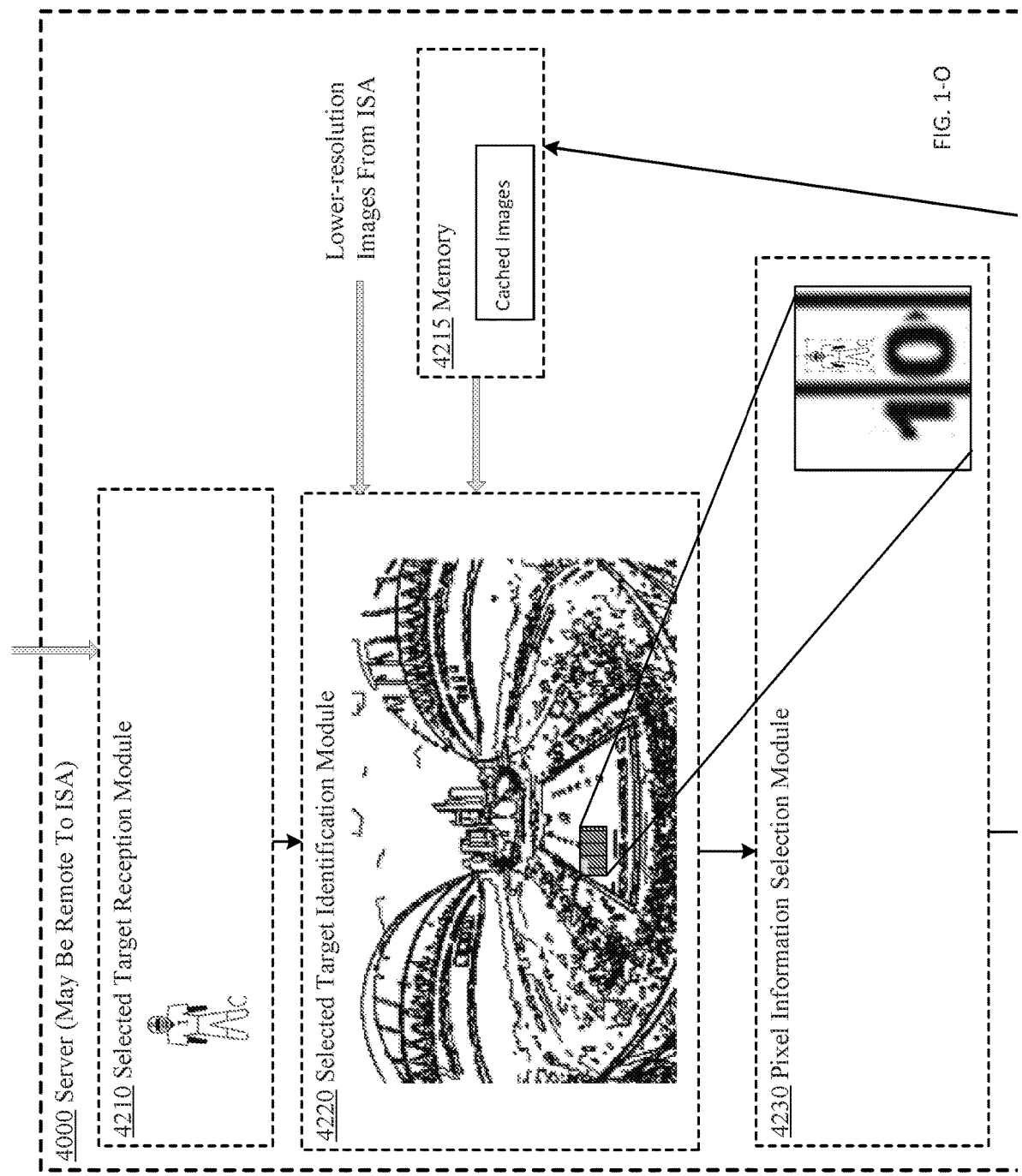
FIG. 1-O

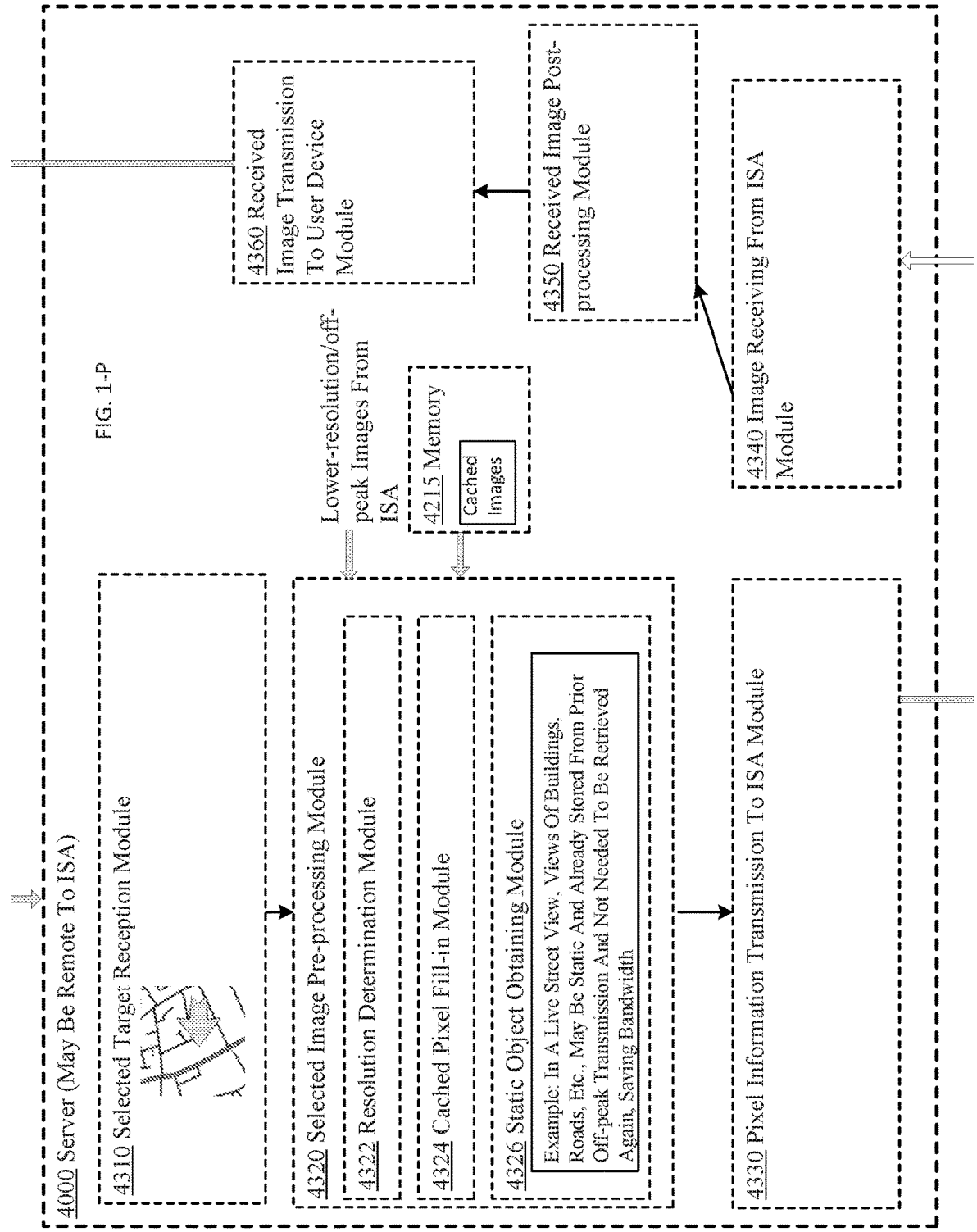

There Are No Modules On This Page, But It Is Required To Show The Complete View Of The Entire System. This Page Fits Into Position (2,7) Of The Grid To Fig. 1-AA →

To Fig. 1-P ↓

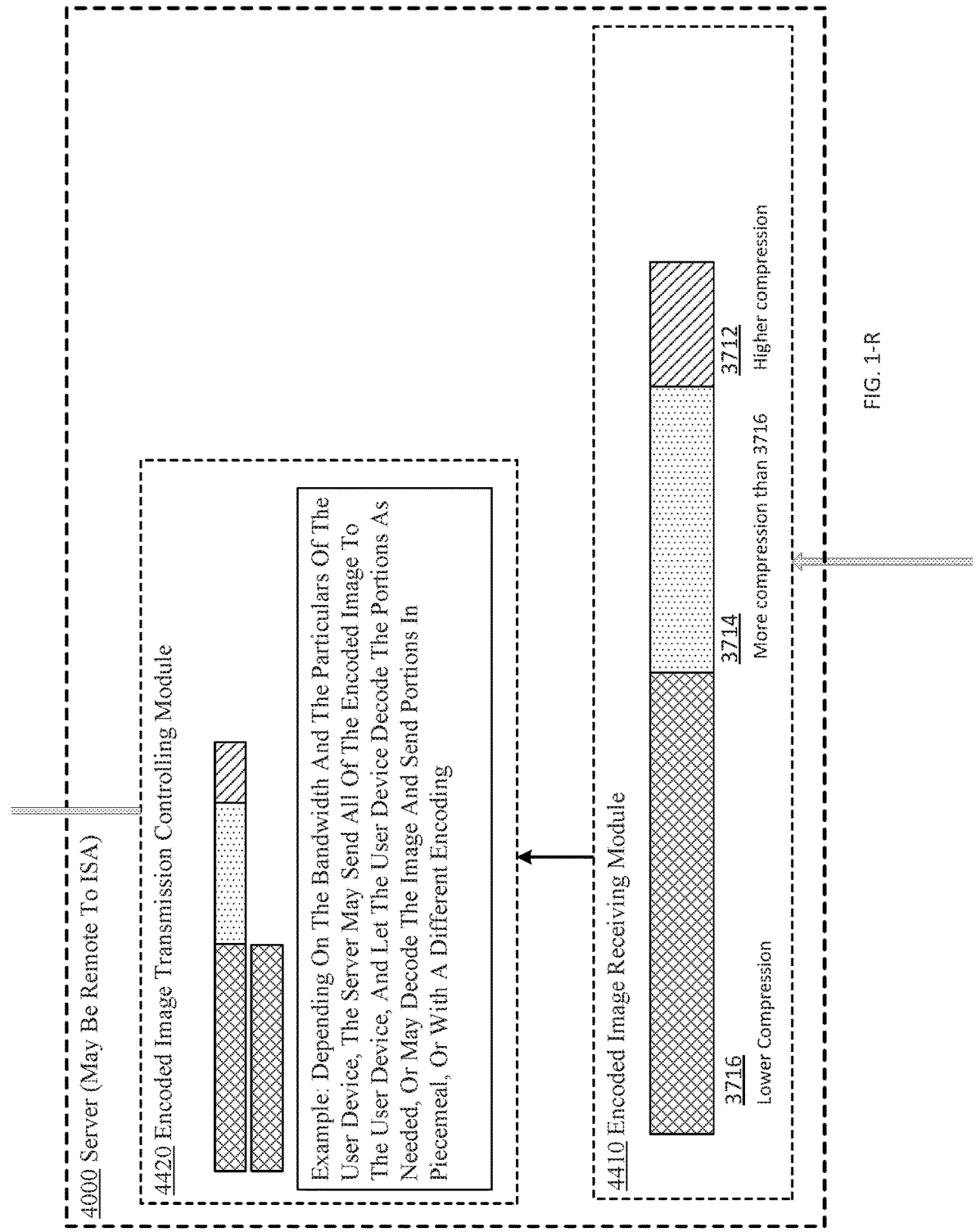

FIG. 1-S

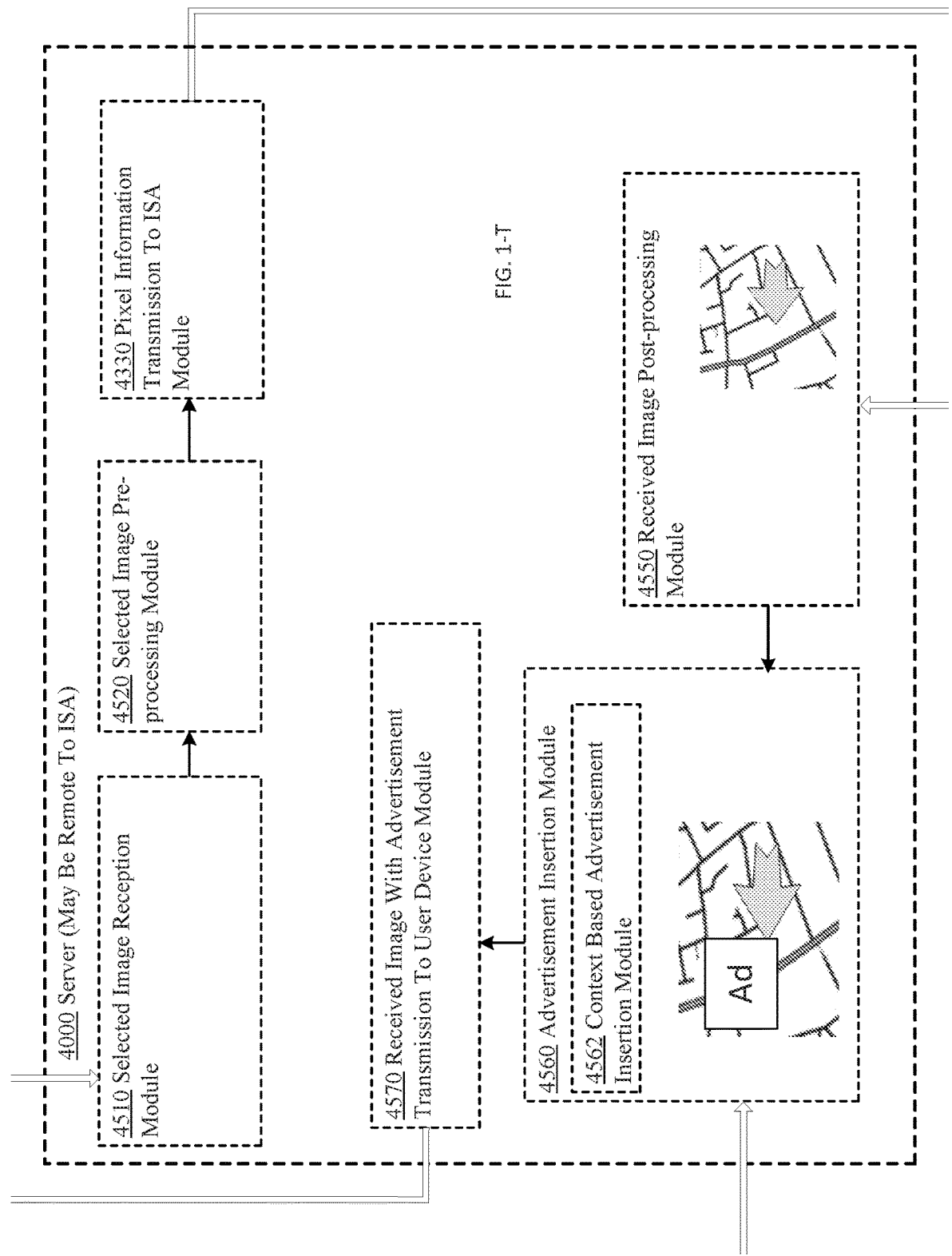
FIG. 1-T

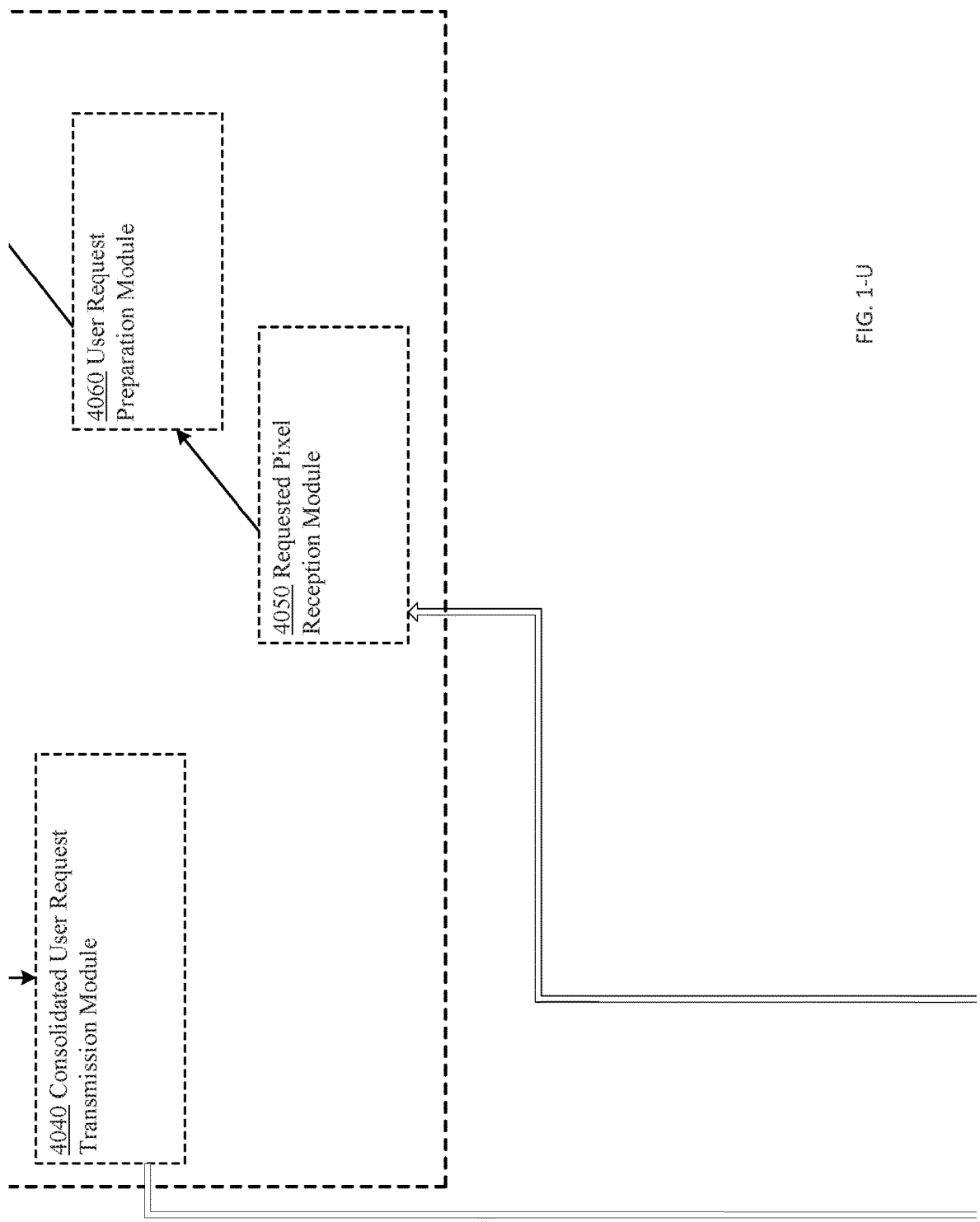

There Are No Modules On This Page, But It Is Required To Show The Complete View Of The Entire System. This Page Fits Into Position (3,2) Of The Grid To Fig. 1-AF →

To Fig. 1-U ↓

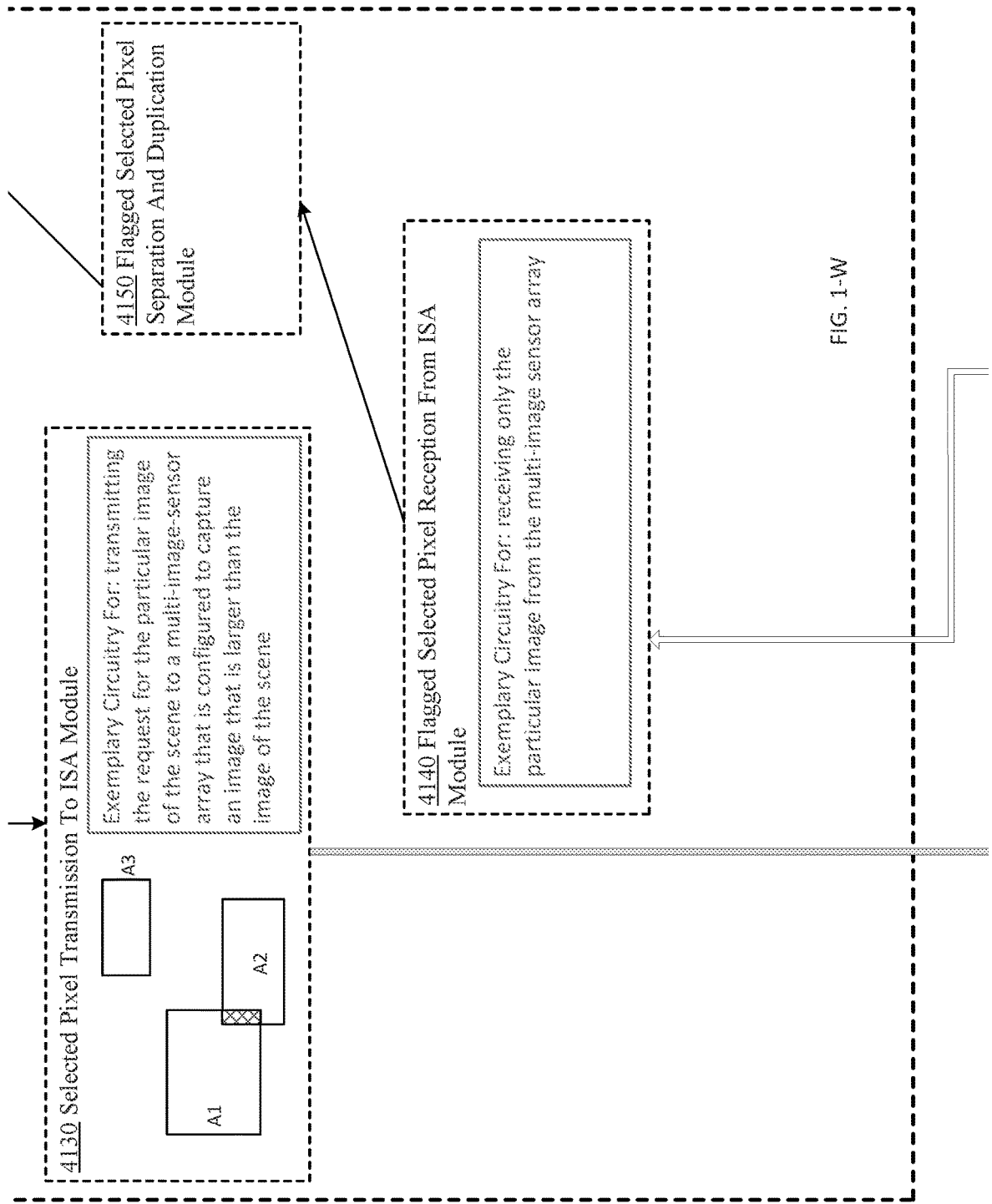

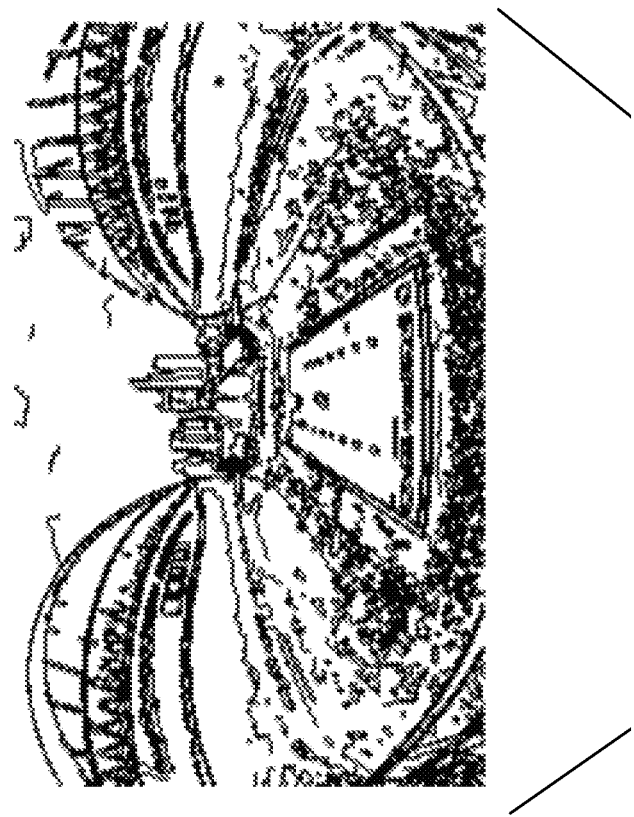
FIG. 1-X

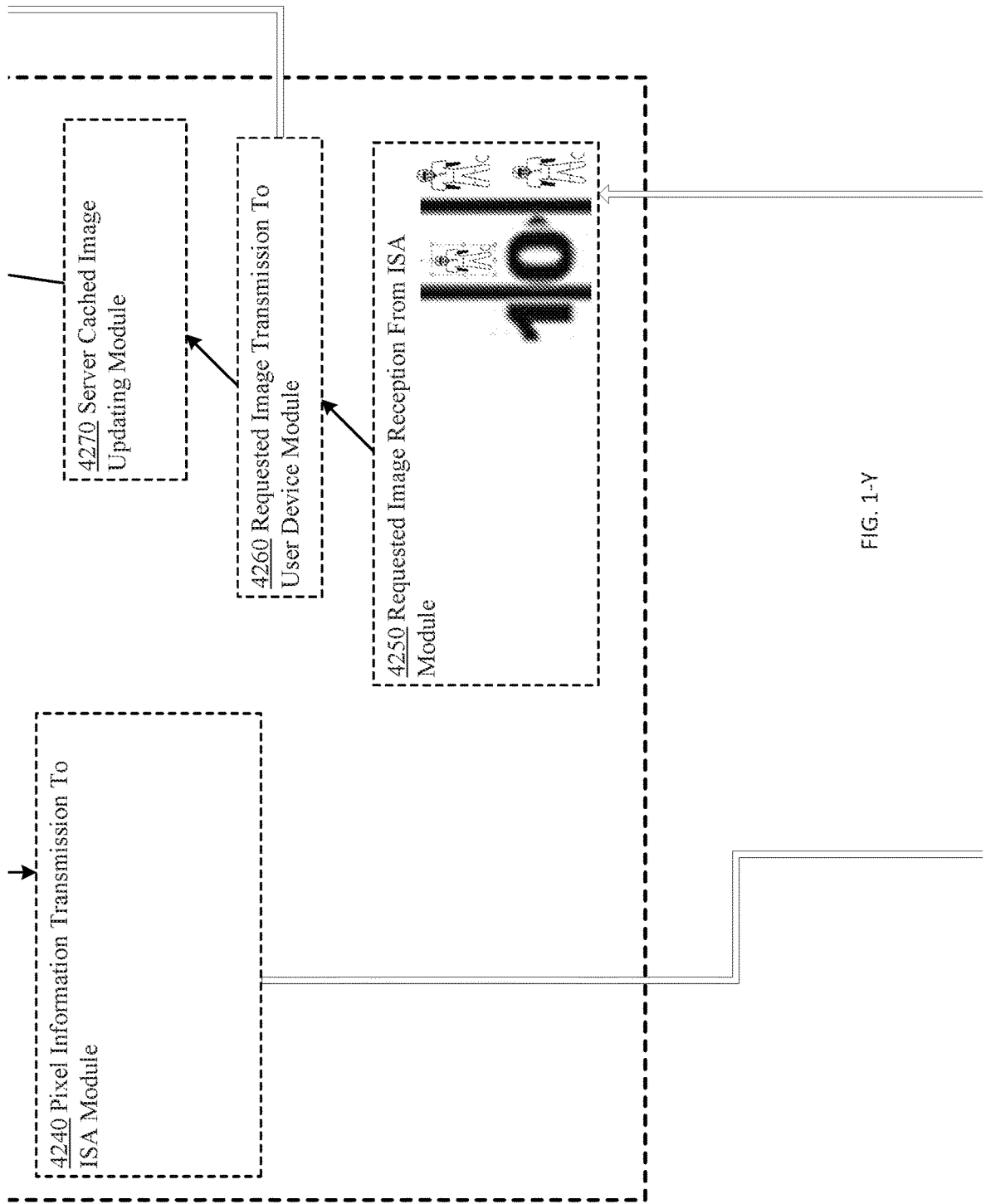
FIG. 1-Y

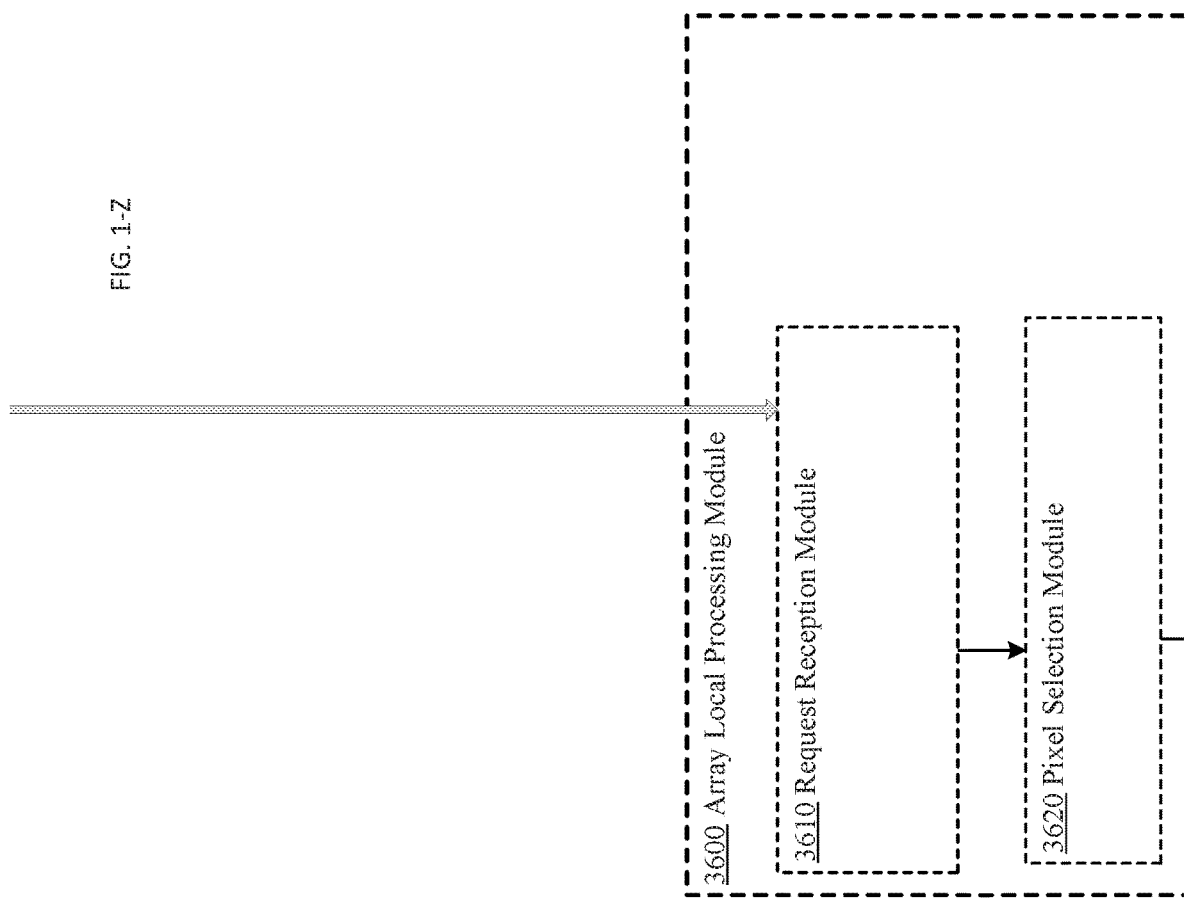
FIG. 1-Z

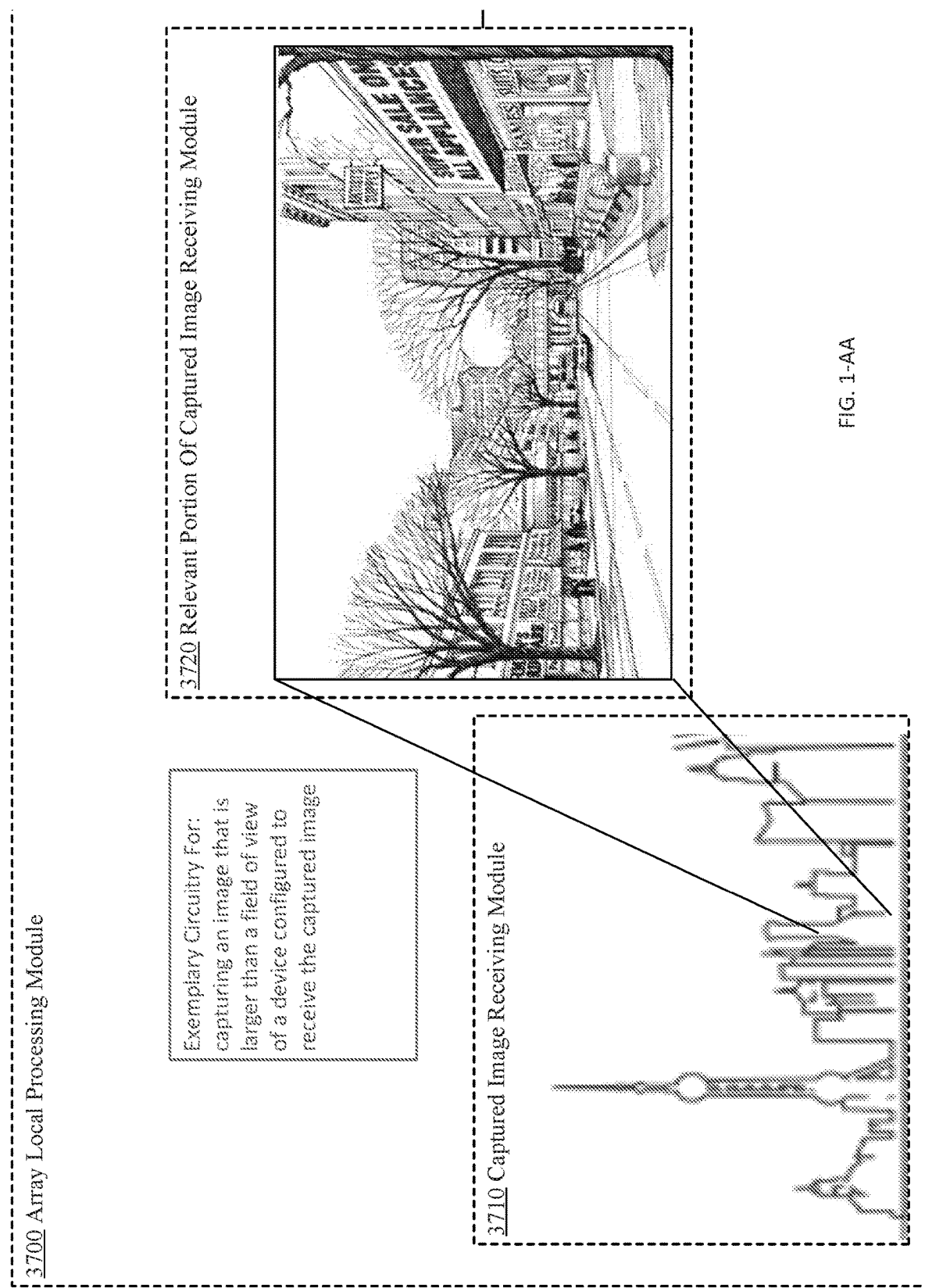
FIG. 1-AA

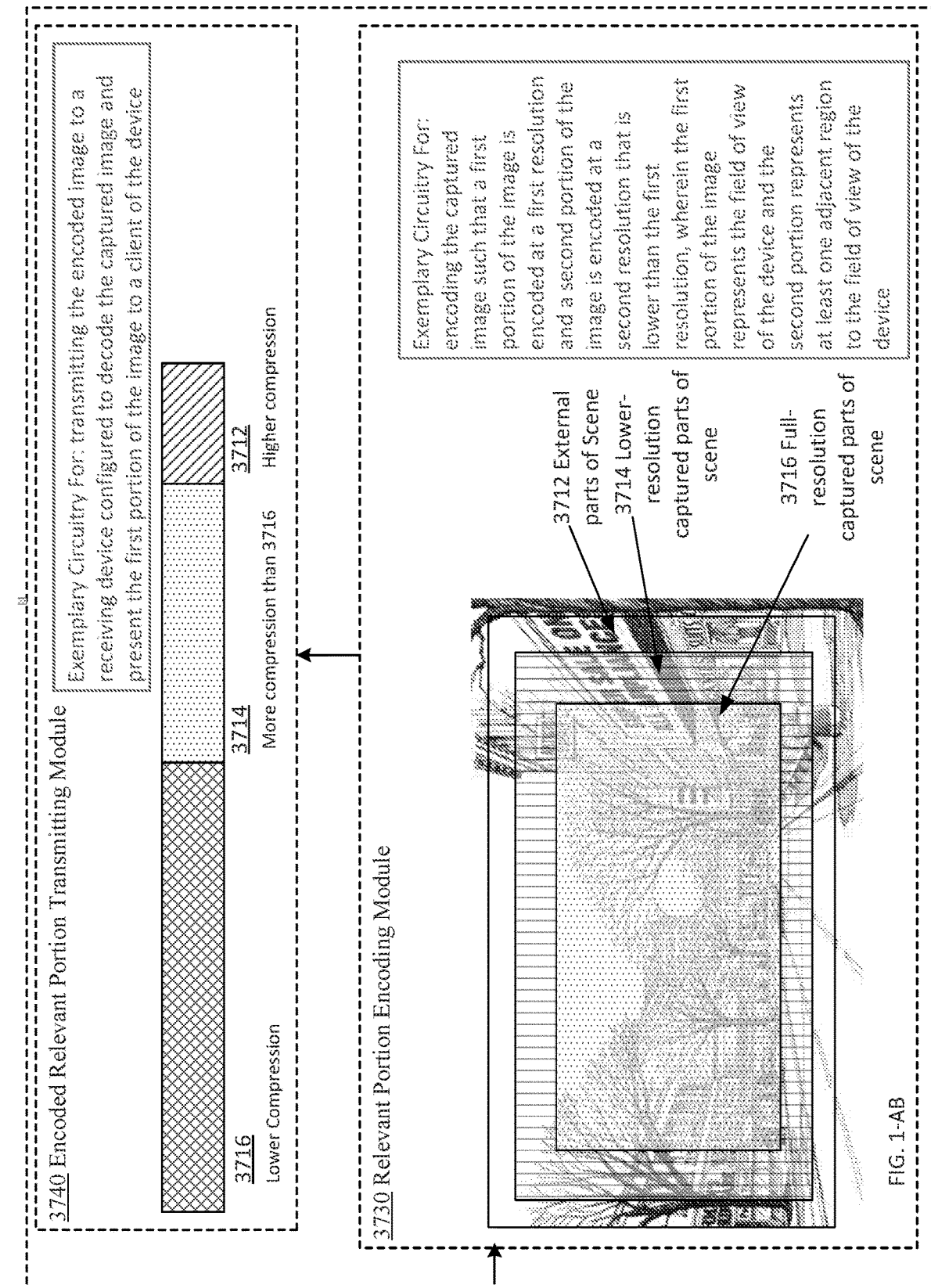
FIG. 1-AB

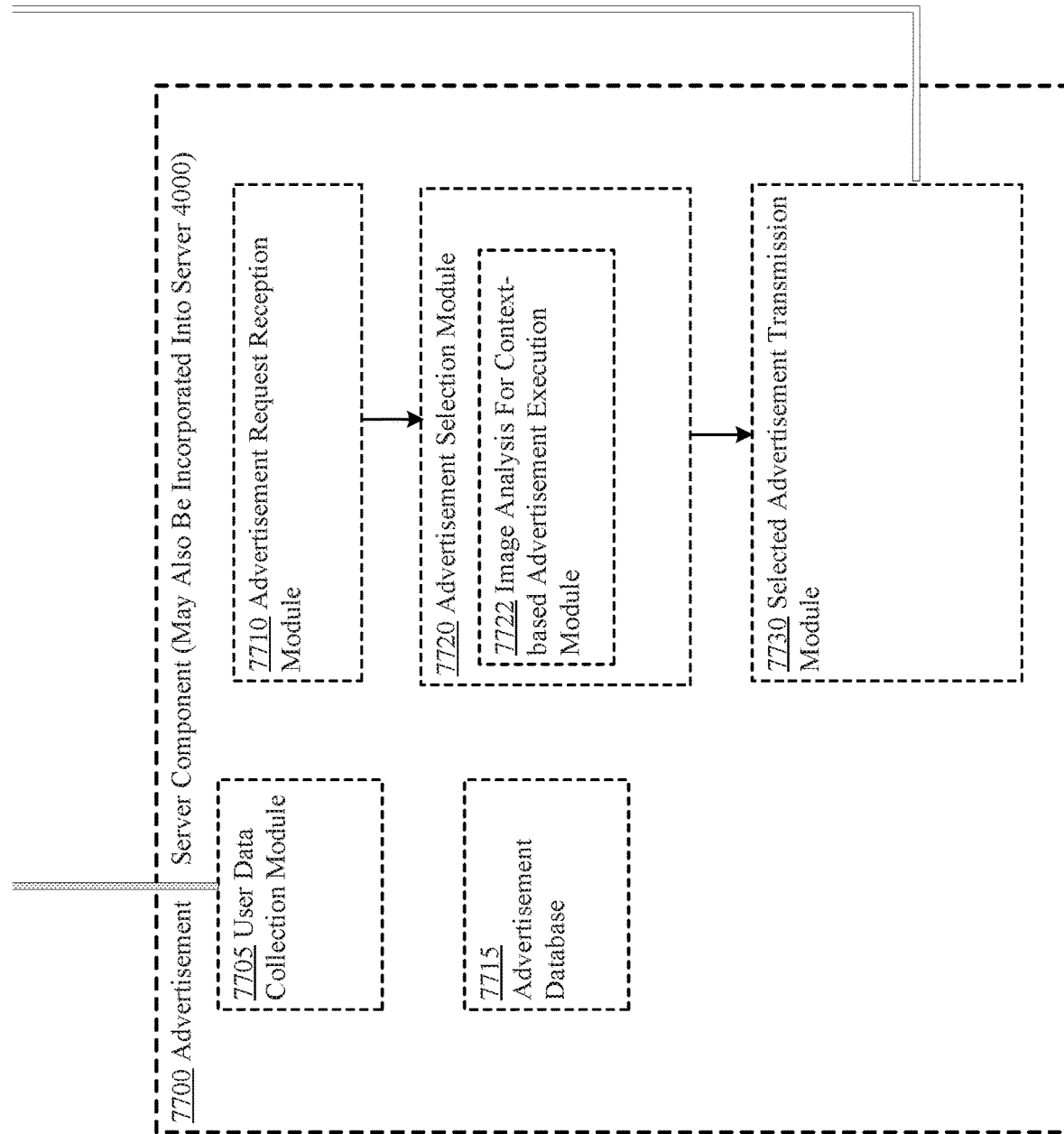
FIG. 1-AC

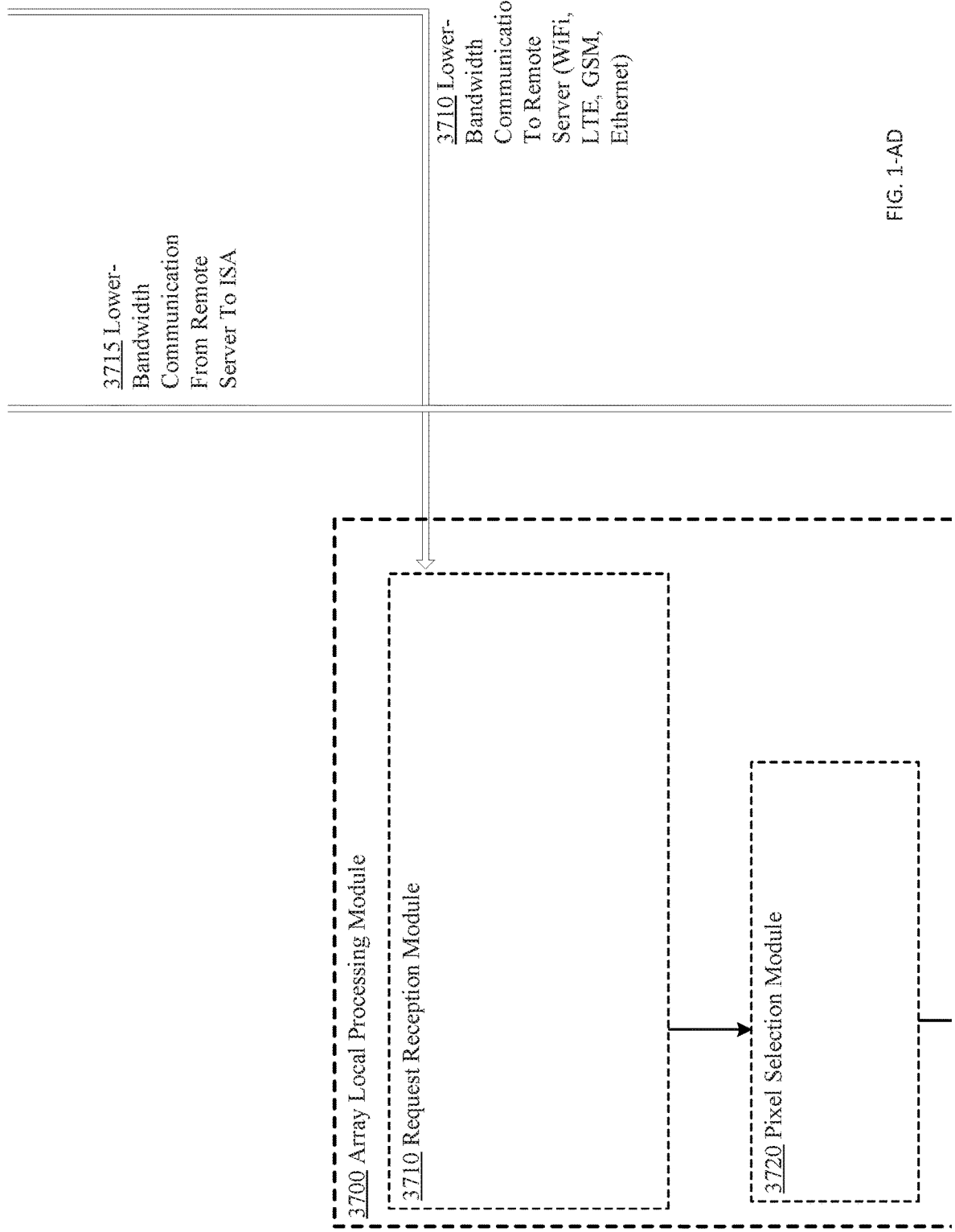

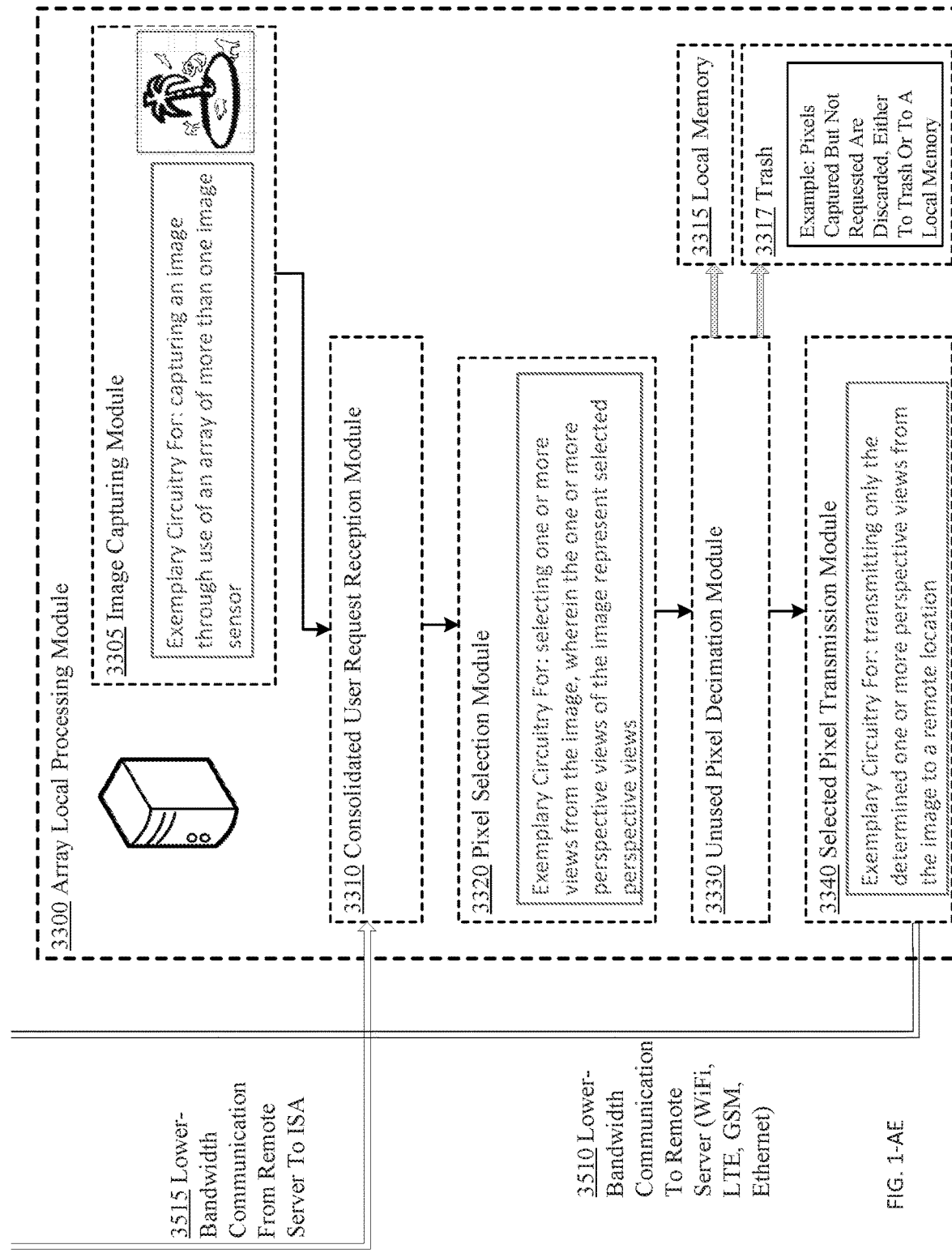
FIG. 1-AE

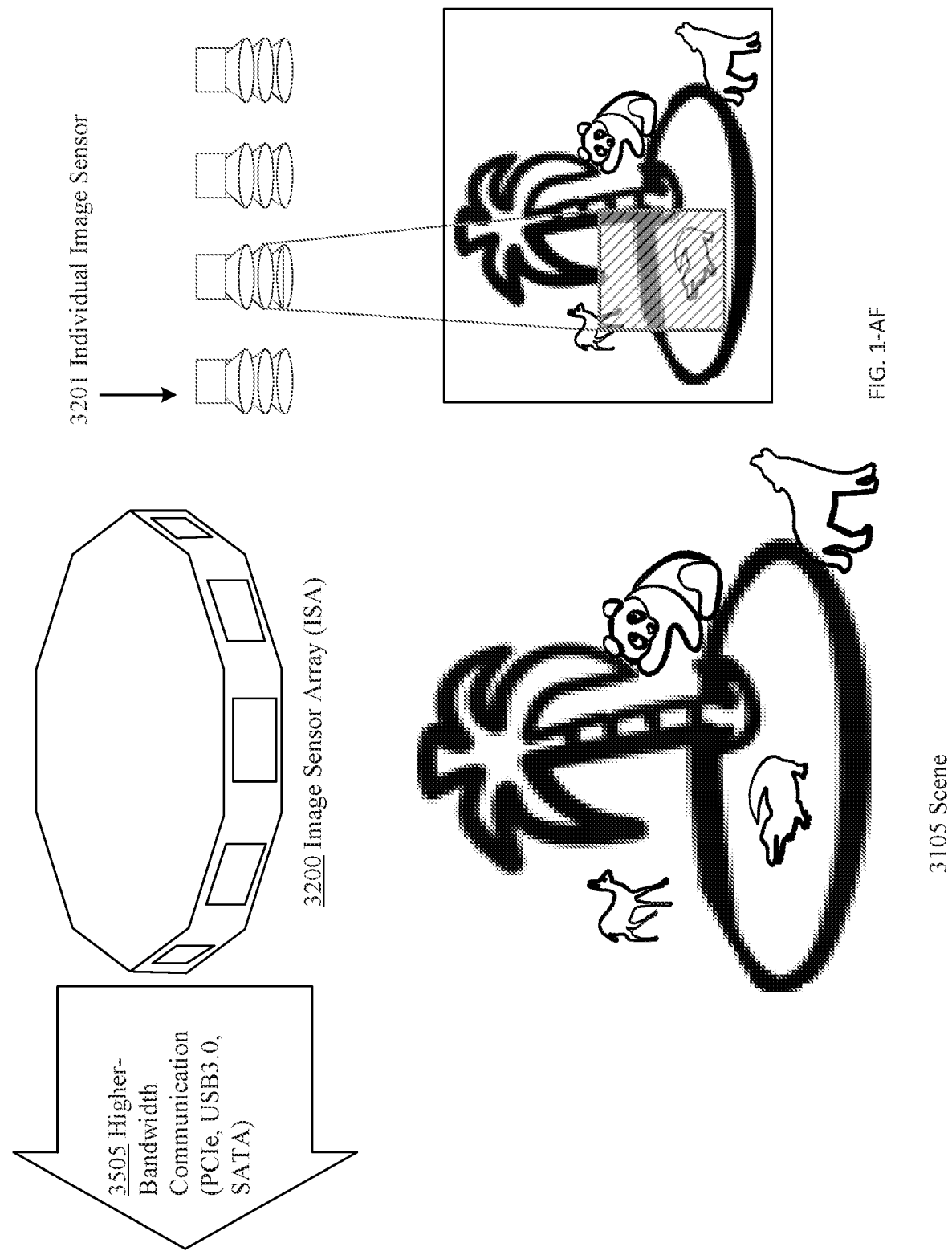

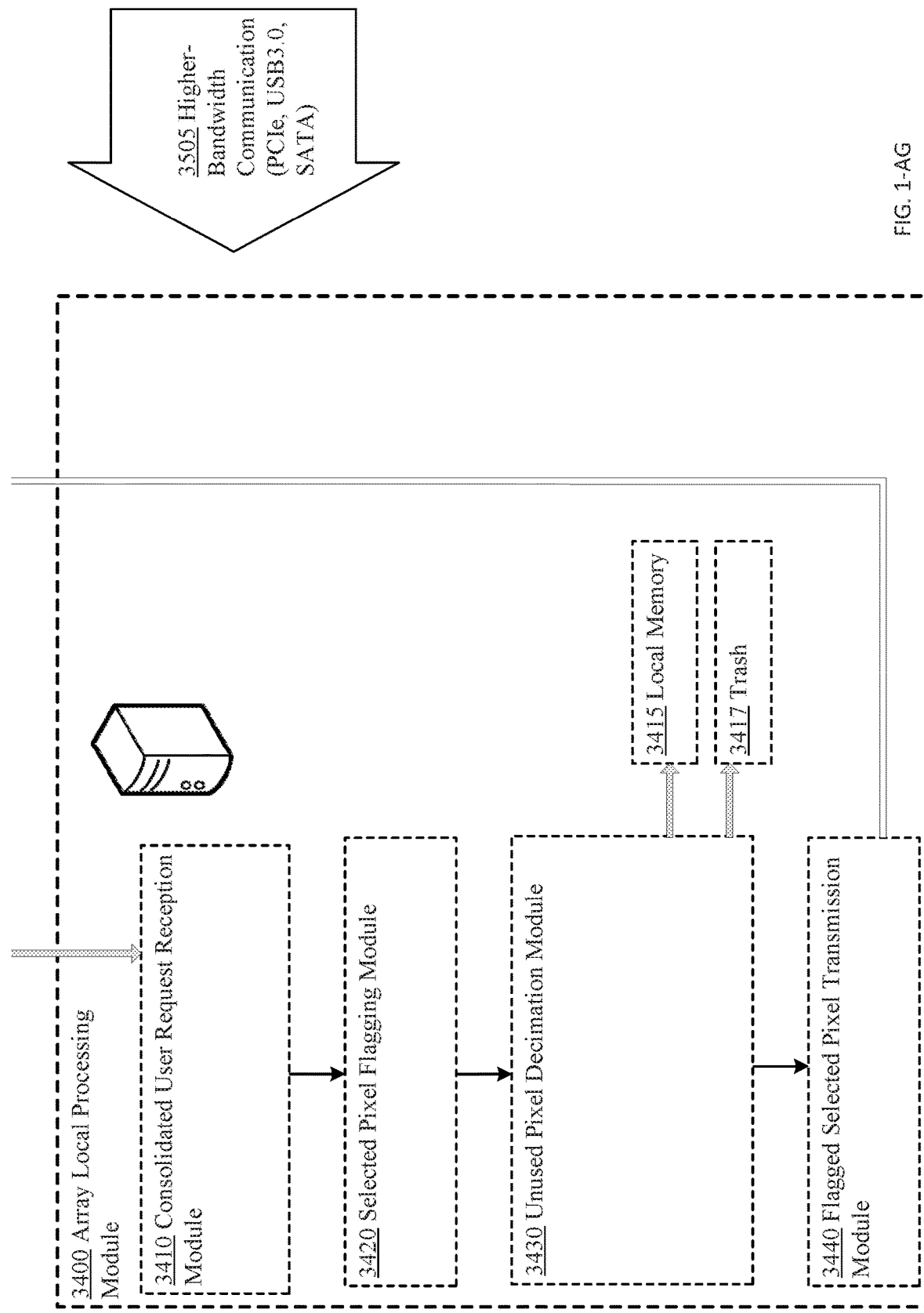
FIG. 1-AG

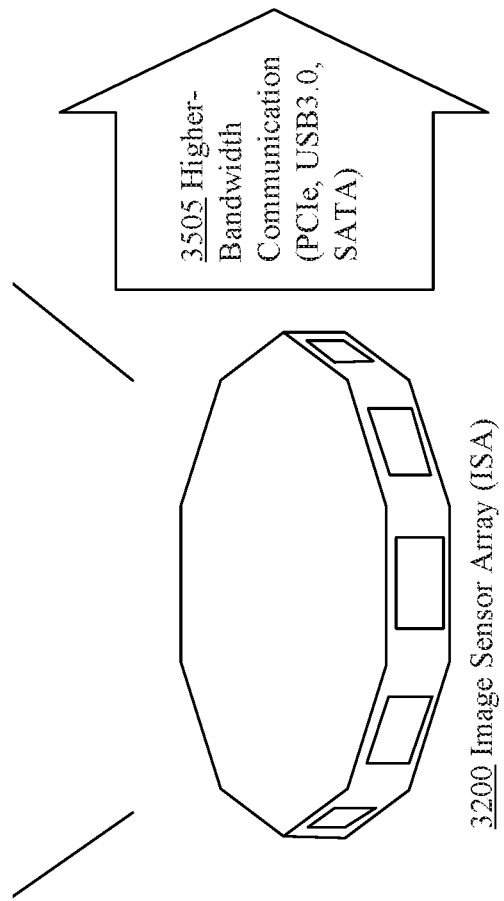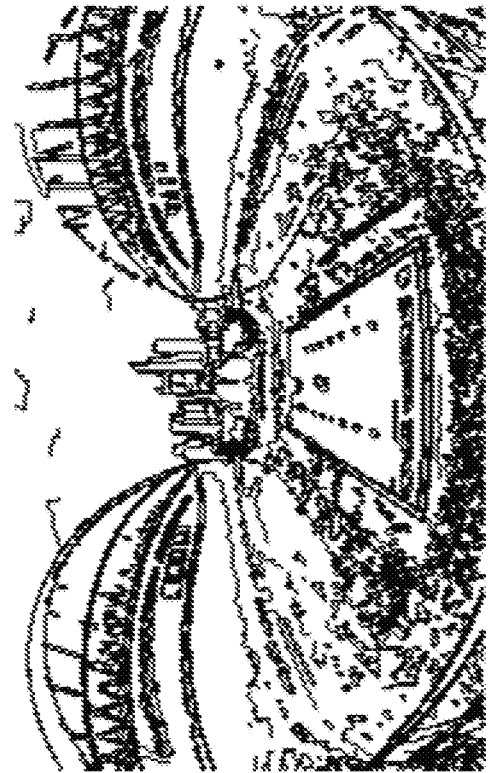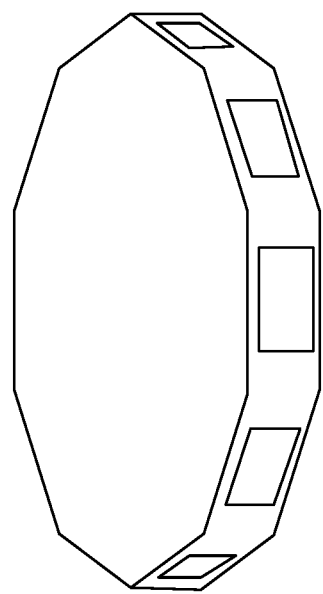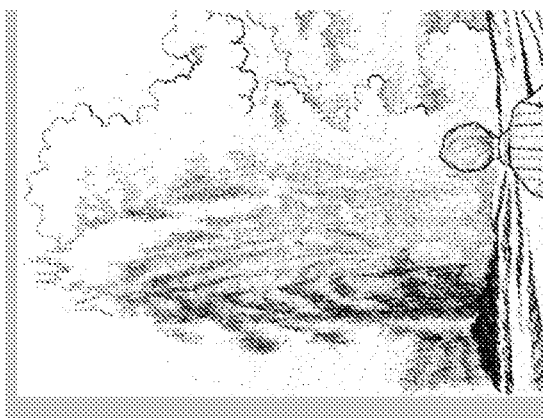
FIG. 1-AH

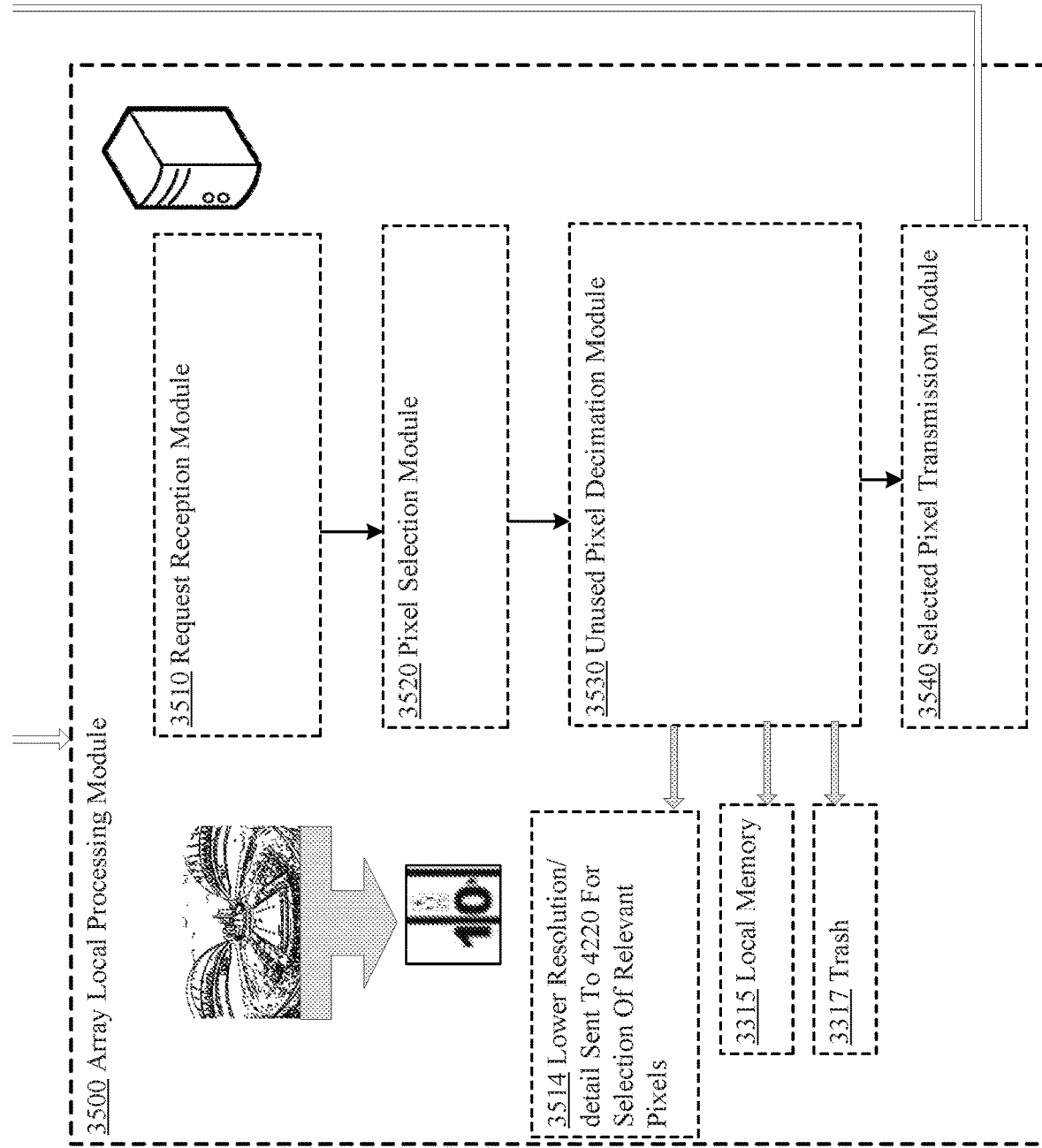
FIG. 1-AI

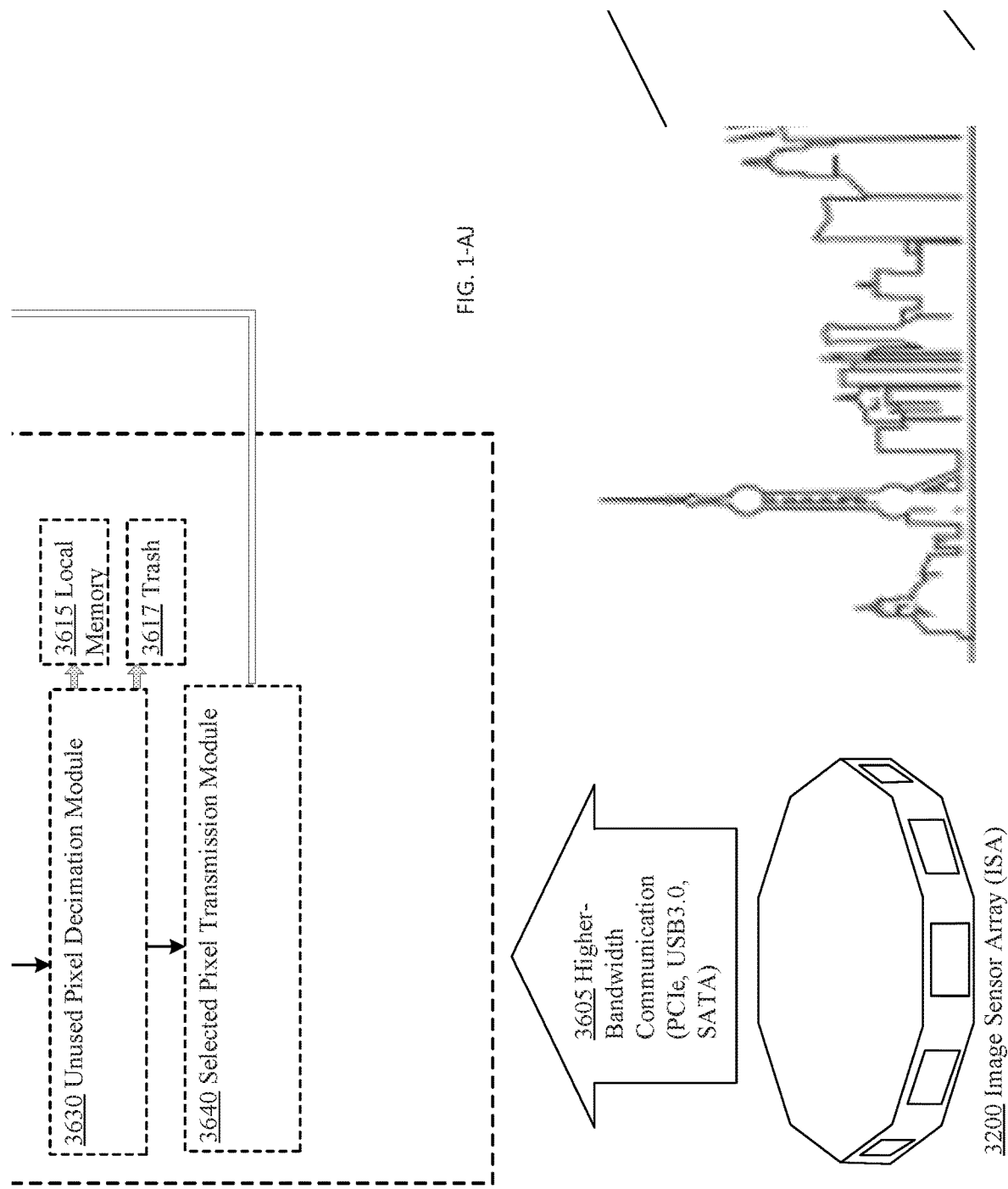
FIG. 1-AJ

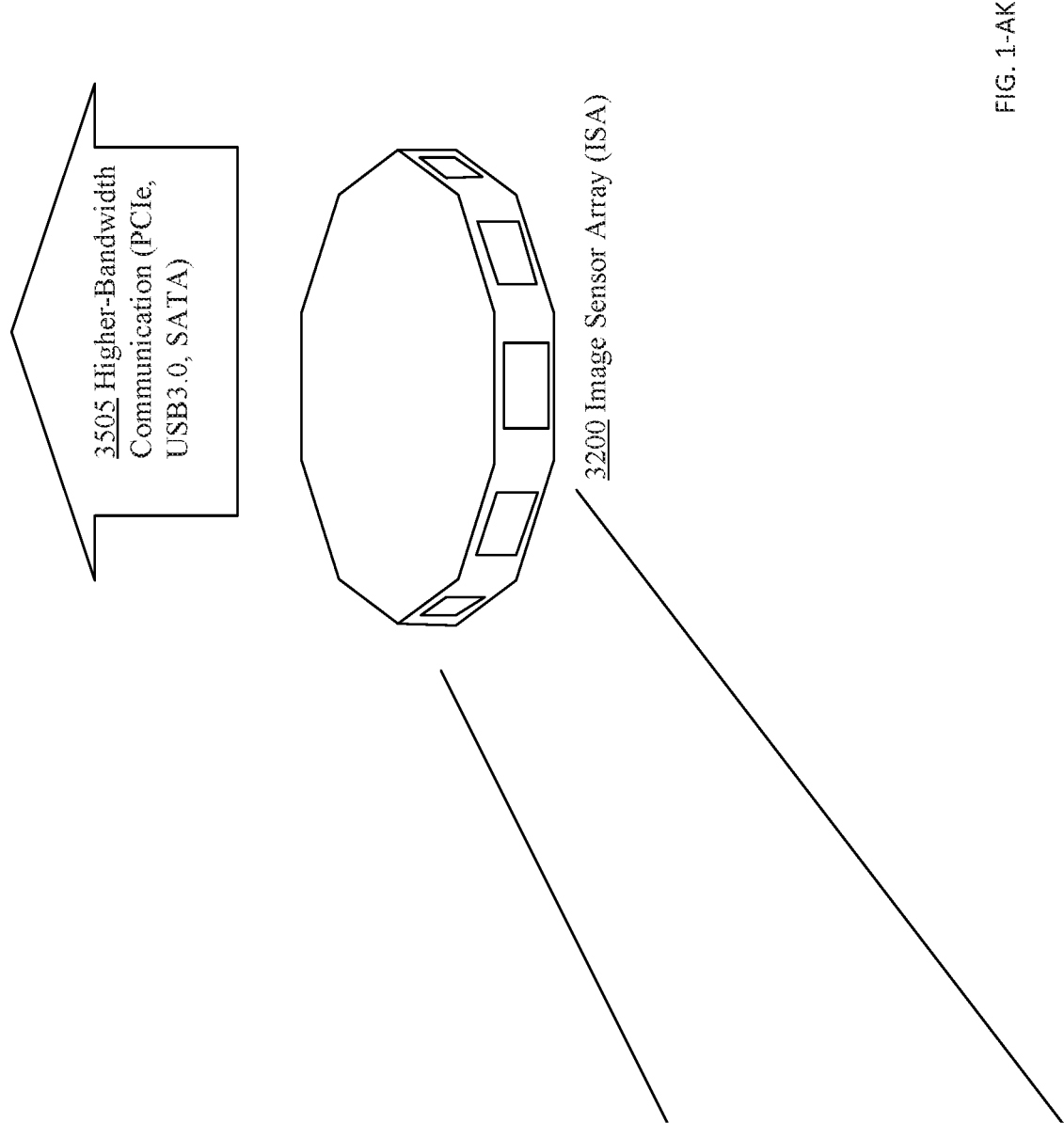

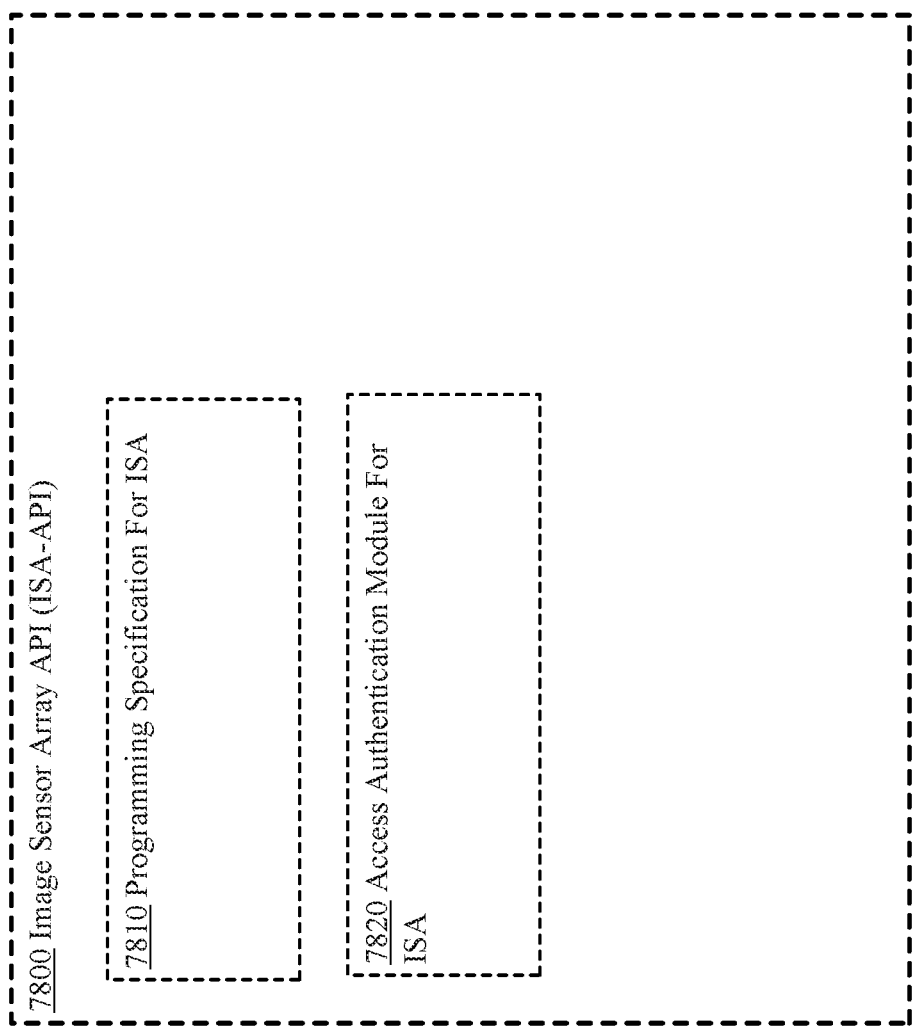
FIG. 1-AL

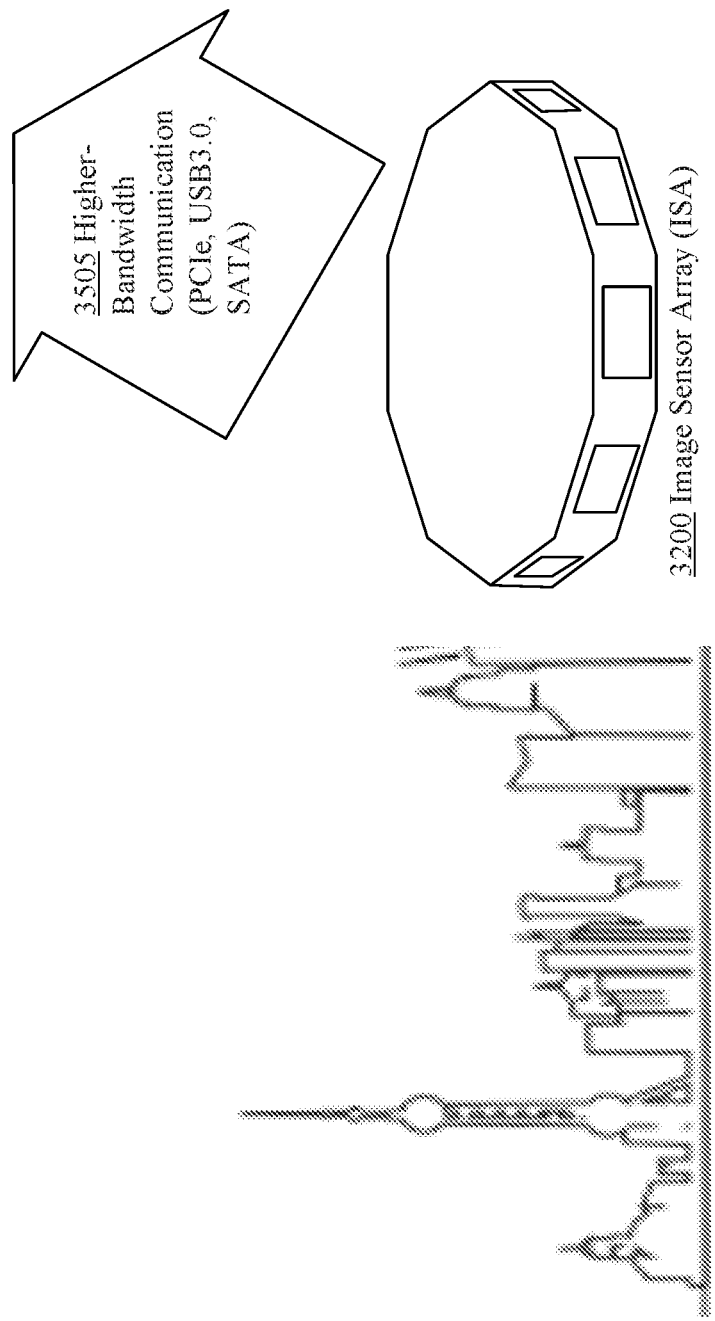
FIG. 1-AM

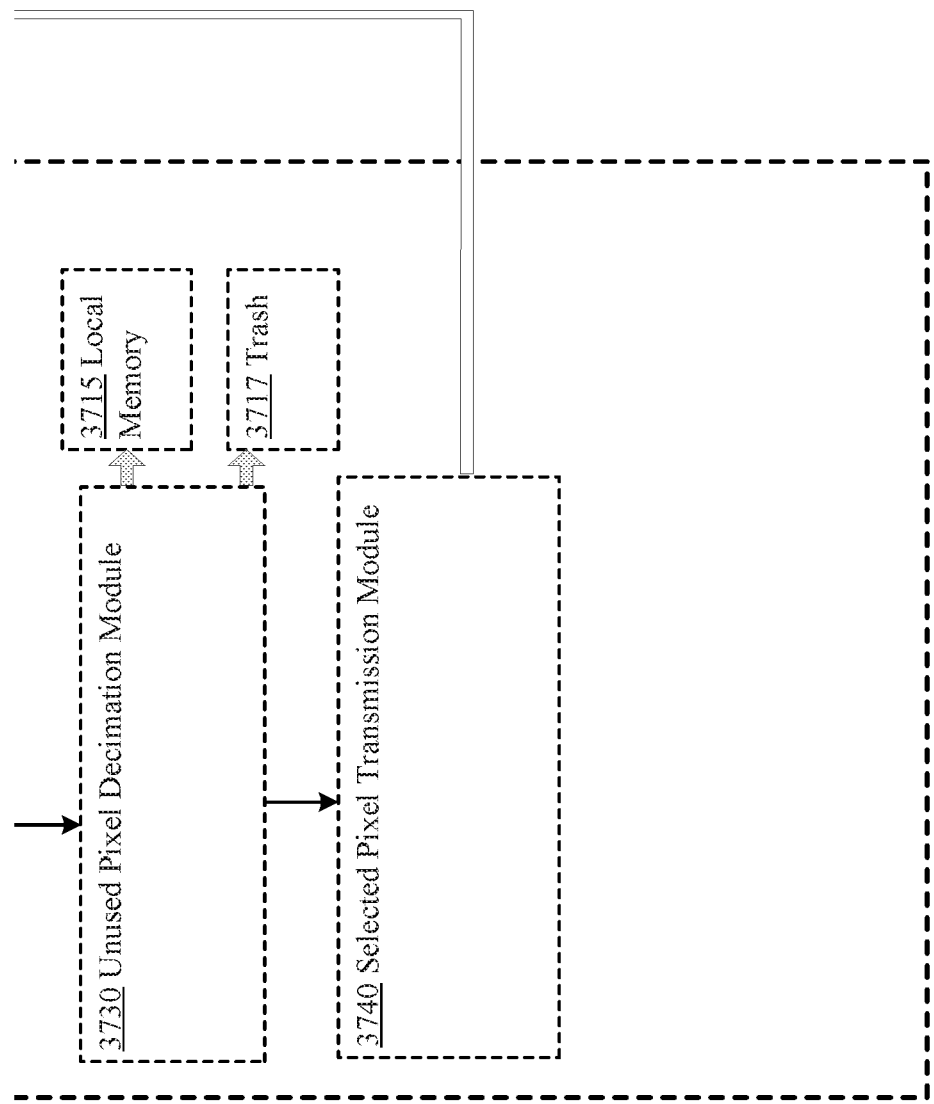

252 Request For Particular Image Data That Is Part Of A Scene Acquiring Module

602 Request For Particular Image Data That Is Part Of A Scene And Includes One Or More Images Acquiring Module 604 Request For Particular Image Data That Is Part Of A Scene Receiving Module 606 Request For Particular Image Data That Is Part Of A Scene Receiving From A Client Device Module 608 Request For Particular Image Data That Is Part Of A Scene Receiving From A Client Device Configured To Display At Least A Portion Of The Scene Module 610 Request For Particular Image Data That Is Part Of A Scene Receiving From A Client Device Configured To Display At Least A Portion Of The Scene In A Viewfinder Module 612 Request For Particular Image Data That Is Part Of A Scene Receiving From A Client Device Configured To Receive A Selection Of A Particular Image Module 614 Request For Particular Image Data That Is Part Of A Scene Receiving From A Client Device Configured To Receive A Scene-based Selection Of A Particular Image Module 616 Request For Particular Image Data That Is Part Of A Scene Receiving From One Or More Various Devices Configured To Receive A Scene-based Selection Of A Particular Image Module

| Fig. 6A | Fig. 6B | Fig. 6C | Fig. 6D | Fig. 6E | Fig. 6F | Fig. 6G |

252 Request For Particular Image Data That Is Part Of A Scene Acquiring Module

618 Request For Particular Image Data That Is Part Of A Scene That Is The Image Data Collected By The Array Of More Than One Image Sensor Acquiring Module 620 Request For Particular Image Data That Is Part Of A Scene That A Representation Of The Image Data Collected By The Array Of More Than One Image Sensor Acquiring Module 622 Request For Particular Image Data That Is Part Of A Scene That A Sampling Of The Image Data Collected By The Array Of More Than One Image Sensor Acquiring Module 624 Request For Particular Image Data That Is Part Of A Scene That Is A Subset Of The Image Data Collected By The Array Of More Than One Image Sensor Acquiring Module 626 Request For Particular Image Data That Is Part Of A Scene That Is A Low-resolution Version Of The Image Data Collected By The Array Of More Than One Image Sensor Acquiring Module

Fig. 6

| Fig. 6A | Fig. 6B | Fig. 6C | Fig. 6D | Fig. 6E | Fig. 6F | Fig. 6G |

FIG. 6B

252 Request For Particular Image Data That Is Part Of A Scene Acquiring Module

636 Request For Particular Image Data That Is An Image That Is A Portion Of The Scene Acquiring Module 638 Request For Particular Image Data That Is An Image That Is A Particular Football Player And A Scene That Is A Football Field Acquiring Module 640 Request For Particular Image Data That Is An Image That Is A Vehicle License Plate And A Scene That Is A Highway Bridge Acquiring Module

Fig. 6

| Fig. 6A | Fig. 6B | Fig. 6C | Fig. 6D | Fig. 6E | Fig. 6F | Fig. 6G |

FIG. 6D

252 Request For Particular Image Data That Is Part Of A Scene Acquiring Module

642 Request For Particular Image Object Located In The Scene Acquiring Module

646 Request For Particular Person Located In The Scene Acquiring Module

648 Request For A Basketball Located In The Scene Acquiring Module

650 Request For A Motor Vehicle Located In The Scene Acquiring Module

652 Request For A Human Object Representation Located In The Scene Acquiring Module 644 Particular Image Data Of The Scene That Contains The Particular Image Object Determining Module 653 Particular Image Data Of The Scene That Contains The Particular Image Object Determining Through Automated Pattern Recognition Application To Scene Data Module 654 Particular Image Data Of The Scene That Contains The Particular Image Object Determining Through Object Identification In Previous Scene Data Module 656 Particular Image Data Of The Scene That Contains The Particular Image Object Determining Through Object Identification In Cached Previous Scene Data Module 658 Particular Image Data Of The Scene That Contains The Particular Image Object Determining Through Object Identification In Cached Previous Scene Data Previously Transmitted From The Image Sensor Array Module 660 Particular Image Data Of The Scene That Contains The Particular Image Object Determining Through Object Identification In Cached Previous Scene Data Previously Transmitted From The Image Sensor Array At A Particular Time Module

Fig. 6

| Fig. 6A | Fig. 6B | Fig. 6C | Fig. 6D | Fig. 6E | Fig. 6F | Fig. 6G |

FIG. 6E

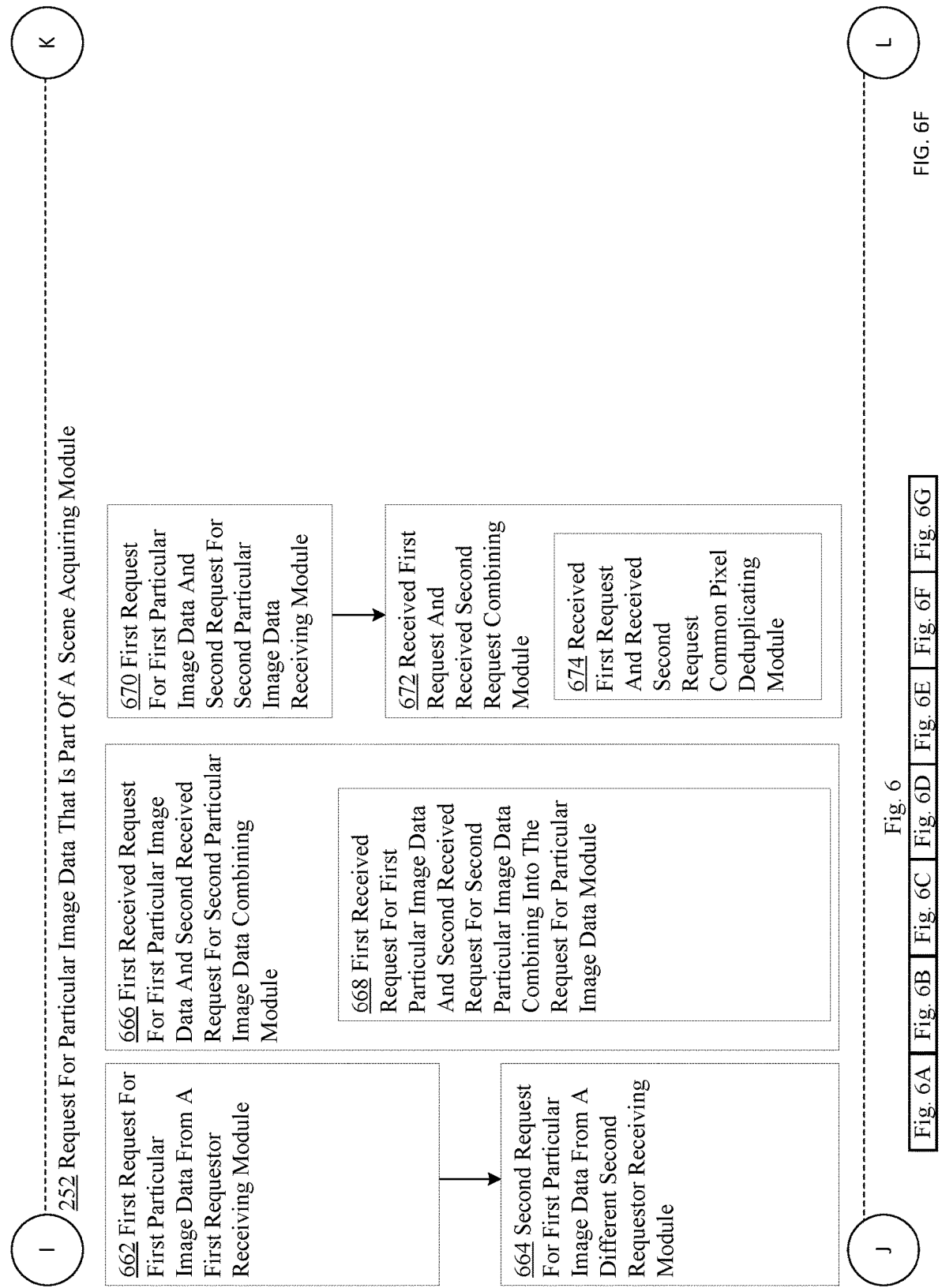

252 Request For Particular Image Data That Is Part Of A Scene Acquiring Module

676 Request For Particular Video Data That Is Part Of A Scene Acquiring Module

678 Request For Particular Audio Data That Is Part Of A Scene Acquiring Module

680 Request For Particular Image Data That Is Part Of A Scene Receiving From A User Device With An Audio Interface Module 682 Request For Particular Image Data That Is Part Of A Scene Receiving From A Microphone-equipped User Device With An Audio Interface Module

Fig. 6

| Fig. 6A | Fig. 6B | Fig. 6C | Fig. 6D | Fig. 6E | Fig. 6F | Fig. 6G |

FIG. 6G

254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data 702 Request For Particular Image Data Transmitting To An Image Sensor Array Module Configured To Transmit The Request To The Image Sensor Array That Includes More Than One Image Sensor And That Is Configured To Capture An Image That Is Larger Than The Requested Particular Image Data 704 Request For Particular Image Data Transmitting To An Image Sensor Array Module Configured To Transmit The Request To The Image Sensor Array That Includes Two Angled Image Sensors And That Is Configured To Capture The Scene That Is Larger Than The Requested Particular Image Data 706 Request For Particular Image Data Transmitting To An Image Sensor Array Module Configured To Transmit The Request To The Image Sensor Array That Includes More Than One Image Sensor Arranged In A Grid And That Is Configured To Capture The Scene That Is Larger Than The Requested Particular Image Data 708 Request For Particular Image Data Transmitting To An Image Sensor Array Module Configured To Transmit The Request To The Image Sensor Array That Includes More Than One Image Sensor Arranged In A Line And That Is Configured To Capture The Scene That Is Larger Than The Requested Particular Image Data 710 Request For Particular Image Data Transmitting To An Image Sensor Array Module Configured To Transmit The Request To The Image Sensor Array That Includes More Than One Nonlinearly Arranged Stationary Image Sensor And That Is Configured To Capture The Scene That Is Larger Than The Requested Particular Image Data

| Fig. 7A | Fig. 7B | Fig. 7C | Fig. 7D | Fig. 7E |

254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data

712 Request For Particular Image Data Transmitting To An Image Sensor Array That Includes An Array Of Static Image Sensors Module

714 Request For Particular Image Data Transmitting To An Image Sensor Array That Includes An Array Of Static Image Sensors That Have Fixed Focal Length And Fixed Field Of View Module

716 Request For Particular Image Data Transmitting To An Image Sensor Array That Includes An Array Of Image Sensors Mounted On A Movable Platform Module

718 Request For Particular Image Data Transmitting To An Image Sensor Array Module Configured To Transmit The Request To The Image Sensor Array That Includes More Than One Image Sensor And That Is Configured To Capture The Scene That Represents More Data Than The Requested Particular Image Data

720 Request For Particular Image Data Transmitting To An Image Sensor Array Module Configured To Transmit The Request To The Image Sensor Array That Includes More Than One Image Sensor And That Is Configured To Capture The Scene That Represents Ten Times As Much Data As The Requested Particular Image Data

722 Request For Particular Image Data Transmitting To An Image Sensor Array Module Configured To Transmit The Request To The Image Sensor Array That Includes More Than One Image Sensor And That Is Configured To Capture The Scene That Represents More Than One Hundred Times As Much Data As The Requested Particular Image Data

724 Request For Particular Image Data Transmitting To An Image Sensor Array Module Configured To Transmit The Request To The Image Sensor Array That Includes More Than One Image Sensor And That Is Configured To Capture The Scene That Represents A Greater Field Of View Than The Requested Particular Image Data

| Fig. 7A | Fig. 7B | Fig. 7C | Fig. 7D | Fig. 7E |

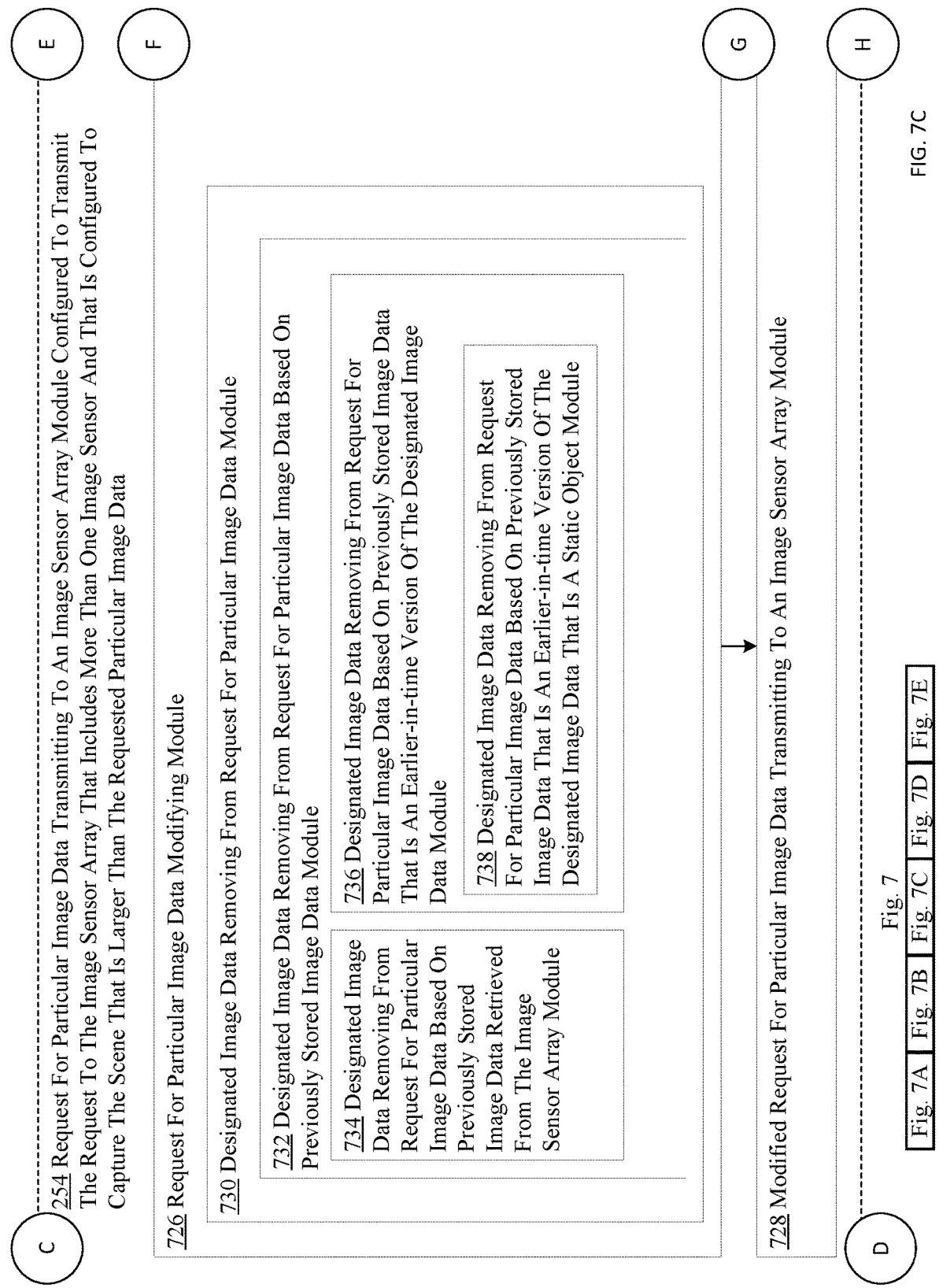

254 Request For Particular Image Data Transmitting To An Image Sensor Array Module Configured To Transmit The Request To The Image Sensor Array That Includes More Than One Image Sensor And That Is Configured To Capture The Scene That Is Larger Than The Requested Particular Image Data

754 Size Of Request For Particular Image Data Determining Module

758 Size Of Request For Particular Image Determining At Least Partially Based On User Device Property Module

760 Size Of Request For Particular Image Determining At Least Partially Based On User Device Resolution Module

762 Size Of Request For Particular Image Determining At Least Partially Based On User Device Access Level Module

764 Size Of Request For Particular Image Determining At Least Partially Based On Available Bandwidth Module

766 Size Of Request For Particular Image Determining At Least Partially Based On Device Usage Time Module

768 Size Of Request For Particular Image Determining At Least Partially Based On Device Available Bandwidth Module

756 Determined-size Request For Particular Image Data Transmitting To The Image Sensor Array Module

Fig. 7

| Fig. 7A | Fig. 7B | Fig. 7C | Fig. 7D | Fig. 7E |

FIG. 7E

256 Particular Image Data From The Image Sensor Array Exclusive Receiving Module 802 Particular Image Data From The Image Sensor Array In Which Other Image Data Is Discarded Receiving Module 804 Particular Image Data From The Image Sensor Array In Which Other Image Data Is Stored At The Image Sensor Array Receiving Module 806 Particular Image Data From The Image Sensor Array Exclusive Near-real-time Receiving Module

Fig. 8

| Fig. 8A | Fig. 8B | Fig. 8C |

FIG. 8A

256 Particular Image Data From The Image Sensor Array Exclusive Receiving Module 808 Particular Image Data From The Image Sensor Array Exclusive Near-real-time Receiving Module 810 Data From The Scene Other Than The Particular Image Data Retrieving At A Later Time Module

| 812 Data From The Scene Other Than The Particular Image Data Retrieving At A Time Of Available Bandwidth Module | 814 Data From The Scene Other Than The Particular Image Data Retrieving At An Off-peak Usage Time Of The Image Sensor Array Module | 816 Data From The Scene Other Than The Particular Image Data Retrieving At A Time When No Particular Image Data Requests Are Present At The Image Sensor Array Module | 818 Data From The Scene Other Than The Particular Image Data Retrieving At A Time Of Available Image Sensor Array Capacity Module |

Fig. 8

| Fig. 8A | Fig. 8B | Fig. 8C |

FIG. 8B

256 Particular Image Data From The Image Sensor Array Exclusive Receiving Module 820 Particular Image Data That Includes Audio Data From The Image Sensor Array Exclusive Receiving Module 822 Particular Image Data That Was Determined To Contain A Particular Requested Image Object From The Image Sensor Array Exclusive Receiving Module 824 Particular Image Data That Was Determined To Contain A Particular Requested Image Object By The Image Sensor Array Exclusive Receiving Module

Fig. 8

| Fig. 8A | Fig. 8B | Fig. 8C |

FIG. 8C

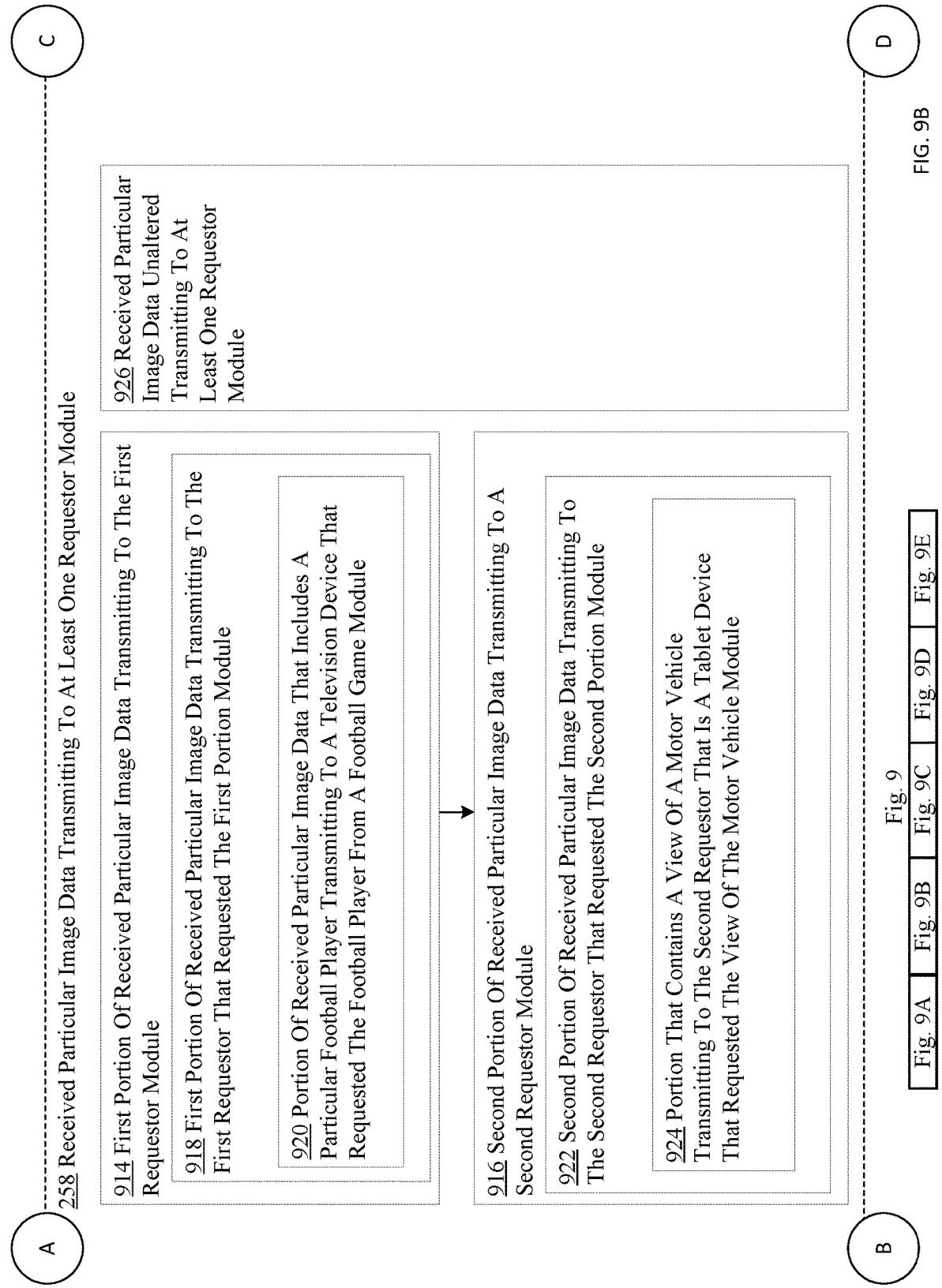

FIG. 9C

258 Received Particular Image Data Transmitting To At Least One Requestor Module 928 Supplemental Data Addition To At Least A Portion Of The Received Particular Image Data To Generate Transmission Image Data Facilitating Module 932 Advertisement Data Addition To At Least A Portion Of The Received Particular Image Data To Generate Transmission Image Data Facilitating Module 934 Context-based Advertisement Data Addition To At Least A Portion Of The Received Particular Image Data To Generate Transmission Image Data Facilitating Module 936 Animal Rights Donation Fund Advertisement Data Addition To At Least A Portion Of The Received Particular Image Data That Includes A Jungle Tiger At An Oasis To Generate Transmission Image Data Facilitating Module 938 Related Visual Data Addition To At Least A Portion Of The Received Particular Image Data To Generate Transmission Image Data Facilitating Module 940 Related Fantasy Football Statistical Data Addition To At Least A Portion Of The Received Particular Image Data Of A Quarterback Data To Generate Transmission Image Data Facilitating Module 930 Generated Transmission Image Data Transmitting To At Least One Requestor Module

Fig. 9

| Fig. 9A | Fig. 9B | Fig. 9C | Fig. 9D | Fig. 9E |

258 Received Particular Image Data Transmitting To At Least One Requestor Module 942 Portion Of Received Particular Image Data Modification To Generate Transmission Image Data Facilitating Module 946 Portion Of Received Particular Image Data Image Manipulation Modification To Generate Transmission Image Data Facilitating Module 948 Portion Of Received Particular Image Data Contrast Balancing Modification To Generate Transmission Image Data Facilitating Module 950 Portion Of Received Particular Image Data Color Modification Balancing To Generate Transmission Image Data Facilitating Module 952 Portion Of Received Particular Image Data Redaction To Generate Transmission Image Data Facilitating Module 954 Portion Of Received Particular Image Data Redaction To Generate Transmission Image Data Based On A Security Clearance Level Of The Requestor Facilitating Module 956 Portion Of Received Satellite Image Data That Includes A Tank Redaction To Generate Transmission Image Data Based On A Security Clearance Level Of The Requestor Facilitating Module 944 Generated Transmission Image Data Transmitting To At Least One Requestor Module

Fig. 9

| Fig. 9A | Fig. 9B | Fig. 9C | Fig. 9D | Fig. 9E |

FIG. 9D

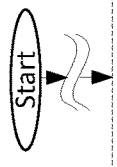

FIG. 12C

1004 Transmitting The Request For The Particular Image Data To An Image Sensor Array That Includes More Than One Image Sensor And That Is Configured To Capture The Scene That Is Larger Than The Requested Particular Image Data 1226 Modifying The Request For The Particular Image Data 1230 Removing Designated Image Data From The Request For The Particular Image Data 1232 Removing Designated Image Data From The Request For The Particular Image Data Based On Previously Stored Image Data 1234 Removing Designated Image Data From The Request For The Particular Image Data Based On Previously Stored Image Data Retrieved From The Image Sensor Array 1236 Removing Designated Image Data From The Request For The Particular Image Data Based On Previously Stored Image Data That Is An Earlier-in-time Version Of The Designated Image Data 1238 Removing Image Data Of One Or More Static Objects From The Request For The Particular Image Data That Is A View Of A Street, Based On Previously Stored Image Data Of The One Or More Static Objects From An Earlier-in-time Version Captured By The Image Sensor Array 1228 Transmitting The Modified Request For The Particular Image Data To The Image Sensor Array That Includes More Than One Image Sensor And That Is Configured To Capture The Scene That Is Larger Than The Requested Particular Image Data 1004 Transmitting The Request For The Particular Image Data To An Image Sensor Array That Includes More Than One Image Sensor And That Is Configured To Capture The Scene That Is Larger Than The Requested Particular Image Data 1254 Determining A Size Of The Request For The Particular Image Data 1258 Determining The Size Of The Request For The Particular Image Data At Least Partially Based On A Property Of A User Device That Requested At Least A Portion Of The Particular Image Data 1260 Determining The Size Of The Request For The Particular Image Data At Least Partially Based On A Resolution Of The User Device That Requested The Particular Image Data 1262 Determining The Size Of The Request For The Particular Image Data At Least Partially Based On A Device Access Level Of A User Device That Requested At Least A Portion Of The Particular Image Data 1264 Determining The Size Of The Request For The Particular Image Data At Least Partially Based On An Available Amount Of Bandwidth For Communication With The Image Sensor Array 1266 Determining The Size Of The Request For The Particular Image Data At Least Partially Based On An Amount Of Time That A User Device That Requested At Least A Portion Of The Particular Image Data Has Requested Image Data 1268 Determining The Size Of The Request For The Particular Image Data At Least Partially Based On An Available Amount Of Bandwidth For Communication With A User Device That Requested At Least A Portion Of The Particular Image Data 1256 Transmitting The Request For The Particular Image Data For Which The Size Has Been Determined To The Image Sensor Array That Is Configured To Capture The Scene

FIG. 12E

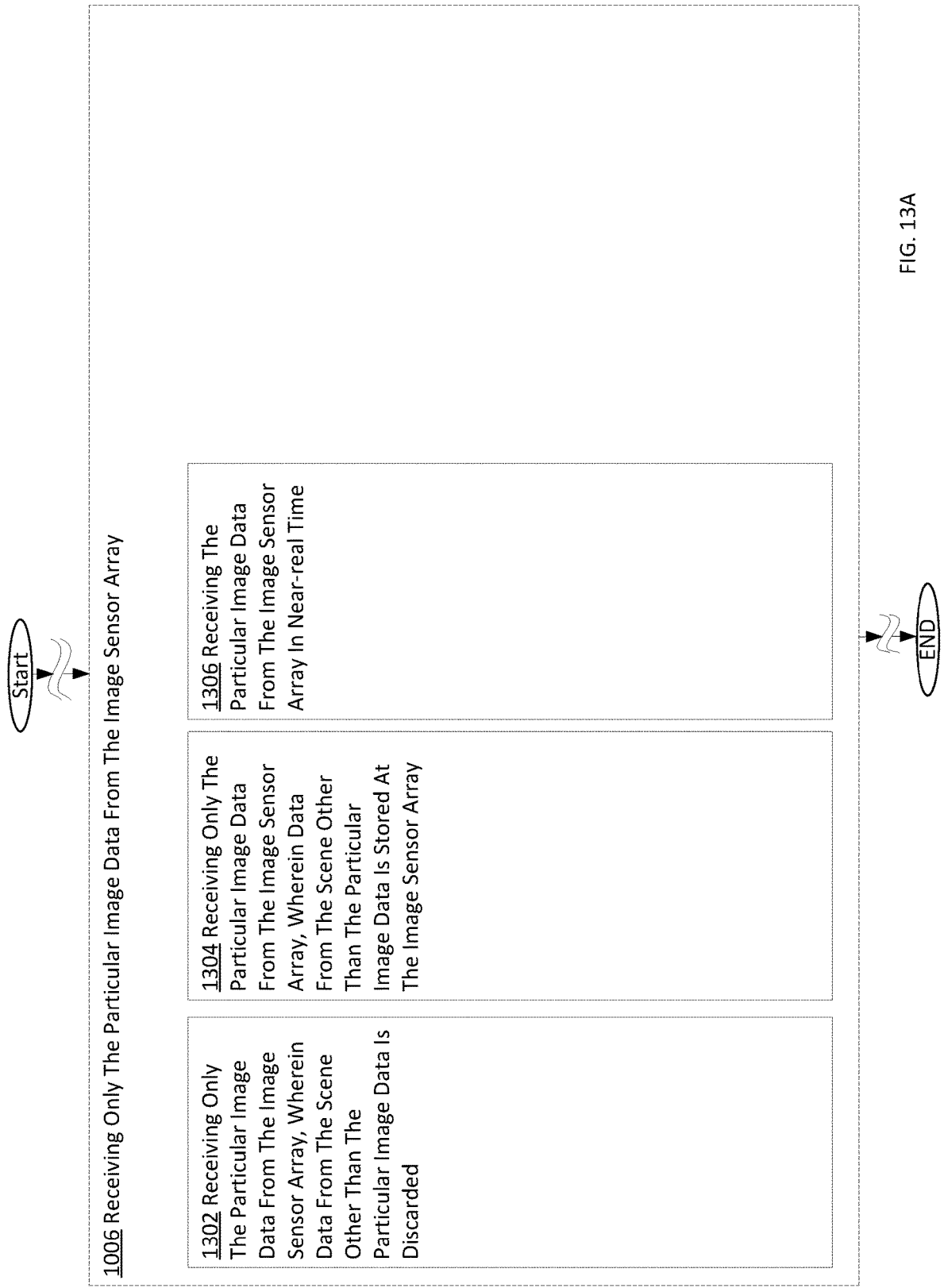

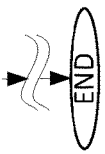
FIG. 13C

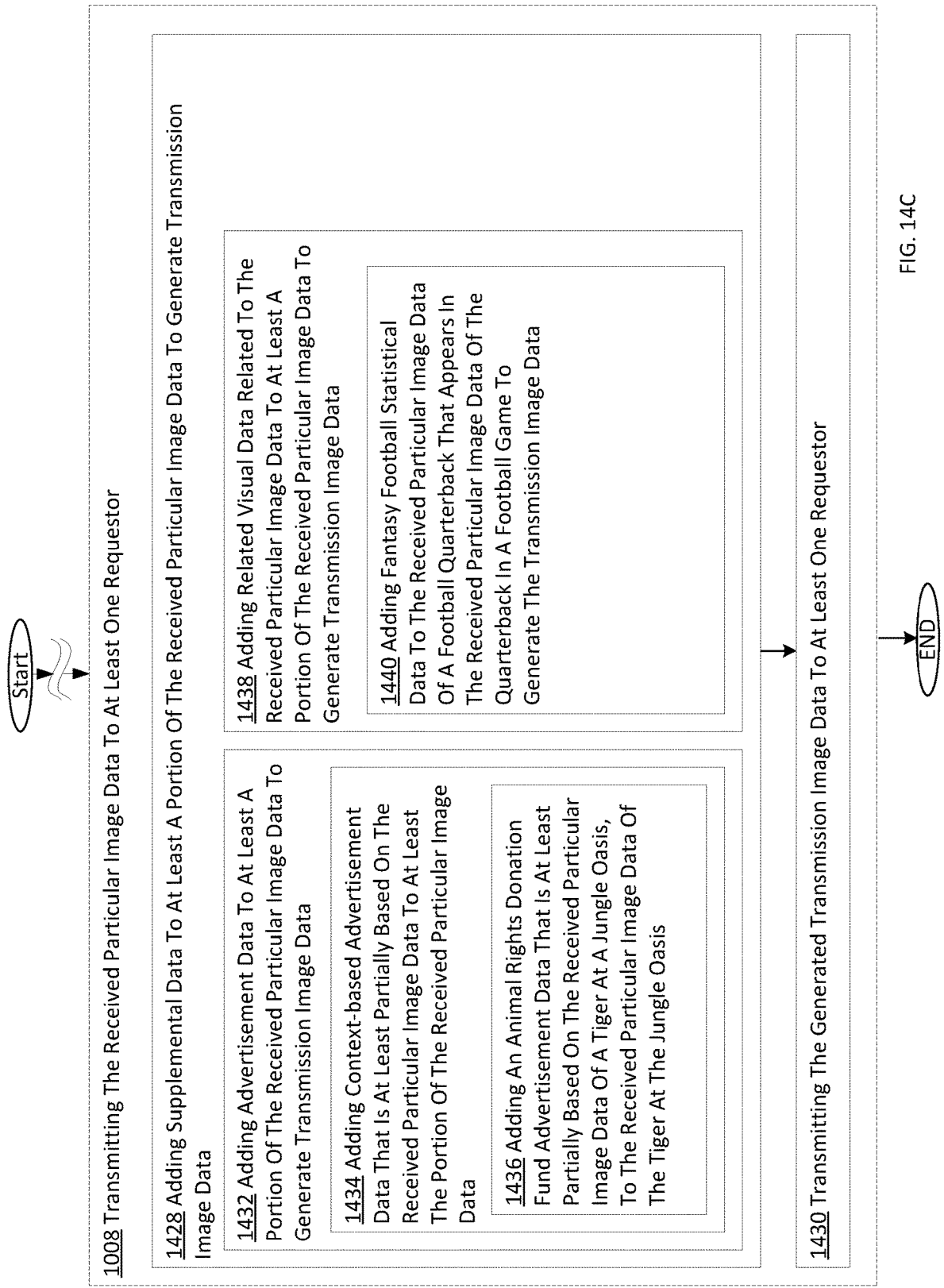

DEVICES, METHODS AND SYSTEMS FOR VISUAL IMAGING ARRAYS

CROSS-REFERENCE TO RELATED APPLICATIONS

If an Application Data Sheet (ADS) has been filed on the filing date of this application, it is incorporated by reference herein. Any applications claimed on the ADS for priority under 35 U.S.C. §§ 119, 120, 121, or 365(c), and any and all parent, grandparent, great-grandparent, etc. applications of such applications, are also incorporated by reference, including any priority claims made in those applications and any material incorporated by reference, to the extent such subject matter is not inconsistent herewith.

The present application is related to and/or claims the benefit of the earliest available effective filing date(s) from the following listed application(s) (the "Priority Applications"), if any, listed below (e.g., claims earliest available priority dates for other than provisional patent applications or claims benefits under 35 USC § 119(e) for provisional patent applications, for any and all parent, grandparent, great-grandparent, etc. applications of the Priority Application(s)). In addition, the present application is related to the "Related Applications," if any, listed below.

PRIORITY APPLICATIONS

For purposes of the USPTO extra-statutory requirements, the present application claims benefit of priority of U.S. Provisional Patent Application No. 62/081,559 titled DEVICES, METHODS, AND SYSTEMS FOR INTEGRATING MULTIPLE USER VIDEO IMAGING ARRAY, filed 18 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/081,560 titled DEVICES, METHODS, AND SYSTEMS FOR IMPLEMENTATION OF MULTIPLE USER VIDEO IMAGING ARRAY (MUVIA), filed 18 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/082,001 titled DEVICES, METHODS, AND SYSTEMS FOR INTEGRATING MULTIPLE USER ACCESS CAMERA ARRAY, filed 19 Nov. 2014 which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/082,002 titled DEVICES, METHODS, AND SYSTEMS FOR INTEGRATING MULTIPLE USER VIDEO IMAGING ARRAY, filed 19 Nov. 2014, which was filed within the twelve months preceding the filing date of the present application or is an application of which a currently co-pending application is entitled to the benefit of the filing date.

For purposes of the USPTO extra-statutory requirements, the present application claims benefit of priority of U.S. Provisional Patent Application No. 62/156,162 titled DEVICES, METHODS, AND SYSTEMS FOR INTEGRATING MULTIPLE USER VIDEO IMAGING ARRAY, filed 1 May 2015 which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 14/714,239, entitled DEVICES, METHODS AND SYSTEMS FOR VISUAL IMAGING ARRAYS, filed 15 May 2015, which is currently co-pending or is an application of which a currently co-pending application is entitled to the benefit of the filing date.

For purposes of the USPTO extra-statutory requirements, the present application claims benefit of priority of U.S. Provisional Patent Application No. 62/180,040 titled DEVICES, METHODS, AND SYSTEMS FOR INTEGRATING MULTIPLE USER ACCESS CAMERA ARRAY, filed 15 Jun. 2015 which was filed within the twelve months preceding the filing date of the present application or is an application of which a currently co-pending application is entitled to the benefit of the filing date.

For purposes of the USPTO extra-statutory requirements, the present application constitutes a continuation-in-part of U.S. patent application Ser. No. 14/791,160, entitled DEVICES, METHODS, AND SYSTEMS FOR VISUAL IMAGING ARRAYS, filed 2 Jul. 2015, which is currently co-pending or is an application of which a currently co-pending application is entitled to the benefit of the filing date, and which is a continuation of U.S. patent application Ser. No. 14/791,127, entitled DEVICES, METHODS, AND SYSTEMS FOR VISUAL IMAGING ARRAYS filed 2 Jul. 2015.

RELATED APPLICATIONS

None.

The United States Patent Office (USPTO) has published a notice to the effect that the USPTO's computer programs require that patent applicants reference both a serial number and indicate whether an application is a continuation, continuation-in-part, or divisional of a parent application. Stephen G. Kunin, Benefit of Prior-Filed Application, USPTO Official Gazette Mar. 18, 2003. The USPTO further has provided forms for the Application Data Sheet which allow automatic loading of bibliographic data but which require identification of each application as a continuation, continuation-in-part, or divisional of a parent application. The present Applicant Entity (hereinafter "Applicant") has provided above a specific reference to the application(s) from which priority is being claimed as recited by statute. Applicant understands that the statute is unambiguous in its specific reference language and does not require either a serial number or any characterization, such as "continuation" or "continuation-in-part," for claiming priority to U.S. patent applications. Notwithstanding the foregoing, Applicant understands that the USPTO's computer programs have certain data entry requirements, and hence Applicant has provided designation(s) of a relationship between the present application and its parent application(s) as set forth above and in any ADS filed in this application, but expressly points out that such designation(s) are not to be construed in any way as any type of commentary and/or admission as to whether or not the present application contains any new matter in addition to the matter of its parent application(s).

If the listings of applications provided above are inconsistent with the listings provided via an ADS, it is the intent of the Applicant to claim priority to each application that appears in the Priority Applications section of the ADS and to each application that appears in the Priority Applications section of this application.

All subject matter of the Priority Applications and the Related Applications and of any and all parent, grandparent, great-grandparent, etc. applications of the Priority Applications and the Related Applications, including any priority claims, is incorporated herein by reference to the extent such subject matter is not inconsistent herewith.

BACKGROUND

This application is related to video imaging arrays that may be capable of handling multiple users and which may transmit less data than they collect.

SUMMARY

In one or more various aspects, a method includes, but is not limited to, that which is illustrated in the drawings. In addition to the foregoing, other method aspects are described in the claims, drawings, and text forming a part of the disclosure set forth herein.

In one or more various aspects, a method includes, but is not limited to, acquiring a request for particular image data that is part of a scene, transmitting the request for the particular image data to an image sensor array that includes more than one image sensor and that is configured to capture the scene that is larger than the requested particular image data, and receiving only the particular image data from the image sensor array. In addition to the foregoing, other method aspects are described in the claims, drawings, and text forming a part of the disclosure set forth herein.

In one or more various aspects, one or more related systems may be implemented in machines, compositions of matter, or manufactures of systems, limited to patentable subject matter under 35 U.S.C. 101. The one or more related systems may include, but are not limited to, circuitry and/or programming for carrying out the herein-referenced method aspects. The circuitry and/or programming may be virtually any combination of hardware, software, and/or firmware configured to effect the herein-referenced method aspects depending upon the design choices of the system designer, and limited to patentable subject matter under 35 USC 101.

In one or more various aspects, a system includes, but is not limited to, means for acquiring a request for particular image data that is part of a scene, means for transmitting the request for the particular image data to an image sensor array that includes more than one image sensor and that is configured to capture the scene that is larger than the requested particular image data, and means for receiving only the particular image data from the image sensor array. In addition to the foregoing, other system aspects are described in the claims, drawings, and text forming a part of the disclosure set forth herein.

In one or more various aspects, a system includes, but is not limited to, circuitry for acquiring a request for particular image data that is part of a scene, circuitry for transmitting the request for the particular image data to an image sensor array that includes more than one image sensor and that is configured to capture the scene that is larger than the requested particular image data, and circuitry for receiving only the particular image data from the image sensor array. In addition to the foregoing, other system aspects are described in the claims, drawings, and text forming a part of the disclosure set forth herein.

In one or more various aspects, a computer program product, comprising a signal bearing medium, bearing one or more instructions including, but not limited to, one or more instructions for acquiring a request for particular image data that is part of a scene, one or more instructions for transmitting the request for the particular image data to an image sensor array that includes more than one image sensor and that is configured to capture the scene that is larger than the requested particular image data, and one or more instructions for receiving only the particular image data from the image sensor array. In addition to the foregoing, other computer program product aspects are described in the claims, drawings, and text forming a part of the disclosure set forth herein.

In one or more various aspects, a device is defined by a computational language, such that the device comprises one or more interchained physical machines ordered for acquiring a request for particular image data that is part of a scene, one or more interchained physical machines ordered for transmitting the request for the particular image data to an image sensor array that includes more than one image sensor and that is configured to capture the scene that is larger than the requested particular image data, and one or more interchained physical machines ordered for receiving only the particular image data from the image sensor array.

In addition to the foregoing, various other method and/or system and/or program product aspects are set forth and described in the teachings such as text (e.g., claims and/or detailed description) and/or drawings of the present disclosure.

The foregoing is a summary and thus may contain simplifications, generalizations, inclusions, and/or omissions of detail; consequently, those skilled in the art will appreciate that the summary is illustrative only and is NOT intended to be in any way limiting. Other aspects, features, and advantages of the devices and/or processes and/or other subject matter described herein will become apparent by reference to the detailed description, the corresponding drawings, and/or in the teachings set forth herein.

BRIEF DESCRIPTION OF THE FIGURES

For a more complete understanding of embodiments, reference now is made to the following descriptions taken in connection with the accompanying drawings. The use of the same symbols in different drawings typically indicates similar or identical items, unless context dictates otherwise. The illustrative embodiments described in the detailed description, drawings, and claims are not meant to be limiting. Other embodiments may be utilized, and other changes may be made, without departing from the spirit or scope of the subject matter presented here.

FIG. 1, including FIGS. 1-A through 1-AN, shows a high-level system diagram of one or more exemplary environments in which transactions and potential transactions may be carried out, according to one or more embodiments. FIG. 1 forms a partially schematic diagram of an environment(s) and/or an implementation(s) of technologies described herein when FIGS. 1-A through 1-AN are stitched together in the manner shown in FIG. 1-D, which is reproduced below in table format.

In accordance with 37 C.F.R. § 1.84(h)(2), FIG. 1 shows "a view of a large machine or device in its entirety . . . broken into partial views . . . extended over several sheets" labeled FIG. 1-A through FIG. 1-AN (Sheets 1-40). The "views on two or more sheets form, in effect, a single complete view, [and] the views on the several sheets . . . [are] so arranged that the complete figure can be assembled" from "partial views drawn on separate sheets . . . linked edge to edge. Thus, in FIG. 1, the partial view FIGS. 1-A through 1-AN are ordered alphabetically, by increasing in columns from left to right, and increasing in rows top to bottom, as shown in the following table:

TABLE 1

Figure 2A:
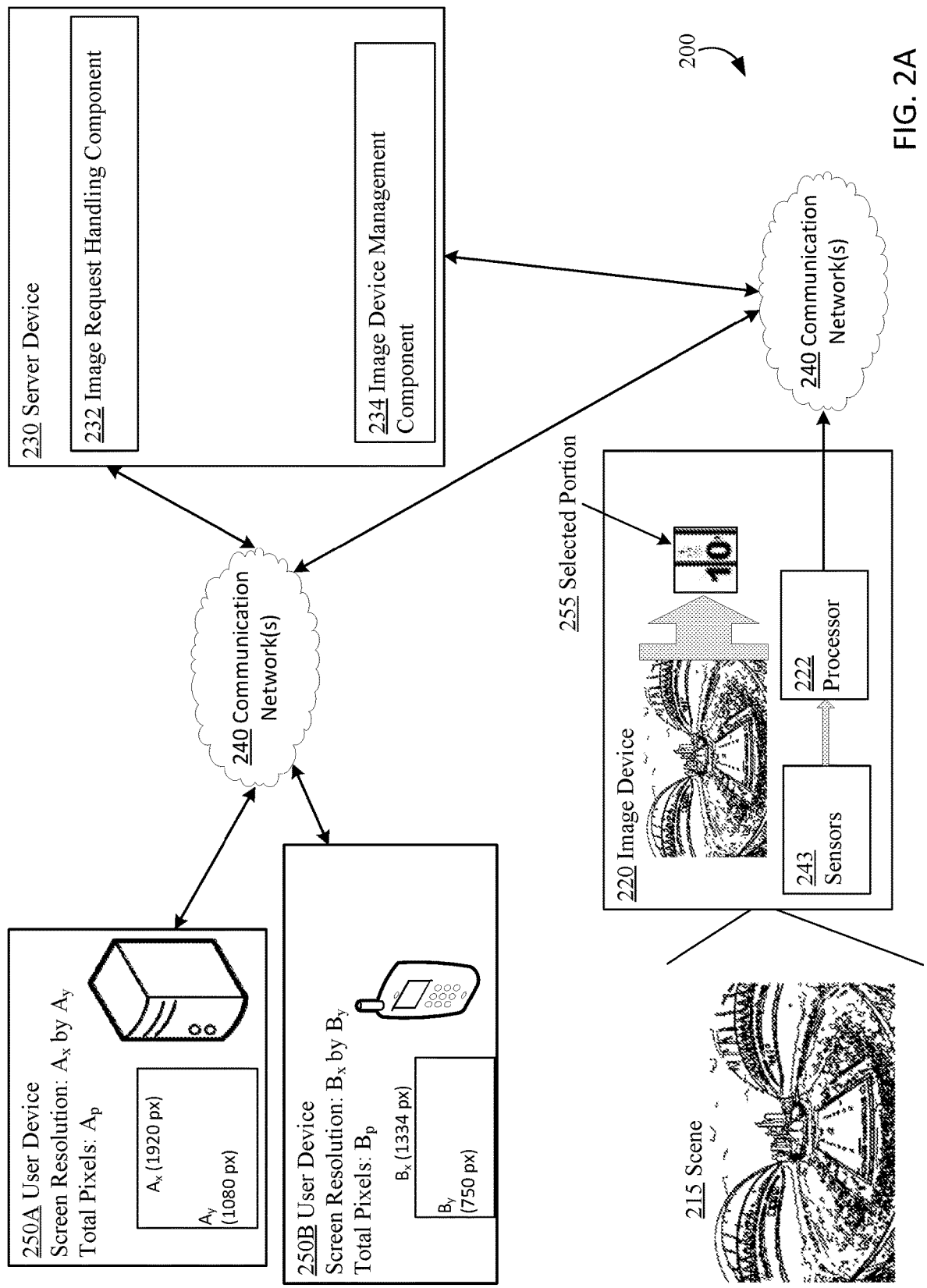

Table showing alignment of enclosed drawings to form partial schematic of one or more environments.

| Pos. (0, 0) | X-Pos 1 | X-Pos 2 | X-Pos 3 | X-Pos 4 | X-Pos 5 | X-Pos 6 | X-Pos 7 | X-Pos 8 | X-Pos 9 | X-Pos 10 |
|---|---|---|---|---|---|---|---|---|---|---|
| Y-Pos. 1 | (1, 1): FIG. 1-A | (1, 2): FIG. 1-B | (1, 3): FIG. 1-C | (1, 4): FIG. 1-D | (1, 5): FIG. 1-E | (1, 6): FIG. 1-F | (1, 7): FIG. 1-G | (1, 8): FIG. 1-H | (1, 9): FIG. 1-I | (1, 10): FIG. 1-J |
| Y-Pos. 2 | (2, 1): FIG. 1-K | (2, 2): FIG. 1-L | (2, 3): FIG. 1-M | (2, 4): FIG. 1-N | (2, 5): FIG. 1-O | (2, 6): FIG. 1-P | (2, 7): FIG. 1-Q | (2, 8): FIG. 1-R | (2, 9): FIG. 1-S | (2, 10): FIG. 1-T |
| Y-Pos. 3 | (3, 1): FIG. 1-U | (3, 2): FIG. 1-V | (3, 3): FIG. 1-W | (3, 4): FIG. 1-X | (3, 5): FIG. 1-Y | (3, 6): FIG. 1-Z | (3, 7): FIG. 1-AA | (3, 8): FIG. 1-AB | (3, 9): FIG. 1-AC | (3, 10): FIG. 1-AD |
| Y-Pos. 4 | (4, 1): FIG. 1-AE | (4, 2): FIG. 1-AF | (4, 3): FIG. 1-AG | (4, 3): FIG. 1-AH | (4, 5): FIG. 1-AI | (4, 6): FIG. 1-AJ | (4, 7): FIG. 1-AK | (4, 8): FIG. 1-AL | (4, 8): FIG. 1-AM | (4, 10): FIG. 1-AN |

In accordance with 37 C.F.R. § 1.84(h)(2), FIG. 1 is " . . . a view of a large machine or device in its entirety . . . broken into partial views . . . extended over several sheets . . . [with] no loss in facility of understanding the view." The partial views drawn on the several sheets indicated in the above table are capable of being linked edge to edge, so that no partial view contains parts of another partial view. As here, "where views on two or more sheets form, in effect, a single complete view, the views on the several sheets are so arranged that the complete figure can be assembled without concealing any part of any of the views appearing on the various sheets." 37 C.F.R. § 1.84(h)(2).

It is noted that one or more of the partial views of the drawings may be blank, or may be absent of substantive elements (e.g., may show only lines, connectors, arrows, and/or the like). These drawings are included in order to assist readers of the application in assembling the single complete view from the partial sheet format required for submission by the USPTO, and, while their inclusion is not required and may be omitted in this or other applications without subtracting from the disclosed matter as a whole, their inclusion is proper, and should be considered and treated as intentional.

FIG. 1-A, when placed at position (1,1), forms at least a portion of a partially schematic diagram of an environment(s) and/or an implementation(s) of technologies described herein.

FIG. 1-B, when placed at position (1,2), forms at least a portion of a partially schematic diagram of an environment(s) and/or an implementation(s) of technologies described herein.

FIG. 1-C, when placed at position (1,3), forms at least a portion of a partially schematic diagram of an environment(s) and/or an implementation(s) of technologies described herein.

FIG. 1-D, when placed at position (1,4), forms at least a portion of a partially schematic diagram of an environment(s) and/or an implementation(s) of technologies described herein.

FIG. 1-E, when placed at position (1,5), forms at least a portion of a partially schematic diagram of an environment(s) and/or an implementation(s) of technologies described herein.

FIG. 1-F, when placed at position (1,6), forms at least a portion of a partially schematic diagram of an environment(s) and/or an implementation(s) of technologies described herein.

FIG. 1-G, when placed at position (1,7), forms at least a portion of a partially schematic diagram of an environment(s) and/or an implementation(s) of technologies described herein.

FIG. 1-H, when placed at position (1,8), forms at least a portion of a partially schematic diagram of an environment(s) and/or an implementation(s) of technologies described herein.

FIG. 1-I, when placed at position (1,9), forms at least a portion of a partially schematic diagram of an environment(s) and/or an implementation(s) of technologies described herein.

FIG. 1-J, when placed at position (1,10), forms at least a portion of a partially schematic diagram of an environment(s) and/or an implementation(s) of technologies described herein.

FIG. 1-K, when placed at position (2,1), forms at least a portion of a partially schematic diagram of an environment(s) and/or an implementation(s) of technologies described herein.

FIG. 1-L, when placed at position (2,2), forms at least a portion of a partially schematic diagram of an environment(s) and/or an implementation(s) of technologies described herein.

FIG. 1-M, when placed at position (2,3), forms at least a portion of a partially schematic diagram of an environment(s) and/or an implementation(s) of technologies described herein.

FIG. 1-N, when placed at position (2,4), forms at least a portion of a partially schematic diagram of an environment(s) and/or an implementation(s) of technologies described herein.

FIG. 1-O (which format is changed to avoid confusion as Figure "10" or "ten"), when placed at position (2,5), forms at least a portion of a partially schematic diagram of an environment(s) and/or an implementation(s) of technologies described herein.

FIG. 1-P, when placed at position (2,6), forms at least a portion of a partially schematic diagram of an environment(s) and/or an implementation(s) of technologies described herein.

FIG. 1-Q, when placed at position (2,7), forms at least a portion of a partially schematic diagram of an environment(s) and/or an implementation(s) of technologies described herein.

FIG. 1-R, when placed at position (2,8), forms at least a portion of a partially schematic diagram of an environment(s) and/or an implementation(s) of technologies described herein.

FIG. 1-S, when placed at position (2,9), forms at least a portion of a partially schematic diagram of an environment(s) and/or an implementation(s) of technologies described herein.

FIG. 1-T, when placed at position (2,10), forms at least a portion of a partially schematic diagram of an environment(s) and/or an implementation(s) of technologies described herein.

FIG. 1-U, when placed at position (3,1), forms at least a portion of a partially schematic diagram of an environment(s) and/or an implementation(s) of technologies described herein.

FIG. 1-V, when placed at position (3,2), forms at least a portion of a partially schematic diagram of an environment(s) and/or an implementation(s) of technologies described herein.

FIG. 1-W, when placed at position (3,3), forms at least a portion of a partially schematic diagram of an environment(s) and/or an implementation(s) of technologies described herein.

FIG. 1-X, when placed at position (3,4), forms at least a portion of a partially schematic diagram of an environment(s) and/or an implementation(s) of technologies described herein.

FIG. 1-Y, when placed at position (3,5), forms at least a portion of a partially schematic diagram of an environment(s) and/or an implementation(s) of technologies described herein.

FIG. 1-Z, when placed at position (3,6), forms at least a portion of a partially schematic diagram of an environment(s) and/or an implementation(s) of technologies described herein.

FIG. 1-AA, when placed at position (3,7), forms at least a portion of a partially schematic diagram of an environment(s) and/or an implementation(s) of technologies described herein.

FIG. 1-AB, when placed at position (3,8), forms at least a portion of a partially schematic diagram of an environment(s) and/or an implementation(s) of technologies described herein.

FIG. 1-AC, when placed at position (3,9), forms at least a portion of a partially schematic diagram of an environment(s) and/or an implementation(s) of technologies described herein.

FIG. 1-AD, when placed at position (3,10), forms at least a portion of a partially schematic diagram of an environment(s) and/or an implementation(s) of technologies described herein.

FIG. 1-AE, when placed at position (4,1), forms at least a portion of a partially schematic diagram of an environment(s) and/or an implementation(s) of technologies described herein.

FIG. 1-AF, when placed at position (4,2), forms at least a portion of a partially schematic diagram of an environment(s) and/or an implementation(s) of technologies described herein.

FIG. 1-AG, when placed at position (4,3), forms at least a portion of a partially schematic diagram of an environment(s) and/or an implementation(s) of technologies described herein.

FIG. 1-AH, when placed at position (4,4), forms at least a portion of a partially schematic diagram of an environment(s) and/or an implementation(s) of technologies described herein.

FIG. 1-AI, when placed at position (4,5), forms at least a portion of a partially schematic diagram of an environment(s) and/or an implementation(s) of technologies described herein.

FIG. 1-AJ, when placed at position (4,6), forms at least a portion of a partially schematic diagram of an environment(s) and/or an implementation(s) of technologies described herein.

FIG. 1-AK, when placed at position (4,7), forms at least a portion of a partially schematic diagram of an environment(s) and/or an implementation(s) of technologies described herein.

FIG. 1-AL, when placed at position (4,8), forms at least a portion of a partially schematic diagram of an environment(s) and/or an implementation(s) of technologies described herein.

FIG. 1-AM, when placed at position (4,9), forms at least a portion of a partially schematic diagram of an environment(s) and/or an implementation(s) of technologies described herein.

FIG. 1-AN, when placed at position (4,10), forms at least a portion of a partially schematic diagram of an environment(s) and/or an implementation(s) of technologies described herein.

FIG. 2A shows a high-level block diagram of an exemplary environment 200, including an image device 220, according to one or more embodiments.

Figure 2B:
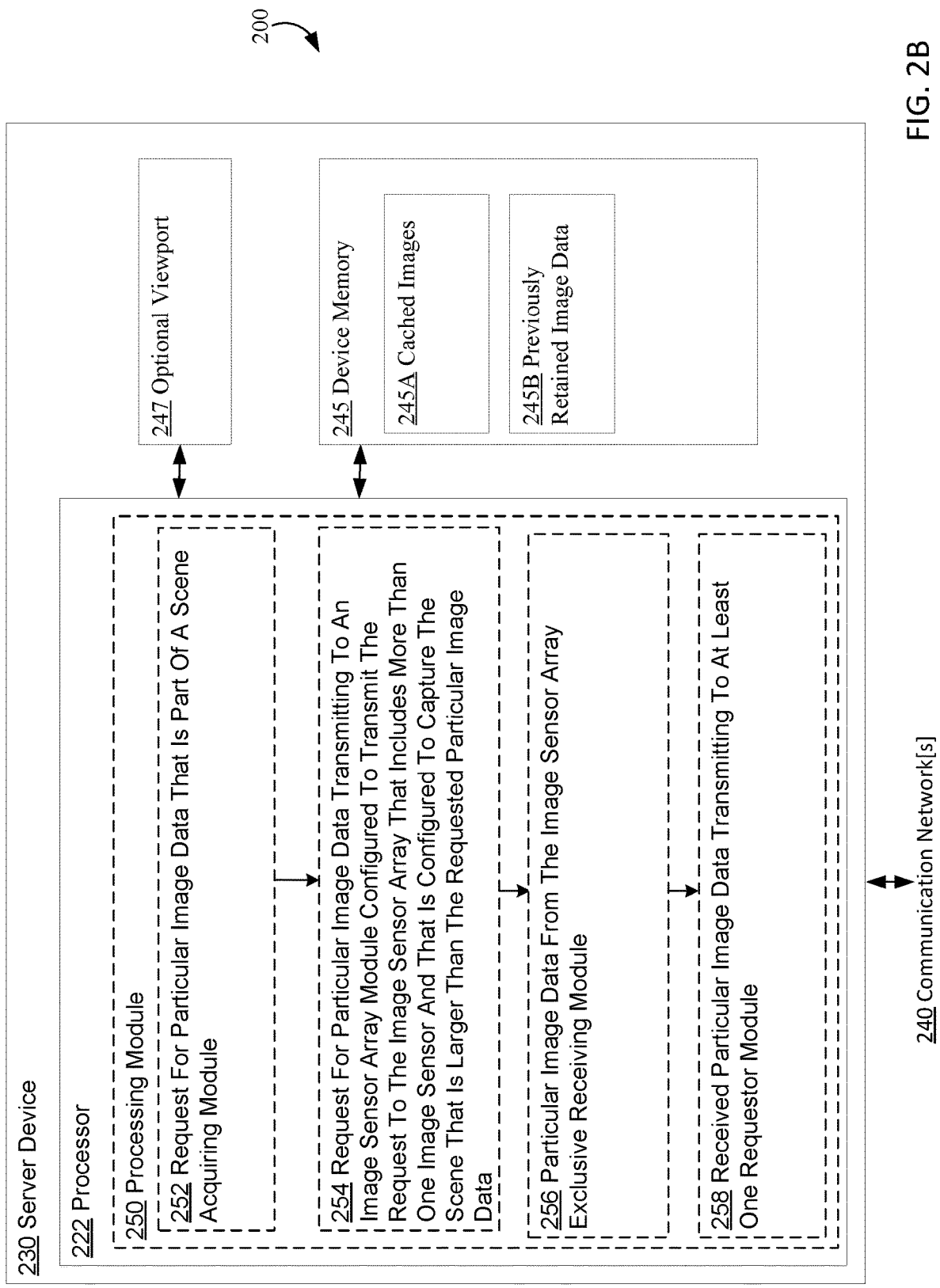

FIG. 2B shows a high-level block diagram of a computing device, e.g., a server device 230 operating in an exemplary environment 200, according to one or more embodiments.

Figure 3A:
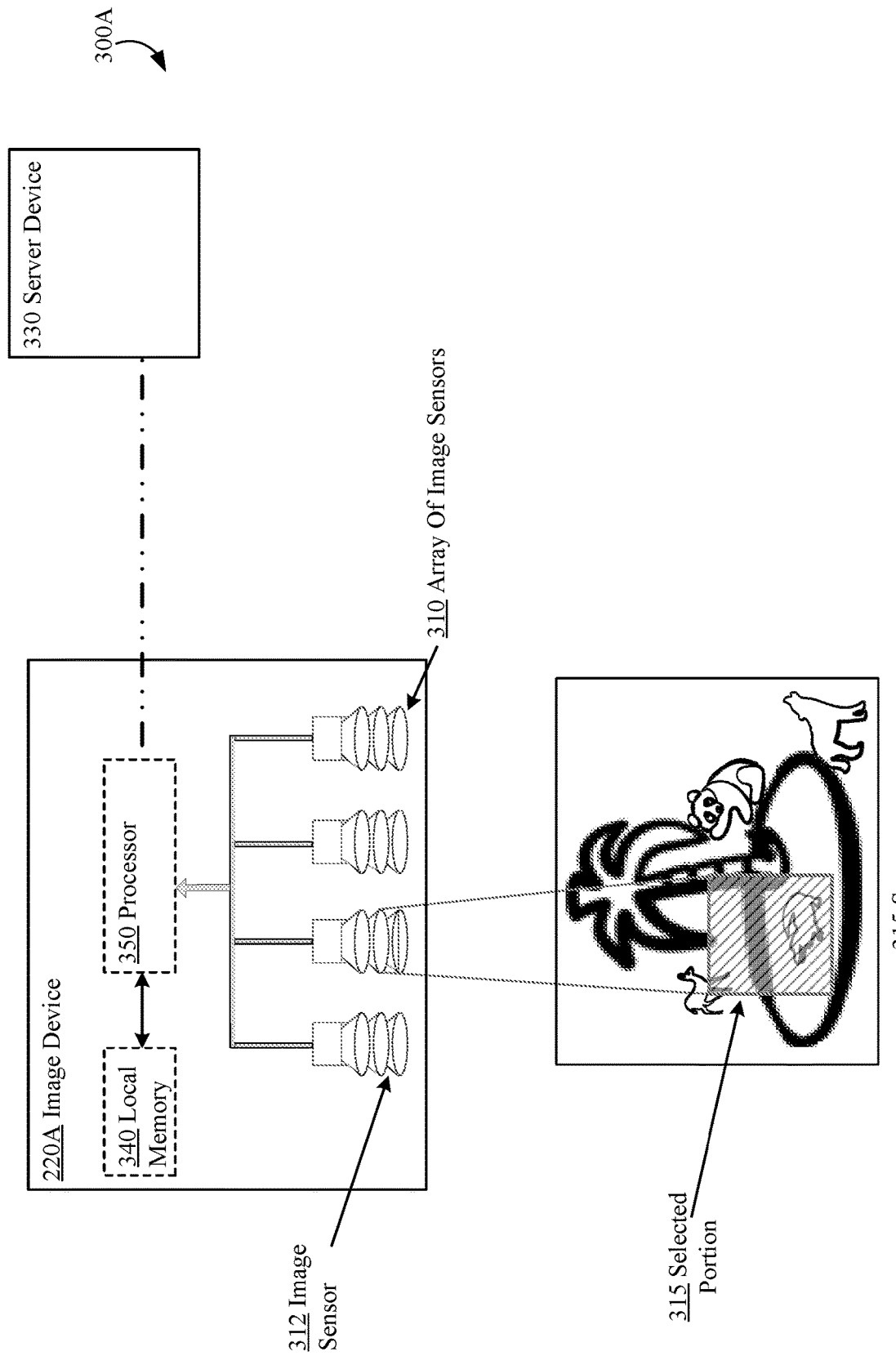

FIG. 3A shows a high-level block diagram of an exemplary operation of a device 220A in an exemplary environment 300A, according to embodiments.

Figure 3B:
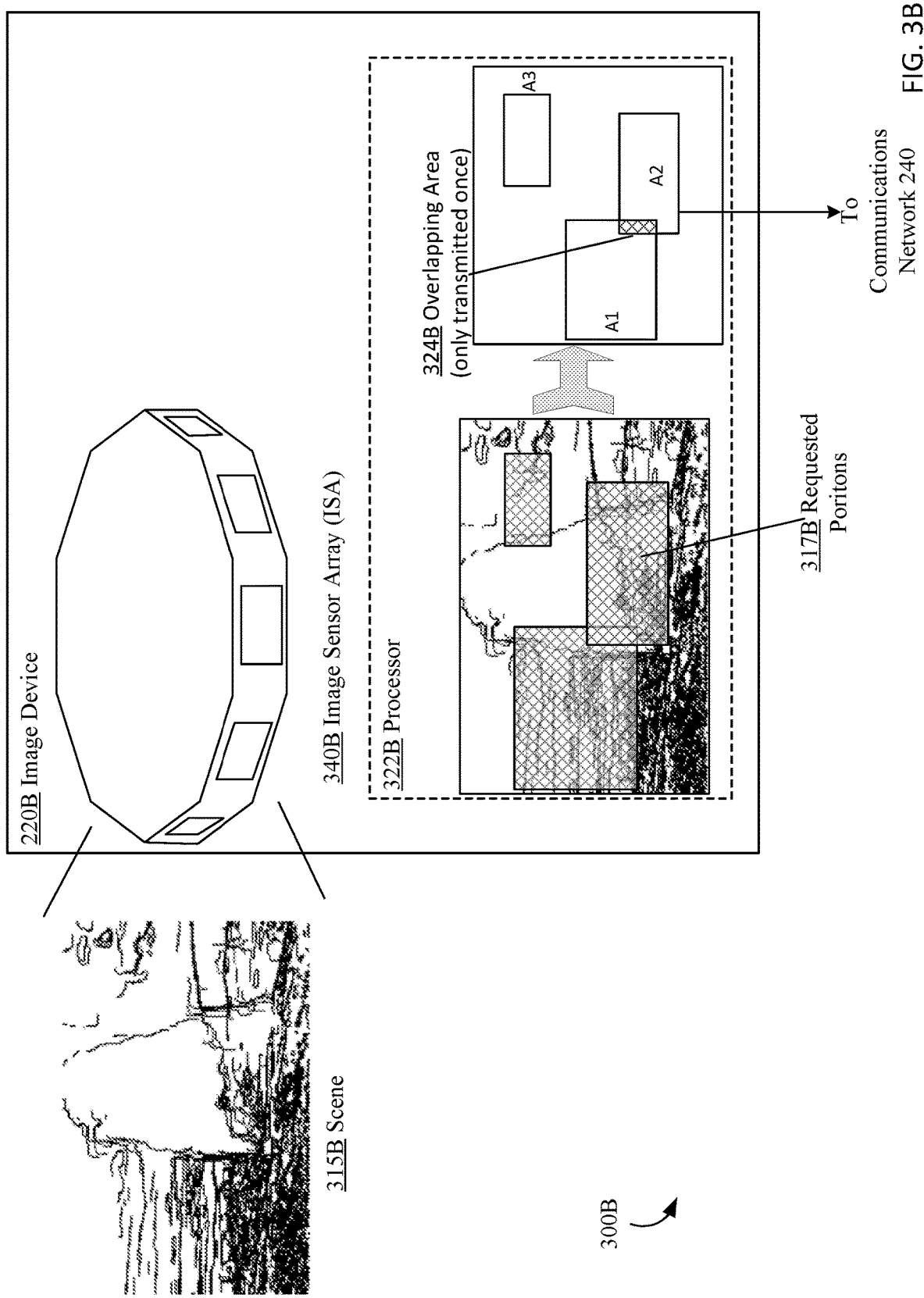

FIG. 3B shows a high-level block diagram of an exemplary operation of a device 220B in an exemplary environment 300B, according to embodiments.

Figure 3C:
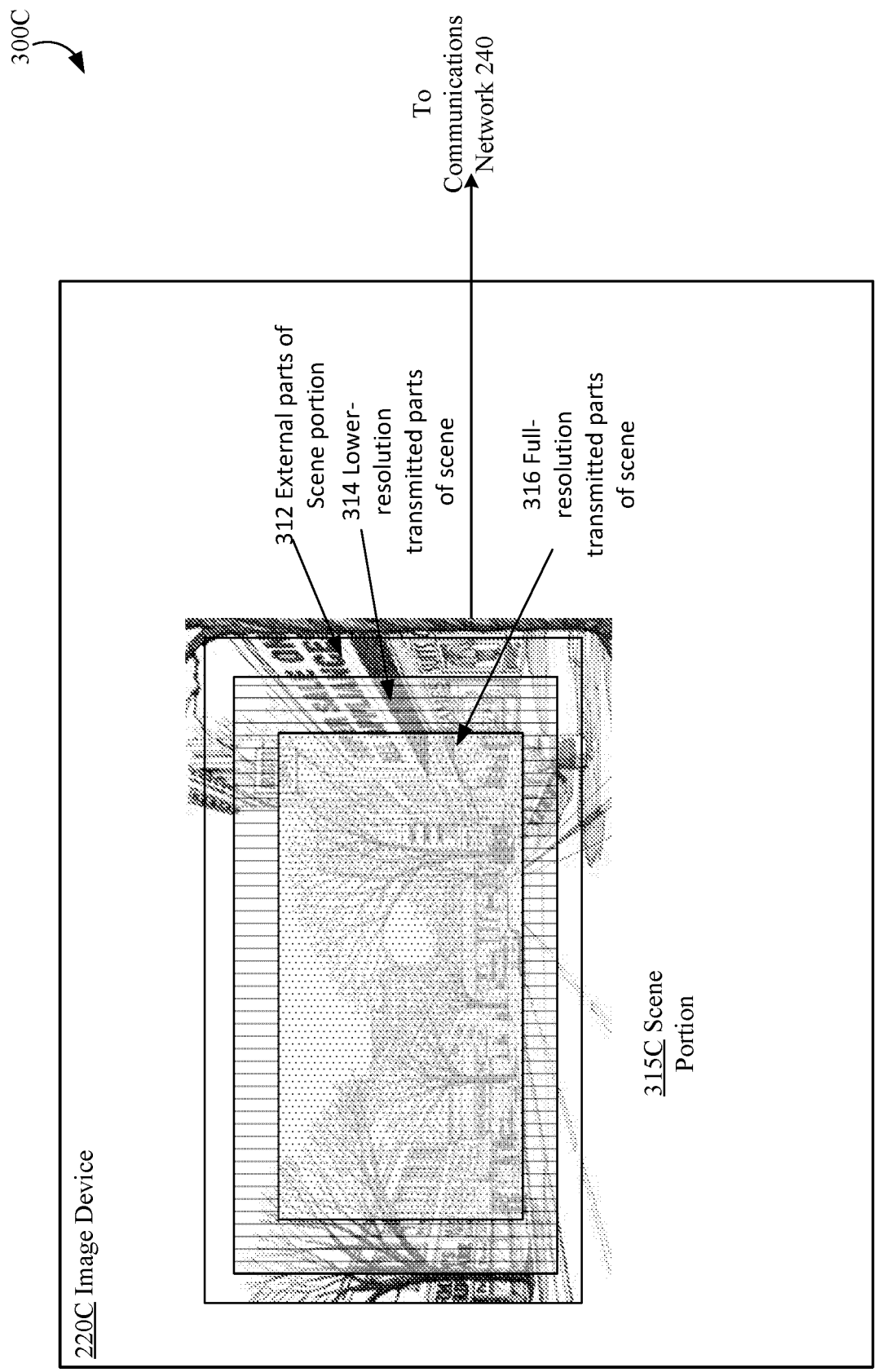

FIG. 3C shows a high-level block diagram of an exemplary operation of a device 220C in an exemplary environment 300C, according to embodiments.

Figure 4A:
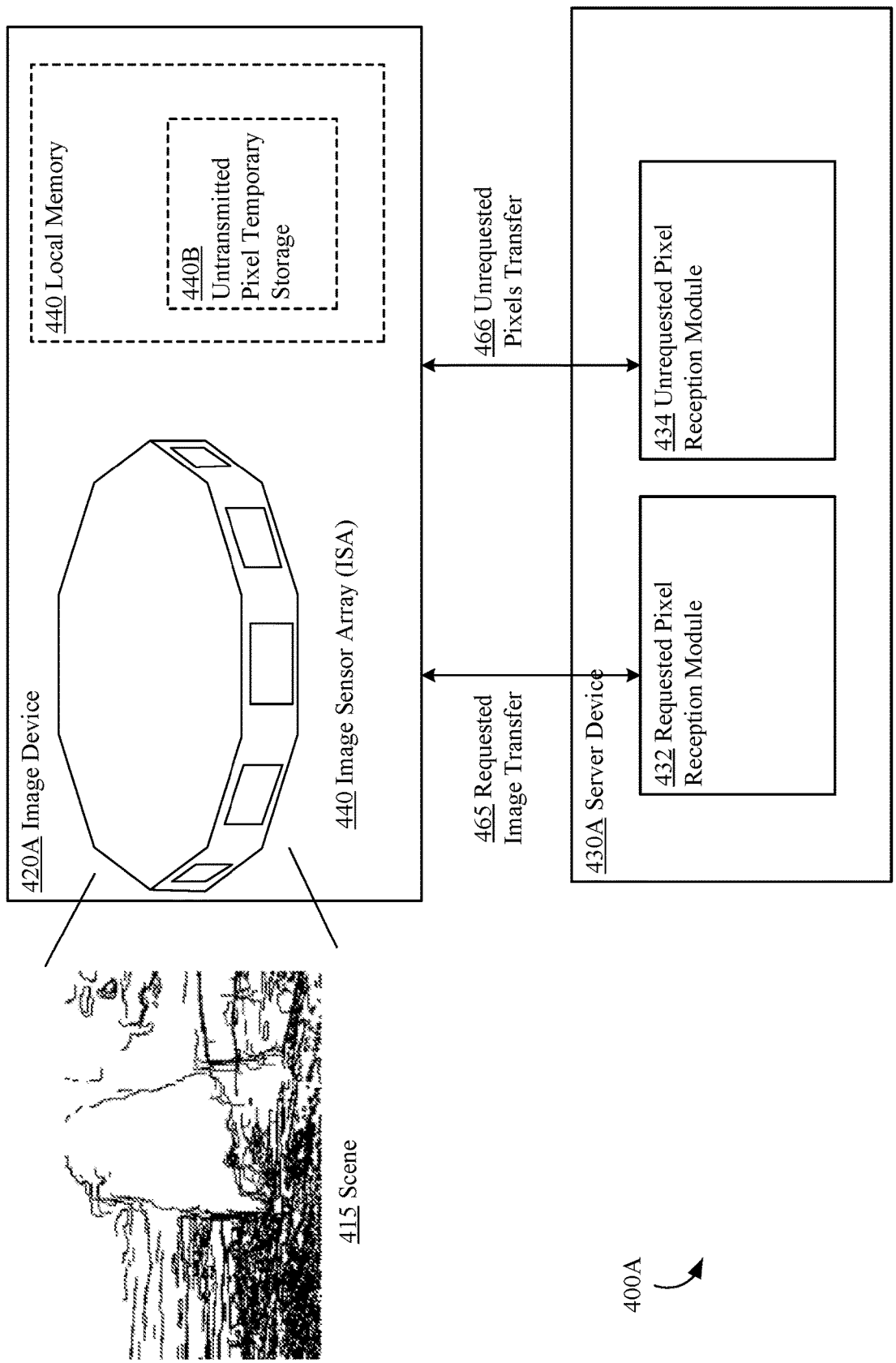

FIG. 4A shows a high-level block diagram of an exemplary operation of an image device 420 in an exemplary environment 400A, according to embodiments.

Figure 4B:
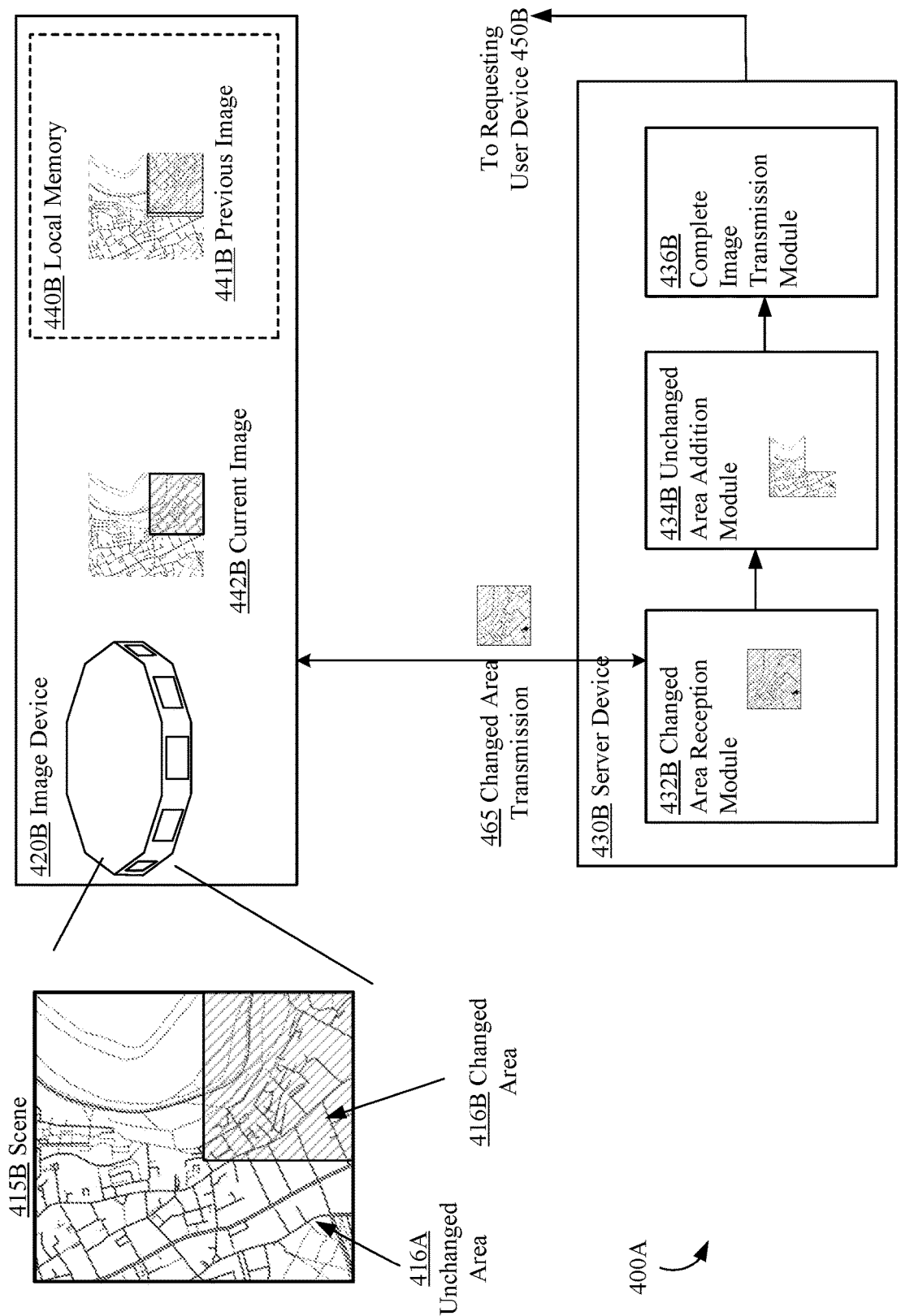

FIG. 4B shows a high-level block diagram of an exemplary operation of an image device 420B in an exemplary environment 400B, according to embodiments.

Figure 5A:
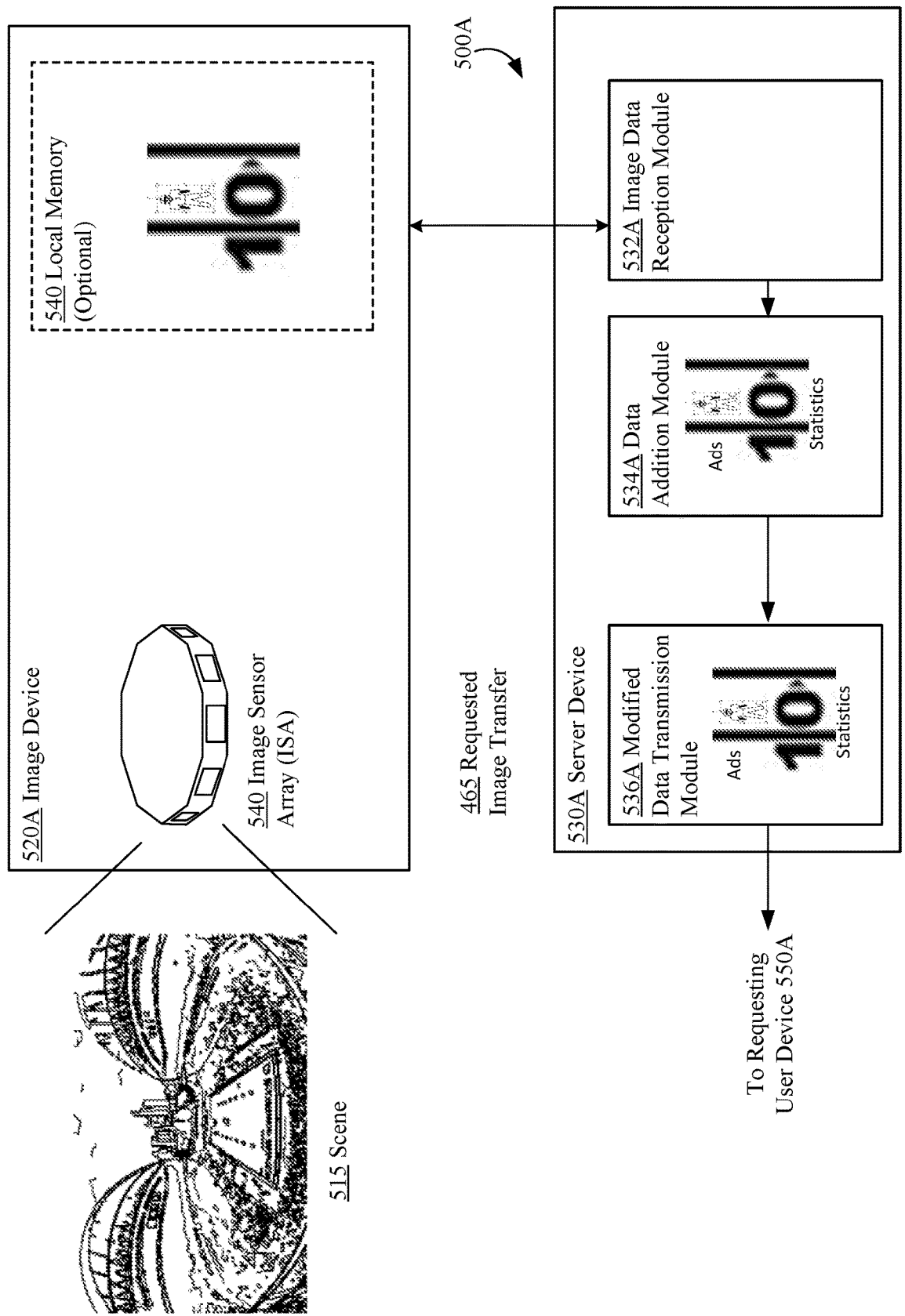

FIG. 5A shows a high-level block diagram of an exemplary operation of a server device 530A in an exemplary environment 500A, according to embodiments.

Figure 5B:
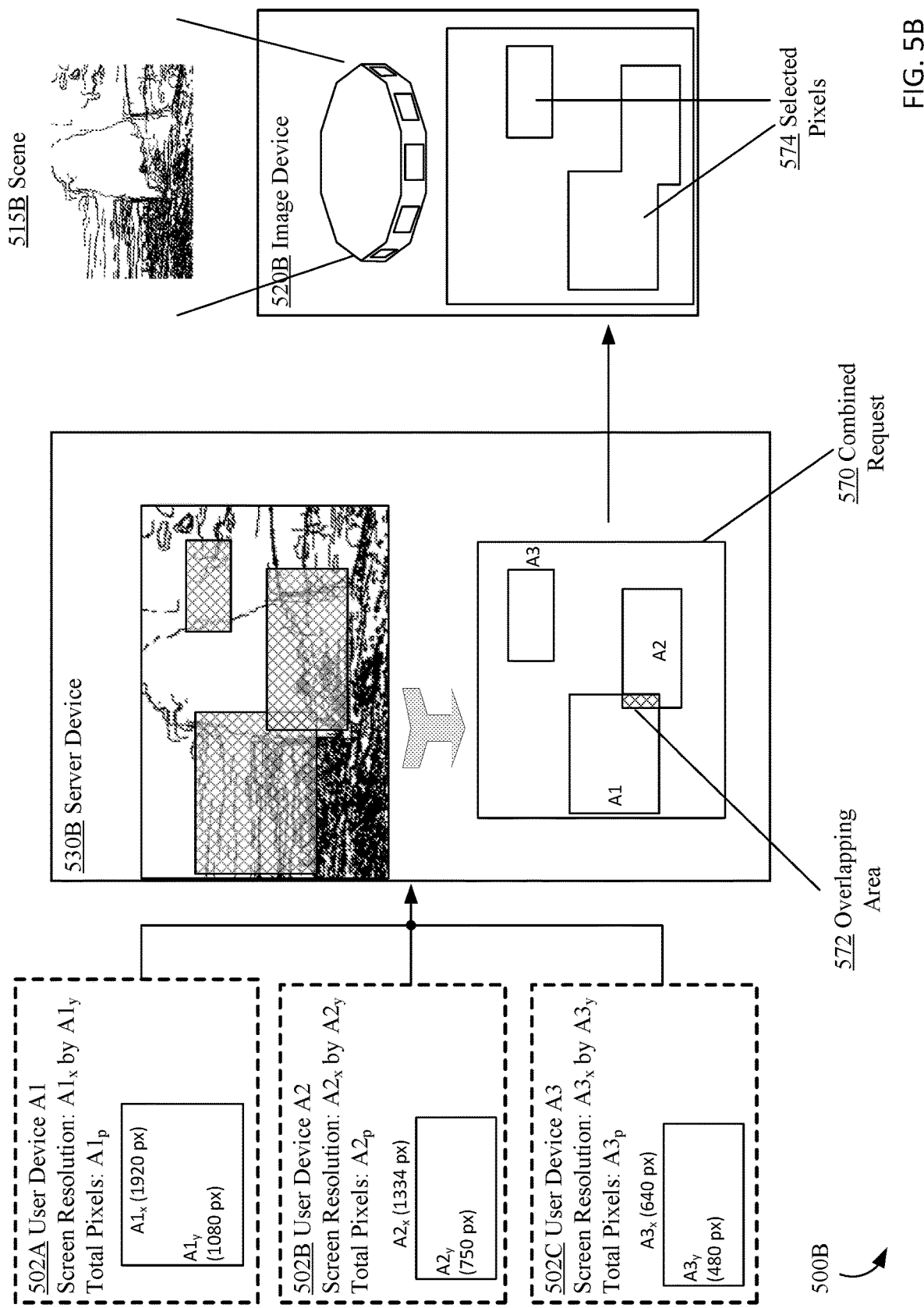

FIG. 5B shows a high-level block diagram of an exemplary operation of a server device 530B in an exemplary environment 500B, according to embodiments.

Figure 6:

FIG. 6, including FIGS. 6A-6G, shows a particular perspective of a request for particular image data that is part of a scene acquiring module 252 of processing module 250 of server device 230 of FIG. 2B, according to an embodiment.

Figure 7D:
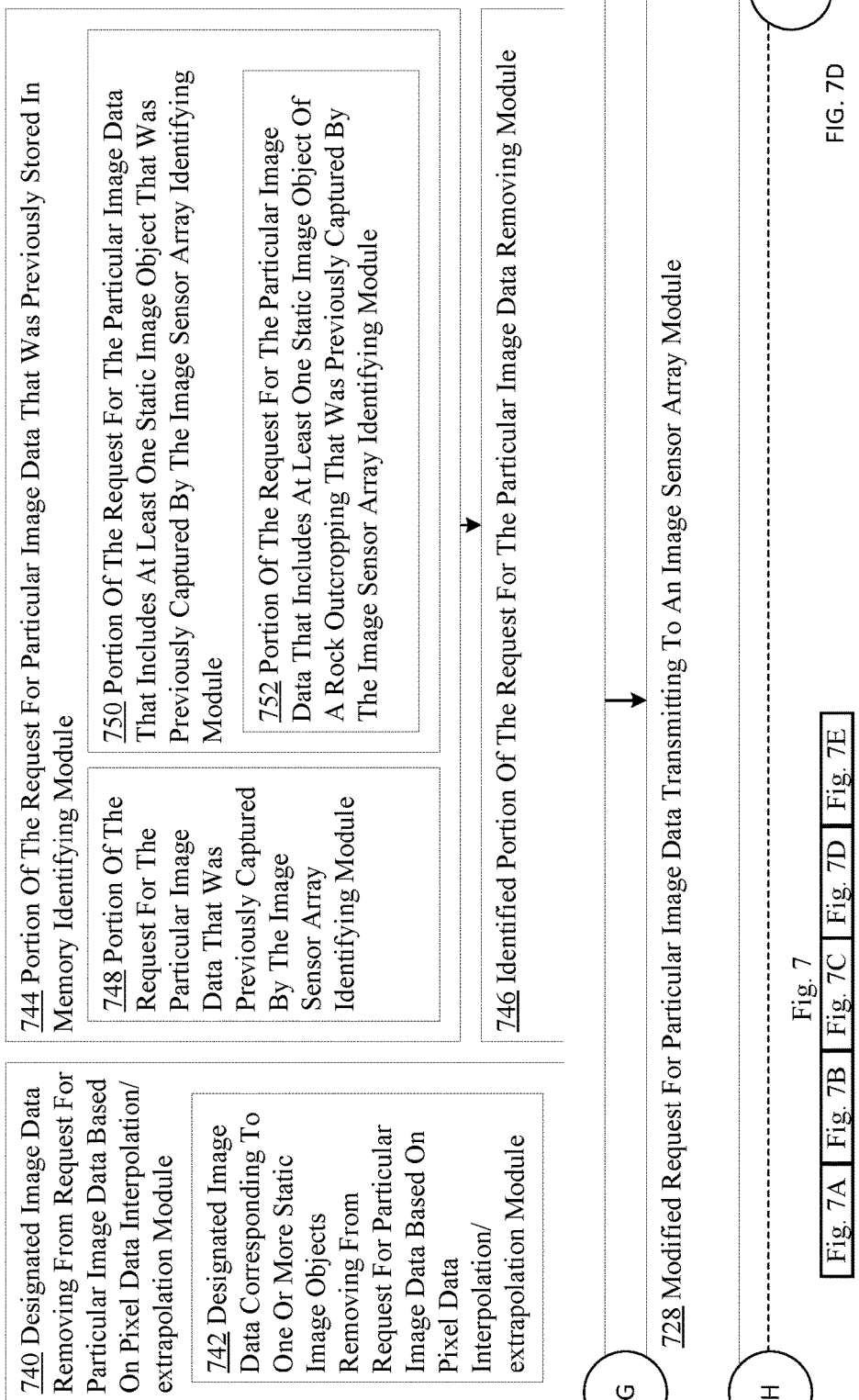

FIG. 7, including FIGS. 7A-7E, shows a particular perspective of a request for particular image data transmitting to an image sensor array module 254 of processing module 250 of server device 230 of FIG. 2B, according to an embodiment.

FIG. 8, including FIGS. 8A-8C, shows a particular perspective of a particular image data from the image sensor array exclusive receiving module 256 of processing module 250 of server device 230 of FIG. 2B, according to an embodiment.

Figure 9:
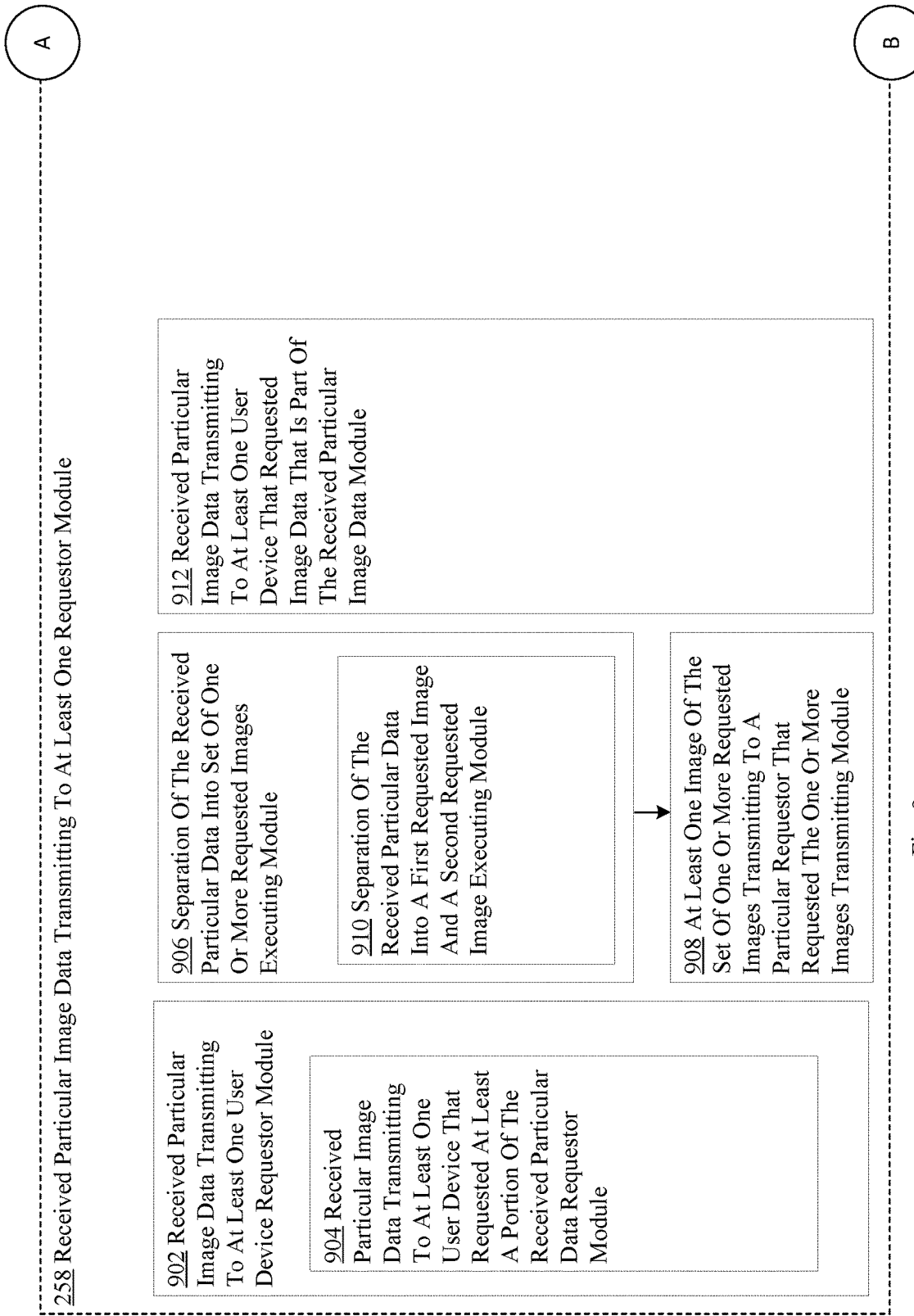

FIG. 9, including FIGS. 9A-9E, shows a particular perspective of a received particular image data transmitting to at least one requestor module 258 of processing module 250 of server device 230 of FIG. 2B, according to an embodiment.

Figure 10:
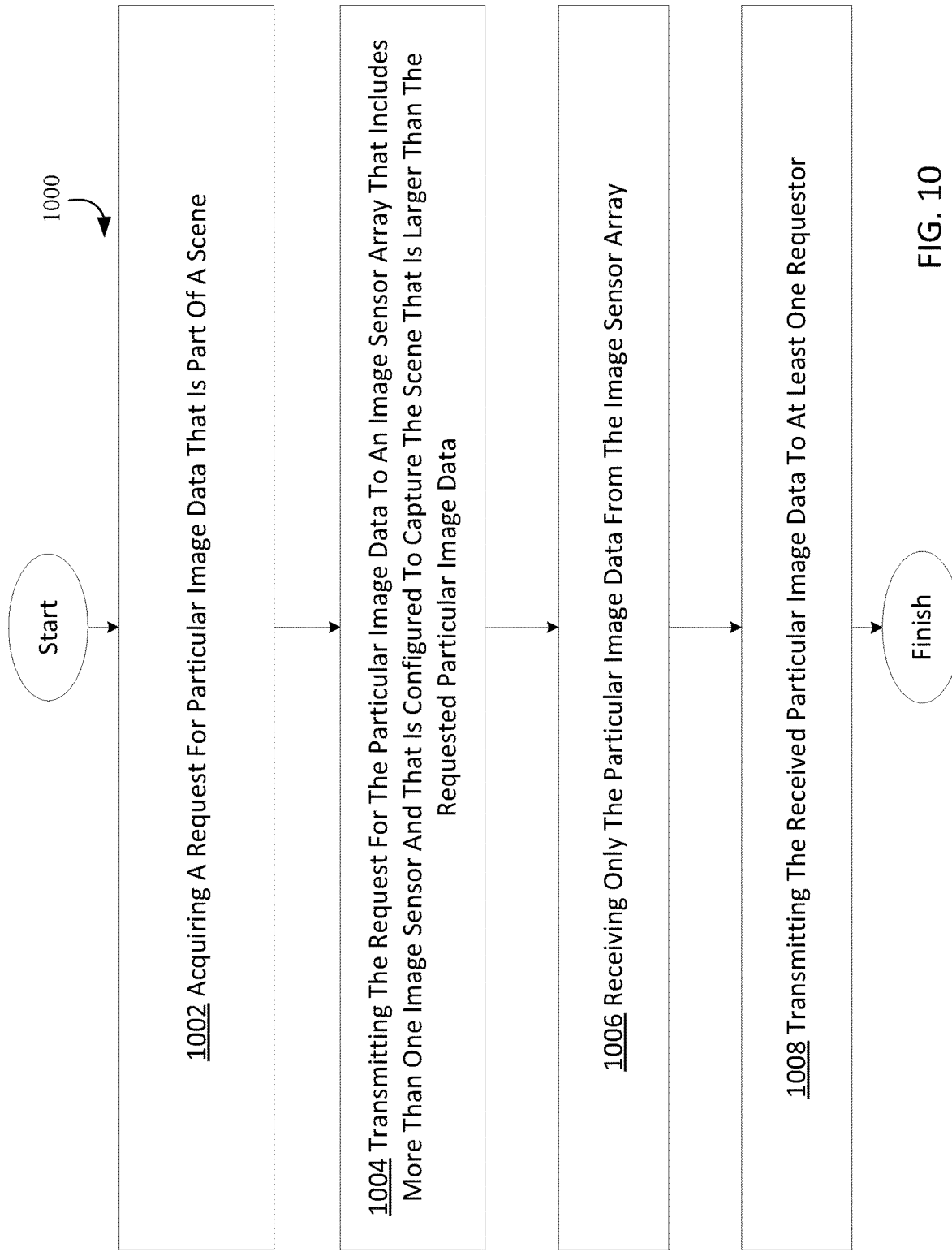

FIG. 10 is a high-level logic flowchart of a process, e.g., operational flow 1000, including one or more operations of an acquiring a request for particular image data that is part of a scene operation, a transmitting the request for the particular image data to an image sensor array operation, a receiving only the particular image data from the image sensor array operation, and a transmitting the received particular image data to at least one requestor operation, according to an embodiment.

Figure 11A:
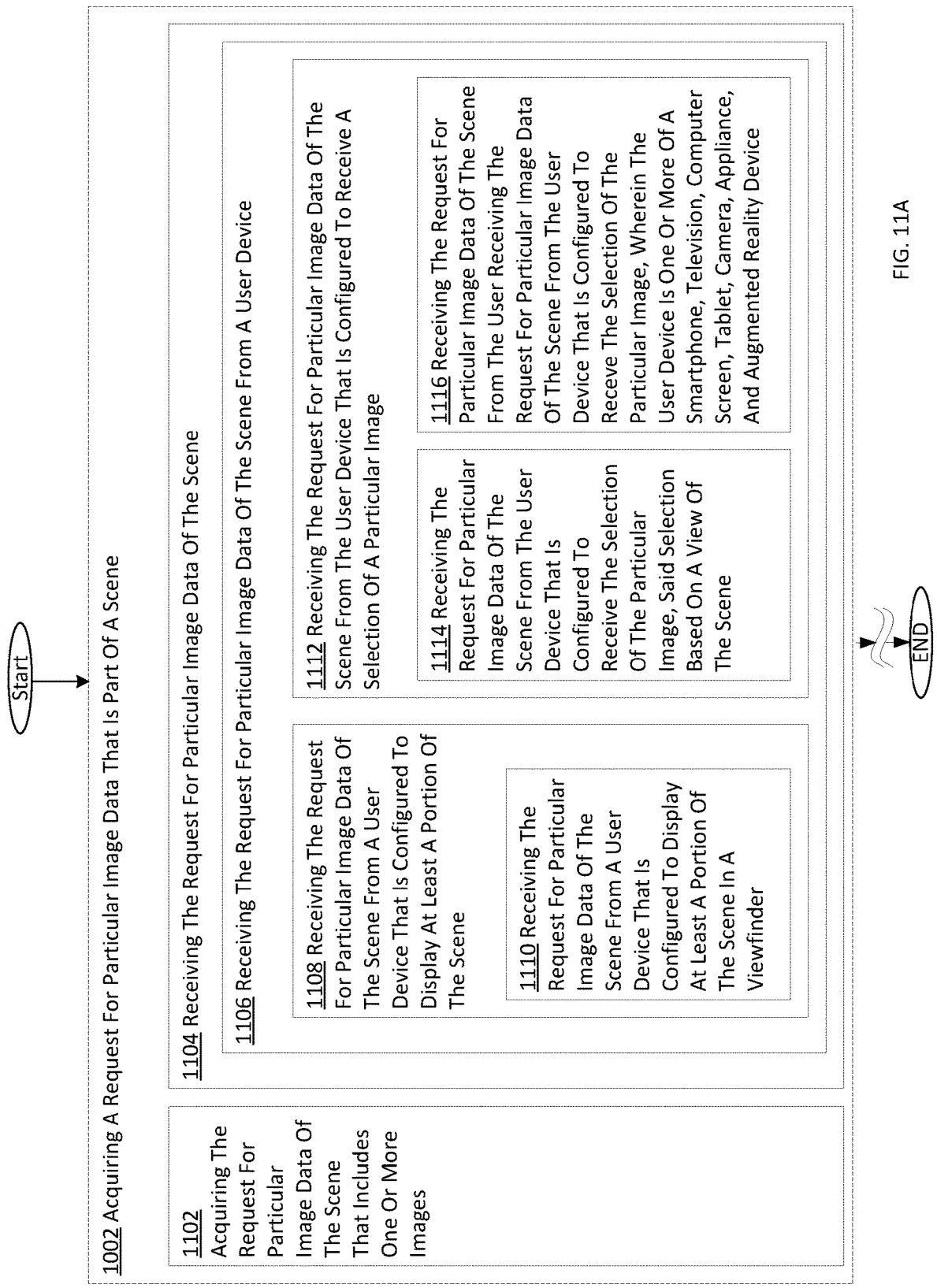

FIG. 11A is a high-level logic flow chart of a process depicting alternate implementations of an acquiring a request for particular image data that is part of a scene operation 1002, according to one or more embodiments.

Figure 11B:
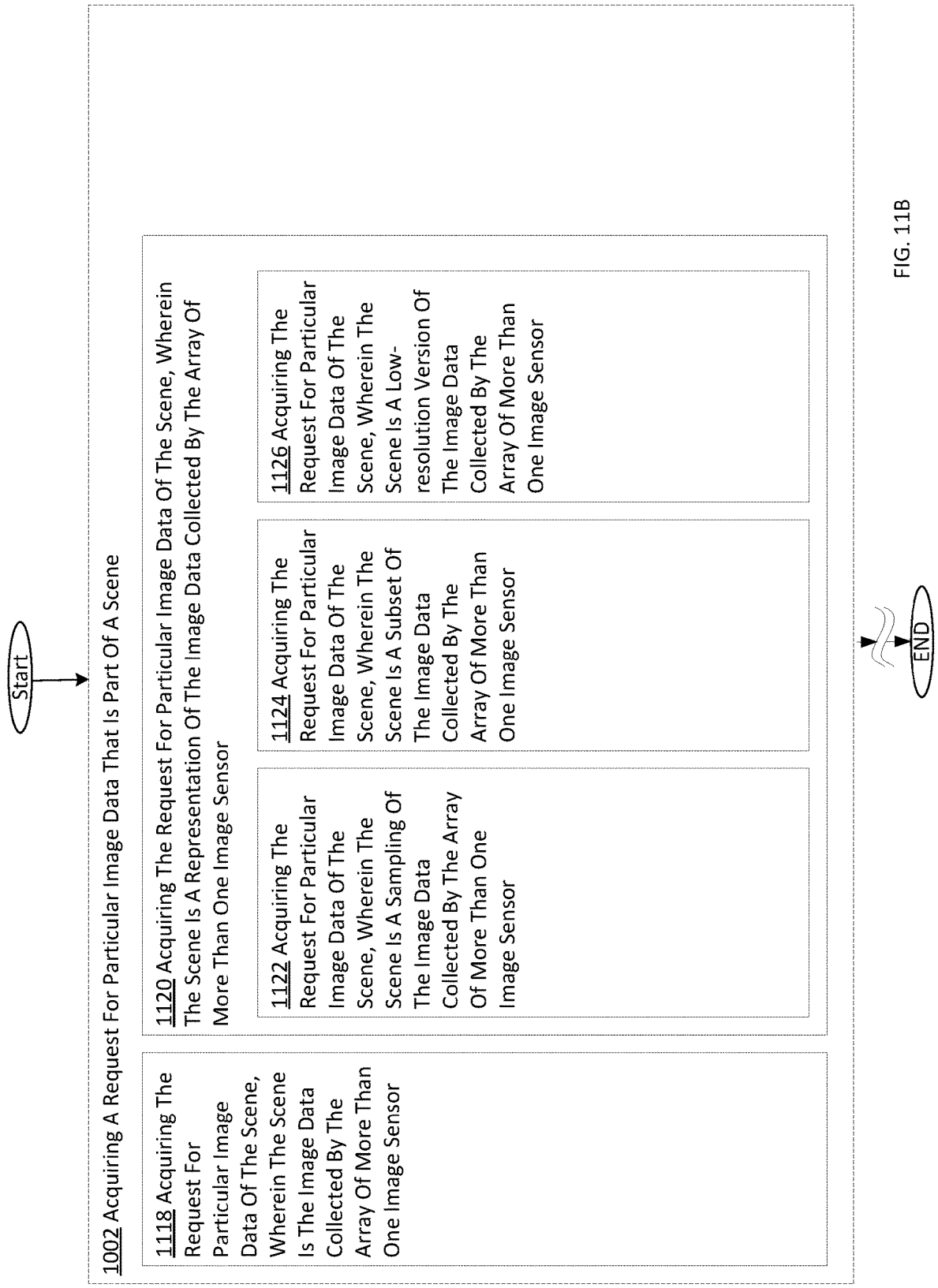

FIG. 11B is a high-level logic flow chart of a process depicting alternate implementations of an acquiring a request for particular image data that is part of a scene operation 1002, according to one or more embodiments.

Figure 11C:
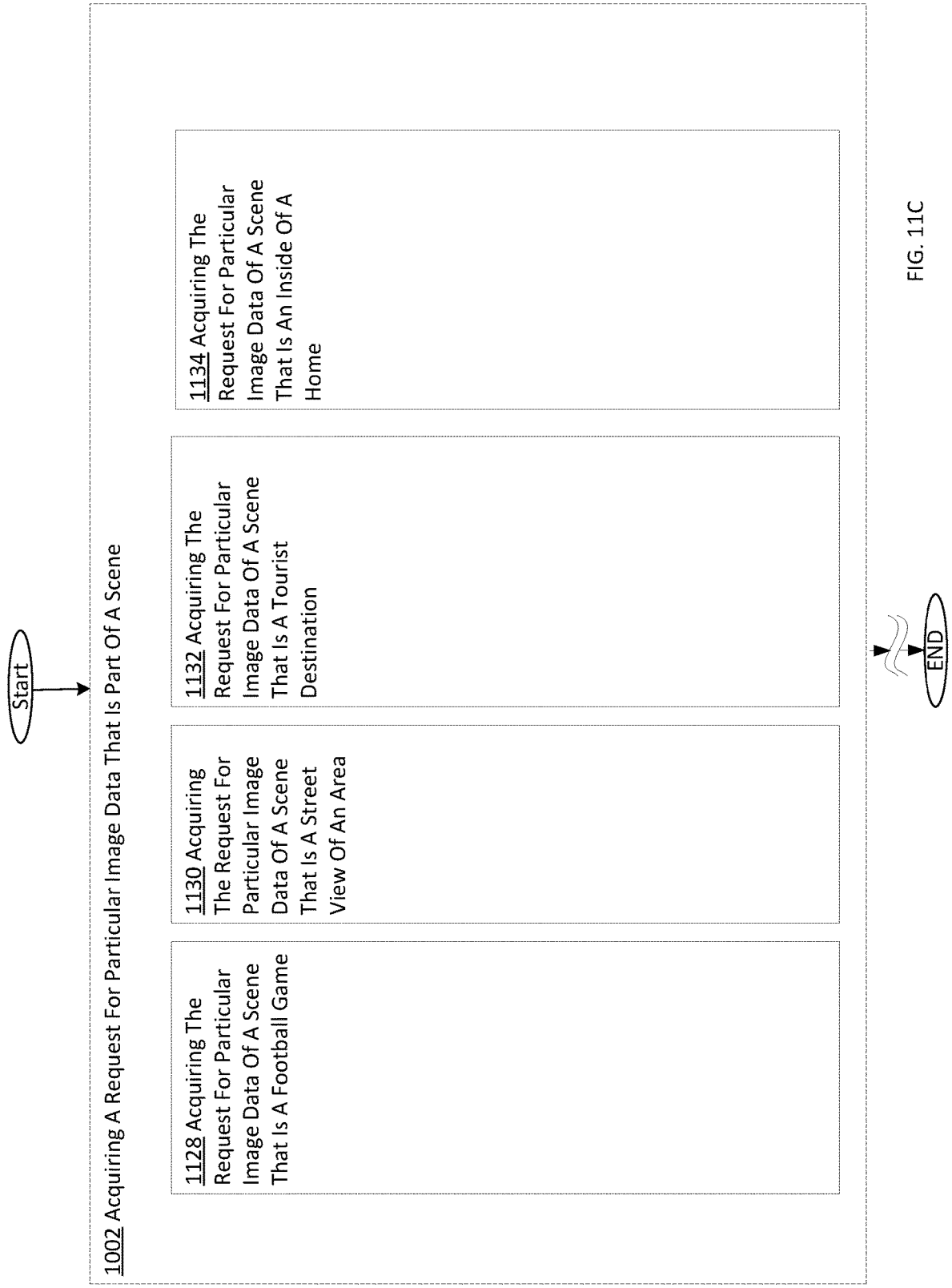

FIG. 11C is a high-level logic flow chart of a process depicting alternate implementations of an acquiring a request for particular image data that is part of a scene operation 1002, according to one or more embodiments.

Figure 11D:
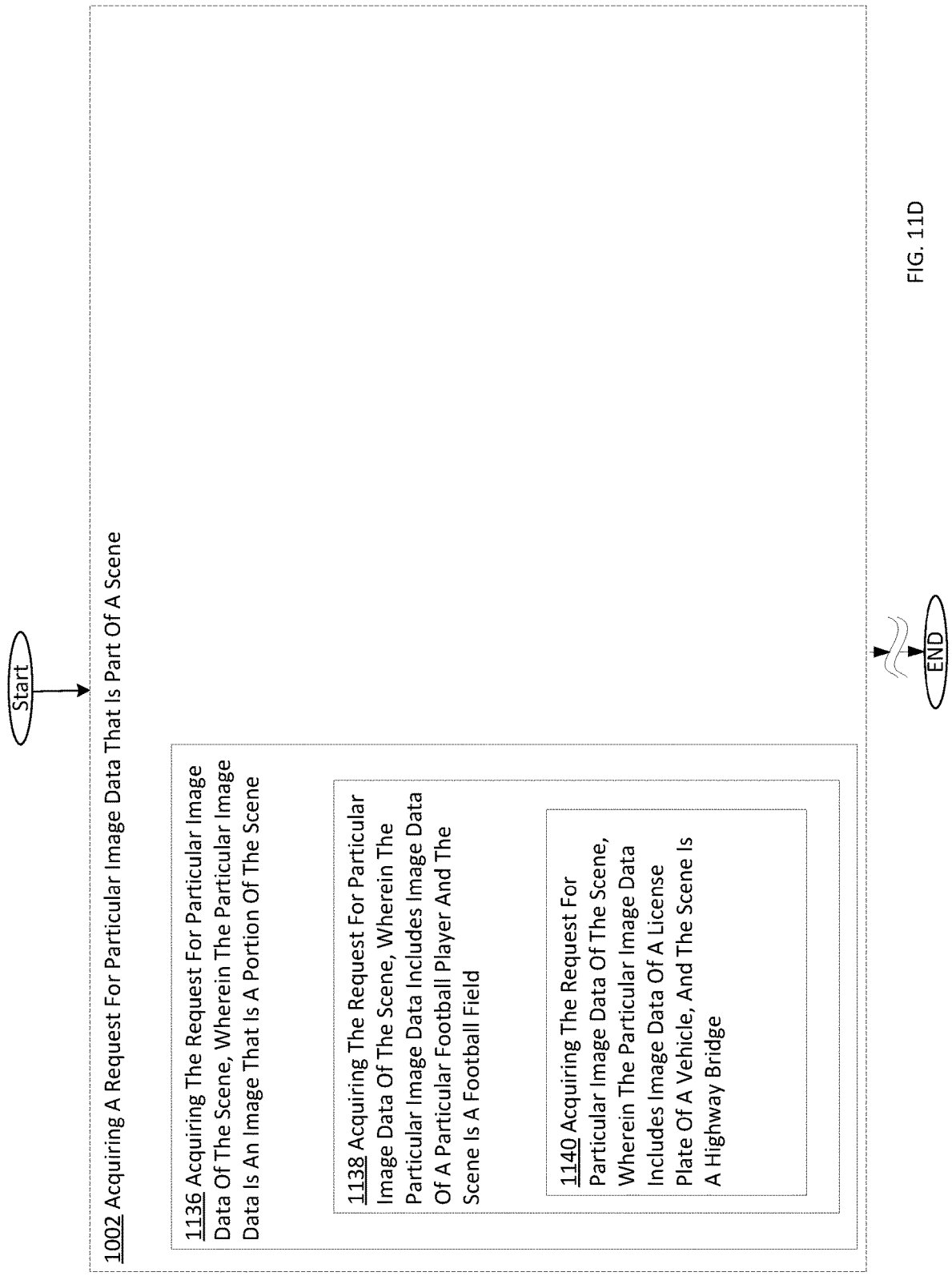

FIG. 11D is a high-level logic flow chart of a process depicting alternate implementations of an acquiring a request for particular image data that is part of a scene operation 1002, according to one or more embodiments.

Figure 11E:
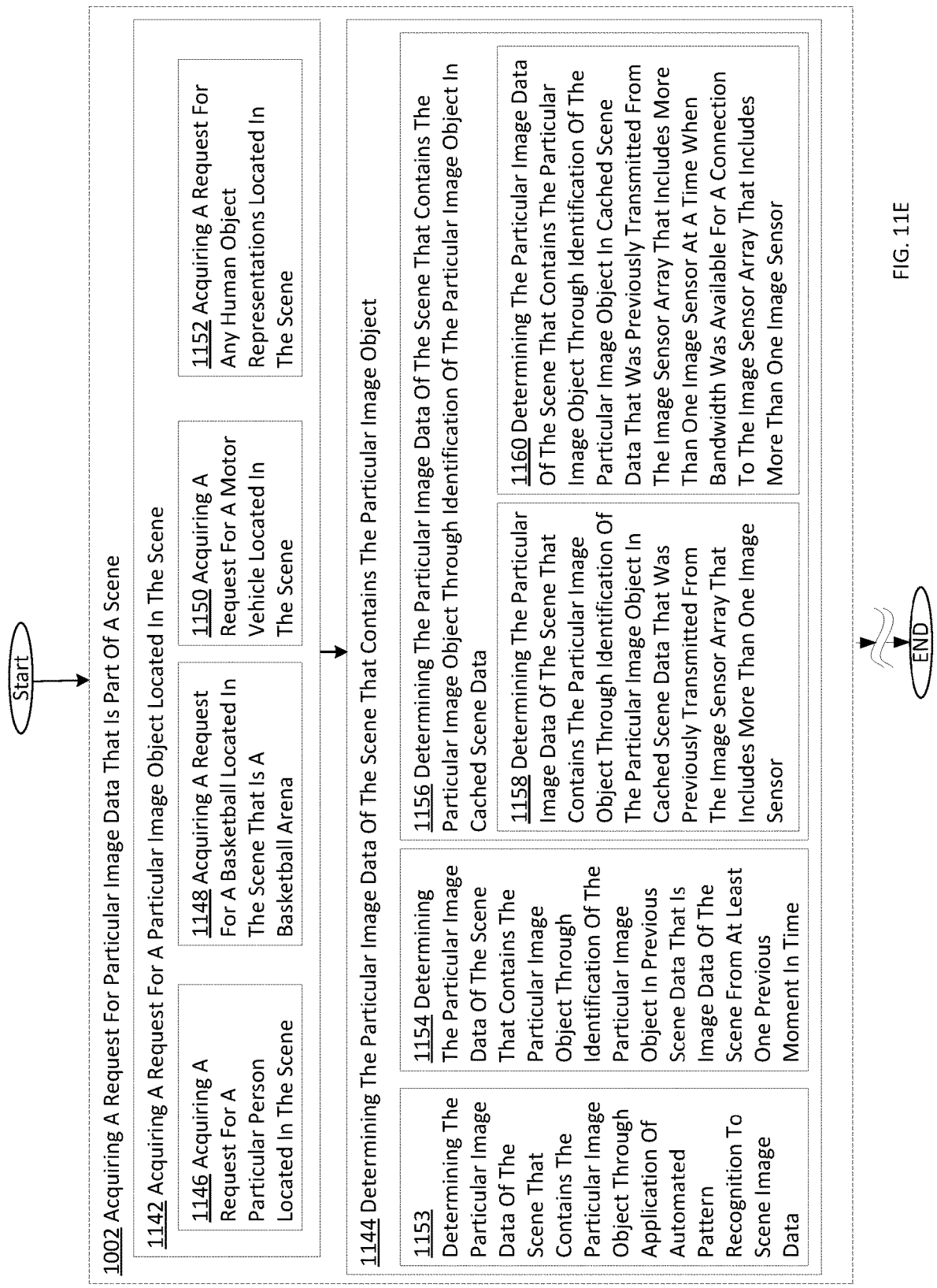

FIG. 11E is a high-level logic flow chart of a process depicting alternate implementations of an acquiring a request for particular image data that is part of a scene operation 1002, according to one or more embodiments.

Figure 11F:
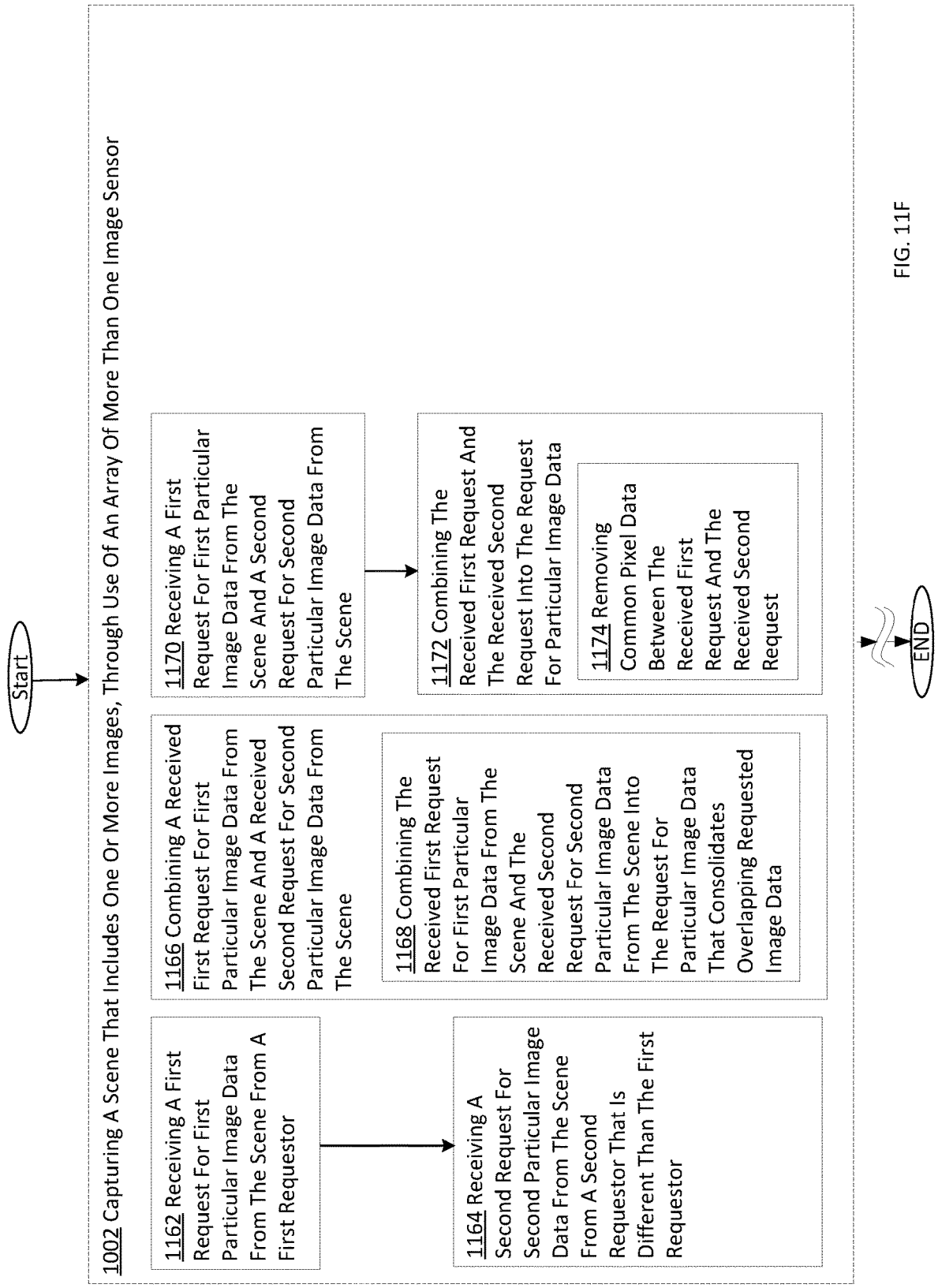

FIG. 11F is a high-level logic flow chart of a process depicting alternate implementations of an acquiring a request for particular image data that is part of a scene operation 1002, according to one or more embodiments.

Figure 11G:
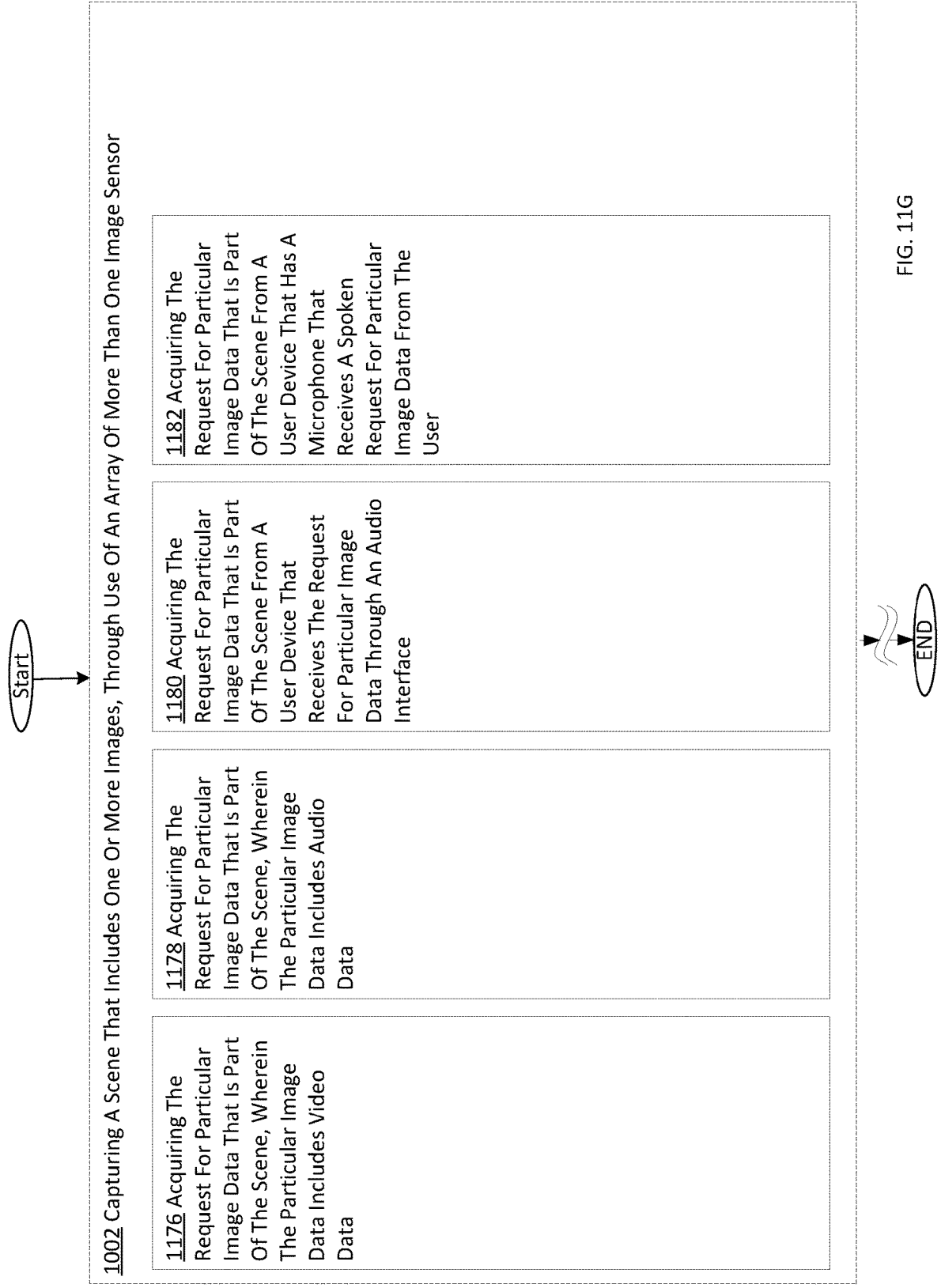

FIG. 11G is a high-level logic flow chart of a process depicting alternate implementations of an acquiring a request for particular image data that is part of a scene operation 1002, according to one or more embodiments.

Figure 12A:
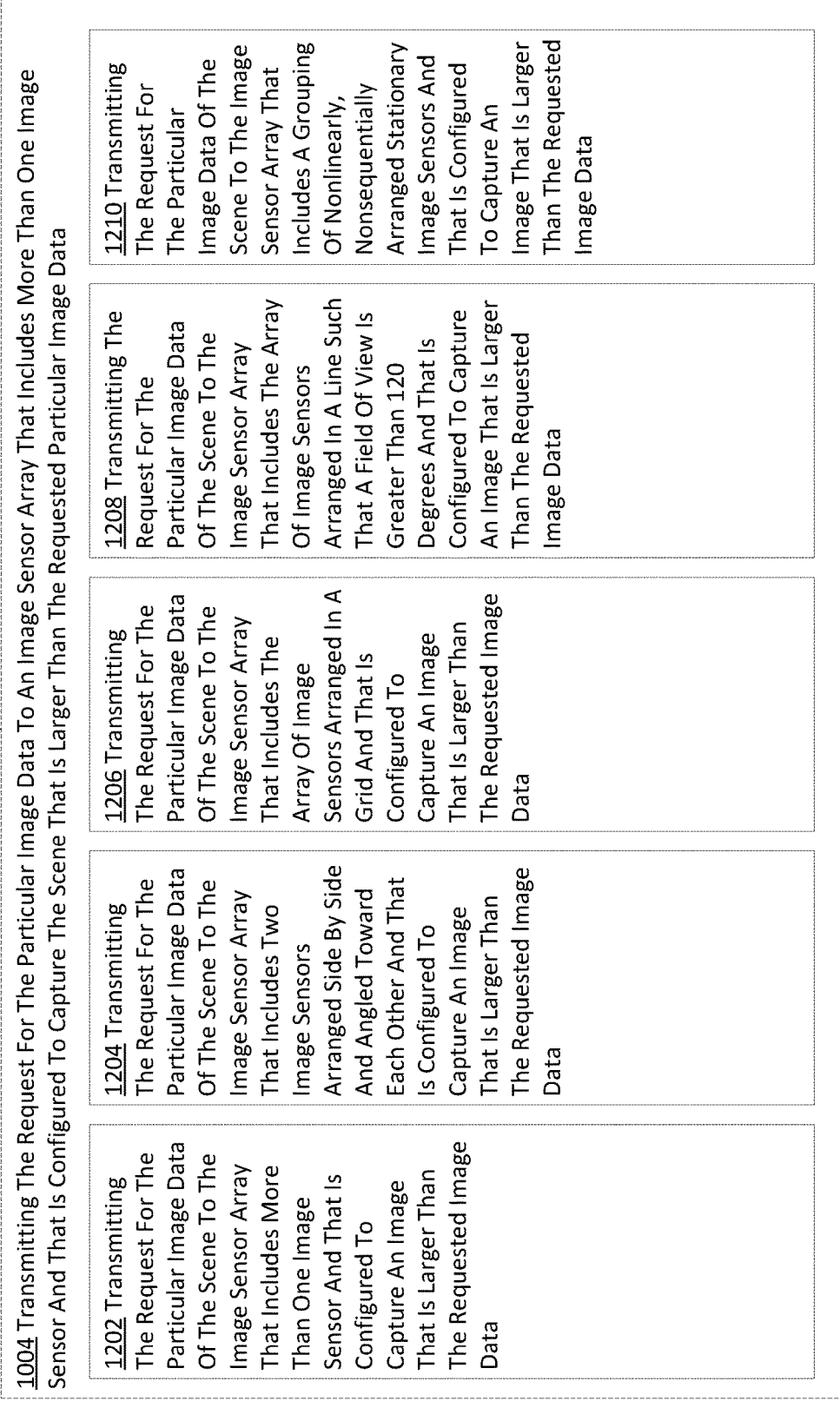

FIG. 12A is a high-level logic flow chart of a process depicting alternate implementations of a transmitting the request for the particular image data to an image sensor array operation 1004, according to one or more embodiments.

Figure 12B:
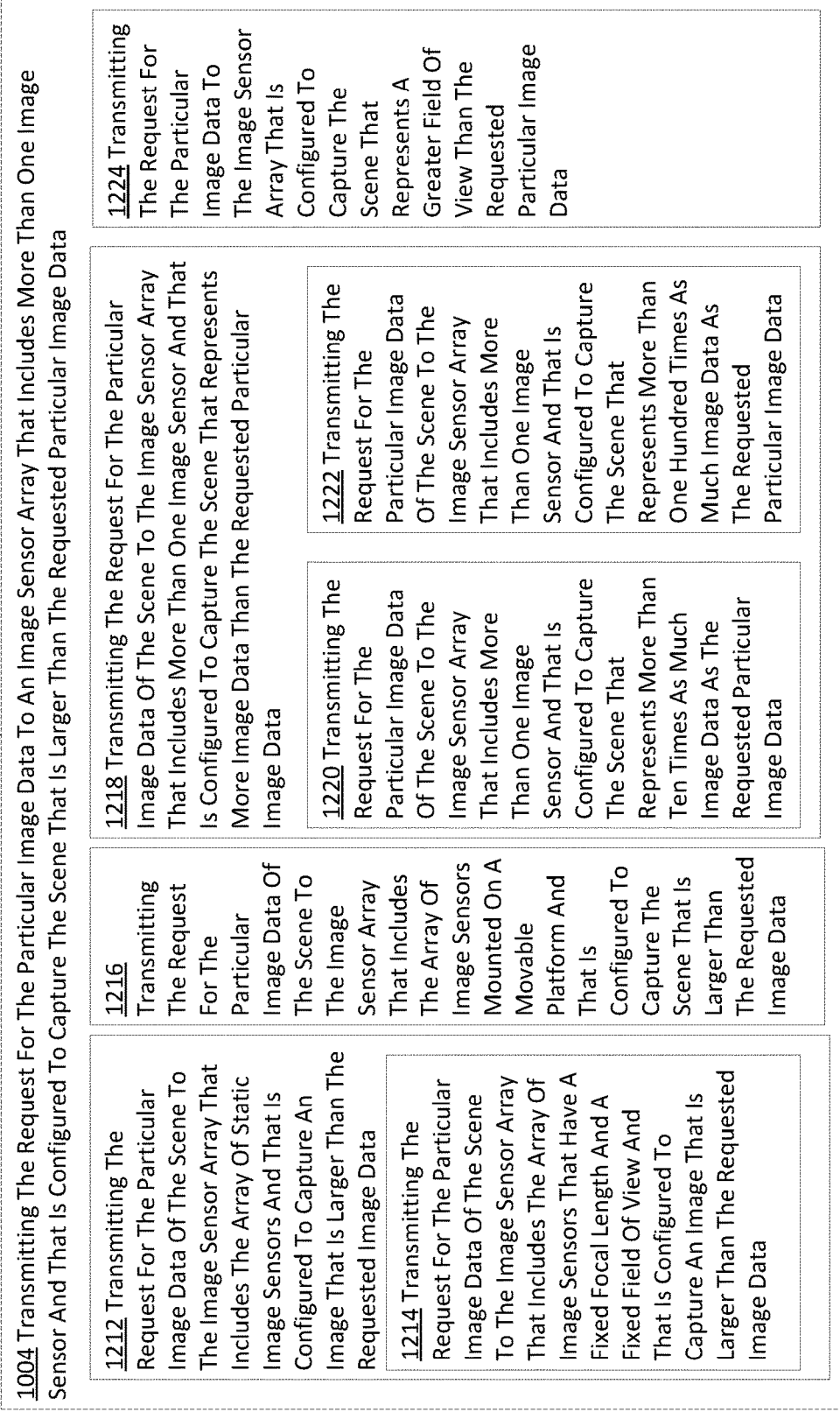

FIG. 12B is a high-level logic flow chart of a process depicting alternate implementations of a transmitting the request for the particular image data to an image sensor array operation 1004, according to one or more embodiments.

FIG. 12C is a high-level logic flow chart of a process depicting alternate implementations of a transmitting the request for the particular image data to an image sensor array operation 1004, according to one or more embodiments.

Figure 12D:
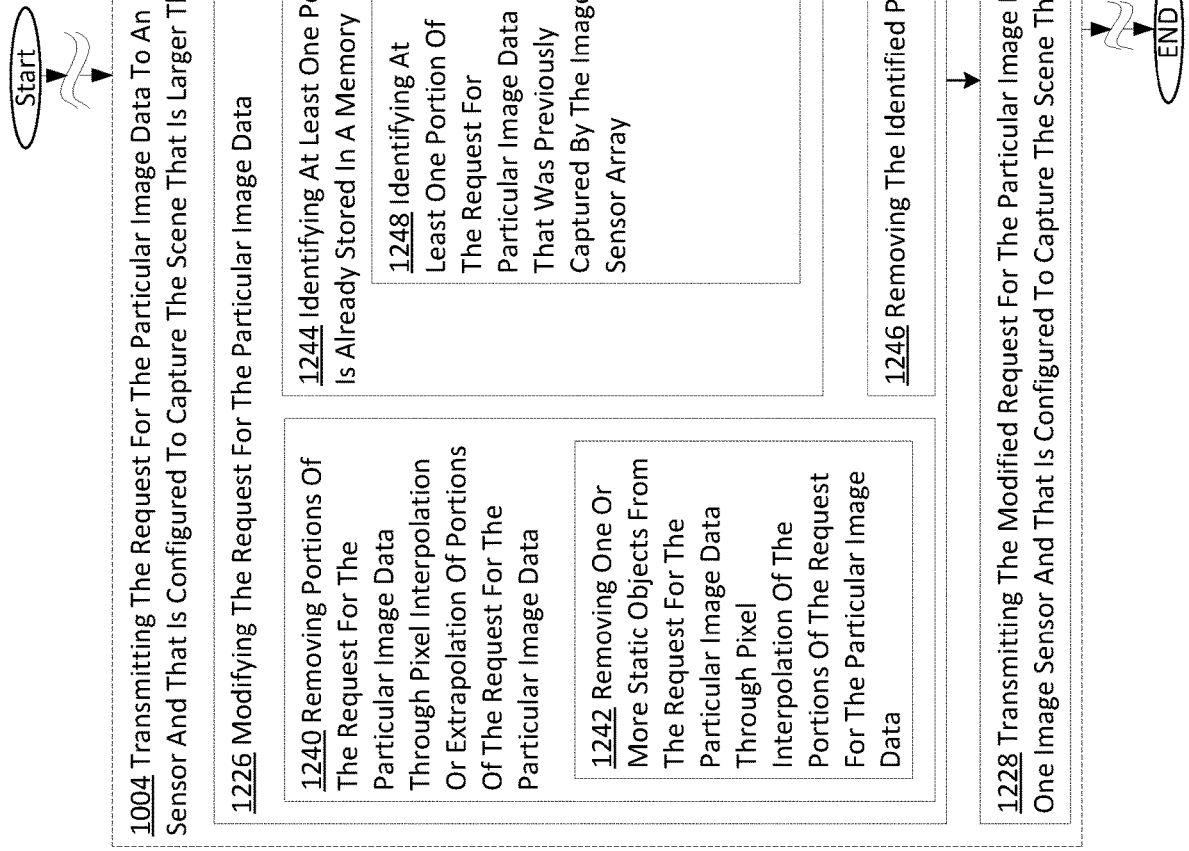

FIG. 12D is a high-level logic flow chart of a process depicting alternate implementations of a transmitting the request for the particular image data to an image sensor array operation 1004, according to one or more embodiments.

FIG. 12E is a high-level logic flow chart of a process depicting alternate implementations of a transmitting the request for the particular image data to an image sensor array operation 1004, according to one or more embodiments.

FIG. 13A is a high-level logic flow chart of a process depicting alternate implementations of a receiving only the particular image data from the image sensor array operation 1006, according to one or more embodiments.

Figure 13B:
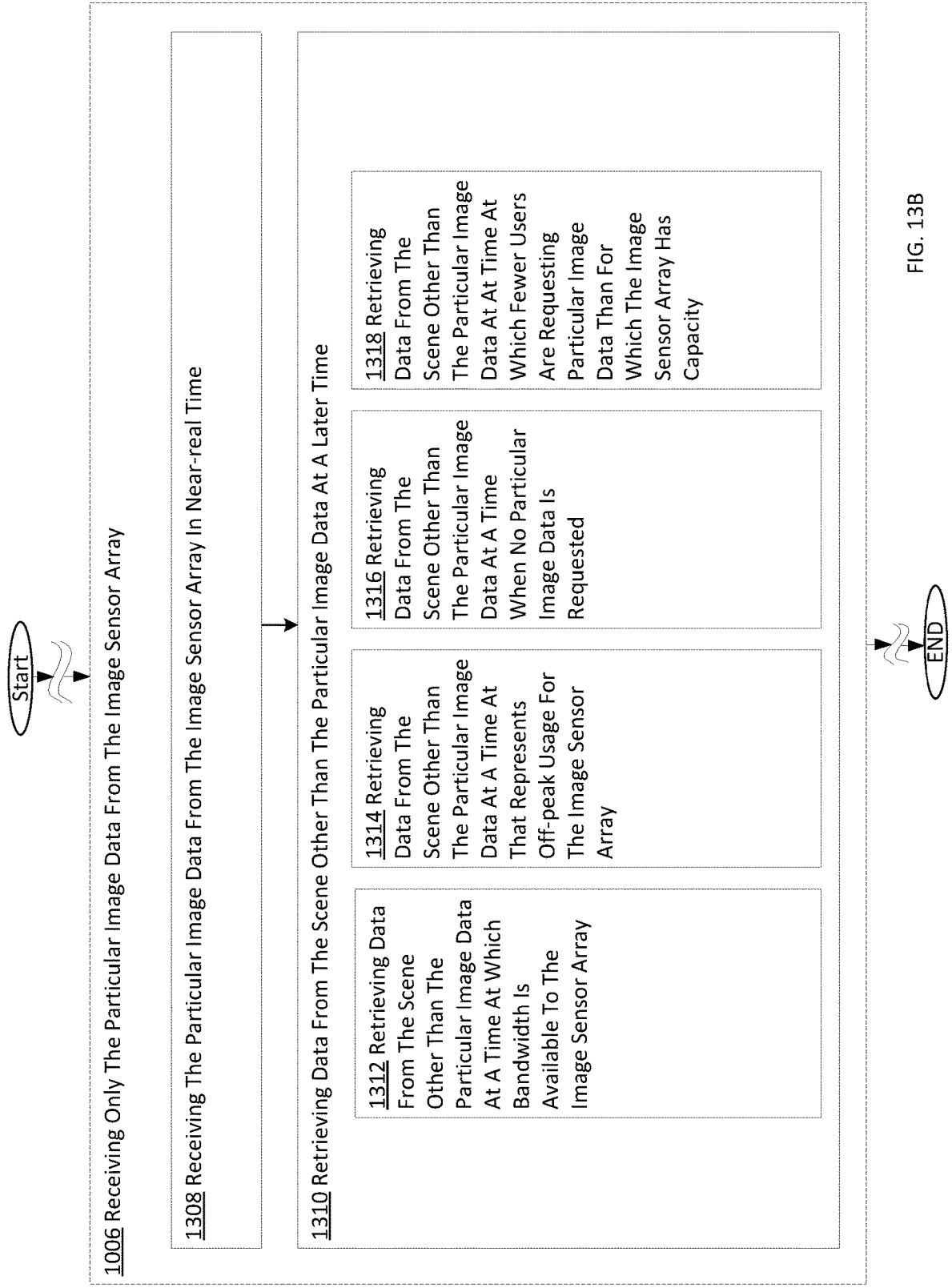

FIG. 13B is a high-level logic flow chart of a process depicting alternate implementations of a receiving only the particular image data from the image sensor array operation 1006, according to one or more embodiments.

FIG. 13C is a high-level logic flow chart of a process depicting alternate implementations of a receiving only the particular image data from the image sensor array operation 1006, according to one or more embodiments.

Figure 14A:
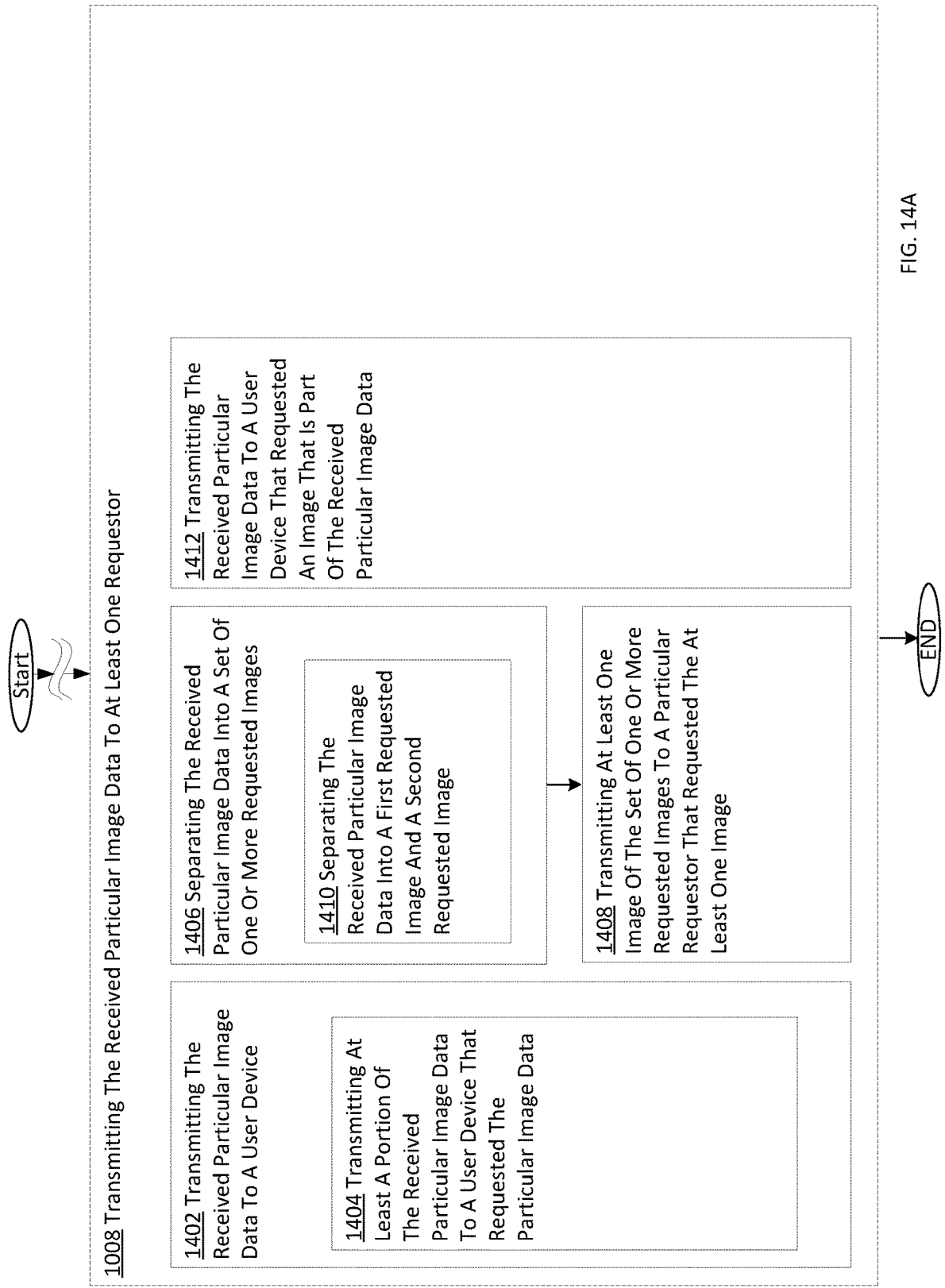

FIG. 14A is a high-level logic flow chart of a process depicting alternate implementations of a transmitting the received particular image data to at least one requestor operation 1008, according to one or more embodiments.

Figure 14B:
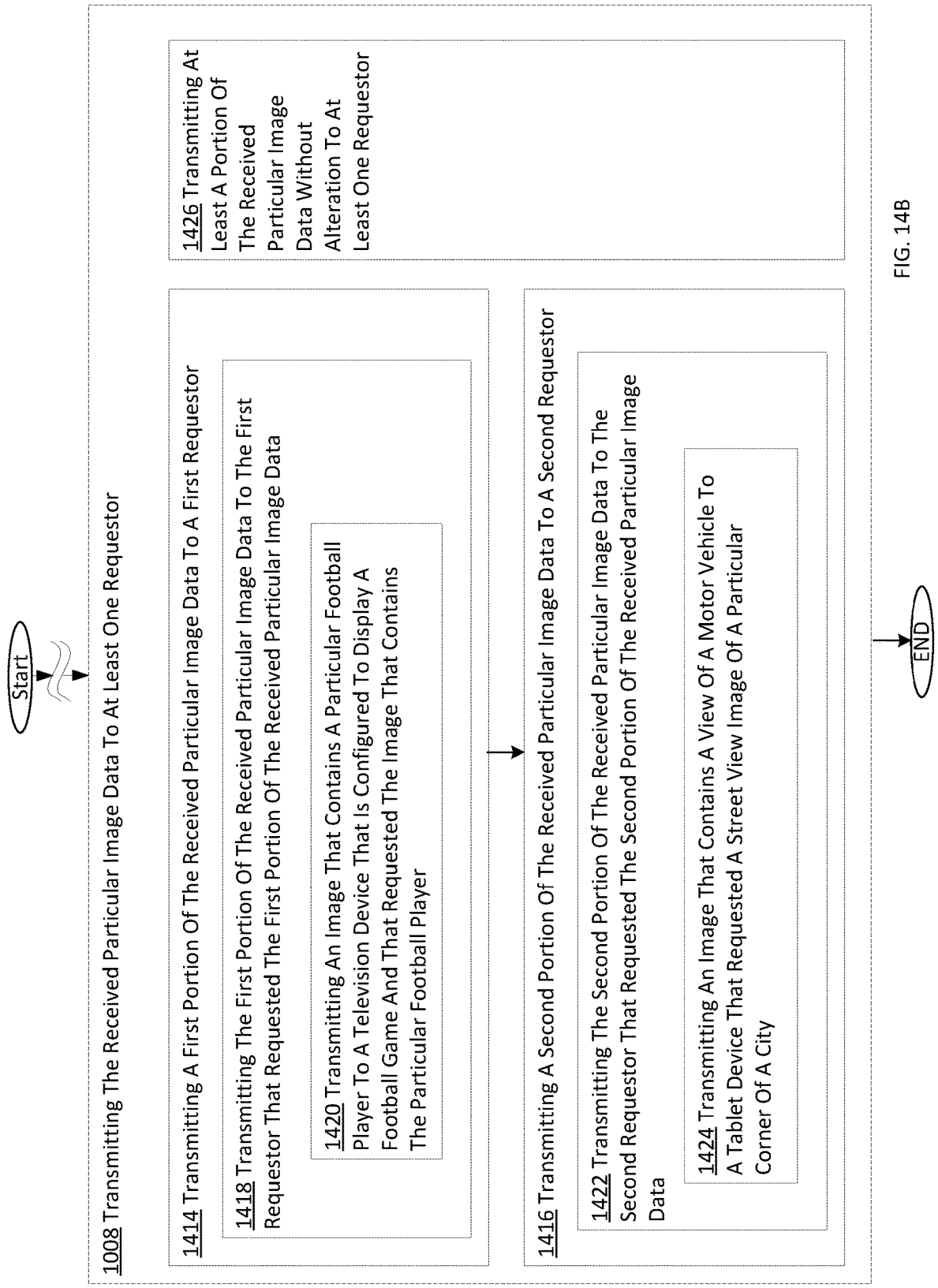

FIG. 14B is a high-level logic flow chart of a process depicting alternate implementations of a transmitting the received particular image data to at least one requestor operation 1008, according to one or more embodiments.

FIG. 14C is a high-level logic flow chart of a process depicting alternate implementations of a transmitting the received particular image data to at least one requestor operation 1008, according to one or more embodiments.

Figure 14D:
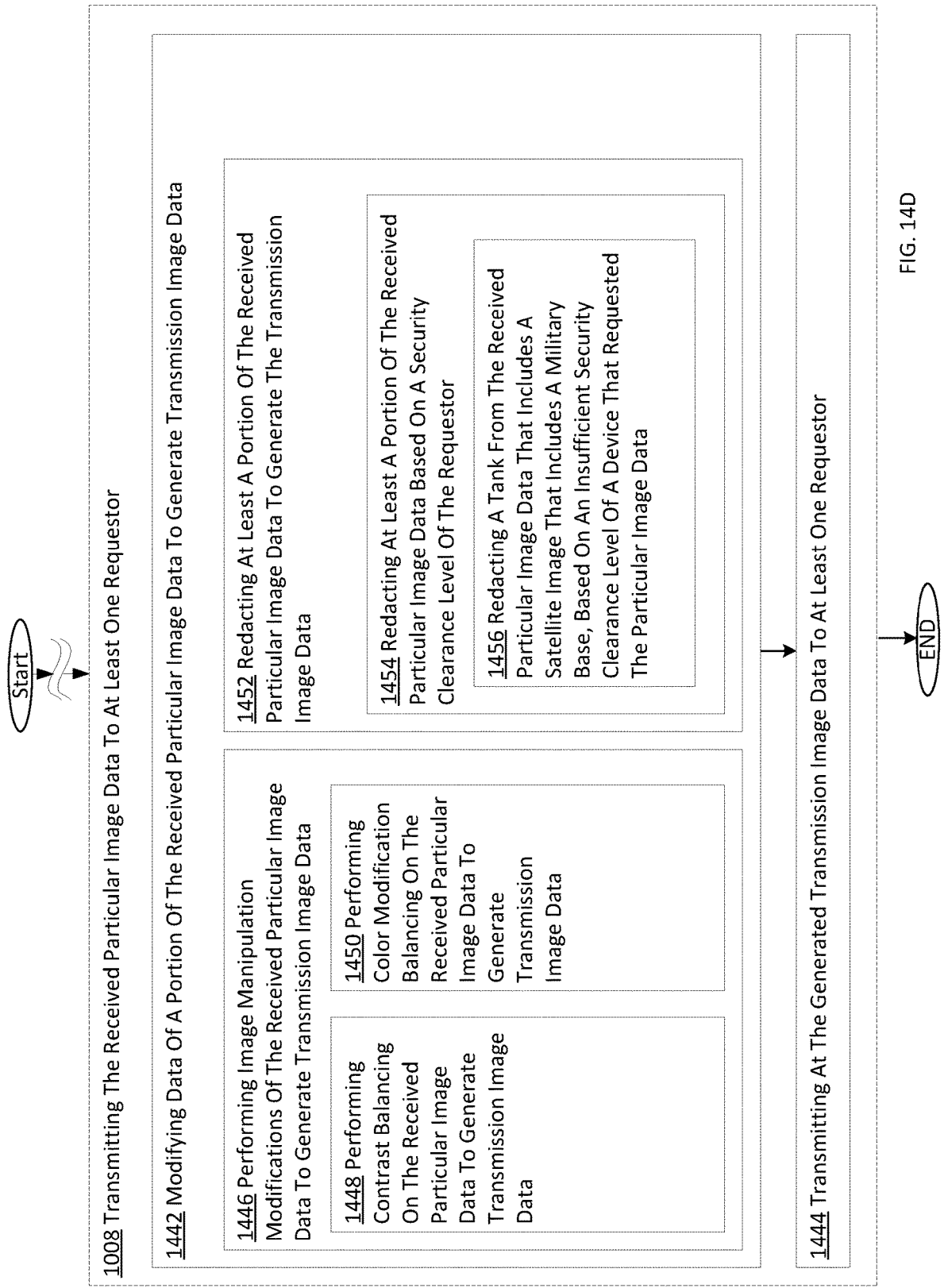

FIG. 14D is a high-level logic flow chart of a process depicting alternate implementations of a transmitting the received particular image data to at least one requestor operation 1008, according to one or more embodiments.

Figure 14E:
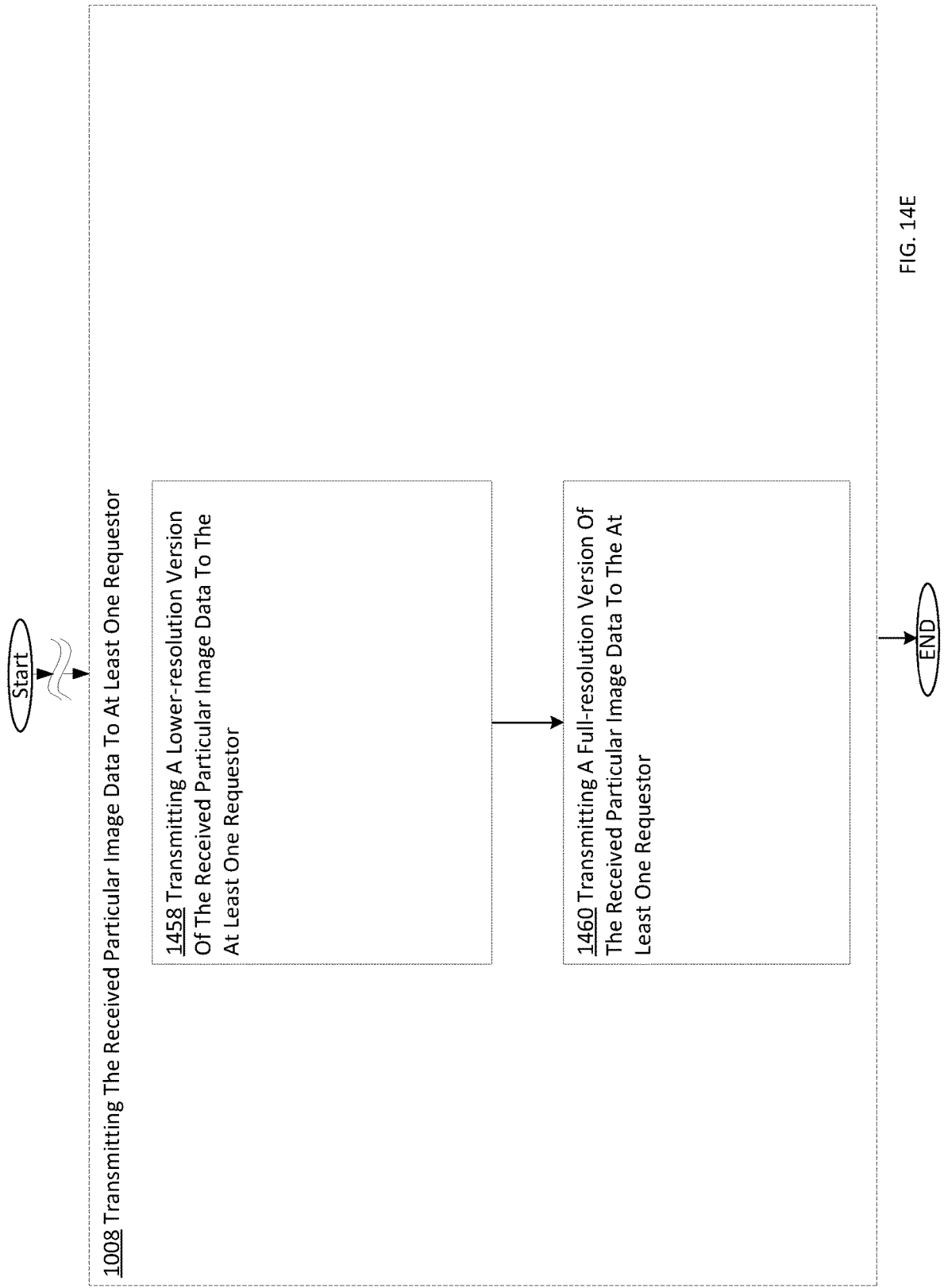

FIG. 14E is a high-level logic flow chart of a process depicting alternate implementations of a transmitting the received particular image data to at least one requestor operation 1008, according to one or more embodiments.

DETAILED DESCRIPTION

Overview

In the following detailed description, reference is made to the accompanying drawings, which form a part hereof. In the drawings, similar symbols typically identify similar or identical components or items, unless context dictates otherwise. The illustrative embodiments described in the detailed description, drawings, and claims are not meant to be limiting. Other embodiments may be utilized, and other changes may be made, without departing from the spirit or scope of the subject matter presented here.

Thus, in accordance with various embodiments, computationally implemented methods, systems, circuitry, articles of manufacture, ordered chains of matter, and computer program products are designed to, among other things, provide an interface for acquiring a request for particular image data that is part of a scene, transmitting the request for the particular image data to an image sensor array that includes more than one image sensor and that is configured to capture the scene that is larger than the requested particular image data, and receiving only the particular image data from the image sensor array.

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software (e.g., a high-level computer program serving as a hardware specification)).

The claims, description, and drawings of this application may describe one or more of the instant technologies in operational/functional language, for example as a set of operations to be performed by a computer. Such operational/functional description in most instances would be understood by one skilled the art as specifically-configured hardware (e.g., because a general purpose computer in effect becomes a special purpose computer once it is programmed to perform particular functions pursuant to instructions from program software).

Operational/Functional Language is a Concrete Specification for Physical Implementation Importantly, although the operational/functional descriptions described herein are understandable by the human mind, they are not abstract ideas of the operations/functions divorced from computational implementation of those operations/functions. Rather, the operations/functions represent a specification for the massively complex computational machines or other means. As discussed in detail below, the operational/functional language must be read in its proper technological context, i.e., as concrete specifications for physical implementations.

The logical operations/functions described herein are a distillation of machine specifications or other physical mechanisms specified by the operations/functions such that the otherwise inscrutable machine specifications may be comprehensible to the human mind. The distillation also allows one of skill in the art to adapt the operational/functional description of the technology across many different specific vendors' hardware configurations or platforms, without being limited to specific vendors' hardware configurations or platforms.

Some of the present technical description (e.g., detailed description, drawings, claims, etc.) may be set forth in terms of logical operations/functions. As described in more detail in the following paragraphs, these logical operations/functions are not representations of abstract ideas, but rather representative of static or sequenced specifications of various hardware elements. Differently stated, unless context dictates otherwise, the logical operations/functions will be understood by those of skill in the art to be representative of static or sequenced specifications of various hardware elements. This is true because tools available to one of skill in the art to implement technical disclosures set forth in operational/functional formats—tools in the form of a high-level programming language (e.g., C, java, visual basic), etc.), or tools in the form of Very high speed Hardware Description Language ("VHDL," which is a language that uses text to describe logic circuits)—are generators of static or sequenced specifications of various hardware configurations. This fact is sometimes obscured by the broad term "software," but, as shown by the following explanation, those skilled in the art understand that what is termed "software" is a shorthand for a massively complex interchaining/specification of ordered-matter elements. The term "ordered-matter elements" may refer to physical components of computation, such as assemblies of electronic logic gates, molecular computing logic constituents, quantum computing mechanisms, etc.

For example, a high-level programming language is a programming language with strong abstraction, e.g., multiple levels of abstraction, from the details of the sequential organizations, states, inputs, outputs, etc., of the machines that a high-level programming language actually specifies. In order to facilitate human comprehension, in many instances, high-level programming languages resemble or even share symbols with natural languages).

It has been argued that because high-level programming languages use strong abstraction (e.g., that they may resemble or share symbols with natural languages), they are therefore a "purely mental construct" (e.g., that "software"—a computer program or computer programming—is somehow an ineffable mental construct, because at a high level of abstraction, it can be conceived and understood in the human mind). This argument has been used to characterize technical description in the form of functions/operations as somehow "abstract ideas." In fact, in technological arts (e.g., the information and communication technologies) this is not true.

The fact that high-level programming languages use strong abstraction to facilitate human understanding should not be taken as an indication that what is expressed is an abstract idea. In fact, those skilled in the art understand that just the opposite is true. If a high-level programming language is the tool used to implement a technical disclosure in the form of functions/operations, those skilled in the art will recognize that, far from being abstract, imprecise, "fuzzy," or "mental" in any significant semantic sense, such a tool is instead a near incomprehensibly precise sequential specification of specific computational machines—the parts of which are built up by activating/selecting such parts from typically more general computational machines over time (e.g., clocked time). This fact is sometimes obscured by the superficial similarities between high-level programming languages and natural languages. These superficial similarities also may cause a glossing over of the fact that high-level programming language implementations ultimately perform valuable work by creating/controlling many different computational machines.

The many different computational machines that a high-level programming language specifies are almost unimaginably complex. At base, the hardware used in the computational machines typically consists of some type of ordered matter (e.g., traditional electronic devices (e.g., transistors), deoxyribonucleic acid (DNA), quantum devices, mechanical switches, optics, fluidics, pneumatics, optical devices (e.g., optical interference devices), molecules, etc.) that are arranged to form logic gates. Logic gates are typically physical devices that may be electrically, mechanically, chemically, or otherwise driven to change physical state in order to create a physical reality of Boolean logic.

Logic gates may be arranged to form logic circuits, which are typically physical devices that may be electrically, mechanically, chemically, or otherwise driven to create a physical reality of certain logical functions. Types of logic circuits include such devices as multiplexers, registers, arithmetic logic units (ALUs), computer memory, etc., each type of which may be combined to form yet other types of physical devices, such as a central processing unit (CPU)—the best known of which is the microprocessor. A modern microprocessor will often contain more than one hundred million logic gates in its many logic circuits (and often more than a billion transistors).

The logic circuits forming the microprocessor are arranged to provide a microarchitecture that will carry out the instructions defined by that microprocessor's defined Instruction Set Architecture. The Instruction Set Architecture is the part of the microprocessor architecture related to programming, including the native data types, instructions, registers, addressing modes, memory architecture, interrupt and exception handling, and external Input/Output.

The Instruction Set Architecture includes a specification of the machine language that can be used by programmers to use/control the microprocessor. Since the machine language instructions are such that they may be executed directly by the microprocessor, typically they consist of strings of binary digits, or bits. For example, a typical machine language instruction might be many bits long (e.g., 32, 64, or 128 bit strings are currently common). A typical machine language instruction might take the form "11110000101011110000111100111111" (a 32 bit instruction).

It is significant here that, although the machine language instructions are written as sequences of binary digits, in actuality those binary digits specify physical reality. For example, if certain semiconductors are used to make the operations of Boolean logic a physical reality, the apparently mathematical bits "1" and "0" in a machine language instruction actually constitute shorthand that specifies the application of specific voltages to specific wires. For example, in some semiconductor technologies, the binary number "1" (e.g., logical "1") in a machine language instruction specifies around +5 volts applied to a specific "wire" (e.g., metallic traces on a printed circuit board) and the binary number "0" (e.g., logical "0") in a machine language instruction specifies around −5 volts applied to a specific "wire." In addition to specifying voltages of the machines' configuration, such machine language instructions also select out and activate specific groupings of logic gates from the millions of logic gates of the more general machine. Thus, far from abstract mathematical expressions, machine language instruction programs, even though written as a string of zeros and ones, specify many, many constructed physical machines or physical machine states.

Machine language is typically incomprehensible by most humans (e.g., the above example was just ONE instruction, and some personal computers execute more than two billion instructions every second). Thus, programs written in machine language—which may be tens of millions of machine language instructions long—are incomprehensible. In view of this, early assembly languages were developed that used mnemonic codes to refer to machine language instructions, rather than using the machine language instructions' numeric values directly (e.g., for performing a multiplication operation, programmers coded the abbreviation "mult," which represents the binary number "011000" in MIPS machine code). While assembly languages were initially a great aid to humans controlling the microprocessors to perform work, in time the complexity of the work that needed to be done by the humans outstripped the ability of humans to control the microprocessors using merely assembly languages.

At this point, it was noted that the same tasks needed to be done over and over, and the machine language necessary to do those repetitive tasks was the same. In view of this, compilers were created. A compiler is a device that takes a statement that is more comprehensible to a human than either machine or assembly language, such as "add 2+2 and output the result," and translates that human understandable statement into a complicated, tedious, and immense machine language code (e.g., millions of 32, 64, or 128 bit length strings). Compilers thus translate high-level programming language into machine language.

This compiled machine language, as described above, is then used as the technical specification which sequentially constructs and causes the interoperation of many different computational machines such that humanly useful, tangible, and concrete work is done. For example, as indicated above, such machine language—the compiled version of the higher-level language—functions as a technical specification which selects out hardware logic gates, specifies voltage levels, voltage transition timings, etc., such that the humanly useful work is accomplished by the hardware.

Thus, a functional/operational technical description, when viewed by one of skill in the art, is far from an abstract idea. Rather, such a functional/operational technical description, when understood through the tools available in the art such as those just described, is instead understood to be a humanly understandable representation of a hardware specification, the complexity and specificity of which far exceeds the comprehension of most any one human. With this in mind, those skilled in the art will understand that any such operational/functional technical descriptions—in view of the disclosures herein and the knowledge of those skilled in the art—may be understood as operations made into physical reality by (a) one or more interchained physical machines, (b) interchained logic gates configured to create one or more physical machine(s) representative of sequential/combinatorial logic(s), (c) interchained ordered matter making up logic gates (e.g., interchained electronic devices (e.g., transistors), DNA, quantum devices, mechanical switches, optics, fluidics, pneumatics, molecules, etc.) that create physical reality representative of logic(s), or (d) virtually any combination of the foregoing. Indeed, any physical object which has a stable, measurable, and changeable state may be used to construct a machine based on the above technical description. Charles Babbage, for example, constructed the first computer out of wood and powered by cranking a handle.

Thus, far from being understood as an abstract idea, those skilled in the art will recognize a functional/operational technical description as a humanly-understandable representation of one or more almost unimaginably complex and time sequenced hardware instantiations. The fact that functional/operational technical descriptions might lend themselves readily to high-level computing languages (or high-level block diagrams for that matter) that share some words, structures, phrases, etc. with natural language simply cannot be taken as an indication that such functional/operational technical descriptions are abstract ideas, or mere expressions of abstract ideas. In fact, as outlined herein, in the technological arts this is simply not true. When viewed through the tools available to those of skill in the art, such functional/operational technical descriptions are seen as specifying hardware configurations of almost unimaginable complexity.

As outlined above, the reason for the use of functional/operational technical descriptions is at least twofold. First, the use of functional/operational technical descriptions allows near-infinitely complex machines and machine operations arising from interchained hardware elements to be described in a manner that the human mind can process (e.g., by mimicking natural language and logical narrative flow). Second, the use of functional/operational technical descriptions assists the person of skill in the art in understanding the described subject matter by providing a description that is more or less independent of any specific vendor's piece(s) of hardware.

The use of functional/operational technical descriptions assists the person of skill in the art in understanding the described subject matter since, as is evident from the above discussion, one could easily, although not quickly, transcribe the technical descriptions set forth in this document as trillions of ones and zeroes, billions of single lines of assembly-level machine code, millions of logic gates, thousands of gate arrays, or any number of intermediate levels of abstractions. However, if any such low-level technical descriptions were to replace the present technical description, a person of skill in the art could encounter undue difficulty in implementing the disclosure, because such a low-level technical description would likely add complexity without a corresponding benefit (e.g., by describing the subject matter utilizing the conventions of one or more vendor-specific pieces of hardware). Thus, the use of functional/operational technical descriptions assists those of skill in the art by separating the technical descriptions from the conventions of any vendor-specific piece of hardware.

In view of the foregoing, the logical operations/functions set forth in the present technical description are representative of static or sequenced specifications of various ordered-matter elements, in order that such specifications may be comprehensible to the human mind and adaptable to create many various hardware configurations. The logical operations/functions disclosed herein should be treated as such, and should not be disparagingly characterized as abstract ideas merely because the specifications they represent are presented in a manner that one of skill in the art can readily understand and apply in a manner independent of a specific vendor's hardware implementation.

Those having skill in the art will recognize that the state of the art has progressed to the point where there is little distinction left between hardware, software (e.g., a high-level computer program serving as a hardware specification), and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software (e.g., a high-level computer program serving as a hardware specification), and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software (e.g., a high-level computer program serving as a hardware specification) implementation; or, yet again alternatively, the implementer may opt for some combination of hardware, software (e.g., a high-level computer program serving as a hardware specification), and/or firmware in one or more machines, compositions of matter, and articles of manufacture, limited to patentable subject matter under 35 USC 101. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software (e.g., a high-level computer program serving as a hardware specification), and or firmware.

In some implementations described herein, logic and similar implementations may include computer programs or other control structures. Electronic circuitry, for example, may have one or more paths of electrical current constructed and arranged to implement various functions as described herein. In some implementations, one or more media may be configured to bear a device-detectable implementation when such media holds or transmits device detectable instructions operable to perform as described herein. In some variants, for example, implementations may include an update or modification of existing software (e.g., a high-level computer program serving as a hardware specification) or firmware, or of gate arrays or programmable hardware, such as by performing a reception of or a transmission of one or more instructions in relation to one or more operations described herein. Alternatively or additionally, in some variants, an implementation may include special-purpose hardware, software (e.g., a high-level computer program serving as a hardware specification), firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operation described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled//implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory. Further, implementation of at least part of a system for performing a method in one territory does not preclude use of the system in another territory In a general sense, those skilled in the art will recognize that the various embodiments described herein can be implemented, individually and/or collectively, by various types of electro-mechanical systems having a wide range of electrical components such as hardware, software, firmware, and/or virtually any combination thereof, limited to patentable subject matter under 35 U.S.C. 101; and a wide range of components that may impart mechanical force or motion such as rigid bodies, spring or torsional bodies, hydraulics, electro-magnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs (e.g., graphene based circuitry). Those skilled in the art will also appreciate that examples of electro-mechanical systems include, but are not limited to, a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that at least a portion of the devices and/or processes described herein can be integrated into a mote system. Those having skill in the art will recognize that a typical mote system generally includes one or more memories such as volatile or non-volatile memories, processors such as microprocessors or digital signal processors, computational entities such as operating systems, user interfaces, drivers, sensors, actuators, applications programs, one or more interaction devices (e.g., an antenna USB ports, acoustic ports, etc.), control systems including feedback loops and control motors (e.g., feedback for sensing or estimating position and/or velocity; control motors for moving and/or adjusting components and/or quantities). A mote system may be implemented utilizing suitable components, such as those found in mote computing/communication systems. Specific examples of such components entail such as Intel Corporation's and/or Crossbow Corporation's mote components and supporting hardware, software, and/or firmware.

For the purposes of this application, "cloud" computing may be understood as described in the cloud computing literature. For example, cloud computing may be methods and/or systems for the delivery of computational capacity and/or storage capacity as a service. The "cloud" may refer to one or more hardware and/or software components that deliver or assist in the delivery of computational and/or storage capacity, including, but not limited to, one or more of a client, an application, a platform, an infrastructure, and/or a server. The cloud may refer to any of the hardware and/or software associated with a client, an application, a platform, an infrastructure, and/or a server. For example, cloud and cloud computing may refer to one or more of a computer, a processor, a storage medium, a router, a switch, a modem, a virtual machine (e.g., a virtual server), a data center, an operating system, a middleware, a firmware, a hardware back-end, a software back-end, and/or a software application. A cloud may refer to a private cloud, a public cloud, a hybrid cloud, and/or a community cloud. A cloud may be a shared pool of configurable computing resources, which may be public, private, semi-private, distributable, scaleable, flexible, temporary, virtual, and/or physical. A cloud or cloud service may be delivered over one or more types of network, e.g., a mobile communication network, and the Internet.

As used in this application, a cloud or a cloud service may include one or more of infrastructure-as-a-service ("IaaS"), platform-as-a-service ("PaaS"), software-as-a-service ("SaaS"), and/or desktop-as-a-service ("DaaS"). As a non-exclusive example, IaaS may include, e.g., one or more virtual server instantiations that may start, stop, access, and/or configure virtual servers and/or storage centers (e.g., providing one or more processors, storage space, and/or network resources on-demand, e.g., EMC and Rackspace). PaaS may include, e.g., one or more software and/or development tools hosted on an infrastructure (e.g., a computing platform and/or a solution stack from which the client can create software interfaces and applications, e.g., Microsoft Azure). SaaS may include, e.g., software hosted by a service provider and accessible over a network (e.g., the software for the application and/or the data associated with that software application may be kept on the network, e.g., Google Apps, SalesForce). DaaS may include, e.g., providing desktop, applications, data, and/or services for the user over a network (e.g., providing a multi-application framework, the applications in the framework, the data associated with the applications, and/or services related to the applications and/or the data over the network, e.g., Citrix). The foregoing is intended to be exemplary of the types of systems and/or methods referred to in this application as "cloud" or "cloud computing" and should not be considered complete or exhaustive.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include, but are not limited to, physically mateable and/or physically interacting components, and/or wirelessly interactable, and/or wirelessly interacting components, and/or logically interacting, and/or logically interactable components.

To the extent that formal outline headings are present in this application, it is to be understood that the outline headings are for presentation purposes, and that different types of subject matter may be discussed throughout the application (e.g., device(s)/structure(s) may be described under process(es)/operations heading(s) and/or process(es)/operations may be discussed under structure(s)/process(es) headings; and/or descriptions of single topics may span two or more topic headings). Hence, any use of formal outline headings in this application is for presentation purposes, and is not intended to be in any way limiting.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

Although one or more users maybe shown and/or described herein, e.g., in FIG. 1, and other places, as a single illustrated figure, those skilled in the art will appreciate that one or more users may be representative of one or more human users, robotic users (e.g., computational entity), and/or substantially any combination thereof (e.g., a user may be assisted by one or more robotic agents) unless context dictates otherwise. Those skilled in the art will appreciate that, in general, the same may be said of "sender" and/or other entity-oriented terms as such terms are used herein unless context dictates otherwise.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") generally encompass active-state components and/or inactive-state components and/or standby-state components, unless context requires otherwise.

High-Level System Architecture

FIG. 1, including FIGS. 1-A-1-AN, shows partial views that, when assembled, form a complete view of an entire system, of which at least a portion will be described in more detail. An overview of the entire system of FIG. 1 is now described herein, with a more specific reference to at least one subsystem of FIG. 1 to be described later with respect to FIGS. 2-14D.

FIG. 1 shows various implementations of the overall system. At a high level, FIG. 1 shows various implementations of a multiple user video imaging array (hereinafter interchangeably referred to as a "MUVIA"). It is noted that the designation "MUVIA" is merely shorthand and descriptive of an exemplary embodiment, and not a limiting term. Although "multiple user" appears in the name MUVIA, multiple users or even a single user are not required. Further, "video" is used in the designation "MUVIA," but MUVIA systems also may capture still images, multiple images, audio data, electromagnetic waves outside the visible spectrum, and other data as will be described herein. Further, "imaging array" may be used in the MUVIA designation, but the image sensor in MUVIA is not necessarily an array or even multiple sensors (although commonly implemented as larger groups of image sensors, single-sensor implementations are also contemplated), and "array" here does not necessarily imply any specific structure, but rather any grouping of one or more sensors.

Generally, although not necessarily required, a MUVIA system may include one or more of a user device (e.g., hereinafter interchangeably referred to as a "client device," in recognition that a user may not necessarily be a human, living, or organic"), a server, and an image sensor array. A "server" in the context of this application may refer to any device, program, or module that is not directly connected to the image sensor array or to the client device, including any and all "cloud" storage, applications, and/or processing.

For example, in an embodiment, e.g., as shown in FIG. 1-A, FIG. 1-K, FIG. 1-U, FIG. 1-AE, and FIG. 1-AF, in an embodiment, the system may include one or more of image sensor array 3200, array local processing module 3300, server 4000, and user device 5200. Each of these portions will be discussed in more detail herein.

Referring now to FIG. 1-A, FIG. 1-A depicts user device 5200, which is a device that may be operated or controlled by a user of a MUVIA system. It is noted here that "user" is merely provided as a designation for ease of understanding, and does not imply control by a human or other organism, sentient or otherwise. In an embodiment, for example, in a security-type embodiment, the user device 5200 may be mostly or completely unmonitored, or may be monitored by an artificial intelligence, or by a combination of artificial intelligence, pseudo-artificial intelligence (e.g., that is intelligence amplification) and human intelligence.

User device 5200 may be, but is not limited to, a wearable device (e.g., glasses, goggles, headgear, a watch, clothing), an implant (e.g., a retinal-implant display), a computer of any kind (e.g., a laptop computer, desktop computer, mainframe, server, etc.), a tablet or other portable device, a phone or other similar device (e.g., smartphone, personal digital assistant), a personal electronic device (e.g., music player, CD player), a home appliance (e.g., a television, a refrigerator, or any other so-called "smart" device), a piece of office equipment (e.g., a copier, scanner, fax device, etc.), a camera or other camera-like device, a video game system, an entertainment/media center, or any other electrical equipment that has a functionality of presenting an image (whether visual or by other means, e.g., a screen, but also other sensory stimulating work).

User device 5200 may be capable of presenting an image, which, for purposes of clarity and conciseness will be referred to as displaying an image, although communication through forms other than generating light waves through the visible light spectrum, although the image is not required to be presented at all times or even at all. For example, in an embodiment, user device 5200 may receive images from server 4000 (or directly from the image sensor array 3200, as will be discussed herein), and may store the images for later viewing, or for processing internally, or for any other reason.

Referring again to FIG. 1-A, in an embodiment, user device 5200 may include a user selection accepting module 5210. User selection accepting module 5210 may be configured to receive user input about what the user wants to see. For example, as shown in FIG. 1-A in the exemplary interface 5212, the user selection accepting module 5210 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the user selection accepting module 5210 may accept a selection of a particular thing—e.g., a building, an animal, or any other object whose representation is present on the screen. Moreover, a user may use a text box to "search" the image for a particular thing, and processing, done at the user device 5200 or at the server 4000, may determine the image and the zoom level for viewing that thing. The search for a particular thing may include a generic search, e.g., "search for people," or "search for penguins," or a more specific search, e.g., "search for the Space Needle," or "search for the White House." The search for a particular thing may take on any known contextual search, e.g., an address, a text string, or any other input.

In an embodiment, the "user selection" facilitated by the user selection accepting module 5210 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-A, in an embodiment, user device 5200 may include a user selection transmitting module 5220. The user selection transmitting module 5220 may take the user selection from user selection transmitting module 5220, and transmit the selection to the server 4000. The transmission may include some pre-processing, for example, the user device 5200 may determine the size and parameters of the image prior to sending the request to the server 4000, or that processing may be handled by the server 4000. Following the thick-line arrow leftward from user selection transmitting module 5220 through to FIG. 1-K, the transmission goes to server 4000, as will be discussed herein. It is noted that the transmission to the server 4000 may also include data about the user device 5200, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-A, FIG. 1-A also includes a selected image receiving module 5230 and a user selection presenting module 5240, which will be discussed in more detail herein, with respect to the dataflow of this embodiment.

Referring now to FIG. 1-K, FIGS. 1-K and 1-U show an embodiment of a server 4000 that communicates with one or both of user device 5200 and array local processing module 3300. Sever 4000 may be a single computing device, or may be many computing devices, which may or may not be in proximity with each other.

Referring again to FIG. 1-K, server 4000 may include a user request reception module 4010. The user request reception module 4010 may receive the transmitted request from user selection transmitting module 5220. The user request reception module 4010 may then turn over processing to user request validation module 4020, which may perform, among other things, a check to make sure the user is not requesting more resolution than what their device can handle. For example, if the server has learned (e.g., through gathered information, or through information that was transmitted with the user request or in a same session as the user request), that the user is requesting a 1900×1080 resolution image, and the maximum resolution for the device is 1334×750, then the request will be modified so that no more than the maximum resolution that can be handled by the device is requested. In an embodiment, this may conserve the bandwidth required to transmit from the MUVIA to the server 4000 and/or the user device 5200.

Referring again to FIG. 1-K, in an embodiment, server 4000 may include a user request latency management module 4030. User request latency management module 4030 may, in conjunction with user device 5200, attempt to reduce the latency from the time a specific image is requested by user device 5200 to the time the request is acted upon and data is transmitted to the user. The details for this latency management will be described in more detail herein, with varying techniques that may be carried out by any or all of the devices in the chain (e.g., user device, camera array, and server). As an example, in an embodiment, a lower resolution version of the image, e.g., that is stored locally or on the server, may be sent to the user immediately upon the request, and then that image is updated with the actual image taken by the camera. In an embodiment, user request latency management module 4030 also may handle static gapfilling, that is, if the image captured by the camera is unchanging, e.g., has not changed for a particular period of time, then a new image is not necessary to be captured, and an older image, that may be stored on server 4000, may be transmitted to the user device 5200. This process also will be discussed in more detail herein.

Referring now to FIG. 1-U, which shows more of server 4000, in an embodiment, server 4000 may include a consolidated user request transmission module 4040, which may be configured to consolidate all the user requests, perform any necessary pre-processing on those requests, and send the request for particular sets of pixels to the array local processing module 3300. The process for consolidating the user requests and performing pre-processing will be described in more detail herein with respect to some of the other exemplary embodiments. In this embodiment, however, server consolidated user request transmission module 4040 transmits the request (exiting leftward from FIG. 1-U and traveling downward to FIG. 1-AE, through a pathway identified in FIG. 1-AE as lower-bandwidth communication from remote server to ISA 3515. It is noted here that "lower bandwidth communication" does not necessarily mean "low bandwidth" or imply any specific number about the bandwidth—it is simply lower than the relatively higher bandwidth communication from the actual image sensor array 3505 to the array local processing module 3300, which will be discussed in more detail herein.

Referring again to FIG. 1-U, server 4000 also may include requested pixel reception module 4050, user request preparation module 4060, and user request transmission module 4070 (shown in FIG. 1-k), which will be discussed in more detail herein, with respect to the dataflow of this embodiment Referring now to FIGS. 1-AE and 1-AF, FIGS. 1-AE and 1-AF show an image sensor array ("ISA") 3200 and an array local processing module 3300, each of which will now be described in more detail.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3300. In an embodiment, array local processing module 3300 is integrated into the image sensor array 3200. In another embodiment, the array local processing module 3300 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3300 to the remote server, which may be, but is not required to be, located further away temporally.

It is noted that, because of the large number of pixels captured by image sensor array 3200, mechanical changes to the image sensor array 3200 are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3300 may capture an image that is received by image capturing module 3305. Image capturing module 3305 may take the captured image and compare it to a consolidated user request, e.g., which is provided by a consolidated user request reception module 3310. Consolidated user request reception module 3310 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3300 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3300 may send only the requested pixels, but the requested pixels cover more area than what the user originally requested. These additional pixels may be transmitted and "cached" by the server or local device, which may be used to decrease latency times, in a process that will be discussed more herein.

Referring back to FIG. 1-U, the transmitted pixels transmitted from selected pixel transmission module 3340 of array local processing module 3300 may be received by server 4000, e.g., at requested pixel reception module 4050. Requested pixel reception module 4050 may receive the requested pixels and turn them over to user request preparation module 4060, which may "unpack" the requested pixels, e.g., determining which pixels go to which user, and at what resolutions, along with any post-processing, including image adjustment, adding in missing cached data, or adding additional data to the images (e.g., advertisements or other data). In an embodiment, server 4000 also may include a user request transmission module 4070, which may be configured to transmit the requested pixels back to the user device 5200.

Referring again to FIG. 1-A, user device 5200 may include a selected image receiving module 5230, which may receive the pixels that were sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-A.

FIGS. 1-B, 1-C, 1-M, 1-W, 1-AG, and 1-AH show another embodiment of the MUVIA system, in which multiple user devices 5510, 5520, and 5530 may request images captured by the same image sensor array 3200.

Referring now to FIGS. 1-B and 1-C, user device 5510, user device 5520, and user device 5530 are shown. In an embodiment, user devices 5510, 5520, and 5530 may have some or all of the same components as user device 5200, but are not shown here for clarity and ease of understanding the drawing. For each of user devices 5510, 5520, and 5530, exemplary screen resolutions have been chosen. There is nothing specific about these numbers that have been chosen, however, they are merely illustrated for exemplary purposes, and any other numbers could have been chosen in their place.

For example, in an embodiment, referring to FIG. 1-B, user device 5510 may have a screen resolution of 1920× 1080 (e.g., colloquially referred to as "HD quality"). User device 5510 may send an image request to the server 4000, and may also send data regarding the screen resolution of the device.

Referring now to FIG. 1-C, user device 5520 may have a screen resolution of 1334×750. User device 5520 may send another image request to the server 4000, and, in an embodiment, instead of sending data regarding the screen resolution of the device, may send data that identifies what kind of device it is (e.g., an Apple-branded smartphone). Server 4000 may use this data to determine the screen resolution for user device 5520 through an internal database, or through contacting an external source, e.g., a manufacturer of the device or a third party supplier of data about devices.

Referring again to FIG. 1-C, user device 5530 may have a screen resolution of 640×480, and may send the request by itself to the server 4000, without any additional data. In addition, server 4000 may receive independent requests from various users to change their current viewing area on the device.

Referring now to FIG. 1-M, server 4000 may include user request reception module 4110. User request reception module 4110 may receive requests from multiple user devices, e.g., user devices 5510, 5520, and 5530. Server 4000 also may include an independent user view change request reception module 4115, which, in an embodiment, may be a part of user request reception module 4110, and may be configured to receive requests from users that are already connected to the system, to change the view of what they are currently seeing.

Referring again to FIG. 1-M, server 4000 may include relevant pixel selection module 4120 configured to combine the user selections into a single area, as shown in FIG. 1-M. It is noted that, in an embodiment, the different user devices may request areas that overlap each other. In this case, there may be one or more overlapping areas, e.g., overlapping areas 4122. In an embodiment, the overlapping areas are only transmitted once, in order to save data/transmission costs and increase efficiency.

Referring now to FIG. 1-W, server 4000 may include selected pixel transmission to ISA module 4130. Module 4130 may take the relevant selected pixels, and transmit them to the array local processing module 3400 of image sensor array 3200. Selected pixel transmission to ISA module 4130 may include communication components, which may be shared with other transmission and/or reception modules.

Referring now to FIG. 1-AG, array local processing module 3400 may communicate with image sensor array 3200. Similarly to FIGS. 1-AE and 1-AF, FIGS. 1-AG and 1-AH show array local processing module 3400 and image sensor array 3200, respectively.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local storage and processing module 3400. In an embodiment, array local storage module 3400 is integrated into the image sensor array. In another embodiment, the array local storage and processing module 3400 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3400 to the remote server, which may be, but is not required to be, located further away temporally.

It is noted that, because of the large number of pixels captured by image sensor array 3200, mechanical changes to the image sensor array are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AG, the image sensor array 3200 may capture an image and compare it to a consolidated user request, e.g., which is provided by a consolidated user request reception module 3410. Consolidated user request reception module 3410 may receive the communication from server 4000 regarding which pixels of the image have been requested. Through use of the consolidated user request and the captured image, pixel selection module 3420 may select the pixels that have been specifically requested by the user, and mark those pixels for transmission back to the server.

After the pixels to be kept are identified, the other pixels that are not to be kept are removed, e.g., decimated at unused pixel decimation module 3430. In an embodiment, these pixels are simply discarded, e.g., not stored in a long-term memory, that is removed to a digital trash 3417. In another embodiment, some or all of these pixels are stored in a local memory, e.g., local memory 3415. From here, these pixels may be transmitted to various locations at off-peak times, may be kept for image processing by the array local processing module 3400, or may be subject to other manipulations or processing separate from the user requests.

Referring gain to FIG. 1-AG, array local processing module 3400 may include flagged selected pixel transmission module 3440, which takes the pixels identified as requested (e.g., "flagged") and transmits them back to the server 4000 for further processing. Similarly to as previously described, this transmission may utilize a lower-bandwidth channel, and module 3440 may include all necessary hardware to effect that lower-bandwidth transmission to server 4000.

Referring again to FIG. 1-W, the flagged selected pixel transmission module 3440 of array local processing module 3400 may transmit the flagged pixels to server 4000. Specifically, flagged selected pixel transmission module 3440 may transmit the pixels to flagged selected pixel reception from ISA module 4140 of server 4000, as shown in FIG. 1-W.

Referring again to FIG. 1-W, server 4000 also may include flagged selected pixel separation and duplication module 4150, which may, effectively, reverse the process of combining the pixels from the various selections, duplicating overlapping areas where necessary, and creating the requested images for each of the user devices that requested images. Flagged selected pixel separation and duplication module 4150 also may include the post-processing done to the image, including filling in cached versions of images, image adjustments based on the device preferences and/or the user preferences, and any other image post-processing.

Referring now to FIG. 1-M (as data flows "northward" from FIG. 1-W from module 4150), server 4000 may include pixel transmission to user device module 4160, which may be configured to transmit the pixels that have been separated out and processed to the specific users that requested the image. Pixel transmission to user device module 4160 may handle the transmission of images to the user devices 5510, 5520, and 5530. In an embodiment, pixel transmission to user device module 4160 may have some or all components in common with user request reception module 4110.

Following the arrow of data flow to the right and upward from module 4160 of server 4000, the requested user images arrive at user device 5510, user device 5520, and user device 5530, as shown in FIGS. 1-B and 1-C. The user devices 5510, 5520, and 5530 may present the received images as previously discussed and/or as further discussed herein.

Referring again to FIG. 1, FIGS. 1-E, 1-O, 1-Y, 1-AH, and 1-AI depict a MUVIA implementation according to an embodiment. In an embodiment, referring now to FIG. 1-E, a user device 5600 may include a target selection reception module 5610. Target selection reception module 5610 may be a component that allows the user to select a "target" from the image, that is, a point of interest from the image. For example, in the shown example, the MUVIA array is pointed at a football stadium, e.g., CenturyLink Field. As an example, a user may select one of the football players visible on the field as a "target." This may be facilitated by a target presentation module, e.g., target presentation module 5612, which may present one or more images (e.g., which may be various versions of images from MUVIA, at different resolutions or not up-to-date) from which the user may select the target, e.g., the football player.

In an embodiment, target selection reception module 5610 may include an audible target selection module 5614 which may be configured to allow the user to select a target using audible commands, without requiring physical interaction with a device.

Referring again to FIG. 1, e.g., FIG. 1-E, in an embodiment, user device 5600 may include selected target transmission module 5620. Selected target transmission module 5620 may be configured to take the target selected by the user, and transmit the selected target to the server 4000.

Referring now to FIG. 1-O, FIG. 1-O (and FIG. 1-Y to the direct "south" of FIG. 1-O) shows an embodiment of server 4000. For example, in an embodiment, server 4000 may include a selected target reception module 4210. In an embodiment, selected target reception module 4210 of server 4000 may receive the selected target from the user device 5600. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-O, in an embodiment, server 4000 may include selected target identification module 4220, which may be configured to take the target data received by selected target reception module 4210 and determine an image that needs to be captured in order to obtain an image that contains the selected target (e.g., in the shown example, the football player). In an embodiment, selected target identification module 4220 may use images previously received (or, in an embodiment, current images) from the image sensor array 3200 to determine the parameters of an image that contains the selected target. For example, in an embodiment, lower-resolution images from the image sensor array 3200 may be transmitted to server 4000 for determining where the target is located within the image, and then specific requests for portions of the image may be transmitted to the image sensor array 3200, as will be discussed herein.

In an embodiment, server 4000 may perform processing on the selected target data, and/or on image data that is received, in order to create a request that is to be transmitted to the image sensor array 3200. For example, in the given example, the selected target data is a football player. The server 4000, that is, selected target identification module 4220 may perform image recognition on one or more images captured from the image sensor array 3200 to determine a "sector" of the entire scene that contains the selected target. In another embodiment, the selected target identification module 4220 may use other, external sources of data to determine where the target is. In yet another embodiment, the selected target data was selected by the user from the scene displayed by the image sensor array 3200, so such processing may not be necessary.

Referring again to FIG. 1-O, in an embodiment, server 4000 may include pixel information selection module 4230, which may select the pixels needed to capture the target, and which may determine the size of the image that should be transmitted from the image sensor array 3200. The size of the image may be determined based on a type of target that is selected, one or more parameters (set by the user, by the device, or by the server, which may or may not be based on the selected target), by the screen resolution of the device, or by any other algorithm. Pixel information selection module 4230 may determine the pixels to be captured in order to express the target, and may update based on changes in the target's status (e.g., if the target is moving, e.g., in the football example, once a play has started and the football player is moving in a certain direction).

Referring now to FIG. 1-Y, FIG. 1Y includes more of server 4000 according to an embodiment. In an embodiment, server 4000 may include pixel information transmission to ISA module 4240. Pixel information transmission to ISA module 4240 may transmit the selected pixels to the array local processing module 3500 associated with image sensor array 3200.

Referring now to FIGS. 1-AH and 1-AI, FIG. 1-AH depicts an image sensor array 3200, which in this example is pointed at a football stadium, e.g., CenturyLink field. Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3500. In an embodiment, array local processing module 3500 is integrated into the image sensor array 3200. In another embodiment, the array local processing module 3500 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3500 to the remote server, which may be, but is not required to be, located further away temporally.

It is noted that, because of the large number of pixels captured by image sensor array 3200, mechanical changes to the image sensor array 3200 are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AE, the image sensor array 3200 may capture an image that is received by image capturing module 3305. Image capturing module 3305 may take the captured image and compare it to a consolidated user request, e.g., which is provided by a consolidated user request reception module 3310. Consolidated user request reception module 3310 may receive the communication from server 4000 regarding which pixels of the image have been requested. Through use of the consolidated user request and the captured image, pixel selection module 3320 may select the pixels that have been specifically requested by the user, and mark those pixels for transmission back to the server.

After the pixels to be kept are identified, the other pixels that are not to be kept are removed, e.g., decimated at unused pixel decimation module 3330. In an embodiment, these pixels are simply discarded, e.g., not stored in a long-term memory, that is removed to a digital trash 3317. In another embodiment, some or all of these pixels are stored in a local memory, e.g., local memory 3315. From here, these pixels may be transmitted to various locations at off-peak times, may be kept for image processing by the array local processing module 3300, or may be subject to other manipulations or processing separate from the user requests. In an embodiment, unused pixel decimation module 3330 may include or communicate with a lower resolution module 3315, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AE, the selected pixels then may be transmitted to the server 4000 using selected pixel transmission module 3340. Selected pixel transmission module 3340 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

Referring now again to FIG. 1-Y, server 4000 may include a requested image reception from ISA module 4250. Requested image reception from ISA module 4250 may receive the image data from the array local processing module 3500 (e.g., in the arrow coming "north" from FIG. 1-AI. That image, as depicted in FIG. 1-Y, may include the target (e.g., the football player), as well as some surrounding area (e.g., the area of the field around the football player). The "surrounding area" and the specifics of what is included/transmitted from the array local processing module may be specified by the user (directly or indirectly, e.g., through a set of preferences), or may be determined by the server, e.g., in the pixel information selection module 4230 (shown in FIG. 1-O).

Referring again to FIG. 1-Y, server 4000 may also include a requested image transmission to user device module 4260. Requested image transmission to user device module 4260 may transmit the requested image to the user device 5600. Requested image transmission to user device module 4260 may include components necessary to communicate with user device 5600 and may, in some embodiments, share components with one or more other modules of server 4000, e.g., a network interface, or a wireless antenna.

Referring again to FIG. 1-Y, server 4000 may include a server cached image updating module 4270. Server cached image updating module 4270 may take the images received from the array local processing module 3500 (e.g., which may include the image to be sent to the user), and compare the received images with stored or "cached" images on the server, in order to determine if the cached images should be updated. This process may happen frequently or infrequently, depending on embodiments, and may be continuously ongoing as long as there is a data connection, in some embodiments. In some embodiments, the frequency of the process may depend on the available bandwidth to the array local processing module 3500, e.g., that is, at off-peak times, the frequency may be increased. In an embodiment, server cached image updating module 4270 compares an image received from the array local processing module 3500, and, if the image has changed, replaces the cached version of the image with the newer image.

Referring now again to FIG. 1-E, FIG. 1-E shows user device 5600. In an embodiment, user device 5600 includes image containing selected target receiving module 5630 that may be configured to receive the image from server 4000, e.g., requested image transmission to user device module 4260 of server 4000 (e.g., depicted in FIG. 1-Y, with the data transmission indicated by a rightward-upward arrow passing through FIG. 1-Y and FIG. 1-O (to the north) before arriving at FIG. 1-E.

Referring again to FIG. 1-E, FIG. 1-E shows received image presentation module 5640, which may display the requested pixels that include the selected target to the user, e.g., by showing them on a screen of the device. In an embodiment, the display of the image may be carried out through an exemplary interface that allows the user to monitor the target, and which also may display information about the target (e.g., in an embodiment, as shown in the figures, the game statistics for the football player also may be shown), which allows a cycle of user requests and new images to be shown as the user navigates through what is seen on the MUVIA, e.g., as shown in FIG. 1-A.

Referring again to FIG. 1, FIGS. 1-F, 1-P, 1-Z, and 1-AJ depict a MUVIA implementation according to an embodiment. This embodiment may be colloquially known as "live street view" in which one or more MUVIA systems allow for a user to move through an area similarly to the well known Google-branded Maps (or Google-Street), except with the cameras working in real time. For example, in an embodiment, referring now to FIG. 1-F, a user device 5700 may include a target selection input reception module 5710. Target selection input reception module 5710 may be a component that allows the user to select a "target" from the image, that is, a point of interest from the image. For example, in the shown example, the MUVIA may be focused on a city, and the target may be an address, a building, a car, or a person in the city. As an example, a user may select a street address as a "target." This may be facilitated by a target presentation module, e.g., image selection presentation module 5712, which may present one or more images (e.g., which may be various versions of images from MUVIA, at different resolutions or not up-to-date) from which the user may select the target, e.g., the street address. In an embodiment, image selection presentation module 5712 may use static images that may or may not be sourced by the MUVIA system, and, in another embodiment, image selection presentation module 5712 may use current or cached views from the MUVIA system.

In an embodiment, image selection presentation module 5712 may include an audible target selection module 5714 which may be configured to allow the user to select a target using audible commands, without requiring physical interaction with a device.

Referring again to FIG. 1, e.g., FIG. 1-F, in an embodiment, user device 5700 may include selected target transmission module 5720. Selected target transmission module 5720 may be configured to take the target selected by the user, and transmit the selected target to the server 4000.

Referring now to FIG. 1-P, FIG. 1-P depicts a server 4000 of the MUVIA system according to embodiments. In an embodiment, server 4000 may include a selected target reception module 4310. Selected target reception module 4310 may receive the selected target from the user device 5700. In an embodiment, server 4000 may provide all or most of the data that facilitates the selection of the target, that is, the images and the interface, which may be provided, e.g., through a web portal.

Referring again to FIG. 1-P, in an embodiment, server 4000 may include a selected image pre-processing module 4320. Selected image pre-processing module 4320 may perform one or more tasks of pre-processing the image, some of which are described herein for exemplary purposes. For example, in an embodiment, selected image pre-processing module 4320 may include a resolution determination module 4322 which may be configured to determine the resolution for the image in order to show the target (and here, resolution is merely a stand-in for any facet of the image, e.g., color depth, size, shadow, pixilation, filter, etc.). In an embodiment, selected image pre-processing module 4320 may include a cached pixel fill-in module 4324. Cached pixel fill-in module 4324 may be configured to manage which portions of the requested image are recovered from a cache, and which are updated, in order to improve performance. For example, if a view of a street is requested, certain features of the street (e.g., buildings, trees, etc., may not need to be retrieved each time, but can be filled in with a cached version, or, in another embodiment, can be filled in by an earlier version. A check can be done to see if a red parked car is still in the same spot as it was in an hour ago; if so, that part of the image may not need to be updated. Using lower resolution/prior images stored in a memory 4215, as well as other image processing techniques, cached pixel fill-in module 4324 determines which portions of the image do not need to be retrieved, thus reducing bandwidth load on the connection between the array local processing module 3600 and the server 4000.

Referring again to FIG. 1-P, in an embodiment, selected image pre-processing module 4320 of server 4000 may include a static object obtaining module 4326, which may operate similarly to cached pixel fill-in module 4324. For example, as in the example shown in FIG. 1-B, static object obtaining module 4326 may obtain prior versions of static objects, e.g., buildings, trees, fixtures, landmarks, etc., which may save bandwidth load on the connection between the array local processing module 3600 and the server 4000.

Referring again to FIG. 1-P, in an embodiment, pixel information transmission to ISA module 4330 may transmit the request for pixels (e.g., an image, after the pre-processing) to the array local processing module 3600 (e.g., as shown in FIGS. 1-Z and 1-AI, with the downward extending dataflow arrow).

Referring now to FIGS. 1-Z and 1-AJ, in an embodiment, an array local processing module 3600, that may be connected by a higher bandwidth connection to an image sensor array 3200, may be present.

Image sensor array 3200 may include one or more image sensors that may, in an embodiment, be statically pointed at a particular object or scene. Image sensor array 3200 may be a single image sensor, or more commonly, may be a group of individual image sensors 3201 that are combined to create a larger field of view. For example, in an embodiment, ten megapixel sensors may be used for each individual image sensor 3201. With twelve of these sensors, the effective field of view, loss-less zoom, and so forth may be increased substantially. These numbers are for example only, and any number of sensors and/or megapixel image sensor capacities may be used.

The use of many individual sensors may create a very large number of pixels captured for each exposure of the image sensor array 3200. Thus, these pixels are transmitted via a higher bandwidth communication 3505 to the array local processing module 3600. In an embodiment, array local processing module 3600 is integrated into the image sensor array 3200. In another embodiment, the array local processing module 3600 is separate from, but directly connected to (e.g., via a USB 3.0 cable) to the image sensor array 3200. It is noted that "higher bandwidth communication 3505" does not require a specific amount of bandwidth, but only that the bandwidth for this communication is relatively higher than the bandwidth communication from the array local processing module 3600 to the remote server, which may be, but is not required to be, located further away temporally.

It is noted that, because of the large number of pixels captured by image sensor array 3200, mechanical changes to the image sensor array 3200 are not generally required, although such mechanical changes are not excluded from these embodiments. For example, because the array has a very large field of view, with very high resolution, "pan" and "zoom" functions may be handled optically, rather than by mechanically changing the focal point of the lenses or by physically pointing the array at a different location. This may reduce the complexity required of the device, and also may improve the speed at which different views may be generated by the image sensor array 3200.

Referring again to FIG. 1-AJ and FIG. 1-Z, the image sensor array 3200 may capture an image that is received by image capturing module 3305. Image capturing module 3305 may take the captured image and compare it to a consolidated user request, e.g., which is provided by a request reception module 3610. Request reception module 3610 may receive the communication from server 4000 regarding which pixels of the image have been requested. Through use of the consolidated user request and the captured image, pixel selection module 3620 may select the pixels that have been specifically requested by the user, and mark those pixels for transmission back to the server.

After the pixels to be kept are identified, the other pixels that are not to be kept are removed, e.g., decimated at unused pixel decimation module 3630. In an embodiment, these pixels are simply discarded, e.g., not stored in a long-term memory, that is removed to a digital trash 3617. In another embodiment, some or all of these pixels are stored in a local memory, e.g., local memory 3615. From here, these pixels may be transmitted to various locations at off-peak times, may be kept for image processing by the array local processing module 3600, or may be subject to other manipulations or processing separate from the user requests. In an embodiment, unused pixel decimation module may include or communicate with a lower resolution module 3514, which may, in some embodiments, be used to transmit a lower-resolution version of more of the image (e.g., an entire scene, or more of the field of view surrounding the target) to the server 4000, so that the server 4000 may accurately determine which images are required to capture the target selected by the user.

Referring again to FIG. 1-AJ, the selected pixels then may be transmitted to the server 4000 using selected pixel transmission module 3640. Selected pixel transmission module 3640 may include any transmission equipment necessary, e.g., cellular radio, wireless adapter, and the like, depending on the format of communication. In an embodiment, only those pixels which have been requested are transmitted to the server via lower-bandwidth communication 3510. Similarly to lower-bandwidth communication 3515, the lower-bandwidth communication 3510 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3600 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3600 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-P, in an embodiment, server 4000 may include image receiving from ISA module 4340. Image receiving from ISA module 4340 may receive the image data from the array local processing module 3600 (e.g., in the arrow coming "north" from FIG. 1-AJ via FIG. 1-Z). The image may include the pixels that were requested from the image sensor array 3200. In an embodiment, server 4000 also may include received image post-processing module 4350, which may, among other post-processing tasks, fill in objects and pixels into the image that were determined not to be needed by selected image pre-processing module 4320, as previously described. In an embodiment, server 4000 may include received image transmission to user device module 4360, which may be configured to transmit the requested image to the user device 5700. Requested image transmission to user device module 4360 may include components necessary to communicate with user device 5700 and may, in some embodiments, share components with one or more other modules of server 4000, e.g., a network interface, or a wireless antenna.

Referring now again to FIG. 1-F, user device 5700 may include a server image reception module 5730. Server image reception module 5730 may receive an image sent by the server 4000, and user selection presenting module 5240, which may display the requested pixels to the user, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-F.

In an embodiment, as shown in FIGS. 1-F and 1-G, server image reception module 5730 may include an audio stream reception module 5732 and a video stream reception module

5734. In an embodiment, as discussed throughout this application, the MUVIA system may capture still images, video, and also sound, as well as other electromagnetic waves and other signals and data. In an embodiment, the audio signals and the video signals may be handled together, or they may be handled separately, as separate streams. Although not every module in the instant diagram separately shows audio streams and video streams, it is noted here that all implementations of MUVIA contemplate both audio and video coverage, as well as still image and other data collection.

Referring now to FIG. 1-G, which shows another portion of user device 5700, FIG. 1-G may include a display 5755 and a memory 5765, which may be used to facilitate presentation and/or storage of the received images.

FIGS. 1-H, 1-R, 1-AA, and 1-AB show an embodiment of a MUVIA implementation. For example, referring now to FIG. 1-H, FIG. 1-H shows an embodiment of a user device 5800. For exemplary purposes, the user device 5800 may be an augmented reality device that shows a user looking down a "street" at which the user is not actually present, e.g., a "virtual tourism" where the user may use their augmented reality device (e.g., googles, e.g., an Oculus Rift-type headgear device) which may be a wearable computer. It is noted that this embodiment is not limited to wearable computers or augmented reality, but as in all of the embodiments described in this disclosure, may be any device. The use of a wearable augmented/virtual reality device is merely used to for illustrative and exemplary purposes.

In an embodiment, user device 5800 may have a field of view 5810, as shown in FIG. 1-H. The field of view for the user 5810 may be illustrated in FIG. 1-H as follows. The most internal rectangle, shown by the dot hatching, represents the user's "field of view" as they look at their "virtual world." The second most internal rectangle, with the straight line hatching, represents the "nearest" objects to the user, that is, a range where the user is likely to "look" next, by turning their head or moving their eyes. In an embodiment, this area of the image may already be loaded on the device, e.g., through use of a particular codec, which will be discussed in more detail herein. The outermost rectangle, which is the image without hatching, represents further outside the user's viewpoint. This area, too, may already be loaded on the device. By loading areas where the user may eventually look, the system can reduce latency and make a user's motions, e.g., movement of head, eyes, and body, appear "natural" to the system.

Referring now to FIGS. 1-AA and 1-AB, these figures show an array local processing module 3700 that is connected to an image sensor array 3200 (e.g., as shown in FIG. 1-AK, and "viewing" a city as shown in FIG. 1-AJ). The image sensor array 3200 may operate as previously described in this document. In an embodiment, array local processing module 3700 may include a captured image receiving module 3710, which may receive the entire scene captured by the image sensor array 3200, through the higher-bandwidth communication channel 3505. As described previously in this application, these pixels may be "cropped" or "decimated" into the relevant portion of the captured image, as described by one or more of the user device 5800, the server 4000, and the processing done at the array local processing module 3700. This process may occur as previously described. The relevant pixels may be handled by relevant portion of captured image receiving module 3720.

Referring now to FIG. 1-AB, in an embodiment, the relevant pixels for the image that are processed by relevant portion of captured image receiving module 3720 may be encoded using a particular codec at relevant portion encoding module 3730. In an embodiment, the codec may be configured to encode the innermost rectangle, e.g., the portion that represents the current user's field of view, e.g., portion 3716, at a higher resolution, or a different compression, or a combination of both. The codec may be further configured to encode the second rectangle, e.g., with the vertical line hashing, e.g., portion 3714, at a different resolution and/or a different (e.g., a higher) compression. Similarly, the outermost portion of the image, e.g., the clear portion 3712, may again be coded at still another resolution and/or a different compression. In an embodiment, the codec itself handles the algorithm for encoding the image, and as such, in an embodiment, the codec may include information about user device 5800.

As shown in FIG. 1-AB, the encoded portion of the image, including portions 3716, 3714, and 3712, may be transmitted using encoded relevant portion transmitting module 3740. It is noted that "lower compression," "more compression," and "higher compression," are merely used as one example for the kind of processing done by the codec. For example, instead of lower compression, a different sampling algorithm or compacting algorithm may be used, or a lossier algorithm may be implemented for various parts of the encoded relevant portion.

Referring now to FIG. 1-R, FIG. 1-R depicts a server 4000 in a MUVIA system according to an embodiment. For example, as shown in FIG. 1-R, server 4000 may include, in addition to portions previously described, an encoded image receiving module 4410. Encoded image receiving module 4410 may receive the encoded image, encoded as previously described, from encoded relevant portion transmitting module 3740 of array local processing module 3700.

Referring again to FIG. 1-R, server 4000 may include an encoded image transmission controlling module 4420. Encoded image transmission controlling module 4420 may transmit portions of the image to the user device 5800. In an embodiment, at least partially depending on the bandwidth and the particulars of the user device 5800, the server may send all of the encoded image to the user device 5800, and let the user device 5800 decode the portions as needed, or may decode the image and send portions in piecemeal, or with a different encoding, depending on the needs of the user device 5800, and the complexity that can be handled by the user device 5800.

Referring again to FIG. 1-H, user device 5800 may include an encoded image transmission receiving module 5720, which may be configured to receive the image that is coded in a particular way, e.g., as will be disclosed in more detail herein. FIG. 1-H also may include an encoded image processing module 5830 that may handle the processing of the image, that is, encoding and decoding portions of the image, or other processing necessary to provide the image to the user.

Referring now to FIG. 1-AL, FIG. 1-AL shows an implementation of an Application Programming Interface (API) for the various MUVIA components. Specifically, image sensor array API 7800 may include, among other elements, a programming specification for ISA 7810, that may include, for example, libraries, classes, specifications, templates, or other coding elements that generally make up an API, and an access authentication module for ISA 7820 that governs API access to the various image sensor arrays. The API allows third party developers to access the workings of the image sensor array 3200 and the array local processing module 3700, so that the third party developers can write applications for the array local processing module 3700, as well as determine which data captured by the image sensor array 3200 (which often may be multiple gigabytes or more of data per second) should be kept or stored or transmitted. In an embodiment, API access to certain functions may be limited. For example, a tiered system may allow a certain number of API calls to the MUVIA data per second, per minute, per hour, or per day. In an embodiment, a third party might pay fees or perform a registration that would allow more or less access to the MUVIA data. In an embodiment, the third party could host their application on a separate web site, and let that web site access the image sensor array 3200 and/or the array local processing module 3700 directly.

Referring again to FIG. 1, FIGS. 1-I, 1-J, 1-S, 1-T, 1-AC, 1-AD, 1-AM, and 1-AN, in an embodiment, show a MUVIA implementation that allows insertion of advertising (or other context-sensitive material) into the images displayed to the user.

Referring again to FIG. 1-I, in an embodiment, user device 5900 may include a user selection accepting module 5910. User selection accepting module 5910 may be configured to receive user input about what the user wants to see. For example, as shown in FIG. 1-I, the user selection accepting module 5910 may show an image from image sensor array 3200, and the user may "pan" and "zoom" the image using any known interface, including, but not limited to, keyboard, mouse, touch, haptic, augmented reality interface, voice command, nonverbal motion commands (e.g., as part of a video game system interface, e.g., the Microsoft Kinect). It is noted, and as will be discussed in more detail herein, the camera itself is not "zooming" or "panning," because the camera does not move. What is happening is that different pixels that are captured by the image sensor array 3200 are kept by the image sensor array 3200 and transmitted to the server 4000.

In an embodiment, the "user selection" facilitated by the user selection accepting module 5910 may not involve a user at all. For example, in an embodiment, e.g., in a security embodiment, the user selection may be handled completely by machine, and may include "select any portion of the image with movement," or "select any portion of the image in which a person is recognized," or "select any portion of the image in which a particular person, e.g., a person on the FBI most wanted list" is recognized.

Referring again to FIG. 1-I, in an embodiment, user device 5900 may include a user selection transmitting module 5920. The user selection transmitting module 5920 may take the user selection from user selection transmitting module 5920, and transmit the selection to the server 4000. The transmission may include some pre-processing, for example, the user device 5900 may determine the size and parameters of the image prior to sending the request to the server 4000, or that processing may be handled by the server 4000. Following the thick-line arrow leftward from user selection transmitting module 5920 through to FIG. 1-K, the transmission goes to server 4000, as will be discussed herein. It is noted that the transmission to the server 4000 may also include data about the user device, for example, the screen resolution, the window size, the type of device, an identity of the user, a level of service the user has paid for (in embodiments in which such services are prioritized by the camera/server), other capabilities of the device, e.g., framerate, and the like.

Referring again to FIG. 1-I, FIG. 1-I also includes a selected image receiving module 5930 and a user selection presenting module 5940, which will be discussed in more detail herein, with respect to the dataflow of this embodiment.

Referring now to FIG. 1-T (graphically represented as "down" and "to the right" of FIG. 1-I), in an embodiment, a server 4000 may include a selected image reception module 4510. In an embodiment, selected image reception module 4510 of server 4000 may receive the selected target from the user device 5900. The selected target data may take various formats, e.g., it may be image data, it may be metadata that identifies the selected target, it may be some other designation, e.g., an ID number, a tracking number, or a piece of information, like a license plate or a social security number. The selected target data may be an address or a physical description, or any other instantiation of data that can be used to identify something.

Referring again to FIG. 1-T, in an embodiment, server 4000 may include selected image pre-processing module 4520. Selected image pre-processing module 4520 may perform one or more tasks of pre-processing the image, some of which have been previously described with respect to other embodiments. In an embodiment, server 4000 also may include pixel information transmission to ISA module 4330 configured to transmit the image request data to the image search array 3200, as has been previously described.

Referring now to FIGS. 1-AD and 1-AN, array local processing module 3700 may be connected to an image sensor array 3200 through a higher-bandwidth communication link 3505, e.g., a USB or PCI port. In an embodiment, image sensor array 3200 may include a request reception module 3710. Request reception module 3710 may receive the request for an image from the server 4000, as previously described. Request reception module 3710 may transmit the data to a pixel selection module 3720, which may receive the pixels captured from image sensor array 3200, and select the ones that are to be kept. That is, in an embodiment, through use of the (sometimes consolidated) user requests and the captured image, pixel selection module 3720 may select the pixels that have been specifically requested by the user, and mark those pixels for transmission back to the server.

After the pixels to be kept are identified, the other pixels that are not to be kept are removed, e.g., decimated at unused pixel decimation module 3730. In an embodiment, these pixels are simply discarded, e.g., not stored in a long-term memory, that is removed to a digital trash 3717. In another embodiment, some or all of these pixels are stored in a local memory, e.g., local memory 3715. From here, these pixels may be transmitted to various locations at off-peak times, may be kept for image processing by the array local processing module 3700, or may be subject to other manipulations or processing separate from the user requests, as described in previous embodiments. In an embodiment, unused pixel decimation module 3730 may be used to transmit a lower-resolution version of more of the image (e.g., an entire scene, or more of the field of view surrounding the target) to the server 4000, so that the server 4000 may accurately determine which images are required to fulfill the request of the user.

Referring again to FIG. 1-AN, the selected pixels then may be transmitted to the server 4000 using selected pixel transmission module 3740. Selected pixel transmission module 3740 may include any transmission equipment necessary, e.g., cellular radio, wireless adapter, and the like, depending on the format of communication. In an embodiment, only those pixels which have been requested are transmitted to the server via lower-bandwidth communication 3710. Similarly to lower-bandwidth communication 3715, the lower-bandwidth communication 3710 does not refer to a specific amount of bandwidth, just that the amount of bandwidth is relatively lower than higher-bandwidth communication 3505.

It is noted that more pixels than what are specifically requested by the user may be transmitted, in certain embodiments. For example, the array local processing module 3700 may send pixels that border the user's requested area, but are outside the user's requested area. In an embodiment, as will be discussed herein, those pixels may be sent at a different resolution or using a different kind of compression. In another embodiment, the additional pixels may merely be sent the same as the requested pixels. In still another embodiment, server 4000 may expand the user requested areas, so that array local processing module 3700 may send only the requested pixels, but the requested pixels cover more area than what the user originally requested. These additional pixels may be transmitted and "cached" by the server or local device, which may be used to decrease latency times, in a process that will be discussed more herein.

Referring now again to FIG. 1-T, in an embodiment, server 4000 may include received image post-processing module 4550. Received image post-processing module 4550 may receive the image data from the array local processing module 3700 (e.g., in the arrow coming "north" from FIG. 1-AN via FIG. 1-AD). The image may include the pixels that were requested from the image sensor array 3200.

In an embodiment, server 4000 also may include advertisement insertion module 4560. Advertisement insertion module 4560 may insert an advertisement into the received image. The advertisement may be based one or more of the contents of the image, a characteristic of a user or the user device, or a setting of the advertisement server component 7700 (see, e.g., FIG. 1-AC, as will be discussed in more detail herein). The advertisement insertion module 4560 may place the advertisement into the image using any known image combination techniques, or, in another embodiment, the advertisement image may be in a separate layer, overlay, or any other data structure. In an embodiment, advertisement insertion module 4560 may include context-based advertisement insertion module 4562, which may be configured to add advertisements that are based on the context of the image. For example, if the image is a live street view of a department store, the context of the image may show advertisements related to products sold by that department store, e.g., clothing, cosmetics, or power tools.

Referring again to FIG. 1-T, server 4000 may include a received image with advertisement transmission to user device module 4570 configured to transmit the image. Received image with advertisement transmission to user device module 4570 may include components necessary to communicate with user device 5900 and may, in some embodiments, share components with one or more other modules of server 4000, e.g., a network interface, or a wireless antenna.

Referring again to FIG. 1-I, user device 5900 may include a selected image receiving module 5930, which may receive the pixels that were sent by the server 4000, and user selection presenting module 5940, which may display the requested pixels to the user, including the advertisement, e.g., by showing them on a screen of the device. In an embodiment, the display of the image may be carried out through the exemplary interface, which allows a cycle of user requests and new images to be shown as the user navigates through what is seen on the MUVIA, e.g., as shown in FIG. 1-I.

Referring now to FIG. 1-AC, FIG. 1-AC shows an advertisement server component 7700 configured to deliver advertisements to the server 4000 for insertion into the images prior to delivery to the user. In an embodiment, advertisement server component 7700 may be integrated with server 4000. In another embodiment, advertisement server component may be separate from server 4000 and may communicate with server 4000. In yet another embodiment, rather than interacting with server 4000, advertisement server component 7700 may interact directly with the user device 5900, and insert the advertisement into the image after the image has been received, or, in another embodiment, cause the user device to display the advertisement concurrently with the image (e.g., overlapping or adjacent to). In such embodiments, some of the described modules of server 4000 may be incorporated into user device 5900, but the functionality of those modules would operate similarly to as previously described.

Referring again to FIG. 1-AC, in an embodiment, advertisement server component 7700 may include a user data collection module 7705. User data collection module 7705 may collect data from user device 5900, and use that data to drive placement of advertisements (e.g., based on a user's browser history, e.g., to sports sites, and the like).

Referring again to FIG. 1-AC, in an embodiment, advertisement server component 7700 may include advertisement database 7715 which includes advertisements that are ready to be inserted into images. In an embodiment, these advertisements may be created on the fly.

Referring again to FIG. 1-AC, in an embodiment, advertisement server component 7700 may include an advertisement request reception module 7710 which receives a request to add an advertisement into the drawing (the receipt of the request is not shown to ease understanding of the drawings). In an embodiment, advertisement server component 7700 may include advertisement selection module 7720, which may include an image analysis module 7722 configured to analyze the image to determine the best context-based advertisement to place into the image. In an embodiment, that decision may be made by the server 4000, or partly at the server 4000 and partly at the advertisement server component 7700 (e.g., the advertisement server component may have a set of advertisements from which a particular one may be chosen). In an embodiment, various third parties may compensate the operators of server component 7700, server 4000, or any other component of the system, in order to receive preferential treatment.

Referring again to FIG. 1-AC, in an embodiment, advertisement server component 7700 may include a selected advertisement transmission module 7730, which may transmit the selected advertisement (or a set of selected advertisements) to the server 4000. In an embodiment, selected advertisement transmission module 7730 may send the complete image with the advertisement overlaid, e.g., in an implementation in which the advertisement server component 7700 also handles the placement of the advertisement. In an embodiment in which advertisement server component 7700 is integrated with server 4000, this module may be an internal transmission module, as may all such transmission/reception modules.

Exemplary Environment 200

Referring now to FIG. 2A, FIG. 2A illustrates an example environment 200 in which methods, systems, circuitry, articles of manufacture, and computer program products and architecture, in accordance with various embodiments, may be implemented by at least one server device 230. Image device 220 may include a number of individual sensors that capture data. Although commonly referred to throughout this application as "image data," this is merely shorthand for data that can be collected by the sensors. Other data, including video data, audio data, electromagnetic spectrum data (e.g., infrared, ultraviolet, radio, microwave data), thermal data, and the like, may be collected by the sensors.

Referring again to FIG. 2A, in an embodiment, image device 220 may operate in an environment 200. Specifically, in an embodiment, image device 220 may capture a scene 215. The scene 215 may be captured by a number of sensors 243. Sensors 243 may be grouped in an array, which in this context means they may be grouped in any pattern, on any plane, but have a fixed position relative to one another. Sensors 243 may capture the image in parts, which may be stitched back together by processor 222. There may be overlap in the images captured by sensors 243 of scene 215, which may be removed.

Upon capture of the scene in image device 220, in processes and systems that will be described in more detail herein, the requested pixels are selected. Specifically, pixels that have been identified by a remote user, by a server, by the local device, by another device, by a program written by an outside user with an API, by a component or other hardware or software in communication with the image device, and the like, are transmitted to a remote location via a communications network 240. The pixels that are to be transmitted may be illustrated in FIG. 2A as selected portion 255, however this is a simplified expression meant for illustrative purposes only.

Referring again to FIG. 2A, in an embodiment, server device 230 may be any device or group of devices that is connected to a communication network. Although in some examples, server device 230 is distant from image device 220, that is not required. Server device 230 may be "remote" from image device 220, which may be that they are separate components, but does not necessarily imply a specific distance. The communications network may be a local transmission component, e.g., a PCI bus. Server device 230 may include a request handling module 232 that handles requests for images from user devices, e.g., user device 250A and 240B. Request handling module 232 also may handle other remote computers and/or users that want to take active control of the image device, e.g., through an API, or through more direct control.

Server device 230 also may include an image device management module, which may perform some of the processing to determine which of the captured pixels of image device 220 are kept. For example, image device management module 234 may do some pattern recognition, e.g., to recognize objects of interest in the scene, e.g., a particular football player, as shown in the example of FIG. 2A. In other embodiments, this processing may be handled at the image device 220 or at the user device 250. In an embodiment, server device 230 limits a size of the selected portion by a screen resolution of the requesting user device.

Server device 230 then may transmit the requested portions to the user devices, e.g., user device 250A and user device 250B. In another embodiment, the user device or devices may directly communicate with image device 220, cutting out server device 230 from the system.

In an embodiment, user device 250A and 250B are shown, however user devices may be any electronic device or combination of devices, which may be located together or spread across multiple devices and/or locations. Image device 220 may be a server device, or may be a user-level device, e.g., including, but not limited to, a cellular phone, a network phone, a smartphone, a tablet, a music player, a walkie-talkie, a radio, an augmented reality device (e.g., augmented reality glasses and/or headphones), wearable electronics, e.g., watches, belts, earphones, or "smart" clothing, earphones, headphones, audio/visual equipment, media player, television, projection screen, flat screen, monitor, clock, appliance (e.g., microwave, convection oven, stove, refrigerator, freezer), a navigation system (e.g., a Global Positioning System ("GPS") system), a medical alert device, a remote control, a peripheral, an electronic safe, an electronic lock, an electronic security system, a video camera, a personal video recorder, a personal audio recorder, and the like. Device 220 may include a device interface 243 which may allow the device 220 to output data to the client in sensory (e.g., visual or any other sense) form, and/or allow the device 220 to receive data from the client, e.g., through touch, typing, or moving a pointing device (e.g., a mouse). User device 250 may include a viewfinder or a viewport that allows a user to "look" through the lens of image device 220, regardless of whether the user device 250 is spatially close to the image device 220.

Referring again to FIG. 2A, in various embodiments, the communication network 240 may include one or more of a local area network (LAN), a wide area network (WAN), a metropolitan area network (MAN), a wireless local area network (WLAN), a personal area network (PAN), a Worldwide Interoperability for Microwave Access (WiMAX), public switched telephone network (PTSN), a general packet radio service (GPRS) network, a cellular network, and so forth. The communication networks 240 may be wired, wireless, or a combination of wired and wireless networks. It is noted that "communication network" as it is used in this application refers to one or more communication networks, which may or may not interact with each other.

Referring now to FIG. 2B, FIG. 2B shows a more detailed version of server device 230, according to an embodiment. The server device 230 may include a device memory 245. In an embodiment, device memory 245 may include memory, random access memory ("RAM"), read only memory ("ROM"), flash memory, hard drives, disk-based media, disc-based media, magnetic storage, optical storage, volatile memory, nonvolatile memory, and any combination thereof. In an embodiment, device memory 245 may be separated from the device, e.g., available on a different device on a network, or over the air. For example, in a networked system, there may be more than one server device 230 whose device memories 245 may be located at a central server that may be a few feet away or located across an ocean. In an embodiment, device memory 245 may include of one or more of one or more mass storage devices, read-only memory (ROM), programmable read-only memory (PROM), erasable programmable read-only memory (EPROM), cache memory such as random access memory (RAM), flash memory, synchronous random access memory (SRAM), dynamic random access memory (DRAM), and/or other types of memory devices. In an embodiment, memory 245 may be located at a single network site. In an embodiment, memory 245 may be located at multiple network sites, including sites that are distant from each other. In an embodiment, device memory 245 may include one or more of cached images 245A and previously retained image data 245B, as will be discussed in more detail further herein.

Referring again to FIG. 2B, in an embodiment, server device 230 may include an optional viewport 247, which may be used to view images captured by server device 230.

This optional viewport 247 may be physical (e.g., glass) or electrical (e.g., LCD screen), or may be at a distance from server device 230.

Referring again to FIG. 2B, FIG. 2B shows a more detailed description of server device 230. In an embodiment, device 220 may include a processor 222. Processor 222 may include one or more microprocessors, Central Processing Units ("CPU"), a Graphics Processing Units ("GPU"), Physics Processing Units, Digital Signal Processors, Network Processors, Floating Point Processors, and the like. In an embodiment, processor 222 may be a server. In an embodiment, processor 222 may be a distributed-core processor. Although processor 222 is as a single processor that is part of a single device 220, processor 222 may be multiple processors distributed over one or many devices 220, which may or may not be configured to operate together.

Processor 222 is illustrated as being configured to execute computer readable instructions in order to execute one or more operations described above, and as illustrated in FIG. 10, FIGS. 11A-11G, FIGS. 12A-12E, FIGS. 13A-13C, and FIGS. 14A-14E. In an embodiment, processor 222 is designed to be configured to operate as processing module 250, which may include one or more of a request for particular image data that is part of a scene acquiring module 252, a request for particular image data transmitting to an image sensor array module 254 configured to transmit the request to the image sensor array that includes more than one image sensor and that is configured to capture the scene that is larger than the requested particular image data, a particular image data from the image sensor array exclusive receiving module 256 configured to transmit the selected particular portion from the scene to a remote location, and a received particular image data transmitting to at least one requestor module 258 configured to de-emphasize pixels from the scene that are not part of the selected particular portion of the scene.

Exemplary Environment 300A

Referring now to FIG. 3A, FIG. 3A shows an exemplary embodiment of an image device, e.g., image device 220A operating in an environment 300A. In an embodiment, image device 220A may include an array 310 of image sensors 312 as shown in FIG. 3. The array of image sensors in this image is shown in a rectangular grid, however this is merely exemplary to show that image sensors 312 may be arranged in any format. In an embodiment, each image sensor 312 may capture a portion of scene 315, which portions are then processed by processor 350. Although processor 350 is shown as local to image device 220A, it may be remote to image device 220A, with a sufficiently high-bandwidth connection to receive all of the data from the array of image sensors (e.g., multiple USB 3.0 lines). In an embodiment, the selected portions from the scene (e.g., the portions shown in the shaded box, e.g., selected portion 315), may be transmitted to a remote device 330, which may be a user device or a server device, as previously described. In an embodiment, the pixels that are not transmitted to remote device 330 may be stored in a local memory 340 or discarded.

Exemplary Environment 300B

Referring now to FIG. 4, FIG. 4 shows an exemplary embodiment of an image device, e.g., image device 320B operating in an environment 300B. In an embodiment, image device 320B may include an image sensor array 320B, e.g., an array of image sensors, which, in this example, are arranged around a polygon to increase the field of view that can be captured, that is, they can capture scene 315, illustrated in FIG. 3B as a natural landmark that can be viewed in a virtual tourism setting. Processor 322 receives the scene 315B and selects the pixels from the scene 315B that have been requested by a user, e.g., requested portions 317B. Requested portions 317B may include an overlapping area 324B that is only transmitted once. In an embodiment, the requested portions 317B may be transmitted to a remote location via communications network 240.

Exemplary Environment 300C

Referring now to FIG. 3C, FIG. 3C shows an exemplary embodiment of an image device, e.g., image device 320C operating in an environment 300C. In an embodiment, image device 320C may capture a scene, of which a part of the scene, e.g., scene portion 315C, as previously described in other embodiments (e.g., some parts of image device 320C are omitted for simplicity of drawing). In an embodiment, e.g., scene portion 315C may show a street-level view of a busy road, e.g., for a virtual tourism or virtual reality simulator. In an embodiment, different portions of the scene portion 315C may be transmitted at different resolutions or at different times. For example, in an embodiment, a central part of the scene portion 315C, e.g., portion 516, which may correspond to what a user's eyes would see, is transmitted at a first resolution, or "full" resolution relative to what the user's device can handle. In an embodiment, an outer border outside portion 316, e.g., portion 314, may be transmitted at a second resolution, which may be lower, e.g., lower than the first resolution. In another embodiment, a further outside portion, e.g., portion 312, may be discarded, transmitted at a still lower rate, or transmitted asynchronously.

Exemplary Environment 400A

Referring now to FIG. 4A, FIG. 4A shows an exemplary embodiment of a server device, e.g., server device 430A. In an embodiment, an image device, e.g., image device 420A may capture a scene 415. Scene 415 may be stored in local memory 440. The portions of scene 415 that are requested by the server device 430A may be transmitted (e.g., through requested image transfer 465) to requested pixel reception module 432 of server device 430A. In an embodiment, the requested pixels transmitted to requested pixel reception module 432 may correspond to images that were requested by various users and/or devices (not shown) in communication with server device 430A.

Referring again to FIG. 4A, in an embodiment, pixels not transmitted from local memory 440 of image device 420A may be stored in untransmitted pixel temporary storage 440B. These untransmitted pixels may be stored and transmitted to the server device 430A at a later time, e.g., an off-peak time for requests for images of scene 415. For example, in an embodiment, the pixels stored in untransmitted pixel temporary storage 440B may be transmitted to the unrequested pixel reception module 434 of server device 430A at night, or when other users are disconnected from the system, or when the available bandwidth to transfer pixels between image device 420A and server device 430A reaches a certain threshold value.

In an embodiment, server device 430A may analyze the pixels received by unrequested pixel reception module 434, for example, to provide a repository of static images from the scene 415 that do not need to be transmitted from the image device 420A each time certain portions of scene 415 are requested.

Exemplary Environment 400B

Referring now to FIG. 4B, FIG. 4A shows an exemplary embodiment of a server device, e.g., server device 430B. In an embodiment, an image device, e.g., image device 420B may capture a scene 415B. Scene 415B may be stored in local memory 440B. In an embodiment, image device 420B may capture the same scene 415B multiple times. In an embodiment, scene 415B may include an unchanged area 416A, which is a portion of the image that has not changed since the last time the scene 415B was captured by the image device 420B. In an embodiment, scene 415B also may include a changed area 416B, which may be a portion of the image that has changed since the last time the scene 415B was captured by the image device 420B. Although changed area 416B is illustrated as polygonal and contiguous in FIG. 4B, this is merely for illustrative purposes, and changed area 416B may be, in some embodiments, nonpolygonal and/or noncontiguous.

In an embodiment, image device 420B, upon capturing scene 415B use an image previously stored in local memory 440B to compare the previous image, e.g., previous image 441B, to the current image, e.g., current image 442B, and may determine which areas of the scene 415B have been changed. The changed areas may be transmitted to server device 430B, e.g., to changed area reception module 432B. This may occur through a changed area transmission 465, as indicated in FIG. 4B.

Referring again to FIG. 4B, in an embodiment, server device 430B receives the changed area at changed area reception module 432B. Server device 430B also may include an unchanged area addition module 434B, which adds the unchanged areas that were previously stored in a memory of server device 430B (not shown) from a previous transmission from image device 420B. In an embodiment, server device 430B also may include a complete image transmission module 436B configured to transmit the completed image to a user device, e.g., user device 450B, that requested the image.

Exemplary Environment 500A

Referring now to FIG. 5A, FIG. 5A shows an exemplary embodiment of a server device, e.g., server device 530A. In an embodiment, an image device 520A may capture a scene 515 through use of an image sensor array 540, as previously described. The image may be temporarily stored in a local memory 540 (as pictured), or may be partially or wholly stored in a local memory before transmission to a server device 530A. In an embodiment, server device 530A may include an image data reception module 532A. Image data reception module 532A may receive the image from image device 520A. In an embodiment, server device 530A may include data addition module 534A, which may add additional data to the received image data. In an embodiment, the additional data may be visible or invisible, e.g., pixel data or metadata, for example. In an embodiment, the additional data may be advertising data. In an embodiment, the additional data may be context-dependent upon the image data, for example, if the image data is of a football player, the additional data may be statistics about that player, or an advertisement for an online shop that sells that player's jersey.

In an embodiment, the additional data may be stored in a memory of server device 530A (not shown). In another embodiment, the additional data may be retrieved from an advertising server or another data server. In an embodiment, the additional data may be tailored to one or more characteristics of the user or the user device, e.g., the user may have a setting that labels each player displayed on the screen with that player's last name. Referring again to FIG. 5A, in an embodiment, server device 530A may include a modified data transmission module 536A, which may receive the modified data from data addition module 534A, and transmit the modified data to a user device, e.g., a user device that requested the image data, e.g., user device 550A. to the server device 430A at a later time, e.g., an off-peak time for requests for images of scene 415. For example, in an embodiment, the pixels stored in untransmitted pixel temporary storage 440B may be transmitted to the unrequested pixel reception module 434 of server device 430A at night, or when other users are disconnected from the system, or when the available bandwidth to transfer pixels between image device 420A and server device 430A reaches a certain threshold value.

In an embodiment, server device 430A may analyze the pixels received by unrequested pixel reception module 434, for example, to provide a repository of static images from the scene 415 that do not need to be transmitted from the image device 420A each time certain portions of scene 415 are requested.

Exemplary Environment 500B

Referring now to FIG. 5B, FIG. 5B shows an exemplary embodiment of a server device, e.g., server device 530B. In an embodiment, multiple user devices, e.g., user device 502A, user device 502B, and user device 502C, each may send a request for image data from a scene, e.g., scene 515B. Each user device may send a request to a server device, e.g., server device 530B. Server device 530B may consolidate the requests, which may be for various resolutions, shapes, sizes, and other features, into a single combined request 570. Overlapping portions of the request, e.g., as shown in overlapping area 572, may be combined.

In an embodiment, server device 530B transmits the combined request 570 to the image device 520B. In an embodiment, image device 520B uses the combined request 570 to designate selected pixels 574, which then may be transmitted back to the server device 530B, where the process of combining the requests may be reversed, and each user device 502A, 502B, and 502C may receive the requested image. This process will be discussed in more detail further herein.

Exemplary Embodiments of the Various Modules of Portions of Processor 250

FIGS. 6-9 illustrate exemplary embodiments of the various modules that form portions of processor 250. In an embodiment, the modules represent hardware, either that is hard-coded, e.g., as in an application-specific integrated circuit ("ASIC") or that is physically reconfigured through gate activation described by computer instructions, e.g., as in a central processing unit.

Referring now to FIG. 6, FIG. 6 illustrates an exemplary implementation of the request for particular image data that is part of a scene acquiring module 252. As illustrated in FIG. 6, the request for particular image data that is part of a scene acquiring module may include one or more sub-logic modules in various alternative implementations and embodiments. For example, as shown in FIG. 6, e.g., FIG. 6A, in an embodiment, module 252 may include one or more of request for particular image data that is part of a scene and includes one or more images acquiring module 602 and request for particular image data that is part of a scene receiving module 604. In an embodiment, module 604 may include request for particular image data that is part of a scene receiving from a client device module 606. In an embodiment, module 606 may include one or more of request for particular image data that is part of a scene receiving from a client device configured to display at least a portion of the scene module 608 and request for particular image data that is part of a scene receiving from a client device configured to receive a selection of a particular image module 612. In an embodiment, module 608 may include request for particular image data that is part of a scene receiving from a client device configured to display at least a portion of the scene in a viewfinder module 610. In an embodiment, module 612 may include one or more of request for particular image data that is part of a scene receiving from a client device configured to receive a scene-based selection of a particular image module 614 and request for particular image data that is part of a scene receiving from one or more various devices configured to receive a scene-based selection of a particular image module 616.

Referring again to FIG. 6, e.g., FIG. 6B, as described above, in an embodiment, module 252 may include one or more of request for particular image data that is part of a scene that is the image data collected by the array of more than one image sensor acquiring module 618 and request for particular image data that is part of a scene that a representation of the image data collected by the array of more than one image sensor acquiring module 620. In an embodiment, module 620 may include one or more of request for particular image data that is part of a scene that a sampling of the image data collected by the array of more than one image sensor acquiring module 622, request for particular image data that is part of a scene that is a subset of the image data collected by the array of more than one image sensor acquiring module 624, and request for particular image data that is part of a scene that is a low-resolution version of the image data collected by the array of more than one image sensor acquiring module 626.

Referring again to FIG. 6, e.g., FIG. 6C, in an embodiment, module 252 may include one or more of request for particular image data that is part of a scene that is a football game acquiring module 628, request for particular image data that is part of a scene that is an area street view acquiring module 630, request for particular image data that is part of a scene that is a tourist destination acquiring module 632, and request for particular image data that is part of a scene that is inside a home acquiring module 634.

Referring again to FIG. 6, e.g., FIG. 6D, in an embodiment, module 252 may include request for particular image data that is an image that is a portion of the scene acquiring module 636. In an embodiment, module 636 may include one or more of request for particular image data that is an image that is a particular football player and a scene that is a football field acquiring module 638 and request for particular image data that is an image that is a vehicle license plate and a scene that is a highway bridge acquiring module 640.

Referring again to FIG. 6, e.g., FIG. 6E, in an embodiment, module 252 may include one or more of request for particular image object located in the scene acquiring module 642 and particular image data of the scene that contains the particular image object determining module 644. In an embodiment, module 642 may include one or more of request for particular person located in the scene acquiring module 646, request for a basketball located in the scene acquiring module 648, request for a motor vehicle located in the scene acquiring module 650, and request for a human object representation located in the scene acquiring module 652.

Referring again to FIG. 6, e.g., FIG. 6F, in an embodiment, module 252 may include one or more of first request for first particular image data from a first requestor receiving module 662, second request for first particular image data from a different second requestor receiving module 664, first received request for first particular image data and second received request for second particular image data combining module 666, first request for first particular image data and second request for second particular image data receiving module 670, and received first request and received second request combining module 672. In an embodiment, module 666 may include first received request for first particular image data and second received request for second particular image data combining into the request for particular image data module 668. In an embodiment, module 672 may include received first request and received second request common pixel deduplicating module 674.

Referring again to FIG. 6, e.g., FIG. 6G, in an embodiment, module 252 may include one or more of request for particular video data that is part of a scene acquiring module 676, request for particular audio data that is part of a scene acquiring module 678, request for particular image data that is part of a scene receiving from a user device with an audio interface module 680, and request for particular image data that is part of a scene receiving from a microphone-equipped user device with an audio interface module 682.

Referring now to FIG. 7, FIG. 7 illustrates an exemplary implementation of request for particular image data transmitting to an image sensor array module 254. As illustrated in FIG. 7, the request for particular image data transmitting to an image sensor array module 254 may include one or more sub-logic modules in various alternative implementations and embodiments. For example, as shown in FIG. 7, e.g., FIG. 7A, in an embodiment, module 254 may include one or more of request for particular image data transmitting to an image sensor array module configured to transmit the request to the image sensor array that includes more than one image sensor and that is configured to capture an image that is larger than the requested particular image data 702, request for particular image data transmitting to an image sensor array module configured to transmit the request to the image sensor array that includes two angled image sensors and that is configured to capture the scene that is larger than the requested particular image data 704, request for particular image data transmitting to an image sensor array module configured to transmit the request to the image sensor array that includes more than one image sensor arranged in a grid and that is configured to capture the scene that is larger than the requested particular image data 706, request for particular image data transmitting to an image sensor array module configured to transmit the request to the image sensor array that includes more than one image sensor arranged in a line and that is configured to capture the scene that is larger than the requested particular image data 708, and request for particular image data transmitting to an image sensor array module configured to transmit the request to the image sensor array that includes more than one nonlinearly arranged stationary image sensor and that is configured to capture the scene that is larger than the requested particular image data 710.

Referring again to FIG. 7, e.g., FIG. 7B, in an embodiment, module 254 may include one or more of request for particular image data transmitting to an image sensor array that includes an array of static image sensors module 712, request for particular image data transmitting to an image sensor array that includes an array of image sensors mounted on a movable platform module 716, request for particular image data transmitting to an image sensor array module configured to transmit the request to the image sensor array that includes more than one image sensor and that is configured to capture the scene that represents more data than the requested particular image data 718, and request for particular image data transmitting to an image sensor array module configured to transmit the request to the image sensor array that includes more than one image sensor and that is configured to capture the scene that represents a greater field of view than the requested particular image data 724. In an embodiment, module 712 may include request for particular image data transmitting to an image sensor array that includes an array of static image sensors that have fixed focal length and fixed field of view module 714. In an embodiment, module 718 may include one or more of request for particular image data transmitting to an image sensor array module configured to transmit the request to the image sensor array that includes more than one image sensor and that is configured to capture the scene that represents ten times as much data as the requested particular image data 720 and request for particular image data transmitting to an image sensor array module configured to transmit the request to the image sensor array that includes more than one image sensor and that is configured to capture the scene that represents more than one hundred times as much data as the requested particular image data 722.

Referring again to FIG. 7, e.g., FIG. 7C, in an embodiment, module 254 may include one or more of request for particular image data modifying module 726 and modified request for particular image data transmitting to an image sensor array module 728. In an embodiment, module 726 may include designated image data removing from request for particular image data module 730. In an embodiment, module 730 may include designated image data removing from request for particular image data based on previously stored image data module 732. In an embodiment, module 732 may include one or more of designated image data removing from request for particular image data based on previously stored image data retrieved from the image sensor array module 734 and designated image data removing from request for particular image data based on previously stored image data that is an earlier-in-time version of the designated image data module 736. In an embodiment, module 736 may include designated image data removing from request for particular image data based on previously stored image data that is an earlier-in-time version of the designated image data that is a static object module 738.

Referring again to FIG. 7, e.g., FIG. 7D, in an embodiment, module 254 may include module 726 and module 728, as previously discussed. In an embodiment, module 726 may include one or more of designated image data removing from request for particular image data based on pixel data interpolation/extrapolation module 740, portion of the request for particular image data that was previously stored in memory identifying module 744, and identified portion of the request for the particular image data removing module 746. In an embodiment, module 740 may include designated image data corresponding to one or more static image objects removing from request for particular image data based on pixel data interpolation/extrapolation module 742. In an embodiment, module 744 may include one or more of portion of the request for the particular image data that was previously captured by the image sensor array identifying module 748 and portion of the request for the particular image data that includes at least one static image object that was previously captured by the image sensor array identifying module 750. In an embodiment, module 750 may include portion of the request for the particular image data that includes at least one static image object of a rock outcropping that was previously captured by the image sensor array identifying module 752.

Referring again to FIG. 7, e.g., FIG. 7E, in an embodiment, module 254 may include one or more of size of request for particular image data determining module 754 and determined-size request for particular image data transmitting to the image sensor array module 756. In an embodiment, module 754 may include one or more of size of request for particular image determining at least partially based on user device property module 758, size of request for particular image determining at least partially based on user device access level module 762, size of request for particular image determining at least partially based on available bandwidth module 764, size of request for particular image determining at least partially based on device usage time module 766, and size of request for particular image determining at least partially based on device available bandwidth module 768. In an embodiment, module 758 may include size of request for particular image determining at least partially based on user device resolution module 760.

Referring now to FIG. 8, FIG. 8 illustrates an exemplary implementation of particular image data from the image sensor array exclusive receiving module 256. As illustrated in FIG. 8A, the particular image data from the image sensor array exclusive receiving module 256 may include one or more sub-logic modules in various alternative implementations and embodiments. For example, as shown in FIG. 8, e.g., FIG. 8A, in an embodiment, module 256 may include one or more of particular image data from the image sensor array in which other image data is discarded receiving module 802, particular image data from the image sensor array in which other image data is stored at the image sensor array receiving module 804, and particular image data from the image sensor array exclusive near-real-time receiving module 806.

Referring again to FIG. 8, e.g., FIG. 8B, in an embodiment, module 256 may include one or more of particular image data from the image sensor array exclusive near-real-time receiving module 808 and data from the scene other than the particular image data retrieving at a later time module 810. In an embodiment, module 810 may include one or more of data from the scene other than the particular image data retrieving at a time of available bandwidth module 812, data from the scene other than the particular image data retrieving at an off-peak usage time of the image sensor array module 814, data from the scene other than the particular image data retrieving at a time when no particular image data requests are present at the image sensor array module 816, and data from the scene other than the particular image data retrieving at a time of available image sensor array capacity module 818.

Referring again to FIG. 8, e.g., FIG. 8C, in an embodiment, module 256 may include one or more of particular image data that includes audio data from the image sensor array exclusive receiving module 820 and particular image data that was determined to contain a particular requested image object from the image sensor array exclusive receiving module 822. In an embodiment, module 822 may include particular image data that was determined to contain a particular requested image object by the image sensor array exclusive receiving module 824.

Referring now to FIG. 9, FIG. 9 illustrates an exemplary implementation of received particular image data transmitting to at least one requestor module 258. As illustrated in FIG. 9A, the received particular image data transmitting to at least one requestor module 258 may include one or more sub-logic modules in various alternative implementations and embodiments. For example, as shown in FIG. 9, e.g., FIG. 9A, in an embodiment, module 258 may include one or more of received particular image data transmitting to at least one user device requestor module 902, separation of the received particular data into set of one or more requested images executing module 906, and received particular image data transmitting to at least one user device that requested image data that is part of the received particular image data module 912. In an embodiment, module 902 may include received particular image data transmitting to at least one user device that requested at least a portion of the received particular data requestor module 904. In an embodiment, module 906 may include separation of the received particular data into a first requested image and a second requested image executing module 910.

Referring again to FIG. 9, e.g., FIG. 9B, in an embodiment, module 258 may include one or more of first portion of received particular image data transmitting to the first requestor module 914, second portion of received particular image data transmitting to a second requestor module 916, and received particular image data unaltered transmitting to at least one requestor module 926. In an embodiment, module 914 may include first portion of received particular image data transmitting to the first requestor that requested the first portion module 918. In an embodiment, module 918 may include portion of received particular image data that includes a particular football player transmitting to a television device that requested the football player from a football game module 920. In an embodiment, module 916 may include second portion of received particular image data transmitting to the second requestor that requested the second portion module 922. In an embodiment, module 922 may include portion that contains a view of a motor vehicle transmitting to the second requestor that is a tablet device that requested the view of the motor vehicle module 924.

Referring again to FIG. 9, e.g., FIG. 9C, in an embodiment, module 258 may include one or more of supplemental data addition to at least a portion of the received particular image data to generate transmission image data facilitating module 928 and generated transmission image data transmitting to at least one requestor module 930. In an embodiment, module 928 may include one or more of advertisement data addition to at least a portion of the received particular image data to generate transmission image data facilitating module 932 and related visual data addition to at least a portion of the received particular image data to generate transmission image data facilitating module 938. In an embodiment, module 932 may include context-based advertisement data addition to at least a portion of the received particular image data to generate transmission image data facilitating module 934. In an embodiment, module 934 may include animal rights donation fund advertisement data addition to at least a portion of the received particular image data that includes a jungle tiger at an oasis to generate transmission image data facilitating module 936. In an embodiment, module 938 may include related fantasy football statistical data addition to at least a portion of the received particular image data of a quarterback data to generate transmission image data facilitating module 940.

Referring again to FIG. 9, e.g., FIG. 9D, in an embodiment, module 258 may include one or more of portion of received particular image data modification to generate transmission image data facilitating module 942 and generated transmission image data transmitting to at least one requestor module 944. In an embodiment, module 942 may include one or more of portion of received particular image data image manipulation modification to generate transmission image data facilitating module 946 and portion of received particular image data redaction to generate transmission image data facilitating module 952. In an embodiment, module 946 may include one or more of portion of received particular image data contrast balancing modification to generate transmission image data facilitating module 948 and portion of received particular image data color modification balancing to generate transmission image data facilitating module 950. In an embodiment, module 952 may include portion of received particular image data redaction to generate transmission image data based on a security clearance level of the requestor facilitating module 954. In an embodiment, module 954 may include portion of received satellite image data that includes a tank redaction to generate transmission image data based on a security clearance level of the requestor facilitating module 956.

Referring again to FIG. 9, e.g., FIG. 9D, in an embodiment, module 258 may include one or more of lower-resolution version of received particular image data transmitting to at least one requestor module 958 and full-resolution version of received particular image data transmitting to at least one requestor module 960.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Following are a series of flowcharts depicting implementations. For ease of understanding, the flowcharts are organized such that the initial flowcharts present implementations via an example implementation and thereafter the following flowcharts present alternate implementations and/or expansions of the initial flowchart(s) as either sub-component operations or additional component operations building on one or more earlier-presented flowcharts. Those having skill in the art will appreciate that the style of presentation utilized herein (e.g., beginning with a presentation of a flowchart(s) presenting an example implementation and thereafter providing additions to and/or further details in subsequent flowcharts) generally allows for a rapid and easy understanding of the various process implementations. In addition, those skilled in the art will further appreciate that the style of presentation used herein also lends itself well to modular and/or object-oriented program design paradigms.

Exemplary Operational Implementation of Processor 250 and Exemplary Variants Further, in FIG. 10 and in the figures to follow thereafter, various operations may be depicted in a box-within-a-box manner. Such depictions may indicate that an operation in an internal box may comprise an optional example embodiment of the operational step illustrated in one or more external boxes. However, it should be understood that internal box operations may be viewed as independent operations separate from any associated external boxes and may be performed in any sequence with respect to all other illustrated operations, or may be performed concurrently. Still further, these operations illustrated in FIG. 10 as well as the other operations to be described herein may be performed by at least one of a machine, an article of manufacture, or a composition of matter.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

Throughout this application, examples and lists are given, with parentheses, the abbreviation "e.g.," or both. Unless explicitly otherwise stated, these examples and lists are merely exemplary and are non-exhaustive. In most cases, it would be prohibitive to list every example and every combination. Thus, smaller, illustrative lists and examples are used, with focus on imparting understanding of the claim terms rather than limiting the scope of such terms.

Referring now to FIG. 10, FIG. 10 shows operation 1000, e.g., an example operation of message processing device 230 operating in an environment 200. In an embodiment, operation 1000 may include operation 1002 depicting acquiring a request for particular image data that is part of a scene. For example, FIG. 6, e.g., FIG. 6B, shows request for particular image data that is part of a scene acquiring module 252 acquiring (e.g., receiving, e.g., from a device that requested an image, that is any device or set of devices capable of displaying, storing, analyzing, or operating upon an image, e.g., television, computer, laptop, smartphone, etc., e.g., or from an entity that requested an image, e.g., a person, an automated monitoring system, an artificial intelligence, an intelligence amplification (e.g., a computer designed to watch for persons appearing on video or still shots), or otherwise obtaining (e.g., acquiring includes receiving, retrieving, creating, generating, generating a portion of, receiving a location of, receiving access instructions for, receiving a password for, etc.) a request (e.g., data, in any format that indicates a computationally-based request for data, e.g., image data, from any source, whether properly-formed or not, and which may come from a communications network or port, or an input/output port, or from a human or other entity, or any device) for particular image data (e.g., a set of image data, e.g., graphical representations of things, e.g., that are composed of pixels or other electronic data, or that are captured by an image sensor, e.g., a CCM or a CMOS sensor), or other data, such as audio data and other data on the electromagnetic spectrum, e.g., infrared data, microwave data, etc.) that is part of a scene (e.g., a particular area, and/or data (including graphical data, audio data, and factual/derived data) that makes up the particular area, which may in some embodiments be all of the data, pixel data or otherwise, that is captured by the image sensor array or portions of the image sensor array).

capturing (e.g., collecting data, that includes visual data, e.g., pixel data, sound data, electromagnetic data, nonvisible spectrum data, and the like) that includes one or more images (e.g., graphical representations of things, e.g., that are composed of pixels or other electronic data, or that are captured by an image sensor, e.g., a CCM or a CMOS sensor), through use of an array (e.g., any grouping configured to work together in unison, regardless of arrangement, symmetry, or appearance) of more than one image sensor (e.g., a device, component, or collection of components configured to collect light, sound, or other electromagnetic spectrum data, and/or to convert the collected into digital data, or perform at least a portion of the foregoing actions).

Referring again to FIG. 10, operation 1000 may include operation 1004 depicting transmitting the request for the particular image data to an image sensor array that includes more than one image sensor and that is configured to capture the scene that is larger than the requested particular image data. For example, FIG. 2, e.g., FIG. 2B, shows request for particular image data transmitting to an image sensor array module 254 transmitting the request (e.g., data, in any format that indicates a computationally-based request for data, e.g., image data, from any source, whether properly-formed or not, and which may come from a communications network or port, or an input/output port, or from a human or other entity, or any device) for particular image data (e.g., a set of image data, e.g., graphical representations of things, e.g., that are composed of pixels or other electronic data, or that are captured by an image sensor, e.g., a CCM or a CMOS sensor), or other data, such as audio data and other data on the electromagnetic spectrum, e.g., infrared data, microwave data, etc., and which may be some subset of the entire scene that includes some pixel data, whether pre- or post-processing, which may or may not include data from multiple sensors of the array of more than one image sensor) to an image sensor array that includes more than one image sensor (e.g., a device, component, or collection of components configured to collect light, sound, or other electromagnetic spectrum data, and/or to convert the collected into digital data, or perform at least a portion of the foregoing actions) and that is configured to capture the scene (e.g., the data, e.g., image data or otherwise (e.g., sound, electromagnetic, captured by the array of more than one image sensor, which may be or may be capable of being combined or stitched together, at any stage of processing, pre, or post)), captured by the array of more than one image sensor, combined or stitched together, at any stage of processing, pre, or post), that is larger (e.g., some objectively measurable feature has a higher or greater value, e.g., size, resolution, color, color depth, pixel data granularity, number of colors, hue, saturation, alpha value, shading) than the requested particular image data.

Referring again to FIG. 10, operation 1000 may include operation 1006 depicting receiving only the particular image data from the image sensor array. For example, FIG. 2 e.g., FIG. 2B shows particular image data from the image sensor array exclusive receiving module 256 receiving only (e.g., not transmitting the parts of the scene that are not part of the selected particular portion) the particular image data (e.g., the designated pixel data that was transmitted from the image sensor array) from the image sensor array (e.g., a set of one or more image sensors that are grouped together, whether spatially grouped or linked electronically or through a network, in any arrangement or configuration, whether contiguous or noncontiguous, and whether in a pattern or not, and which image sensors may or may not be uniform throughout the array).

Referring again to FIG. 10, operation 1000 may include operation 1008 depicting transmitting the received particular image data to at least one requestor. For example, FIG. 2, e.g., FIG. 2B, shows received particular image data transmitting to at least one requestor module 258 transmitting the received particular image data (e.g., at least partially, but not solely, the designated pixel data that was transmitted from the image sensor array, which data may be modified, added to, subtracted from, or changed, as will be discussed herein) to at least one requestor (the particular image data may be separated into requested data and sent to the requesting entity that requested the data, whether that requesting entity is a device, person, artificial intelligence, or part of a computer routine or system, or the like).

FIGS. 11A-11G depict various implementations of operation 1002, depicting acquiring a request for particular image data that is part of a scene according to embodiments. Referring now to FIG. 11A, operation 1002 may include operation 1102 depicting acquiring the request for particular image data of the scene that includes one or more images. For example, FIG. 6, e.g., FIG. 6A shows request for particular image data that is part of a scene and includes one or more images acquiring module 602 acquiring (e.g., receiving, e.g., from a device that requested an image, that is any device or set of devices capable of displaying, storing, analyzing, or operating upon an image, e.g., television, computer, laptop, smartphone, etc., e.g., or from an entity that requested an image, e.g., a person, an automated monitoring system, an artificial intelligence, an intelligence amplification (e.g., a computer designed to watch for persons appearing on video or still shots), a request (e.g., data, in any format that requests an image) for particular image data of the scene that includes one or more images (e.g., the scene, e.g., a street corner, includes one or more images, e.g., images of a wristwatch worn by a person crossing the street corner, images of the building on the street corner, etc.).

Referring again to FIG. 11A, operation 1002 may include operation 1104 depicting receiving the request for particular image data of the scene. For example, FIG. 6, e.g., FIG. 6A, shows request for particular image data that is part of a scene receiving module 604 receiving (e.g., from a device, e.g., a user's personal laptop device) the request for particular image data (e.g., a particular player from a game) of the scene (e.g., the portions of the game that are captured by the image sensor array).

Referring again to FIG. 11A, operation 1104 may include operation 1106 depicting receiving the request for particular image data of the scene from a user device. For example, FIG. 6, e.g., FIG. 6A, shows request for particular image data that is part of a scene receiving from a client device module 606 receiving (e.g., receiving a call from an API that is accessing a remote server that sends commands to the image sensor array) the request for particular image data (e.g., a still shot of an area outside a building where any movement has been detected, e.g., a security camera shot) of the scene from a user device (e.g., the API that was downloaded by an independent user is running on that user's device).

Referring again to FIG. 11A, operation 1106 may include operation 1108 depicting receiving the request for particular image data of the scene from a user device that is configured to display at least a portion of the scene. For example, FIG. 6, e.g., FIG. 6A, shows request for particular image data that is part of a scene receiving from a client device configured to display at least a portion of the scene module 608 receiving the request for particular image data (e.g., image data of a particular animal) of the scene (e.g., image data that includes the sounds and video from an animal oasis) from a user device (e.g., a smart television) that is configured to display at least a portion of the scene (e.g., the data captured by an image sensor array of the animal oasis).

Referring again to FIG. 11A, operation 1108 may include operation 1110 depicting receiving the request for particular image data of the scene from a user device that is configured to display at least a portion of the scene in a viewfinder. For example, FIG. 6, e.g., FIG. 6A, shows request for particular image data that is part of a scene receiving from a client device configured to display at least a portion of the scene in a viewfinder module 610 receiving the request for particular image data (e.g., images of St. Peter's Basilica in Rome, Italy) of the scene (e.g., image data captured by the image sensor array of the Vatican) from a user device (e.g., a smartphone device) that is configured to display at least a portion of the scene (e.g., the Basilica, to be displayed on the screen as part of a virtual tourism app running on the smartphone) in a viewfinder (e.g., a screen or set of screens, whether real or virtual, that can display and/or process image data). It is noted that a viewfinder may be remote from where the image is captured.

Referring again to FIG. 11A, operation 1106 may include operation 1112 depicting receiving the request for particular image data of the scene from the user device that is configured to receive a selection of a particular image. For example, FIG. 6, e.g., FIG. 6A, shows request for particular image data that is part of a scene receiving from a client device configured to receive a selection of a particular image module 612 receiving the request for particular image data of the scene from the user device that is configured to receive a selection of a particular image (e.g., the user device, e.g., a computer device, receives an audible command from a user regarding which portion of the scene the user wants to see (e.g., which may involve showing a "demo" version of the scene, e.g., a lower-resolution older version of the scene, for example), and the device receives this selection and then sends the request for the particular image data to the server device.

Referring again to FIG. 11A, operation 1112 may include operation 1114 depicting receiving the request for particular image data of the scene from the user device that is configured to receive the selection of the particular image, said selection based on a view of the scene. For example, FIG. 6, e.g., FIG. 6A, shows request for particular image data that is part of a scene receiving from a client device configured to receive a scene-based selection of a particular image module 614 receiving the request for particular image data of the scene from the user device that is configured to receive the selection of the particular image, said selection based on a view of the scene.

Referring again to FIG. 11A, operation 1112 may include operation 1116 depicting receiving the request for particular image data of the scene from the user receiving the request for particular image data of the scene from the user device that is configured to receive the selection of the particular image, wherein the user device is one or more of a smartphone, television, computer screen, tablet, camera, appliance, and augmented reality device. For example, FIG. 6, e.g., FIG. 6A, shows request for particular image data that is part of a scene receiving from one or more various devices configured to receive a scene-based selection of a particular image module 616 receiving the request for particular image data of the scene from the user receiving the request for particular image data of the scene from the user device that is configured to receive the selection of the particular image, wherein the user device is one or more of a smartphone, television, computer screen, tablet, camera, appliance, and augmented reality device Referring now to FIG. 11B, operation 1002 may include operation 1118 depicting acquiring the request for particular image data of the scene, wherein the scene is the image data collected by the array of more than one image sensor. For example, FIG. 6, e.g., FIG. 6B, shows request for particular image data that is part of a scene that is the image data collected by the array of more than one image sensor acquiring module 618 acquiring the request for particular image data of the scene (e.g., a live street view of a corner in New York City near Madison Square Garden), wherein the scene is the image data (e.g., video and audio data) collected by the array of more than one image sensor (e.g., a set of twenty-five ten-megapixel CMOS sensors arranged at an angle to provide a full view).

Referring again to FIG. 11B, operation 1002 may include operation 1120 depicting acquiring the request for particular image data of the scene, wherein the scene is a representation of the image data collected by the array of more than one image sensor. For example, FIG. 6, e.g., FIG. 6B, shows request for particular image data that is part of a scene that a representation of the image data collected by the array of more than one image sensor acquiring module 620 acquiring the request for particular image data (e.g., an image of a particular street vendor) of the scene (e.g., a city street in Alexandra, Va.), wherein the scene is a representation (e.g., metadata, e.g., data about the image data, e.g., a sampling, a subset, a description, a retrieval location) of the image data (e.g., the pixel data) collected by the array of more than one image sensor (e.g., one thousand CMOS sensors of two megapixels each, mounted on a UAV).

Referring again to FIG. 11B, operation 1120 may include operation 1122 depicting acquiring the request for particular image data of the scene, wherein the scene is a sampling of the image data collected by the array of more than one image sensor. For example, FIG. 6, e.g., FIG. 6B, shows request for particular image data that is part of a scene that a sampling of the image data collected by the array of more than one image sensor acquiring module 622 acquiring the request for particular image data of the scene, wherein the scene is a sampling (e.g., a subset, selected randomly or through a pattern) of the image data (e.g., an image of a checkout line at a discount store) collected (e.g., gathered, read, stored) by the array of more than one image sensor (e.g., an array of two thirty megapixel sensors angled towards each other).

Referring again to FIG. 11B, operation 1120 may include operation 1124 depicting acquiring the request for particular image data of the scene, wherein the scene is a subset of the image data collected by the array of more than one image sensor. For example, FIG. 6, e.g., FIG. 6B, shows request for particular image data that is part of a scene that is a subset of the image data collected by the array of more than one image sensor acquiring module 624 acquiring the request for particular image data (e.g., a particular object inside of a house, e.g., a refrigerator) of the scene (e.g., an interior of a house), wherein the scene is a subset of the image data (e.g., a half of, or a sampling of the whole, or a selected area of, or only the contrast data, etc.,) collected by the array of more than one image sensor (e.g., a 10×10 grid of three-megapixel image sensors).

Referring again to FIG. 11B, operation 1120 may include operation 1126 depicting acquiring the request for particular image data of the scene, wherein the scene is a low-resolution version of the image data collected by the array of more than one image sensor. For example, FIG. 6, e.g., FIG. 6B, shows request for particular image data that is part of a scene that is a low-resolution version of the image data collected by the array of more than one image sensor acquiring module 626 acquiring the request for particular image data (e.g., an image of a particular car crossing a bridge) of the scene (e.g., a highway bridge), wherein the scene is a low-resolution (e.g., "low" here meaning "less than a possible resolution given the equipment that captured the image") version of the image data collected by the array of more than one image sensor.

Referring now to FIG. 11C, operation 1002 may include operation 1128 depicting acquiring the request for particular image data of a scene that is a football game. For example, FIG. 6, e.g., FIG. 6C, shows request for particular image data that is part of a scene that is a football game acquiring module 628 acquiring the request for particular image data of a scene that is a football game.

Referring again to FIG. 11C, operation 1002 may include operation 1130 depicting acquiring the request for particular image data of a scene that is a street view of an area. For example, FIG. 6, e.g., FIG. 6C, shows request for particular image data that is part of a scene that is an area street view acquiring module 630 acquiring the request for particular image data that is a street view (e.g., a live or short-delayed view) of an area (e.g., a street corner, a garden oasis, a mountaintop, an airport, etc.).

Referring again to FIG. 11C, operation 1002 may include operation 1132 depicting acquiring the request for particular image data of a scene that is a tourist destination. For example, FIG. 6, e.g., FIG. 6C, shows request for particular image data that is part of a scene that is a tourist destination acquiring module 632 acquiring the request for particular image data of a scene that is a tourist destination (e.g., the great pyramids of Giza).

Referring again to FIG. 11C, operation 1002 may include operation 1134 depicting acquiring the request for particular image data of a scene that is an inside of a home. For example, FIG. 6, e.g., FIG. 6C, shows request for particular image data that is part of a scene that is inside a home acquiring module 634 acquiring the request for particular image data of a scene that is inside of a home (e.g., inside a kitchen).

Referring now to FIG. 11D, operation 1002 may include operation 1136 depicting acquiring the request for particular image data of the scene, wherein the particular image data is an image that is a portion of the scene. For example, FIG. 6, e.g., FIG. 6D, shows request for particular image data that is an image that is a portion of the scene acquiring module 636 acquiring the request for particular image data (e.g., an image of a tiger in a wildlife preserve), wherein the particular image data (e.g., an image of a tiger) that is a portion of the scene (e.g., image data of the wildlife preserve).

Referring again to FIG. 11D, operation 1136 may include operation 1138 depicting acquiring the request for particular image data of the scene, wherein the particular image data includes image data of a particular football player and the scene is a football field. For example, FIG. 6, e.g., FIG. 6D, shows request for particular image data that is an image that is a particular football player and a scene that is a football field acquiring module 638 acquiring the request for particular image data of the scene, wherein the particular image data includes image data of a particular football player and the scene is a football field.

Referring again to FIG. 11D, operation 1136 may include operation 1140 depicting acquiring the request for particular image data of the scene, wherein the particular image data includes image data of a license plate of a vehicle, and the scene is an image representation of a highway bridge. For example, FIG. 6, e.g., FIG. 6D, shows request for particular image data that is an image that is a vehicle license plate and a scene that is a highway bridge acquiring module 640 acquiring the request for particular image data of the scene, wherein the particular image data includes image data of a license plate of a vehicle, and the scene is a highway bridge (e.g., an image of the highway bridge).

Referring now to FIG. 11E, operation 1002 may include operation 1142 depicting acquiring a request for a particular image object located in the scene. For example, FIG. 6, e.g., FIG. 6E, shows request for particular image object located in the scene acquiring module 642 acquiring a request for a particular image object (e.g., a particular type of bird) located in the scene (e.g., a bird sanctuary).

Referring again to FIG. 11E, operation 1002 may include operation 1144, which may appear in conjunction with operation 1142, operation 1144 depicting determining the particular image data of the scene that contains the particular image object. For example, FIG. 6, e.g., FIG. 6E, shows particular image data of the scene that contains the particular image object determining module 644 determining the particular image data (e.g., a 1920×1080 image that contains the particular type of bird) of the scene (e.g., the image of the bird sanctuary) that contains the particular image object (e.g., the particular type of bird).

Referring again to FIG. 11E, operation 1142 may include operation 1146 depicting acquiring a request for a particular person located in the scene. For example, FIG. 6, e.g., FIG. 6E, shows request for particular person located in the scene acquiring module 646 acquiring a request for a particular person (e.g., a person dressed a certain way, or loitering outside of a warehouse, or a particular celebrity or athlete, or a business tracking a specific worker) located in the scene (e.g., an image data).

Referring again to FIG. 11E, operation 1142 may include operation 1148 depicting acquiring a request for a basketball located in the scene that is a basketball arena. For example, FIG. 6, e.g., FIG. 6E, shows request for a basketball located in the scene acquiring module 648 acquiring a request for a basketball (e.g., the image data corresponding to a basketball) located in the scene that is a basketball arena.

Referring again to FIG. 11E, operation 1142 may include operation 1150 depicting acquiring a request for a motor vehicle located in the scene. For example, FIG. 6, e.g., FIG. 6E, shows request for a motor vehicle located in the scene acquiring module 650 acquiring a request for a motor vehicle located in the scene.

Referring again to FIG. 11E, operation 1142 may include operation 1152 depicting acquiring a request for any human object representations located in the scene. For example, FIG. 6, e.g., FIG. 6E, shows request for a human object representation located in the scene acquiring module 652 acquiring a request for any human object representations (e.g., when any image data corresponding to a human walks by, e.g., for a security camera application, or an application that takes an action when a person approaches, e.g., an automated terminal) located in the scene.

Referring again to FIG. 11E, operation 1142 may include operation 1153 depicting determining the particular image data of the scene that contains the particular image object through application of automated pattern recognition to scene image data. For example, FIG. 6, e.g., FIG. 6E, shows particular image data of the scene that contains the particular image object determining through automated pattern recognition application to scene data module 653 determining the particular image data of the scene (e.g., a tennis match) that contains the particular image object (e.g., a tennis player) through application of automated pattern recognition (e.g., recognizing human images through machine recognition, e.g., shape-based classification, head-shoulder detection, motion-based detection, and component-based detection) to scene image data.

Referring again to FIG. 11E, operation 1144 may include operation 1154 depicting determining the particular image data of the scene that contains the particular image object through identification of the particular image object in previous scene data that is image data of the scene from at least one previous moment in time. For example, FIG. 6, e.g., FIG. 6E, shows particular image data of the scene that contains the particular image object determining through object identification in previous scene data module 654 determining the particular image data of the scene that contains the particular image object through identification of the particular image object in previous scene data that is image data of the scene from at least one previous moment in time.

Referring again to FIG. 11E, operation 1144 may include operation 1156 depicting determining the particular image data of the scene that contains the particular image object through identification of the particular image object in cached scene data. For example, FIG. 6, e.g., FIG. 6E, shows particular image data of the scene that contains the particular image object determining through object identification in cached previous scene data module 656

Referring again to FIG. 11E, operation 1156 may include operation 1158 depicting determining the particular image data of the scene that contains the particular image object through identification of the particular image object in cached scene data that was previously transmitted from the image sensor array that includes more than one image sensor. For example, FIG. 6, e.g., FIG. 6E, shows particular image data of the scene that contains the particular image object determining through object identification in cached previous scene data previously transmitted from the image sensor array module 658 determining the particular image data of the scene that contains the particular image object (e.g., a particular landmark, or animal at a watering hole) through identification of the particular image object (e.g., a lion at a watering hole) in cached scene data that was previously transmitted from the image sensor array (e.g., a set of twenty five image sensors) that includes more than one image sensor (e.g., a three megapixel CMOS sensor).

Referring again to FIG. 11E, operation 1156 may include operation 1160 depicting determining the particular image data of the scene that contains the particular image object through identification of the particular image object in cached scene data that was previously transmitted from the image sensor array that includes more than one image sensor at a time when bandwidth was available for a connection to the image sensor array that includes more than one image sensor. For example, FIG. 6, e.g., FIG. 6E, shows particular image data of the scene that contains the particular image object determining through object identification in cached previous scene data previously transmitted from the image sensor array at a particular time module 660 determining the particular image data of the scene that contains the particular image object (e.g., a specific item in a shopping cart that doesn't match a cash-register generated list of what was purchased by the person wheeling the cart) through identification of the particular image object (e.g., the specific item, e.g., a toaster oven) in cached scene data (e.g., data that is stored in the server that was from a previous point in time, whether one-millionth of a second previously or years previously, although in the example the cached scene data is from a previous frame, e.g., less than one second prior) that was previously transmitted from the image sensor array that includes more than one image sensor at a time when bandwidth was available for connection to the image sensor array that includes more than one image sensor.

Referring now to FIG. 11F, operation 1002 may include operation 1162 depicting receiving a first request for first particular image data from the scene from a first requestor. For example, FIG. 6, e.g., FIG. 6F, shows first request for first particular image data from a first requestor receiving module 662 receiving a first request (e.g., a request for a 1920×180 "HD" view) for first particular image data (e.g., a first animal, e.g., a tiger, at a watering hole scene) from the scene (e.g., a watering hole) from a first requestor (e.g., a family watching the watering hole from an internet-connected television).

Referring again to FIG. 11F, operation 1002 may include operation 1164, which may appear in conjunction with operation 1162, operation 1164 depicting receiving a second request for second particular image data from the scene from a second requestor that is different than the first requestor. For example, FIG. 6, e.g., FIG. 6F, shows second request for first particular image data from a different second requestor receiving module receiving a second request (e.g., a 640× 480 view for a smartphone) for second particular image data (e.g., a second animal, e.g., a pelican) from the scene (e.g., a watering hole) from a second requestor (e.g., a person watching a stream of the watering hole on their smartphone).

Referring again to FIG. 11F, operation 1002 may include operation 1166 depicting combining a received first request for first particular image data from the scene and a received second request for second particular image data from the scene. For example, FIG. 6, e.g., FIG. 6F, shows first received request for first particular image data and second received request for second particular image data combining module 666 combining a received first request for first particular image data (e.g., a request to watch a running back of a football team) from the scene and a received second request for second particular image data (e.g., a request to watch a quarterback of the same football team) from the scene (e.g., a football game).

Referring again to FIG. 11F, operation 1166 may include operation 1168 depicting combining the received first request for first particular image data from the scene and the received second request for second particular image data from the scene into the request for particular image data that consolidates overlapping requested image data. For example, FIG. 6, e.g., FIG. 6F, shows first received request for first particular image data and second received request for second particular image data combining into the request for particular image data module 668 combining the received first request for first particular image data (e.g., request from device 502A, as shown in FIG. 5B) from the scene and the received second request for second particular image data (e.g., the request from device 502B, as shown in FIG. 5B) from the scene into the request for particular image data that consolidates overlapping requested image data (e.g., the selected pixels 574, as shown in FIG. 5B).

Referring again to FIG. 11F, operation 1166 may include operation 1170 depicting receiving a first request for first particular image data from the scene and a second request for second particular image data from the scene. For example, FIG. 6, e.g., FIG. 6F, shows first request for first particular image data and second request for second particular image data receiving module 670 receiving a first request for first particular image data (e.g., image data of a particular street corner from a street view) from the scene (e.g., a live street view of DoG street in Alexandria, Va.) and a second request for second particular image data (e.g., image data of the opposite corner of the live street view) from the scene (e.g., the live street view of DoG street in Alexandria, Va.).

Referring again to FIG. 11F, operation 1002 may include operation 1172, which may appear in conjunction with operation 1170, operation 1172 depicting combining the received first request and the received second request into the request for particular image data. For example, FIG. 6, e.g., FIG. 6F, shows received first request and received second request combining module 672 combining the received first request (e.g., a 1920×1080 request for a virtual tourism view of the Sphinx) and the received second request (e.g., a 410×210 request for a virtual tourism view of an overlapping, but different part of the Sphinx) into the request for particular image data (e.g., the request that will be sent to the image sensor array that regards which pixels will be kept).

Referring again to FIG. 11F, operation 1172 may include operation 1174 depicting removing common pixel data between the received first request and the received second request. For example, FIG. 6, e.g., FIG. 6F, shows received first request and received second request common pixel deduplicating module 674 removing (e.g., deleting, marking, flagging, erasing, storing in a different format, storing in a different place, coding/compressing using a different algorithm, changing but not necessarily destroying, destroying, allowing to be written over by new data, etc.) common pixel data (e.g., pixel data that was part of more than one request) between the received first request (e.g., a request to view the left fielder of the Washington Nationals from a baseball game) and the received second request (e.g., a request to view the right fielder of the Washington Nationals from a baseball game).

Referring now to FIG. 11G, operation 1002 may include operation 1176 depicting acquiring the request for particular image data that is part of the scene, wherein the particular image data includes video data. For example, FIG. 6, e.g., FIG. 6G, shows request for particular video data that is part of a scene acquiring module 676 acquiring the request for particular image data that is part of the scene, wherein the particular image data includes video data (e.g., streaming data, e.g., as in a live street view of a corner near the Verizon Center in Washington, D.C.).

Referring again to FIG. 11G, operation 1002 may include operation 1178 depicting acquiring the request for particular image data that is part of the scene, wherein the particular image data includes audio data. For example, FIG. 6, e.g., FIG. 6G, shows request for particular audio data that is part of a scene acquiring module 678 acquiring the request for particular image data that is part of the scene, wherein the particular image data includes audio data (e.g., data of the sounds at an oasis, or of people in the image that are speaking).

Referring again to FIG. 11G, operation 1002 may include operation 1180 depicting acquiring the request for particular image data that is part of the scene from a user device that receives the request for particular image data through an audio interface. For example, FIG. 6, e.g., FIG. 6G, shows request for particular image data that is part of a scene receiving from a user device with an audio interface module 680 acquiring the request for particular image data (e.g., to watch a particular person on the field at a football game, e.g., the quarterback) that is part of the scene (e.g., the scene of a football stadium during a game) from a user device (e.g., an internet-connected television) that receives the request for particular image data through an audio interface (e.g., the person speaks to an interface built into the television to instruct the television regarding which player to follow)

Referring again to FIG. 11G, operation 1002 may include operation 1182 depicting acquiring the request for particular image data that is part of the scene from a user device that has a microphone that receives a spoken request for particular image data from the user. For example, FIG. 6, e.g., FIG. 6G, shows request for particular image data that is part of a scene receiving from a microphone-equipped user device with an audio interface module 682 acquiring the request for particular image data (e.g., an image of a cheetah at a jungle oasis) that is part of the scene (e.g., a jungle oasis) from a user device that has a microphone (e.g., a smartphone device) that receives a spoken request (e.g., "zoom in on the cheetah") for particular image data (e.g., an image of a cheetah at a jungle oasis) for particular image data (e.g., an image of a cheetah at a jungle oasis) from the user (e.g., the person operating the smartphone device that wants to zoom in on the cheetah).

FIGS. 12A-12E depict various implementations of operation 1004, depicting transmitting the request for the particular image data to an image sensor array that includes more than one image sensor and that is configured to capture the scene that is larger than the requested particular image data, according to embodiments. Referring now to FIG. 12A, operation 1004 may include operation 1202 depicting transmitting the request for the particular image data of the scene to the image sensor array that includes more than one image sensor and that is configured to capture an image that is larger than the requested image data. For example, FIG. 7, e.g., FIG. 7A, shows request for particular image data transmitting to an image sensor array that includes more than one image sensor and to capture a larger image module 702 transmitting the request for the particular image data of the scene to the image sensor array (e.g., an array of twelve sensors of ten megapixels each) that includes more than one image sensor and that is configured to capture an image that is larger than the requested image data (e.g., the requested image data is 1920×1080 (e.g., roughly 2 million pixels), and the captured area is 12,000,000 pixels, minus overlap).

Referring again to FIG. 12A, operation 1004 may include operation 1204 depicting transmitting the request for the particular image data of the scene to the image sensor array that includes two image sensors arranged side by side and angled toward each other and that is configured to capture an image that is larger than the requested image data. For example, FIG. 7, e.g., FIG. 7A, shows request for particular image data transmitting to an image sensor array module configured to transmit the request to the image sensor array that includes two angled image sensors and that is configured to capture the scene that is larger than the requested particular image data 704 transmitting the request for the particular image data of the scene (e.g., a chemistry lab) to the image sensor array that includes two image sensors arranged side by side and angled toward each other and that is configured to capture an image that is larger than the requested image data (e.g., the requested image is a zoomed-out view of the lab that can be expressed in 1.7 million pixels, but the cameras capture 10.5 million pixels).

Referring again to FIG. 12A, operation 1004 may include operation 1206 depicting transmitting the request for the particular image data of the scene to the image sensor array that includes the array of image sensors arranged in a grid and that is configured to capture an image that is larger than the requested image data. For example, FIG. 7, e.g., FIG. 7A, shows request for particular image data transmitting to an image sensor array module configured to transmit the request to the image sensor array that includes more than one image sensor arranged in a grid and that is configured to capture the scene that is larger than the requested particular image data 706 transmitting the request for the particular image data of the scene to the image sensor array that includes the array of image sensors arranged in a grid and that is configured to capture an image that is larger than the requested image data (e.g., the image data requested is of a smaller area (e.g., the area around a football player) than the image (e.g., the entire football field)).

Referring again to FIG. 12A, operation 1004 may include operation 1208 depicting transmitting the request for the particular image data of the scene to the image sensor array that includes the array of image sensors arranged in a line such that a field of view is greater than 120 degrees and that is configured to capture an image that is larger than the requested image data. For example, FIG. 7, e.g., FIG. 7A, shows request for particular image data transmitting to an image sensor array module configured to transmit the request to the image sensor array that includes more than one image sensor arranged in a line and that is configured to capture the scene that is larger than the requested particular image data 708 transmitting the request for the particular image data of the scene to the image sensor array that includes the array of image sensors arranged in a line such that a field of view is greater than 120 degrees and that is configured to capture an image (e.g., an image of a highway) that is larger than the requested image data (e.g., an image of one or more of the cars on the highway).

Referring again to FIG. 12A, operation 1004 may include operation 1210 depicting transmitting the request for the particular image data of the scene to the image sensor array that includes a grouping of nonlinearly, nonsequentially arranged stationary image sensors and that is configured to capture an image that is larger than the requested image data. For example, FIG. 7, e.g., FIG. 7A, shows request for particular image data transmitting to an image sensor array module configured to transmit the request to the image sensor array that includes more than one nonlinearly arranged stationary image sensor and that is configured to capture the scene that is larger than the requested particular image data 710 transmitting the request for the particular image data of the scene to the image sensor array that includes a grouping of nonlinearly, nonsequentially arranged stationary image sensors (e.g., five-megapixel CCD sensors) and that is configured to capture an image that is larger than the requested image data.

Referring now to FIG. 12B, operation 1004 may include operation 1212 depicting transmitting the request for the particular image data of the scene to the image sensor array that includes the array of static image sensors and that is configured to capture an image that is larger than the requested image data. For example, FIG. 7, e.g., FIG. 7B, shows request for particular image data transmitting to an image sensor array that includes an array of static image sensors module 712 transmitting the request for the particular image data of the scene to the image sensor array that includes the array of static image sensors and that is configured to capture an image that is larger than the requested image data.

Referring again to FIG. 12B, operation 1212 may include operation 1214 depicting transmitting the request for the particular image data of the scene to the image sensor array that includes the array of image sensors that have a fixed focal length and a fixed field of view and that is configured to capture an image that is larger than the requested image data. For example, FIG. 7, e.g., FIG. 7B, shows request for particular image data transmitting to an image sensor array that includes an array of static image sensors that have fixed focal length and fixed field of view module 714 transmitting the request for the particular image data (e.g., an image of a black bear) of the scene (e.g., a mountain watering hole) to the image sensor array that includes the array of image sensors (e.g., twenty-five megapixel CMOS sensors) that have a fixed focal length and a fixed field of view and that is configured to capture an image that is larger than the requested image data (e.g., the image requested is ultra high resolution but represents a smaller area than what is captured in the scene).

Referring again to FIG. 12B, operation 1004 may include operation 1216 depicting transmitting the request for the particular image data of the scene to the image sensor array that includes the array of image sensors mounted on a movable platform and that is configured to capture the scene that is larger than the requested image data. For example, FIG. 7, e.g., FIG. 7B, shows request for particular image data transmitting to an image sensor array that includes an array of image sensors mounted on a movable platform module 716 transmitting the request for the particular image data of the scene to the image sensor array that includes the array of image sensors mounted on a movable platform (e.g., a movable dish, or a UAV) and that is configured to capture the scene (e.g., the scene is a wide angle view of a city) that is larger than the requested image data (e.g., one building or street corner of the city).

Referring again to FIG. 12B, operation 1004 may include operation 1218 depicting transmitting the request for the particular image data of the scene to the image sensor array that includes more than one image sensor and that is configured to capture the scene that represents more image data than the requested particular image data. For example, FIG. 7, e.g., FIG. 7B, shows request for particular image data transmitting to an image sensor array module configured to transmit the request to the image sensor array that includes more than one image sensor and that is configured to capture the scene that represents more data than the requested particular image data 718 transmitting the request for the particular image data of the scene to the image sensor array that includes more than one image sensor and that is configured to capture the scene that represents more image data than the requested particular data.

Referring again to FIG. 12B, operation 1218 may include operation 1220 depicting transmitting the request for the particular image data of the scene to the image sensor array that includes more than one image sensor and that is configured to capture the scene that represents more than ten times as much image data as the requested particular image data. For example, FIG. 7, e.g., FIG. 7B, shows request for particular image data transmitting to an image sensor array module configured to transmit the request to the image sensor array that includes more than one image sensor and that is configured to capture the scene that represents ten times as much data as the requested particular image data 720 transmitting the request for the particular image data of the scene to the image sensor array that includes more than one image sensor and that is configured to capture the scene that represents more than ten times (e.g., twenty million pixels) as much image data as the requested particular image data (e.g., 1.8 million pixels).

Referring again to FIG. 12B, operation 1218 may include operation 1222 depicting transmitting the request for the particular image data of the scene to the image sensor array that includes more than one image sensor and that is configured to capture the scene that represents more than one hundred times as much image data as the requested particular image data. For example, FIG. 7, e.g., FIG. 7B, shows request for particular image data transmitting to an image sensor array module configured to transmit the request to the image sensor array that includes more than one image sensor and that is configured to capture the scene that represents more than one hundred times as much data as the requested particular image data 722 transmitting the request for the particular image data (e.g., a 1920×1080 image of a red truck crossing a bridge) of the scene (e.g., a highway bridge) to the image sensor array (e.g., a set of one hundred sensors) that includes more than one image sensor (e.g., twenty sensors each of two megapixel, four megapixel, six megapixel, eight megapixel, and ten megapixel) and that is configured to capture the scene that represents more than one hundred times (e.g., 600 million pixels vs. the requested two million pixels) as much image data as the requested particular image data.

Referring again to FIG. 12B, operation 1004 may include operation 1224 depicting transmitting the request for the particular image data to the image sensor array that is configured to capture the scene that represents a greater field of view than the requested particular image data. For example, FIG. 7, e.g., FIG. 7B, shows request for particular image data transmitting to an image sensor array module configured to transmit the request to the image sensor array that includes more than one image sensor and that is configured to capture the scene that represents a greater field of view than the requested particular image data 724 transmitting the request for the particular image data (e.g., an image of a bakery shop on a corner) to the image sensor array that is configured to capture the scene (e.g., a live street view of a busy street corner) that represents a greater field of view (e.g., the entire corner) than the requested image data (e.g., just the bakery).

Referring now to FIG. 12C, operation 1004 may include operation 1226 modifying the request for the particular image data. For example, FIG. 7, e.g., FIG. 7C, shows request for particular image data modifying module 726 modifying (e.g., altering, changing, adding to, subtracting from, deleting, supplementing, changing the form of, changing an attribute of, etc.) the request for the particular image data (e.g., a request for an image of a baseball player).

Referring again to FIG. 12C, operation 1004 may include operation 1228, which may appear in conjunction with operation 1226, operation 1228 depicting transmitting the modified request for the particular image data to the image sensor array that includes more than one image sensor and that is configured to capture the scene that is larger than the requested particular image data. For example, FIG. 7, e.g., FIG. 7C, shows modified request for particular image data transmitting to an image sensor array module 728 transmitting the modified request (e.g., the request increases the area around the baseball player that was requested) for the particular image data to the image sensor array that includes more than one image sensor and that is configured to capture the scene (e.g., a baseball game at a baseball stadium) that is larger than the requested particular image data.

Referring again to FIG. 12C, operation 1226 may include operation 1230 depicting removing designated image data from the request for the particular image data. For example, FIG. 7, e.g., FIG. 7C, shows designated image data removing from request for particular image data module 730 removing designated image data (e.g., image data of a static object that has already been captured and stored in memory, e.g., a building from a live street view, or a car that has not moved since the last request) from the request for the particular image data (e.g., a request to see a part of the live street view).

Referring again to FIG. 12C, operation 1230 may include operation 1232 depicting removing designated image data from the request for the particular image data based on previously stored image data. For example, FIG. 7, e.g., FIG. 7C, shows designated image data removing from request for particular image data based on previously stored image data module 732 removing designated image data (e.g., image data of a static object that has already been captured and stored in memory, e.g., a building from a live street view, or a car that has not moved since the last request) from the request for the particular image data (e.g., a request to see a part of the live street view) based on previously stored image data (e.g., the most previously requested image has the car in it already, and so it will not be checked again for another sixty frames of captured image data, for example).

Referring again to FIG. 12C, operation 1232 may include operation 1234 depicting removing designated image data from the request for the particular image data based on previously stored image data retrieved from the image sensor array. For example, FIG. 7, e.g., FIG. 7C, shows designated image data removing from request for particular image data based on previously stored image data retrieved from the image sensor array module 734 removing designated image data from the request for the particular image data based on previously stored image data retrieved from the image sensor array (e.g., the image sensor array sent the older version of the data that included a static object, e.g., a part of a bridge when the scene is a highway bridge, and so the request for the scene that includes part of the bridge, the part of the bridge that is static is removed).

Referring again to FIG. 12C, operation 1232 may include operation 1236 depicting removing designated image data from the request for the particular image data based on previously stored image data that is an earlier-in-time version of the designated image data. For example, FIG. 7, e.g., FIG. 7C, shows designated image data removing from request for particular image data based on previously stored image data that is an earlier-in-time version of the designated image data module 736 removing designated image data (e.g., portions of a stadium) from the request for the particular image data (e.g., a request to view a player inside a stadium for a game) based on previously stored image data (e.g., image data of the stadium) that is an earlier-in-time version of the designated image data (e.g., the image data of the stadium from one hour previous, or from one frame previous).

Referring again to FIG. 12C, operation 1236 may include operation 1238 depicting removing image data of one or more static objects from the request for the particular image data that is a view of a street, based on previously stored image data of the one or more static objects from an earlier-in-time version captured by the image sensor array. For example, FIG. 7, e.g., FIG. 7C, shows designated image data removing from request for particular image data based on previously stored image data that is an earlier-in-time version of the designated image data that is a static object module 738 removing image data of one or more static objects from the request for the particular image data that is a view of a street, based on previously stored image data of the one or more static objects from an earlier-in-time version captured by the image sensor array.

Referring now to FIG. 12D, operation 1226 may include operation 1240 depicting removing portions of the request for the particular image data through pixel interpolation or extrapolation of portions of the request for the particular image data. For example, FIG. 7, e.g., FIG. 7D, shows designated image data removing from request for particular image data based on pixel data interpolation/extrapolation module 740 removing portions of the request for the particular image data (e.g., portions of a uniform building) through pixel interpolation (e.g., filling in the middle of the building based on extrapolation of a known pattern of the building) of portions of the request for the particular image data (e.g., a request for a live street view that includes a building).

Referring again to FIG. 12D, operation 1240 may include operation 1242 depicting removing one or more static objects from the request for the particular image data through pixel interpolation of the portions of the request for the particular image data. For example, FIG. 7, e.g., FIG. 7D, shows designated image data corresponding to one or more static image objects removing from request for particular image data based on pixel data interpolation/extrapolation module 742 removing one or more static objects (e.g., a brick of a pyramid) through pixel interpolation (e.g., filling in the middle of the pyramid based on extrapolation of a known pattern of the pyramid) of portions of the request for the particular image data (e.g., a request for a live street view that includes a building).

Referring again to FIG. 12D, operation 1226 may include operation 1244 depicting identifying at least one portion of the request for the particular image data that is already stored in a memory. For example, FIG. 7, e.g., FIG. 7D, shows portion of the request for particular image data that was previously stored in memory identifying module 744 identifying at least one portion of the request for the particular image data (e.g., a request for a virtual tourism exhibit of which a part has been cached in memory from a previous access) that is already stored in a memory (e.g., a memory of the server device, e.g., memory 245).

Referring again to FIG. 12D, operation 1226 may include operation 1246, which may appear in conjunction with operation 1244, operation 1246 depicting removing the identified portion of the request for the particular image data. For example, FIG. 7, e.g., FIG. 7D, shows identified portion of the request for the particular image data removing module 746 removing the identified portion of the request for the particular image data (e.g., removing the part of the request that requests the image data that is already stored in a memory of the server).

Referring again to FIG. 12D, operation 1226 may include operation 1248 depicting identifying at least one portion of the request for particular image data that was previously captured by the image sensor array. For example, FIG. 7, e.g., FIG. 7D, shows portion of the request for the particular image data that was previously captured by the image sensor array identifying module 748 identifying at least one portion of the request for particular image data that was previously captured by the image sensor array (e.g., an array of twenty-five two megapixel CMOS sensors).

Referring again to FIG. 12D, operation 1226 may include operation 1250 depicting identifying one or more static objects of the request for particular image data that was previously captured by the image sensor array. For example, FIG. 7, e.g., FIG. 7D, shows portion of the request for the particular image data that includes at least one static image object that was previously captured by the image sensor array identifying module 750 identifying one or more static objects (e.g., buildings, roads, trees, etc.) of the request for particular image data (e.g., image data of a part of a rural town) that was previously captured by the image sensor array.

Referring again to FIG. 12D, operation 1250 may include operation 1252 depicting identifying one or more natural rock outcroppings of the request for particular image data that was previously captured by the image sensor array. For example, FIG. 7, e.g., FIG. 7D, shows portion of the request for the particular image data that includes at least one static image object of a rock outcropping that was previously captured by the image sensor array identifying module 752 identifying one or more natural rock outcroppings of the request for particular image data that was previously captured by the image sensor array (e.g., an array of twenty-five two megapixel CMOS sensors).

Referring now to FIG. 12E, operation 1004 may include operation 1254 depicting determining a size of the request for the particular image data. For example, FIG. 7, e.g., FIG. 7E, shows size of request for particular image data determining module 754 determining a size (e.g., a number of pixels, or a transmission speed, or a number of frames per second) of the request for the particular image data (e.g., data of a lion at a jungle oasis).

Referring again to FIG. 12E, operation 1004 may include operation 1256, which may appear in conjunction with operation 1254, operation 1256 depicting transmitting the request for the particular image data for which the size has been determined to the image sensor array that is configured to capture the scene. For example, FIG. 7, e.g., FIG. 7E, shows determined-size request for particular image data transmitting to the image sensor array module 756 transmitting the request for the particular image data for which the size has been determined to the image sensor array that is configured to capture the scene (e.g., a scene of an interior of a home).

Referring again to FIG. 12E, operation 1254 may include operation 1258 depicting determining the size of the request for the particular image data at least partially based on a property of a user device that requested at least a portion of the particular image data. For example, FIG. 7, e.g., FIG. 7E, shows size of request for particular image determining at least partially based on user device property module 758 determining the size (e.g., the horizontal and vertical resolutions, e.g., 1920×1080) of the request for the particular image data at least partially based on a property of a user device that requested at least a portion of the particular image data.

Referring again to FIG. 12E, operation 1258 may include operation 1260 depicting determining the size of the request for the particular image data at least partially based on a resolution of the user device that requested the particular image data. For example, FIG. 7, e.g., FIG. 7E, shows size of request for particular image determining at least partially based on user device resolution module 760 determining the size of the request for the particular image data at least partially based on a resolution of the user device that requested the particular image data.

Referring again to FIG. 12E, operation 1254 may include operation 1262 depicting determining the size of the request for the particular image data at least partially based on a device access level of a user device that requested at least a portion of the particular image data. For example, FIG. 7, e.g., FIG. 7E, shows size of request for particular image determining at least partially based on user device access level module 762 determining the size of the request for the particular image data at least partially based on a device access level of a user device that requested at least a portion of the particular image data (e.g., whether the user has paid for the service, or what level of service the user has subscribed to, or whether other "superusers" are present that demand higher bandwidth and receive priority in receiving images).

Referring again to FIG. 12E, operation 1254 may include operation 1264 depicting determining the size of the request for the particular image data at least partially based on an available amount of bandwidth for communication with the image sensor array. For example, FIG. 7, e.g., FIG. 7E, shows size of request for particular image determining at least partially based on available bandwidth module 764 determining the size of the request for the particular image data at least partially based on an available amount of bandwidth for communication with the image sensor array (e.g., a set of twenty-five image sensors lined on each face of a twenty-five sided polygonal structure)

Referring again to FIG. 12E, operation 1254 may include operation 1266 depicting determining the size of the request for the particular image data at least partially based on an amount of time that a user device that requested at least a portion of the particular image data has requested image data. For example, FIG. 7, e.g., FIG. 7E, shows size of request for particular image determining at least partially based on device usage time module 766 determining the size of the request for the particular image data at least partially based on an amount of time that a user device that requested at least a portion of the particular image data has requested image data (e.g., devices that have waited longer may get preference; or, once a device has been sent a requested image, that device may move to the back of a queue for image data requests).

Referring again to FIG. 12E, operation 1254 may include operation 1268 depicting determining the size of the request for the particular image data at least partially based on an available amount of bandwidth for communication with a user device that requested at least a portion of the particular image data. For example, FIG. 7, e.g., FIG. 7E, shows size of request for particular image determining at least partially based on device available bandwidth module 768 determining the size of the request for the particular image data at least partially based on an available amount of bandwidth for communication with a user device that requested at least a portion of the particular image data (e.g., based on a connection between the user device and the server, e.g., if the bandwidth to the user device is a limiting factor, that may be taken into account and used in setting the size of the request for the particular image data).

FIGS. 13A-13C depict various implementations of operation 1006, depicting receiving only the particular image data from the image sensor array, according to embodiments. Referring now to FIG. 13A, operation 1006 may include operation 1302 depicting receiving only the particular image data from the image sensor array, wherein data from the scene other than the particular image data is discarded. For example, FIG. 8, e.g., FIG. 8A, shows particular image data from the image sensor array in which other image data is discarded receiving module 802 receiving only the particular image data from the image sensor array, wherein data from the scene other than the particular image data is discarded (e.g., the data may be stored, at least temporarily, but is not stored in a place where overwriting will be prevented, as in a persistent memory).

Referring again to FIG. 13A, operation 1006 may include operation 1304 depicting receiving only the particular image data from the image sensor array, wherein data from the scene other than the particular image data is stored at the image sensor array. For example, FIG. 8, e.g., FIG. 8A, shows particular image data from the image sensor array in which other image data is stored at the image sensor array receiving module 804 receiving only the particular image data (e.g., an image of a polar bear and a penguin) from the image sensor array (e.g., twenty five CMOS sensors), wherein data from the scene (e.g., an Antarctic ice floe) other than the particular image data is stored at the image sensor array (e.g., a grouping of twenty-five CMOS sensors).

Referring again to FIG. 13A, operation 1006 may include operation 1306 depicting receiving the particular image data from the image sensor array in near-real time. For example, FIG. 8, e.g., FIG. 8A, shows particular image data from the image sensor array exclusive near-real-time receiving module 806 receiving the particular image data from the image sensor array in near-real time (e.g., not necessarily as something is happening, but near enough to give an appearance of real-time).

Referring now to FIG. 13B, operation 1006 may include operation 1308 depicting receiving the particular image data from the image sensor array in near-real time. For example, FIG. 8, e.g., FIG. 8B, shows particular image data from the image sensor array exclusive near-real-time receiving module 808 receiving the particular image data from the image sensor array in near real time receiving the particular image data (e.g., an image of a person walking across a street captured in a live street view setting) from the image sensor array (e.g., two hundred ten-megapixel sensors) in near-real time.

Referring again to FIG. 13B, operation 1006 may include operation 1310, which may appear in conjunction with operation 1308, operation 1310 depicting retrieving data from the scene other than the particular image data at a later time. For example, FIG. 8, e.g., FIG. 8B, shows data from the scene other than the particular image data retrieving at a later time module 810 retrieving data from the scene (e.g., a scene of a mountain pass) other than the particular image data (e.g., the data that was not requested—e.g., data that no user requested but that was captured by the image sensor array, but not transmitted to the remote server) at a later time (e.g., at an off-peak time when more bandwidth is available, e.g., fewer users are using the system).

Referring again to FIG. 13B, operation 1310 may include operation 1312 depicting retrieving data from the scene other than the particular image data at a time at which bandwidth is available to the image sensor array. For example, FIG. 8, e.g., FIG. 8B, shows data from the scene other than the particular image data retrieving at a time of available bandwidth module 812 retrieving data from the scene other than the particular image data (e.g., data that was not requested) at a time at which bandwidth is available to the image sensor array (e.g., the image sensor array is not using all of its allotted bandwidth to handle requests for portions of the scene, and has available bandwidth to transmit data that can be retrieved that is other than the requested particular image data).

Referring again to FIG. 13B, operation 1310 may include operation 1314 depicting retrieving data from the scene other than the particular image data at a time at that represents off-peak usage for the image sensor array. For example, FIG. 8, e.g., FIG. 8B, shows data from the scene other than the particular image data retrieving at an off-peak usage time of the image sensor array module 814 retrieving data from the scene other than the particular image data (e.g., data that was not requested) at a time that represents off-peak usage (e.g., the image sensor array may be capturing a city street, so off-peak usage would be at night; or the image sensor array may be a security camera, so off-peak usage may be the middle of the day, or off-peak usage may be flexible based on previous time period analysis, e.g., could also mean any time the image sensor array is not using all of its allotted bandwidth to handle requests for portions of the scene, and has available bandwidth to transmit data that can be retrieved that is other than the requested particular image data) for the image sensor array.

Referring again to FIG. 13B, operation 1310 may include operation 1316 depicting retrieving data from the scene other than the particular image data at a time when no particular image data is requested. For example, FIG. 8, e.g., FIG. 8B, shows data from the scene other than the particular image data retrieving at a time when no particular image data requests are present at the image sensor array module 816 retrieving data from the scene other than the particular image data at a time when no particular image data is requested.

Referring again to FIG. 13B, operation 1310 may include operation 1318 depicting retrieving data from the scene other than the particular image data at time at which fewer users are requesting particular image data than for which the image sensor array has capacity. For example, FIG. 8, e.g., FIG. 8B, shows data from the scene other than the particular image data retrieving at a time of available image sensor array capacity module 818 retrieving data from the scene other than the particular image data at time at which fewer users are requesting particular image data than for which the image sensor array has capacity.

Referring now to FIG. 13C, operation 1006 may include operation 1320 depicting receiving only the particular image data that includes audio data from the sensor array. For example, FIG. 8, e.g., FIG. 8C, shows particular image data that includes audio data from the image sensor array exclusive receiving module 820 receiving only the particular image data (e.g., image data from a watering hole) that includes audio data (e.g., sound data, e.g., as picked up by a microphone) from the sensor array (e.g., the image sensor array may include one or more microphones or other sound-collecting devices, either separately from or linked to image capturing sensors).

Referring again to FIG. 13C, operation 1006 may include operation 1322 depicting receiving only the particular image data that was determined to contain a particular requested image object from the image sensor array. For example, FIG. 8, e.g., FIG. 8C, shows particular image data that was determined to contain a particular requested image object from the image sensor array exclusive receiving module 822 receiving only the particular image data that was determined to contain a particular requested image object (e.g., a particular football player from a football game that is the scene) from the image sensor array.

Referring again to FIG. 13C, operation 1322 may include operation 1324 depicting receiving only the particular image data that was determined to contain a particular requested image object by the image sensor array. For example, FIG. 8, e.g., FIG. 8C, shows particular image data that was determined to contain a particular requested image object by the image sensor array exclusive receiving module 824. receiving only the particular image data that was determined to contain a particular requested image object (e.g., a lion at a watering hole) by the image sensor array (e.g., the image sensor array performs the pattern recognition and identifies the particular image data, which may only have been identified as "the image data that contains the lion," and only that particular image data is transmitted and thus received by the server).

FIGS. 14A-14E depict various implementations of operation 1008, depicting transmitting the received particular image data to at least one requestor, according to embodiments. Referring now to FIG. 14A, operation 1008 may include operation 1402 depicting transmitting the received particular image data to a user device. For example, FIG. 9, e.g., FIG. 9A, shows received particular image data transmitting to at least one user device requestor module 902 transmitting the received particular image data (e.g., an image of a quarterback at a National Football League game) to a user device (e.g., a television connected to the internet).

Referring again to FIG. 14A, operation 1402 may include operation 1404 depicting transmitting at least a portion of the received particular image data to a user device that requested the particular image data. For example, FIG. 9, e.g., FIG. 9A, shows received particular image data transmitting to at least one user device that requested at least a portion of the received particular data requestor module 904 transmitting at least a portion of the received particular image data (e.g., a portion that corresponds to a particular request received from a device, e.g., a request for a particular segment of the scene that shows a lion at a watering hole) to a user device (e.g., a computer device with a CPU and monitor) that requested the particular image data (e.g., the computer device requested the portion of the scene at which the lion is visible).

Referring again to FIG. 14A, operation 1008 may include operation 1406 depicting separating the received particular image data into a set of one or more requested images. For example, FIG. 9, e.g., FIG. 9A, shows separation of the received particular data into set of one or more requested images executing module 906 separating the received particular image data into a set of one or more requested images (e.g., if there were five requests for portions of the scene data, and some of the requests overlapped, the image data may be duplicated and packaged such that each requesting device receives the pixels that were requested).

Referring again to FIG. 14A, operation 1008 may include operation 1408, which may appear in conjunction with operation 1406, operation 1408 depicting transmitting at least one image of the set of one or more requested images to a particular requestor that requested the at least one image. For example, FIG. 9, e.g., FIG. 9A, shows at least one image of the set of one or more requested images transmitting to a particular requestor that requested the one or more images transmitting module 908 transmitting at least one image of the set of one or more requested images to a particular requestor (e.g., a person operating a "virtual camera" that lets the person "see" the scene through the lens of a camera, even though the camera is temporally separated from the image sensor array, possibly by a large distance, because the image is transmitted to the camera).

Referring again to FIG. 14A, operation 1406 may include operation 1410 depicting separating the received particular image data into a first requested image and a second requested image. For example, FIG. 9, e.g., FIG. 9A, shows separation of the received particular data into a first requested image and a second requested image executing module 910 separating the received particular image data (e.g., image data from a jungle oasis) into a first requested image (e.g., an image of a lion) and a second requested image (e.g., an image of a hippopotamus).

Referring again to FIG. 14A, operation 1008 may include operation 1412 depicting transmitting the received particular image data to a user device that requested an image that is part of the received particular image data. For example, FIG. 9, e.g., FIG. 9A, shows received particular image data transmitting to at least one user device that requested image data that is part of the received particular image data module 912 transmitting the received particular image data to a user device that requested an image that is part of the received particular image data.

Referring now to FIG. 14B, operation 1008 may include operation 1414 depicting transmitting a first portion of the received particular image data to a first requestor. For example, FIG. 9, e.g., FIG. 9B, shows first portion of received particular image data transmitting to a first requestor module 914 transmitting a first portion (e.g., a part of an animal oasis that contains a zebra) of the received particular image data (e.g., image data from the oasis that contains a zebra) to a first requestor (e.g., device that requested video feed that is the portion of the oasis that contains the zebra, e.g., a television device).

Referring again to FIG. 14B, operation 1008 may include operation 1416, which may appear in conjunction with operation 1414, operation 1416 depicting transmitting a second portion of the received particular image data to a second requestor. For example, FIG. 9, e.g., FIG. 9B, shows second portion of received particular image data transmitting to a second requestor module 916 transmitting a second portion (e.g., a portion of the oasis that contains birds) of the received particular image data (e.g., image data from the oasis) to a second requestor (e.g., a device that requested the image that is the portion of the oasis that contains birds, e.g., a tablet device).

Referring again to FIG. 14B, operation 1414 may include operation 1418 depicting transmitting the first portion of the received particular image data to the first requestor that requested the first portion of the received particular image data. For example, FIG. 9, e.g., FIG. 9B, shows first portion of received particular image data transmitting to a first requestor that requested the first portion module 918 transmitting the first portion of the received particular image data (e.g., a portion that contains a particular landmark in a virtual tourism setting) to the first requestor that requested the first portion of the received particular image data.

Referring again to FIG. 14B, operation 1418 may include operation 1420 depicting transmitting an image that contains a particular football player to a television device that is configured to display a football game and that requested the image that contains the particular football player. For example, FIG. 9, e.g., FIG. 9B, shows portion of received particular image data that includes a particular football player transmitting to a television device that requested the football player from a football game module 920 transmitting an image that contains a particular football player to a television device that is configured to display a football game and that requested the image that contains the particular football player.

Referring again to FIG. 14B, operation 1416 may include operation 1422 depicting transmitting the second portion of the received particular image data to the second requestor that requested the second portion of the received particular image data. For example, FIG. 9, e.g., FIG. 9B, shows second portion of received particular image data transmitting to the second requestor that requested the second portion module 922 transmitting the second portion of the received particular image data (e.g., the portion of the received particular image data that includes the lion) to the second requestor that requested the second portion of the received particular image data (e.g., a person watching the feed on their television).

Referring again to FIG. 14B, operation 1422 may include operation 1424 depicting transmitting an image that contains a view of a motor vehicle to a tablet device that requested a street view image of a particular corner of a city. For example, FIG. 9, e.g., FIG. 9B, shows portion that contains a view of a motor vehicle transmitting to the second requestor that is a tablet device that requested the view of the motor vehicle module 924 transmitting an image that contains a view of a motor vehicle (e.g., a Honda Accord) to a tablet device that requested a street view image of a particular corner of a city (e.g., Alexandria, Va.).

Referring again to FIG. 14B, operation 1008 may include operation 1426 depicting transmitting at least a portion of the received particular image data without alteration to at least one requestor. For example, FIG. 9, e.g., FIG. 9B, shows received particular image data unaltered transmitting to at least one requestor module 926 transmitting at least a portion of the received particular image data (e.g., an image of animals at an oasis) without alteration (e.g., without altering how the image appears to human eyes, e.g., there may be data manipulation that is not visible) to at least one requestor (e.g., the device that requested the image, e.g., a mobile device).

Referring now to FIG. 14C, operation 1008 may include operation 1428 depicting adding supplemental data to at least a portion of the received particular image data to generate transmission image data. For example, FIG. 9, e.g., FIG. 9C, shows supplemental data addition to at least a portion of the received particular image data to generate transmission image data facilitating module 928 adding supplemental data (e.g., context data, or advertisement data, or processing assistance data, or data regarding how to display or cache the image, whether visible in the image or embedded therein, or otherwise associated with the image) to at least a portion of the received particular image data (e.g., images from an animal watering hole) to generate transmission image data (e.g., image data that will be transmitted to the requestor, e.g., a user of a desktop computer).

Referring again to FIG. 14C, operation 1008 may include operation 1430, which may appear in conjunction with operation 1428, operation 1430 depicting transmitting the generated transmission image data to at least one requestor. For example, FIG. 9, e.g., FIG. 9C, shows generated transmission image data transmitting to at least one requestor module 930 transmitting the generated transmission image data to at least one requestor transmitting the generated transmission image data (e.g., image data of a football player at a football game with statistical data of that football player overlaid in the image) to at least one requestor (e.g., a person watching the game on their mobile tablet device).

Referring again to FIG. 14C, operation 1428 may include operation 1432 depicting adding advertisement data to at least a portion of the received particular image data to generate transmission image data. For example, FIG. 9, e.g., FIG. 9C, shows advertisement data addition to at least a portion of the received particular image data to generate transmission image data facilitating module 932 adding advertisement data (e.g., data for an advertisement for buying tickets to the next soccer game and an advertisement for buying a soccer jersey of the player that is pictured) to at least a portion of the received particular image data (e.g., images of a soccer game and/or players in the soccer game) to generate transmission image data.

Referring again to FIG. 14C, operation 1432 may include operation 1434 depicting adding context-based advertisement data that is at least partially based on the received particular image data to at least the portion of the received particular image data. For example, FIG. 9, e.g., FIG. 9C, shows context-based advertisement data addition to at least a portion of the received particular image data to generate transmission image data facilitating module 934 adding context-based advertisement data (e.g., an ad for travel services to a place that is being viewed in a virtual tourism setting, e.g., the Great Pyramids) that is at least partially based on the received particular image data (e.g., visual image data from the Great Pyramids) to at least the portion of the received particular image data.

Referring again to FIG. 14C, operation 1434 may include operation 1436 depicting adding an animal rights donation fund advertisement data that is at least partially based on the received particular image data of a tiger at a jungle oasis, to the received particular image data of the tiger at the jungle oasis. For example, FIG. 9, e.g., FIG. 9C, shows animal rights donation fund advertisement data addition to at least a portion of the received particular image data that includes a jungle tiger at an oasis to generate transmission image data facilitating module 936 adding an animal rights donation fund advertisement data that is at least partially based on the received particular image data of a tiger at a jungle oasis, to the received particular image data of the tiger at the jungle oasis.

Referring again to FIG. 14C, operation 1428 may include operation 1438 depicting adding related visual data related to the received particular image data to at least a portion of the received particular image data to generate transmission image data. For example, FIG. 9, e.g., FIG. 9C, shows related visual data addition to at least a portion of the received particular image data to generate transmission image data facilitating module 938 adding related visual data (e.g., the name of an animal being shown, or a make and model year of a car being shown, or, if a product is shown in the frame, the name of the website that has it for the cheapest price right now) related to the received particular image data (e.g., an animal, a car, or a product) to at least a portion of the received particular image data to generate transmission image data (e.g., data to be transmitted to the receiving device).

Referring again to FIG. 14C, operation 1438 may include operation 1440 depicting adding fantasy football statistical data to the received particular image data of a football quarterback that appears in the received particular image data of the quarterback in a football game to generate the transmission image data. For example, FIG. 9, e.g., FIG. 9C, shows related fantasy football statistical data addition to at least a portion of the received particular image data of a quarterback data to generate transmission image data facilitating module 940 adding fantasy football statistical data (e.g., passes completed, receptions, rushing yards gained, receiving yards gained, total points scored, player name, etc.) to the received particular image data of a football quarterback that appears in the received particular image data of the quarterback in a football game to generate the transmission image data (e.g., image data that is to be transmitted to the requesting device, e.g., a television).

Referring now to FIG. 14D, operation 1008 may include operation 1442 depicting modifying data of a portion of the received particular image data to generate transmission image data. For example, FIG. 9, e.g., FIG. 9D, shows portion of received particular image data modification to generate transmission image data facilitating module 942 modifying data (e.g., adding to, subtracting from, or changing the data of a characteristic of, e.g., alpha data, color data, saturation data, either on individual bytes or on the image as a whole) of a portion of the received particular image data (e.g., the image data sent from the camera array) to generate transmission image data (e.g., data to be transmitted to the device that requested the data, e.g., a smartphone device).

Referring again to FIG. 14D, operation 1008 may include operation 1444 depicting transmitting at the generated transmission image data to at least one requestor. For example, FIG. 9, e.g., FIG. 9D, shows generated transmission image data transmitting to at least one requestor module 944 transmitting the generated transmission image data (e.g., the image data that was generated by the server device to transmit to the requesting device) to at least one requestor (e.g., the requesting device, e.g., a laptop computer of a family at home running a virtual tourism program in a web page).

Referring again to FIG. 14D, operation 1442 may include operation 1446 depicting performing image manipulation modifications of the received particular image data to generate transmission image data. For example, FIG. 9, e.g., FIG. 9D, shows portion of received particular image data image manipulation modification to generate transmission image data facilitating module 946 performing image manipulation modifications (e.g., editing a feature of a captured image) of the received particular image data (e.g., a live street view of an area with a lot of shading from tall skyscrapers) to generate transmission image data (e.g., the image data to be transmitted to the device that requested the data, e.g., a camera device).

Referring again to FIG. 14D, operation 1446 may include operation 1448 depicting performing contrast balancing on the received particular image data to generate transmission image data. For example, FIG. 9, e.g., FIG. 9D, shows portion of received particular image data contrast balancing modification to generate transmission image data facilitating module 948 performing contrast balancing on the received particular image data (e.g., a live street view of an area with a lot of shading from tall skyscrapers) to generate transmission image data (e.g., the image data to be transmitted to the device that requested the data, e.g., a camera device).

Referring again to FIG. 14D, operation 1446 may include operation 1450 depicting performing color modification balancing on the received particular image data to generate transmission image data. For example, FIG. 9, e.g., FIG. 9D, shows portion of received particular image data color modification balancing to generate transmission image data facilitating module 950 performing color modification balancing on the received particular image data (e.g., an image of a lion at an animal watering hole) to generate transmission image data (e.g., the image data that will be transmitted to the device).

Referring again to FIG. 14D, operation 1442 may include operation 1452 depicting redacting at least a portion of the received particular image data to generate the transmission image data. For example, FIG. 9, e.g., FIG. 9D, shows portion of received particular image data redaction to generate transmission image data facilitating module 952 redacting (e.g., deleting, smoothing over, blurring, performing any sort of image manipulation operation upon, or any other operation designed to obscure any feature of data associated with the tank, including, but not limited to, removing or overwriting the data associated with the tank entirely) at least a portion of the received particular image data to generate the transmission image data (e.g., the image data that will be transmitted to the device or designated for transmission to the device).

Referring again to FIG. 14D, operation 1452 may include operation 1454 depicting redacting at least a portion of the received particular image data based on a security clearance level of the requestor. For example, FIG. 9, e.g., FIG. 9D, shows portion of received particular image data redaction to generate transmission image data based on a security clearance level of the requestor facilitating module 954 redacting (e.g., deleting, smoothing over, blurring, performing any sort of image manipulation operation upon, or any other operation designed to obscure any feature of data associated with the tank, including, but not limited to, removing or overwriting the data associated with the tank entirely) at least a portion of the received particular image data (e.g., the faces of people, or the license plates of cars) based on a security clearance level of the requestor (e.g., a device that requested the image may have a security clearance based on what that device is allowed to view, and if the security clearance level is below a certain threshold, data like license plates and people's faces may be redacted).

Referring again to FIG. 14D, operation 1454 may include operation 1456 depicting redacting a tank from the received particular image data that includes a satellite image that includes a military base, based on an insufficient security clearance level of a device that requested the particular image data. For example, FIG. 9, e.g., FIG. 9D, shows portion of received satellite image data that includes a tank redaction to generate transmission image data based on a security clearance level of the requestor facilitating module 956 redacting (e.g., deleting, smoothing over, blurring, performing any sort of image manipulation operation upon, or any other operation designed to obscure any feature of data associated with the tank, including, but not limited to, removing or overwriting the data associated with the tank entirely) a tank from the received particular image data that includes a satellite image (e.g., the image sensor array that captured the image is at least partially mounted on a satellite) that includes a military base, based on an insufficient security clearance level (e.g., some data indicates that the device does not have a security level sufficient to approve seeing the tank) of a device that requested the particular image data).

Figure 9E:
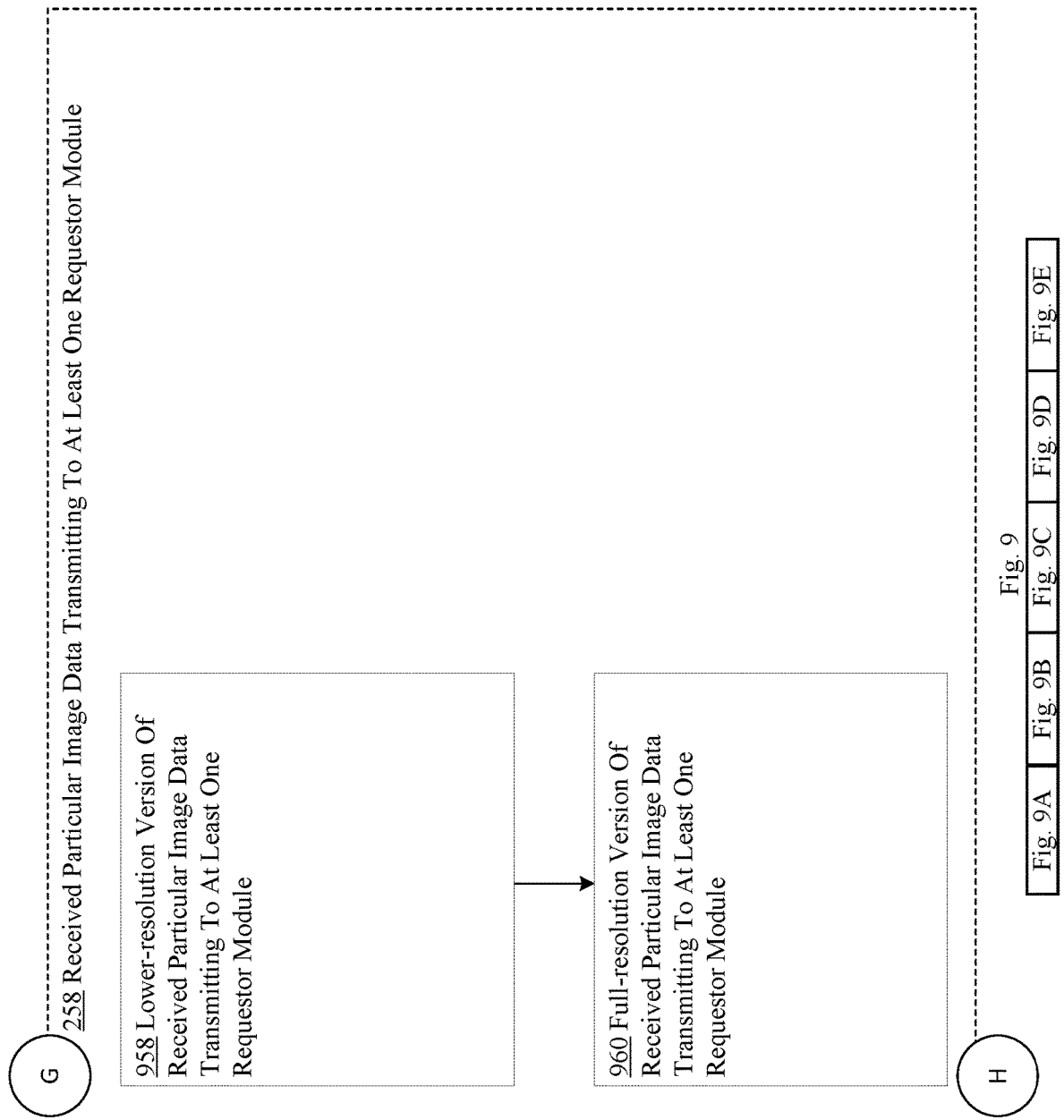

Referring now to FIG. 14E, operation 1008 may include operation 1458 depicting transmitting a lower-resolution version of the received particular image data to the at least one requestor. For example, FIG. 9, e.g., FIG. 9E, shows lower-resolution version of received particular image data transmitting to at least one requestor module 958 transmitting a lower-resolution version (e.g., a version of the image data that is at a lower resolution than what the device that requested the particular image data is capable of displaying) of the received particular image data (e.g., an image of a baseball player at a baseball game) to the at least one requestor (e.g., the device that requested the data).

Referring again to FIG. 14E, operation 1008 may include operation 1460, which may appear in conjunction with operation 1458, operation 1460 depicting transmitting a full-resolution version of the received particular image data to the at least one requestor. For example, FIG. 9, e.g., FIG. 9F, shows full-resolution version of received particular image data transmitting to at least one requestor module 960 transmitting a full-resolution version (e.g., a version that is at a resolution of the device that requested the image) of the received particular image data (e.g., an image of an animal at an animal oasis).

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.)

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.).

It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

With respect to the appended claims, those skilled in the art will appreciate that recited operations therein may generally be performed in any order. Also, although various operational flows are presented in a sequence(s), it should be understood that the various operations may be performed in other orders than those which are illustrated, or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to,"

"related to," or other past-tense adjectives are generally not intended to exclude such variants, unless context dictates otherwise.

This application may make reference to one or more trademarks, e.g., a word, letter, symbol, or device adopted by one manufacturer or merchant and used to identify and/or distinguish his or her product from those of others. Trademark names used herein are set forth in such language that makes clear their identity, that distinguishes them from common descriptive nouns, that have fixed and definite meanings, or, in many if not all cases, are accompanied by other specific identification using terms not covered by trademark. In addition, trademark names used herein have meanings that are well-known and defined in the literature, or do not refer to products or compounds for which knowledge of one or more trade secrets is required in order to divine their meaning. All trademarks referenced in this application are the property of their respective owners, and the appearance of one or more trademarks in this application does not diminish or otherwise adversely affect the validity of the one or more trademarks. All trademarks, registered or unregistered, that appear in this application are assumed to include a proper trademark symbol, e.g., the circle R or bracketed capitalization (e.g., [trademark name]), even when such trademark symbol does not explicitly appear next to the trademark. To the extent a trademark is used in a descriptive manner to refer to a product or process, that trademark should be interpreted to represent the corresponding product or process as of the date of the filing of this patent application.

Throughout this application, the terms "in an embodiment," "in one embodiment," "in an embodiment," "in several embodiments," "in at least one embodiment," "in various embodiments," and the like, may be used. Each of these terms, and all such similar terms should be construed as "in at least one embodiment, and possibly but not necessarily all embodiments," unless explicitly stated otherwise. Specifically, unless explicitly stated otherwise, the intent of phrases like these is to provide non-exclusive and non-limiting examples of implementations of the invention. The mere statement that one, some, or may embodiments include one or more things or have one or more features, does not imply that all embodiments include one or more things or have one or more features, but also does not imply that such embodiments must exist. It is a mere indicator of an example and should not be interpreted otherwise, unless explicitly stated as such.

Those skilled in the art will appreciate that the foregoing specific exemplary processes and/or devices and/or technologies are representative of more general processes and/or devices and/or technologies taught elsewhere herein, such as in the claims filed herewith and/or elsewhere in the present application.

What is claimed is:

1. A device comprising:
   a wireless communication link;
   an image sensor array that includes more than one image sensor and that is configured to capture image data of a scene;
   circuitry configured for transmitting via the wireless communication link a low resolution version of the image data for identifying a target;
   circuitry configured for acquiring via the wireless communication link a request for a selected area that is part of the scene and that is associated with the target, at least partly in response to transmission of the lower resolution version of the image data;
   circuitry configured for selecting at least some of the image data to obtain one or more pixels corresponding to the selected area at a resolution that is higher than the lower resolution; and
   circuitry configured for transmitting via the wireless communication link the at least some of the image data corresponding to the selected area.

2. The device of claim 1, wherein said image sensor array that includes more than one image sensor and that is configured to capture image data of a scene comprises:
   an image sensor array that includes more than one image sensor and that is configured to capture image data of a street scene.

3. The device of claim 1, wherein said circuitry configured for acquiring via the wireless communication link a request for a selected area that is part of the scene and that is associated with the target, at least partly in response to transmission of the lower resolution version of the image data comprises:
   circuitry configured for acquiring via the wireless communication link a request for a selected area of a license plate, at least partly in response to transmission of the lower resolution version of the image data.

4. The device of claim 1, wherein said circuitry configured for acquiring via the wireless communication link a request for a selected area that is part of the scene and that is associated with the target, at least partly in response to transmission of the lower resolution version of the image data comprises:
   circuitry configured for acquiring via the wireless communication link a request for a selected area of an object, at least partly in response to transmission of the lower resolution version of the image data.

5. The device of claim 1, further comprising:
   circuitry configured for determining at least one portion of the scene that contains an object through identification of the object in cached scene data.

6. The device of claim 5, wherein said circuitry configured for determining at least one portion of the scene that contains an object through identification of the object in cached scene data comprises:
   circuitry configured for determining at least one portion of the scene that contains an object through identification of the object in cached scene data that was previously transmitted.

7. The device of claim 1, further comprising:
   circuitry configured for acquiring a second request for an at least partially overlapping area that is part of the scene.

8. The device of claim 1, further comprising:
   circuitry configured for combining the request with at least one other request.

9. The device of claim 8, wherein said circuitry configured for combining the request with at least one other request comprises:
   circuitry configured for combining the request with at least one other request to consolidate one or more overlapping areas.

10. The device of claim 1, further comprising:
    circuitry configured for decimating at least some of the image data in an amount that is at least one hundred times less than the image data.

11. The device of claim 1, further comprising:
    circuitry configured for removing at least some of the image data corresponding to an object.

12. The device of claim 1, further comprising:
circuitry configured for identifying at least one portion of the image data for removal that was previously stored in a memory.

13. The device of claim 1, further comprising:
circuitry configured for discarding at least some of the image data.

14. The device of claim 1, further comprising:
circuitry configured for storing at least some of the image data corresponding to other than the selected area.

15. The device of claim 1, wherein the an image sensor array that includes more than one image sensor and that is configured to capture image data of a scene comprises:
an image sensor array that includes more than one image sensor and that is configured to capture image data of a scene in near-real-time or real-time.

16. The device of claim 1, further comprising:
circuitry configured for transmitting unrequested image data from the scene corresponding to other than the selected area at a time at which bandwidth is available.

17. The device of claim 1, wherein the circuitry configured for transmitting via the wireless communication link the at least some of the image data corresponding to the selected area comprises:
circuitry configured for transmitting via the wireless communication link the at least some of the image data corresponding to the selected area without other image data corresponding to outside the selected area to reduce bandwidth load on the wireless communication link.

18. The device of claim 1, further comprising:
circuitry configured for adding supplemental data to the at least some of the image data corresponding to the selected area.

19. The device of claim 18, wherein said circuitry configured for adding supplemental data to the at least some of the image data corresponding to the selected area comprises:
circuitry configured for adding advertisement data to the at least some of the image data corresponding to the selected area.

20. The device of claim 19, wherein said circuitry configured for adding advertisement data to the at least some of the image data corresponding to the selected area comprises:
circuitry configured for adding context-based advertisement data to the at least some of the image data corresponding to the selected area.

21. The imago device of claim 18, wherein said circuitry configured for adding supplemental data to the at least some of the image data corresponding to the selected area comprises:
circuitry configured for adding supplemental visual data to the at least some of the image data corresponding to the selected area.

22. The imago device of claim 1, further comprising:
circuitry configured for transmitting at least some additional image data from the scene corresponding to other than the selected area.

23. The device of claim 1, further comprising:
circuitry configured for storing at least some static image data to satisfy one or more subsequent requests.

24. The device of claim 1, further comprising:
circuitry configured for transmitting at least some additional image data from the scene corresponding to other than the selected area to reduce latency associated with a subsequent request.

25. The device of claim 1, further comprising:
circuitry configured for transmitting at least some additional image data from the scene at one or more specified intervals.

26. The device of claim 1, further comprising:
circuitry configured for transmitting non-live image data of the scene.

27. The device of claim 1, further comprising:
circuitry configured for trashing unselected image data corresponding to other than the selected area.

28. The imago device of claim 1, further comprising:
circuitry configured for decimating at least some of the one or more pixels corresponding to the selected area based at least partly on a bandwidth capacity of the wireless communication link and/or a screen resolution of a requesting device.

29. The device of claim 1, further comprising:
circuitry configured for comparing the image data of the scene to previously captured image data to identify one or more unchanged pixels.

30. The device of claim 1, wherein the circuitry configured for transmitting via the wireless communication link a low resolution version of the image data for identifying a target comprises:
circuitry configured for transmitting via the wireless communication link a low resolution version of the image data associated with an entirety of the scene for identifying a target.

31. The device of claim 1, wherein the circuitry configured for transmitting via the wireless communication link a low resolution version of the image data for identifying a target comprises:
circuitry configured for transmitting via the wireless communication link a low resolution version of the image data associated with one or more regions surrounding one or more potential targets.

32. The device of claim 1, wherein the circuitry configured for transmitting via the wireless communication link a low resolution version of the image data for identifying a target comprises:
circuitry configured for transmitting via the wireless communication link a plurality of different low resolution versions of the image data for identifying a target.

33. The device of claim 1, wherein the circuitry configured for transmitting via the wireless communication link a low resolution version of the image data for identifying a target comprises:
circuitry configured for transmitting via the wireless communication link a low resolution version of the image data for identifying at least one of the following types of targets: address, person, point-of-interest, or number.

34. The device of claim 1, wherein the circuitry configured for transmitting via the wireless communication link a low resolution version of the image data for identifying a target comprises:
circuitry configured for transmitting via the wireless communication link a low resolution version of the image data for computer-identification of a target.

35. The device of claim 1, wherein the circuitry configured for transmitting via the wireless communication link a low resolution version of the image data for identifying a target comprises:
circuitry configured for transmitting via the wireless communication link a low resolution version of the image data for user-selection of a target.

36. The device of claim 1, wherein the circuitry configured for acquiring via the wireless communication link a request for a selected area that is part of the scene and that is associated with the target, at least partly in response to transmission of the lower resolution version of the image data comprises:

circuitry configured for acquiring via the wireless communication link a request for a selected area that is part of the scene and that is surrounds the target, at least partly in response to transmission of the lower resolution version of the image data.

37. A system comprising:

a wireless communication link;

an image sensor array that includes more than one image sensor and that is configured to capture image data of a scene;

circuitry configured for transmitting via the wireless communication link a low resolution version of the image data for identifying a target;

circuitry configured for acquiring via the wireless communication link a request for a selected area that is part of the scene and that is associated with the target, at least partly in response to transmission of the lower resolution version of the image data;

circuitry configured for selecting at least some of the image data to obtain one or more pixels corresponding to the selected area at a resolution that is higher than the lower resolution; and circuitry configured for transmitting via the wireless communication link the at least some of the image data corresponding to the selected area.

38. A system comprising:

a wireless communication link;

an image sensor array that includes more than one image sensor and that is configured to capture image data of a scene; and at least one processing component configured to perform operations including at least:

transmitting via the wireless communication link a low resolution version of the image data for identifying a target;

acquiring via the wireless communication link a request for a selected area that is part of the scene and that is associated with the target, at least partly in response to transmission of the lower resolution version of the image data;

selecting at least some of the image data to obtain one or more pixels corresponding to the selected area at a resolution that is higher than the lower resolution; and transmitting via the wireless communication link the at least some of the image data corresponding to the selected area.

\* \* \* \* \*

UNITED STATES PATENT AND TRADEMARK OFFICE
CERTIFICATE OF CORRECTION

PATENT NO. : 10,491,796 B2
APPLICATION NO. : 14/838128
DATED : November 26, 2019
INVENTOR(S) : Ehren Brav et al.

Page 1 of 1

It is certified that error appears in the above-identified patent and that said Letters Patent is hereby corrected as shown below:

On the Title Page

Item (72) INVENTORS:
Please replace the listing of inventors "Ehren Brav, Russell Hannigan, Roderick A. Hyde, Muriel Y. Ishikawa, 3ric Johanson, Jordin T. Kare, Phillip Rutschman, Clarence T. Tegreene, Charles Whitmer, Lowell L. Wood, Jr. and Victoria Y.H. Wood"
With:
--Ehren Brav, Russell Hannigan, 3ric Johanson and Phil Rutschman--

In the Claims

Please replace Column 85, Line 11, Claim 15:
"wherein the an image sensor"
With:
--wherein the image sensor--

Please replace Column 87, Line 6, Claim 36:
"of the scene and that is surrounds the target"
With:
--of the scene and that surrounds the target--

Signed and Sealed this
Fourth Day of February, 2020

Andrei Iancu
*Director of the United States Patent and Trademark Office*